(12) United States Patent
Kusakawa et al.

(10) Patent No.: US 8,213,609 B2
(45) Date of Patent: Jul. 3, 2012

(54) KEY GENERATING DEVICE, ENCRYPTING DEVICE, RECEIVING DEVICE, KEY GENERATING METHOD, ENCRYPTING METHOD, KEY PROCESSING METHOD, AND PROGRAM

(75) Inventors: Masafumi Kusakawa, Tokyo (JP); Seiichi Matsuda, Tokyo (JP); Tomoyuki Asano, Kanagawa (JP); Harunaga Hiwatari, Tokyo (JP)

(73) Assignee: Sony Corporation, Tokyo (JP)

( * ) Notice: Subject to any disclaimer, the term of this patent is extended or adjusted under 35 U.S.C. 154(b) by 792 days.

(21) Appl. No.: 12/329,673

(22) Filed: Dec. 8, 2008

(65) Prior Publication Data

US 2009/0208005 A1 Aug. 20, 2009

(30) Foreign Application Priority Data

Dec. 11, 2007 (JP) ................ P2007-319268
Jan. 21, 2008 (JP) ................ P2008-010953
Jun. 9, 2008 (JP) ................ P2008-150982

(51) Int. Cl.
*H04L 9/00* (2006.01)
(52) U.S. Cl. ............ 380/44; 380/29; 380/30; 380/46; 713/168
(58) Field of Classification Search ........ 726/7; 380/29, 380/30, 44, 46; 713/168
See application file for complete search history.

(56) References Cited

U.S. PATENT DOCUMENTS

| 7,590,236 | B1 * | 9/2009 | Boneh et al. ............ 380/30 |
| 7,639,799 | B2 * | 12/2009 | Lauter et al. ............ 380/30 |
| 8,121,289 | B2 * | 2/2012 | Delerablee ............ 380/44 |
| 2008/0085005 | A1 * | 4/2008 | Jung et al. ............ 380/282 |
| 2008/0298582 | A1 * | 12/2008 | Sakai ............ 380/44 |
| 2009/0129600 | A1 * | 5/2009 | Brickell et al. ............ 380/282 |
| 2010/0067702 | A1 * | 3/2010 | Kusakawa et al. ............ 380/282 |

OTHER PUBLICATIONS

Cecile Delerablee et al., "Fully Collusion Secure Dynamic Broadcast Encryption with Constant-Size Ciphertexts of Decryption Keys," France Telecom Division R&D, Springer-Verlag Berlin Heidelberg 2007.
Florian Hess et al., "The Eta Pairing Revisited," IEEE Transactions on Information Theory, vol. 52, No. 10, Oct. 2006.

* cited by examiner

*Primary Examiner* — Nabil El Hady
(74) *Attorney, Agent, or Firm* — Finnegan, Henderson, Farabow, Garrett & Dunner, L.L.P.

(57) ABSTRACT

A key generating device according to an embodiment of the present invention includes: a parameter determining unit that randomly determines a plurality of parameters that are needed when generating a secret key and a public key; a bilinear group selecting unit that selects a plurality of bilinear groups and bilinear mapping on the basis of the plurality of parameters; and a key generating unit that generates the secret key and the public key on the basis of the parameters and the plurality of bilinear groups.

41 Claims, 51 Drawing Sheets

FIG.9A

| | G | | | $G_1$ | | | $Z_p^*$ | | |
|---|---|---|---|---|---|---|---|---|---|
| | Add | Mul | Pairing | Mul | Pow | Inv | Mul | Pow | Inv |
| RELATED ART | $\dfrac{r(r-1)}{2}$ | $\dfrac{r(r-1)}{2}+2$ | 0 | $\dfrac{r(r-1)}{2}$ | $\dfrac{r(r-1)}{2}+1$ | $\dfrac{r(r-1)}{2}$ | 0 | 0 | $\dfrac{r(r-1)}{2}$ |

FIG.9B

| | PUBLIC KEY | HEADER | SECRET KEY |
|---|---|---|---|
| RELATED ART | $3n+3$ | $2r+2$ | 2 |

FIG.15

| | G | | Pairing | G₁ | | | Zp* | | |
|---|---|---|---|---|---|---|---|---|---|
| | Add (A) | Mul (S) | | Mul (M) | Pow (E) | Inv (I) | Mul | Pow | Inv |
| RELATED ART | $\frac{r(r-1)}{2}$ | $\frac{r^2-r}{2}+2$ | 0 | $\frac{r(r-1)}{2}$ | $\frac{r(r-1)}{2}+1$ | $\frac{r(r-1)}{2}$ | 0 | 0 | $\frac{r(r-1)}{2}$ |
| THIS EMBODIMENT | $\frac{r(r-1)}{2}+3$ | $\frac{r^2-r}{2}+6$ | 1 | 0 | 1 | 0 | 0 | 0 | $\frac{r(r-1)}{2}+2$ |
| | ⇒ +3A | ⇒ +4S | ⇒ +P | \multicolumn{3}{c}{⇒ $-\frac{r(r-1)}{2}(M+E+I)$} | | | ⇒ +2inv |

FIG.23

|  | PUBLIC KEY | HEADER | SECRET KEY |
|---|---|---|---|
| RELATED ART | $3n + 3$ | $2r + 2$ | 2 |
| THIS EMBODIMENT | $2n + 5$ | $2r + 2$ | 2 |

RELATED ART: $ek_n = (p, G, G_1, e, W, H, V, (u_1, V_1, B_1), \cdots, (u_n, V_n, B_n))$

→ DELETION

THIS EMBODIMENT: $ek_n = (p, G, G_1, e, W, H, V, u_0, dk_0, (u_1, B_1), \cdots, (u_n, B_n))$

ADDITION

FIG.35

| | G | | Pairing | $G_1$ | | | | $Z_p^*$ | | |
|---|---|---|---|---|---|---|---|---|---|---|
| | Add (A) | Mul (S) | | Mul (M) | Pow (E) | Inv (I) | | Mul | Pow | Inv |
| RELATED ART | $\frac{r(r-1)}{2}$ | $\frac{r^2-r}{2}+2$ | 0 | $\frac{r(r-1)}{2}$ | $\frac{r(r-1)}{2}+1$ | $\frac{r(r-1)}{2}$ | | 0 | 0 | $\frac{r(r-1)}{2}$ |
| THIS MODIFICATION | $\frac{r(r-1)}{2}+3$ | $\frac{r^2-r}{2}+6$ | 1 | 0 | 1 | 0 | | 0 | 0 | $\frac{r(r-1)}{2}+2$ |
| | ⇨ +3A | ⇨ +4S | ⇨ +P | $\underbrace{\qquad\qquad\qquad\qquad\qquad\qquad}_{-\frac{r(r-1)}{2}(M+E+I)}$ | | | | | | ⇨ +2inv |

FIG.45
|  | PUBLIC KEY | HEADER | SECRET KEY |
|---|---|---|---|
| RELATED ART | $3n + 3$ | $2r + 2$ | 2 |
| THIS EMBODIMENT | $2n + 5$ | $2r + 2$ | 2 |
RELATED ART: $ek_n = (p, \mathbf{G}, \mathbf{G}_1, e, W, H, V, (u_1, V_1, B_1), \cdots, (u_n, V_n, B_n))$
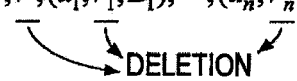
→DELETION
THIS EMBODIMENT: $ek_n = (p, \mathbf{G}, \mathbf{G}_1, e, W, H, V, u_0, dk_0, (u_1, B_1), \cdots, (u_n, B_n))$
ADDITION

KEY GENERATING DEVICE, ENCRYPTING DEVICE, RECEIVING DEVICE, KEY GENERATING METHOD, ENCRYPTING METHOD, KEY PROCESSING METHOD, AND PROGRAM

CROSS-REFERENCE TO RELATED APPLICATION

The present invention contains subject matter related to Japanese Patent Application JP 2007-319268 filed in the Japan Patent Office on Dec. 11, 2007, Japanese Patent Application JP 2008-10953 filed in the Japan Patent Office on Jan. 21, 2008, and Japanese Patent Application JP 2008-150982 filed in the Japan Patent Office on Jun. 9, 2008, the entire contents of which being incorporated herein by reference.

BACKGROUND OF THE INVENTION

1. Field of the Invention

The present invention relates to a key generating device, an encrypting device, a receiving device, a key generating method, an encrypting method, a key processing method, and a program.

2. Description of the Related Art

In recent years, with the spread and development of mobile phones or digital home appliances as well as personal computers (PC), a business that is related to distributing contents, such as music or video, has become important more and more. As the content distribution business, a CATV or satellite broadcasting, pay broadcasting utilizing the Internet, and content sales utilizing physical media, such as a CD or DVD, exist. In all of the cases, it is necessary to construct a scheme where only a contractor can acquire contents. As a method that realizes the content distribution system, there is a cipher technology that is called Broadcast Encryption. In the Broadcast Encryption, a manager (hereinafter, referred to as center) of the content distribution system provides a key to only a contractor (hereinafter, referred to as user) in advance, and at the time of distributing the contents, a cipher text where the contents are encrypted with a session key and a header that enables only a user belonging to a designated set to acquire the session key are distributed, thereby enabling only a specific contractor to acquire the contents.

In the Broadcast Encryption, common key Broadcast Encryption that configures a common key cipher as a main constituent and public key Broadcast Encryption that configures a public key cipher as a main constituent exist. In the case of the former, since a process of acquiring a session key from a header is executed using a common key cipher, the processing speed can be greatly increased. However, since the center and each user need to share the same key or an intermediate key needed when deriving the same key in advance, only the center can distribute the contents. Accordingly, the former is a system suitable for pay broadcasting or content distribution using physical media such as a DVD and next-generation DVD. In actuality, the former is used in the standard such as AACS.

In the case of the latter, since the entire system or a public key of each user, or both the entire system and the public key are opened, there is an advantage in that anyone can distribute contents to a specific user set. However, since a process of acquiring a session key from a header is executed using a public key cipher, there is a disadvantage in that the process is delayed as compared with the case of the former. Accordingly, different from the former, the latter is suitable for an environment where it is difficult to share a key in advance (for example, a content distribution on the Internet or the dynamic configuration of a safe network).

As such, in the Broadcast Encryption, a plurality of applicable methods exist according to each situation, but even when any method is used, efficiency of three points that include a size of a header, the number of keys that a user holds, and the amount of calculation needed to acquire a session key becomes important. The header size affects capacities of physical media in the case of the physical media, and affects the amount of transmission information of a network in the case of the network. The number of keys that the user holds affects a memory size that needs to be obtained for keys, when an apparatus that each user holds is designed. The amount of calculation affects time that is needed until the user reproduces encrypted contents or power consumption of an apparatus that the user holds. In addition, in the public key Broadcast Encryption, since the public key is used when encryption or decryption is performed or both the encryption and the decryption are performed, the size of the public key also becomes an important indicator. Accordingly, in the Broadcast Encryption, it is important to maximally reduce the above values.

Among methods that have attracted attention as public key Broadcast Encrypting methods, a method (hereinafter, referred to a method according to the related art) is disclosed in the following Document 1. This method is similar to the methods used until now. Specifically, the method is a safe method with respect to a coalition and the size of the public key is the same as the size in the methods used until now, but the configuration where the public key is not used at the time of decryption is realized, thereby succeeding in reducing the amount of information that each apparatus holds. Further, even after the system is set, a new user can be freely added.

[Document 1]

C. Delerablee, P. Paillier, and D. Pointcheval, "Fully Collusion Secure Dinamic Broadcast Encryption with Constant-Size Ciphertexts or Decryption Keys" Pairing-Based Cryptography-Pairing 2007, Lecture Notes in Computer Science 4575, pp. 39-59, Springer, 2007.

[Document 2]

F. Hess, N. Smart, and F. Vercauteren, "The Eta Pairing Revisited" IEEE TRANSACTIONS ON INFORMATION THEORY, VOL. 52, NO. 10, pp. 4595-4602, October 2006.

However, in the related art that is described in the above Document 1, in regards to a calculation amount that is needed when an encryption process is executed, when the number of revoked users is r, addition of points on an elliptic curve and scalar multiplication are needed by about $r^2$ times, and multiplication, a power, and an inverse element operation on a cyclic group where a bit length is long are needed by about $r^2$ times. As r increases, an operation load of a transmitter greatly increases.

SUMMARY OF THE INVENTION

Accordingly, the present invention addresses the above-identified and other issues associated with conventional methods and apparatuses. There is a need for a key generating device, an encrypting device, a receiving device, a key generating method, an encrypting method, a key processing method, and a program, which is new and improved, and can reduce a calculation amount needed when an encryption process is executed.

According to an embodiment of the present invention, there is provided a key generating device that generates a unique secret key of each of a plurality of receiving devices and a public key and public information opened to the plurality of receiving devices and an encrypting device. The key generating device includes: a parameter determining unit that randomly determines a plurality of parameters that are needed when generating the secret key and the public key; a bilinear group selecting unit that selects a plurality of bilinear groups and bilinear mapping on the basis of the plurality of parameters; and a key generating unit that generates the secret key and the public key on the basis of the parameters and the plurality of bilinear groups.

The parameter determining unit may determine a prime number p of a predetermined digit as a parameter, and the bilinear group selecting unit may select a bilinear mapping group G and a cyclic multiplicative group $G_1$ where the prime number p is used as an order.

The parameter determining unit may determine $\gamma \in Z_P^*$ and G, H∈G as parameters, and the key generating unit may select a unique value $u_i \in Z_P^*$ of the receiving device, and calculates the secret key $dk_i$ on the basis of the following Equation 1.

$$dk_i = (A_i, B_i) \in G \quad \text{[Equation 1]}$$
$$= \left(\frac{u_i}{\gamma + u_i} G, \frac{1}{\gamma + u_i} H\right)$$

The key generating unit may further include a pseudo secret key calculating unit that calculates a pseudo secret key, which is not used as the secret key but opened as the public information. The pseudo secret key calculating unit may select $u_0 \in Z_P^*$ opened as the public information, and calculate the pseudo secret key $dk_0$ on the basis of the following Equation 2.

[Formula 2]
$$dk_0 = (A_0, B_0) \in G \quad \text{[Equation 2]}$$
$$= \left(\frac{u_0}{\gamma + u_0} G, \frac{1}{\gamma + u_0} H\right)$$

The key generating unit may calculate V=e (G, H)∈$G_1$ and W=γG∈G, calculate unique public information $V_i$ of the receiving device on the basis of the following Equation 3, and calculate a public key $ek_i$ on the basis of the following Equation 4.

$$V_i = e(G, H)^{\frac{1}{\gamma + u_i}} \in G_1 \quad \text{[Equation 3]}$$
$$ek_i = \begin{array}{l}(p, G, G_1, e, W, H, V, \\ (u_1, B_1, V_1), \ldots (u_i, B_i, V_i))\end{array} \quad \text{[Equation 4]}$$

The key generating unit may calculate W=γG∈G, and calculate a public key $ek_i$ on the basis of the following Equation 5.

$$ek_i = (p, G, G_1, e, W, H, u_0, dk_0, (u_1, B_1), \ldots (u_i, B_i)) \quad \text{[Equation 5]}$$

According to another embodiment of the present invention, there is provided a key generating device that generates a unique secret key of each of a plurality of receiving devices and a public key and public information opened to the plurality of receiving devices and an encrypting device. The key generating device includes a parameter determining unit that randomly determines a plurality of parameters that are needed when generating the secret key and the public key; a bilinear group selecting unit that selects a plurality of bilinear groups and bilinear mapping on the basis of the plurality of parameters; and a key generating unit that generates the secret key and the public key on the basis of the parameters and the plurality of bilinear groups. The parameter determining unit determines prime number p of a predetermined digit, $\gamma \in Z_P^*$, and G, H∈G as parameters. The bilinear group selecting unit selects a bilinear mapping group G and a cyclic multiplicative group $G_1$ where the prime number p is used as an order, and bilinear mapping e. The key generating unit calculates V=e (G, H)∈$G_1$, W=γG∈G, and X=γH∈G, selects a unique value $u_i \in Z_P^*$ of the receiving device, calculates the secret key $dk_i$ on the basis of the following Equation 1, calculates unique public information $V_i$ of the receiving device on the basis of the following Equation 6, and calculates a public key $ek_i$ on the basis of the following Equation 7.

$$dk_i = (A_i, B_i) \in G \quad \text{[Equation 1]}$$
$$= \left(\frac{u_i}{\gamma + u_i} G, \frac{1}{\gamma + u_i} H\right)$$

$$V_i = e(G, H)^{\frac{1}{\gamma + u_i}} \in G_1 \quad \text{[Equation 6]}$$

$$ek_i = \begin{array}{l}(p, G, G_1, e, W, H, V, X, \\ (u_1, B_1, V_1), \ldots (u_i, B_i, V_i))\end{array} \quad \text{[Equation 7]}$$

According to another embodiment of the present invention, there is provided an encrypting device that encrypts a plain text on the basis of a public key and public information and generates a cipher text. The encrypting device includes a revoked receiving device specifying unit that specifies revoked receiving devices that is not allowed to decrypt the cipher text among a plurality of receiving devices and determines a set of the revoked receiving devices; a session key determining unit that determines a session key needed to encrypt the cipher text, on the basis of a pseudo secret key that is not used as the secret key but opened as the public information or a unique secret key of the encrypting device, the public key, and the public information and the set of revoked receiving devices; a bilinear mapping operation unit that executes a bilinear mapping operation that is needed when calculating the session key; and an encrypting unit that encrypts the plain text using the session key. The bilinear mapping operation unit outputs at least a value $P_r$ defined by the following Equation 8 as an operation result to the session key determining unit. The session key determining unit calculates a value that is equivalent to $_\gamma P_r$ on the basis of the public information and the operation result output from the bilinear mapping operation unit, and calculates a session key on the basis of the calculated $_\gamma P_r$, the public information, and the pseudo secret key opened as the public information or the unique secret key of the encrypting device.

$$P_l(l = 1, \ldots, r) = \frac{1}{(\gamma + u_{R_1}) \ldots (\gamma + u_{R_1})} H \in G \quad \text{[Equation 8]}$$

When the number r of elements of the set of revoked receiving devices is 2 or more, the bilinear mapping operation unit may output values defined by the following Equations 9 and 10 in addition to Equation 8 as an operation result to the session key determining unit.

$$P_{r-2,r-1} = \frac{1}{(\gamma + u_{R_1}) \ldots (\gamma + u_{R_{r-2}})(\gamma + u_{R_{r-1}})} H \in G \quad \text{[Equation 9]}$$

$$P_{r-2,r} = \frac{1}{(\gamma + u_{R_1}) \ldots (\gamma + u_{R_{r-2}})(\gamma + u_{R_r})} H \in G \quad \text{[Equation 10]}$$

The session key determining unit may calculate a value $_\gamma P_r$ defined by the following Equation 11, on the basis of the public information and the operation result output from the bilinear mapping operation unit. The session key determining unit may calculate a session key, on the basis of the value $_\gamma P_r$, the public information, and the pseudo secret key opened as the public information or the unique secret key of the encrypting device.

$$\gamma P_r = \frac{1}{2}(P_{r-2,r-1} + P_{r-2,r} - (u_{R_{r-1}} + u_{R_r})P_r) \quad \text{[Equation 11]}$$

The session key determining unit may calculate the value $_\gamma P_r$ defined by the following Equation 12, on the basis of the public information and the operation result output from the bilinear mapping operation unit. The session key determining unit may calculate a session key, on the basis of the value $_\gamma P_r$, the public information, and the pseudo secret key opened as the public information or the unique secret key of the encrypting device.

$$\gamma P_r = P_{r-1} - u_{R_r} P_r \quad \text{[Equation 12]}$$

The session key determining unit may select $k \in Z_p^*$, calculate a value K' defined by the following Equation 13 on the basis of the value $_\gamma P_r$, the public information, and the pseudo secret key opened as the public information or the unique secret key of the encrypting device, and calculate a session key $K=(K')^k \in G_1$.

$$K' = e\left(\frac{1}{u_j} A_j, \gamma P_r + u_j P_r\right) \in G_1 \quad \text{[Equation 13]}$$

The session key determining unit may calculate a header hdr transmitted together with the cipher text, on the basis of the following Equation 14.

$$hdr = (kW, kP_r, (u_{R_1}, P_1), \ldots, (u_{R_r}, P_r)) \quad \text{[Equation 14]}$$

The encrypting device may further include a utilization key specifying unit that determines whether the encrypting device holds a unique secret key thereof and specifies a secret key used when a session key is calculated. When it is determined that the encrypting device holds the unique secret key thereof, the session key determining unit may use the unique secret key of the encrypting device to calculate the session key K. When it is determined that the encrypting device does not hold the unique secret key thereof, the session key determining unit may use a pseudo secret key included in the public information to calculate the session key K.

The encrypting device may include a session key calculating method selecting unit that holds a second session key calculating method that is used to calculate the session key K, and selects a session key calculating method to calculate the session key K. The session key calculating method selecting unit may select the session key calculating method used by the session key determining unit in accordance with the number r of elements of the set of revoked receiving devices.

The encrypting device may include a transmitter authentication information generating unit that uses an operation result from the bilinear mapping operation unit to generate transmitter authentication information, which is used when it is detected whether the cipher text is tampered and validity of the cipher text is verified by the receiving device.

The transmitter authentication information generating unit may use the public key, the public information, the unique secret key of the encrypting device, the parameters and the session key used when the session key is calculated, and the cipher text, thereby generating the transmitter authentication information.

The transmitter authentication information generating unit may select an arbitrary parameter $t \in Z_p^*$, and use the public information and the parameter t to calculate an element $sig_{j,0}$ of the transmitter authentication information on the basis of the following Equation 15. The transmitter authentication information generating unit may use the cipher text C, the session key K, the calculated element $sig_{j,0}$, and a hash function H to calculate a hash value h on the basis of the following Equation 16.

$$sig_{j,0} = e(G, H)^{\frac{t}{(\gamma + u_{R_1}) \ldots (\gamma + u_{R_r})}} \in G \quad \text{[Equation 15]}$$

$$h = H(C, K, sig_{j,0}) \quad \text{[Equation 16]}$$

The transmitter authentication information generating unit may calculate secret information y of the encrypting device on the basis of the following Equation 17, and use the secret information y and the unique secret key of the encrypting device to calculate an element $sig_{j,1}$ of the transmitter authentication information on the basis of the following Equation 18. The transmitter authentication information generating unit may use the unique value $u_i$ of the encrypting device, the element $sig_{j,0}$, and the element $sig_{j,1}$ to set ($u_i$, $sig_{j,0}$, $sig_{j,1}$) as the transmitter authentication information.

$$y = t - hk \in Z_p^* \quad \text{[Equation 17]}$$

$$sig_{j,1} = \frac{y}{u_j} A_j = \frac{t - hk}{\gamma + u_j} G \in G \quad \text{[Equation 18]}$$

The transmitter authentication information generating unit may calculate secret information y of the encrypting device on the basis of the following Equation 19, and use the secret information y and the unique secret key of the encrypting device to calculate an element $sig_{j,1}$ of the transmitter authentication information on the basis of the following Equation 20. The transmitter authentication information generating unit may use the unique value $u_i$ of the encrypting device, the element $sig_{j,0}$, and the element $sig_{j,1}$ to set ($u_i$, $sig_{j,0}$, $sig_{j,1}$) as the transmitter authentication information.

The transmitter authentication information generating unit may calculate secret information y of the encrypting device on the basis of the following Equation 19, and use the secret information y and the unique secret key of the encrypting device to calculate an element $sig_{j,1}$ of the transmitter authentication information on the basis of the following Equation 20. The transmitter authentication information generating unit may use the unique value $u_i$ of the encrypting device and the calculated hash value h and element $sig_{j,1}$ to set ($u_i$, h, $sig_{j,1}$) as the transmitter authentication information.

$$y = t - h \in Z_p^*$$ [Equation 19]

$$sig_{j,1} = \frac{y}{u_j} A_j = \frac{t-h}{\gamma + u_j} G \in G$$ [Equation 20]

According to another embodiment of the present invention, there is provided a receiving device that communicates with a key generating device and an encrypting device. The receiving device includes a session key calculating unit that calculates a session key used to decrypt a cipher text transmitted from the encrypting device, on the basis of a unique secret key of the receiving device, a public key, and public information generated by the key generating device, and a header transmitted from the encrypting device; and a bilinear mapping operation unit that executes a bilinear mapping operation needed when the session key is calculated. The bilinear mapping operation unit operates a value $B_{i,r}$ defined by the following Equation 21 on the basis of the public key and the public information, and the session key calculating unit calculates the session key on the basis of the following Equation 22.

$$B_{i,R} = \frac{1}{\prod_{j=1}^{r}(\gamma + u_{R_j})} B_i$$ [Equation 21]

$$K = e(k\,W, B_{i,R}) \cdot e(A_i, kP_r)$$ [Equation 22]

According to anther embodiment of the present invention, there is provided a receiving device that communicates with a key generating device and an encrypting device. The receiving device includes a session key calculating unit that calculates a session key used to decrypt a cipher text transmitted from the encrypting device, on the basis of a unique secret key of the receiving device, a public key, and public information generated by the key generating device, and a header transmitted from the encrypting device; a received content verifying unit that uses the header, the cipher text, transmitter authentication information transmitted from the encrypting device, and the calculated session key to verify received information; and a bilinear mapping operation unit that executes a bilinear mapping operation needed when the session key is calculated and the received information is verified.

The received content verifying unit may use the calculated session key, the cipher text, and the transmitter authentication information to calculate a predetermined value, and verify the predetermined value on the basis of whether the calculated value is equal to a portion of elements constituting the transmitter authentication information.

The received content verifying unit may use a value $_\gamma P_r$ calculated in accordance with r as the number of revoked receiving devices, the transmitter authentication information ($u_i$, $sig_{j,0}$, $sig_{j,1}$), and the header to calculate a parameter $CH_1$ on the basis of the following Equation 23. The received content verifying unit may use the cipher text, the calculated session key K, and an element $sig_{j,0}$ of the transmitter authentication information to calculate a hash value h' on the basis of the following Equation 24. The received content verifying unit may use the parameter $CH_1$, the session key K, and the hash value h' to calculate a verifying parameter $CH_2$ on the basis of the following Equation 25.

$$CH_1 = e(sig_{j,1}, \gamma P_r + u_j P_r) \in G_1$$ [Equation 23]

$$h' = H(C, K, sig_{j,0})$$ [Equation 24]

$$CH_2 = CH_1 \cdot K^{h'} \in G_1$$ [Equation 25]

The received content verifying unit may use a value $_\gamma P_r$ calculated in accordance with r as the number of revoked receiving devices, the transmitter authentication information ($u_i$, $sig_{j,0}$, $sig_{j,1}$), and the header to calculate a parameter $CH_1$ on the basis of the following Equation 23. The received content verifying unit may use the cipher text, the calculated session key K, and an element $sig_{j,0}$ of the transmitter authentication information to calculate a hash value h' on the basis of the following Equation 24. The received content verifying unit may use the public key, the public information, and the calculated value $_\gamma P_r$ to calculate a parameter K' on the basis of the following Equation 26. The received content verifying unit may use the parameter $CH_1$, the parameter K', and the hash value h' to calculate a verifying parameter $CH_2$ on the basis of the following Equation 27.

$$CH_1 = e(sig_{j,1}, \gamma P_r + u_j P_r) \in G_1$$ [Equation 23]

$$h' = H(C, K, sig_{j,0})$$ [Equation 24]

$$K' = e\left(\frac{1}{\gamma + u_0} G, \gamma P_r + u_0 P_r\right)$$ [Equation 26]

$$CH_2 = CH_1 \cdot K'^{h'} \in G_1$$ [Equation 27]

The received content verifying unit may use a value $_\gamma P_r$ calculated in accordance with r as the number of revoked receiving devices, the transmitter authentication information ($u_i$, h, $sig_{j,1}$), and the header to calculate a parameter $CH_1$ on the basis of the following Equation 23. The received content verifying unit may use the public key, the public information, the calculated value $_\gamma P_r$, and the unique secret key of the receiving device to calculate a parameter K' on the basis of the following Equation 28. The received content verifying unit may use the parameter $CH_1$, the parameter K', and an element h of the transmitter authentication information to calculate a verifying parameter $CH_2$ on the basis of the following Equation 29. The received content verifying unit may use the cipher text, the calculated session key K, and the calculated verifying parameter $CH_2$ to calculate a hash value h' on the basis of the following Equation 30.

$$CH_1 = e(sig_{j,1}, \gamma P_r + u_j P_r) \in G_1$$ [Equation 23]

$$K' = e\left(\frac{1}{\gamma + u_i} G, \gamma P_r + u_i P_r\right)$$ [Equation 28]

$$CH_2 = CH_1 \cdot K'^h \in G_1$$ [Equation 29]

$$h' = H(C, K, CH_2)$$ [Equation 30]

The received content verifying unit may determine that verification is successfully made, when the verifying parameter $CH_2$ is equal to an element $sig_{j,0}$ of the transmitter authentication information. The received content verifying unit may determine that the verification is failed, when the verifying parameter $CH_2$ is not equal to the element $sig_{j,0}$ of the transmitter authentication information.

The received content verifying unit may determine that verification is successfully made, when the hash value h' is equal to an element h of the transmitter authentication information. The received content verifying unit may determine that the verification is failed, when the hash value h' is not equal to the element h of the transmitter authentication information.

The receiving device may further include a decrypting unit that decrypts the cipher text using the calculated session key. The decrypting unit may execute a decryption process on the cipher text in accordance with a verification result of the received content verifying unit.

The decrypting unit may not execute a decryption process on the cipher text, when the transmitter authentication information is generated using a pseudo secret key that is not used as the secret key but opened as the public information.

According to another embodiment of the present invention, there is provided a key generating method that generates a unique secret key of each of a plurality of receiving devices and a public key and public information opened to the plurality of receiving devices and an encrypting device. The key generating method includes the steps of: randomly determining a plurality of parameters that are needed when generating the secret key and the public key; selecting a plurality of bilinear groups and bilinear mapping on the basis of the plurality of parameters; and generating the secret key and the public key on the basis of the parameters and the plurality of bilinear groups.

According to another embodiment of the present invention, there is provided a key generating method that generates a unique secret key of each of a plurality of receiving devices and a public key and public information opened to the plurality of receiving devices and an encrypting device. The key generating method includes the steps of: randomly determining a plurality of parameters that are needed when generating the secret key and the public key and selecting a plurality of bilinear groups and bilinear mapping on the basis of the plurality of parameters; and generating the secret key and the public key on the basis of the parameters and the plurality of bilinear groups. In the step of determining the parameters and selecting the plurality of bilinear groups and bilinear mapping, a prime number p of a predetermined digit, $\gamma \in Z_P^*$, and G, H∈G are determined as parameters, and a bilinear mapping group G and a cyclic multiplicative group $G_1$ where the prime number p is used as an order and bilinear mapping e are selected. In the key generating step, V=e (G, H)∈$G_1$, W=γG∈G, and X=γH∈G are calculated, a unique value $u_i \in Z_P^*$ of the receiving device is selected, the secret key $dk_i$ is calculated on the basis of the following Equation 1, unique public information $V_i$ of the receiving device is calculated on the basis of the following Equation 6, and a public key $ek_i$ is calculated on the basis of the following Equation 7.

$$dk_i = (A_i, B_i) \in G \quad \text{[Equation 1]}$$
$$= \left( \frac{u_i}{\gamma + u_i} G, \frac{1}{\gamma + u_i} H \right)$$

$$V_i = e(G, H)^{\frac{1}{\gamma + u_i}} \in G_1 \quad \text{[Equation 6]}$$

$$ek_i = \begin{matrix} (p, G, G_1, e, W, H, V, X, \\ (u_1, B_1, V_1), \ldots (u_i, B_i, V_i)) \end{matrix} \quad \text{[Equation 7]}$$

According to another embodiment of the present invention, there is provided an encrypting method that encrypts a plain text on the basis of a public key and public information and generates a cipher text. The encrypting method includes the steps of: specifying revoked receiving devices that are not allowed to decrypt the cipher text among a plurality of receiving devices and determining a set of the revoked receiving devices; executing a bilinear mapping operation that is needed when calculating a session key used to encrypt the plain text, and outputting at least a value $P_r$ defined as the following Equation 8 as an operation result; determining the session key used to encrypt the plain text, on the basis of a pseudo secret key that is not used as the secret key but opened as the public information or a unique secret key of the encrypting device, the public key, the public information, the set of revoked receiving devices, and the operation result; and encrypting the plain text using the session key.

$$P_l(l=1, \ldots, r) = \frac{1}{(\gamma + u_{R_1}) \ldots (\gamma + u_{R_l})} H \in G \quad \text{[Equation 8]}$$

In the bilinear mapping operation step, when the number r of elements of the set of revoked receiving devices is 2 or more, values defined by Equations 9 and 10 in addition to Equation 8 may be output as an operation result.

$$P_{r-2,r-1} = \frac{1}{(\gamma + u_{R_1}) \ldots (\gamma + u_{R_{r-2}})(\gamma + u_{R_{r-1}})} H \in G \quad \text{[Equation 9]}$$

$$P_{r-2,r} = \frac{1}{(\gamma + u_{R_1}) \ldots (\gamma + u_{R_{r-2}})(\gamma + u_{R_r})} H \in G \quad \text{[Equation 10]}$$

The encrypting method may include a transmitter authentication information generating step of using an operation result obtained by executing the bilinear mapping operation step to generate transmitter authentication information, which is used when it is detected whether the cipher text is tampered and validity of the cipher text is verified by the receiving device.

According to another embodiment of the present invention, there is provided a key processing method that is executed by a receiving device that communicates with a key generating device and an encrypting device. The key processing method includes the steps of: executing a bilinear mapping operation that is needed when calculating a session key used to decrypt a cipher text transmitted from the encrypting device, and outputting a value $B_{i,r}$ defined by the following Equation 21; and calculating the session key using the following Equation 22, on the basis of a unique secret key of the receiving device, a public key, and public information generated by the key generating device, and a header transmitted from the encrypting device.

$$B_{i,R} = \frac{1}{\prod_{j=1}^{r} (\gamma + u_{R_j})} B_i \quad \text{[Equation 21]}$$

$$K = e(k W, B_{i,R}) \cdot e(A_i, kP_r) \quad \text{[Equation 22]}$$

According to another embodiment of the present invention, there is provided a key processing method that is executed by a receiving device that communicates with a key generating device and an encrypting device. The key processing method includes the steps of: executing a bilinear mapping operation that is needed when calculating a session key used to decrypt a cipher text transmitted from the encrypting device; calculating the session key used to decrypt the cipher text transmitted from the encrypting device, on the basis of a unique secret key of the receiving device, a public key, and public information generated by the key generating device, and a header transmitted from the encrypting device; and verifying the received content using the header, the cipher text, transmitter authentication information transmitted from the encrypting device, and the calculated session key.

According to another embodiment of the present invention, there is provided a program that allows a computer to function as a key generating device that generates a unique secret key of each of a plurality of receiving devices and a public key and public information opened to the plurality of receiving devices and an encrypting device. The program allows the computer to execute: a parameter determining function of randomly determining a plurality of parameters that are needed when generating the secret key and the public key; a bilinear group selecting function of selecting a plurality of bilinear groups and bilinear mapping on the basis of the plurality of parameters; and a key generating function of generating the secret key and the public key on the basis of the parameters and the plurality of bilinear groups.

According to anther embodiment of the present invention, there is provided a program that allows a computer to function as a key generating device that generates a unique secret key of each of a plurality of receiving devices and a public key and public information opened to the plurality of receiving devices and an encrypting device. The program allows the computer to execute: a parameter determining function of determining a prime number p of a predetermined digit, $\gamma \in Z_P^*$, and $G$, $H \in G$ as parameters, which are needed when generating the secret key and the public key; a bilinear group selecting function of selecting a bilinear mapping group $G$ and a cyclic multiplicative group $G_1$ where the prime number p is used as an order and bilinear mapping e, on the basis of the prime number p of the predetermined digit; and a key generating function of calculating $V=e(G, H) \in G_1$, $W=\gamma G \in G$, and $X=\gamma H \in G$, selecting a unique value $u_i \in Z_P^*$ of the receiving device, outputting a value defined by the following Equation 1 as an operation result and setting the value as the secret key $dk_i$, outputting a value defined by the following Equation 6 as an operation result and setting the value as unique public information $V_i$ of the receiving device, and outputting a value defined by the following Equation 7 as an operation result and setting the value as a public key $ek_i$, on the basis of the parameters and the plurality of bilinear groups.

$$dk_i = (A_i, B_i) \in G \qquad \text{[Equation 1]}$$
$$= \left( \frac{u_i}{\gamma + u_i} G, \frac{1}{\gamma + u_i} H \right)$$

$$V_i = e(G, H)^{\frac{1}{\gamma + u_i}} \in G_1 \qquad \text{[Equation 6]}$$

$$ek_i = \begin{matrix}(p, G, G_1, e, W, H, V, X, \\ (u_1, B_1, V_1), \ldots (u_i, B_i, V_i))\end{matrix} \qquad \text{[Equation 7]}$$

According to this configuration, a computer program is stored in a storage unit that is included in a computer and read and executed by a CPU that is included in the computer, thereby allowing the computer to function as the key generating device. In addition, it may be possible to provide a recording medium that stores a computer program and is readable by the computer. For example, the recording medium may be a magnetic disk, an optical disk, a magneto-optical disk, or a flash memory. In addition, the computer program may be distributed through a network without using the recording medium.

According to another embodiment of the present invention, there is provided a program that allows a computer to function as an encrypting device that encrypts a plain text on the basis of a public key and public information and generates a cipher text. The program allows the computer to execute: a revoked receiving device specifying function of specifying revoked receiving devices where the cipher text is not transmitted among a plurality of receiving devices and determining a set of the revoked receiving devices; a session key determining function of determining a session key used to encrypt the plain text, on the basis of a pseudo secret key that is not used as the secret key but opened as the public information or a unique secret key of the encrypting device, the public key, the public information, and the set of revoked receiving devices; a bilinear mapping operation function of executing a bilinear mapping operation needed when the session key is calculated on the basis of the pseudo secret key that is not used as the secret key but opened as the public information or the unique secret key of the encrypting device, the public key, the public information, and the set of revoked receiving devices, and outputting at least a value $P_r$ defined by the following Equation 8 as an operation result; and an encrypting function of encrypting the plain text using the session key.

$$P_l(l = 1, \ldots, r) = \frac{1}{(\gamma + u_{R_1}) \ldots (\gamma + u_{R_l})} H \in G \qquad \text{[Equation 8]}$$

According to this configuration, a computer program is stored in a storage unit that is included in a computer and read and executed by a CPU that is included in the computer, thereby allowing the computer to function as the encrypting device. In addition, it may be possible to provide a recording medium that stores a computer program and is readable by the computer. For example, the recording medium may be a magnetic disk, an optical disk, a magneto-optical disk, or a flash memory. In addition, the computer program may be distributed through, for example, a network without using the recording medium.

According to another embodiment of the present invention, there is provided a program that allows a computer to function as a receiving device that communicates with a key generating device and an encrypting device. The program allows the computer to execute: a bilinear mapping operation function of executing a bilinear mapping operation needed when calculating a session key used to decrypt a cipher text transmitted from the encrypting device, and outputting a value $B_{i,r}$ defined by the following Equation 21; and a session key calculating function of calculating the session key using the following Equation 22, on the basis of a unique secret key of the receiving device, a public key, and public information generated by the key generating device, and a header transmitted from the encrypting device.

$$B_{i,R} = \frac{1}{\prod_{j=1}^r (\gamma + u_{R_j})} B_i \qquad \text{[Equation 21]}$$

$$K = e(k\,W, B_{i,R}) \cdot e(A_i, kP_r) \qquad \text{[Equation 22]}$$

According to anther embodiment of the present invention, there is provided a program that allows a computer to function as a receiving device that communicates with a key generating device and an encrypting device. The program allows the computer to execute: a session key calculating function of calculating a session key used to decrypt a cipher text transmitted from the encrypting device, on the basis of a unique secret key of the receiving device, a public key, and public information generated by the key generating device, and a header transmitted from the encrypting device; a received content verifying function of using the header, the cipher text, transmitter authentication information transmitted from the encrypting device, and the calculated session key to verify the received information; and a bilinear mapping operation function of executing a bilinear mapping operation needed when the session key is calculated and the received information is verified.

According to this configuration, a computer program is stored in a storage unit that is included in a computer and read and executed by a CPU that is included in the computer, thereby allowing the computer to function as the receiving device. In addition, it may be possible to provide a recording medium that stores a computer program and is readable by the computer. For example, the recording medium may be a magnetic disk, an optical disk, a magneto-optical disk, or a flash memory. In addition, the computer program may be distributed through, for example, a network without using the recording medium.

According to the embodiments of the present invention described above, multiplication, a power, and an inverse element operation on a cyclic group where a bit length is long, which are needed at the time of encryption in the method according to the related art, are removed, and a one-time bilinear mapping operation (pairing) and an operation of points on an elliptic curve are slightly added. Therefore, when the user, that is, an entity (an operation subject, such as a person, a device, and a server) holding a secret key executes encryption, in particular, as r increases, the calculation amount that is needed at the time of encryption, that is, the calculation time or a cost of an apparatus that is needed at the time of calculation can be reduced.

BRIEF DESCRIPTION OF THE DRAWINGS

FIGS. 9A and 9B are diagrams illustrating a data size and a calculation amount in the method according to related art;

FIG. 15 is a diagram illustrating a calculation amount in an encryption process according to the embodiment;

FIG. 23 is a flowchart illustrating a public key size in an encryption process according to the embodiment;

FIG. 35 is a diagram illustrating a calculation amount in an encryption process according to the same modification;

FIG. 45 is a flowchart illustrating a public key size in an encryption process according to the embodiment;

DETAILED DESCRIPTION OF THE PREFERRED EMBODIMENTS

Figure 1:
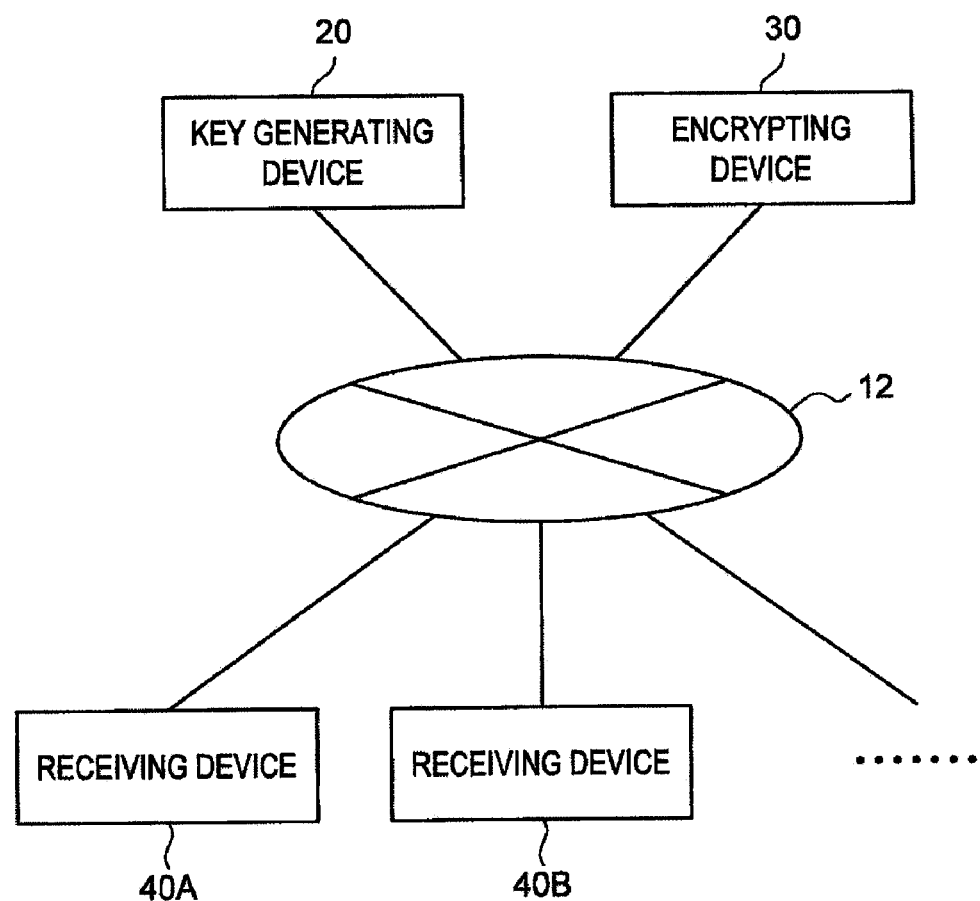
FIG. 1 is a diagram illustrating a cipher key distribution system according to a first embodiment of the present invention.

Hereinafter, preferred embodiments of the present invention will be described in detail with reference to the appended drawings. Note that, in this specification and the appended drawings, structural elements that have substantially the same function and structure are denoted with the same reference numerals, and repeated explanation of these structural elements is omitted.

(First Embodiment)
<With Respect to a Cipher Key Distribution System>

Hereinafter, a cipher key distribution system according to a first embodiment of the present invention will be described in detail.

FIG. 1 is a diagram illustrating a cipher key distribution system 10 according to this embodiment. The cipher key distribution system 10 includes a communication network 12, a key generating device 20, an encrypting device 30, a receiving device 40A, and a receiving device 40B, for example.

The communication network 12 is a communication circuit switching network that connects the key generating device 20, the encrypting device 30, and the receiving device 40 to enable two-way communication or one-way communication. For example, the communication network is composed of the Internet, a telephone circuit switching network, a satellite communication network, a public switched telephone network, such as a multicasting path, or a leased line network, such as a wide area network (WAN), a local area network (LAN), an Internet protocol-virtual private network (IP-VPN), and a wireless LAN, and may be a wired network or a wireless network.

The key generating device 20 generates a public key and unique secret keys of a plurality of receiving devices, opens the public key, and distributes the secret keys to the individual receiving devices through a secure communication path. In addition, the key generating device 20 is possessed by a center that generates and manages the public key and the secret keys.

The encrypting device 30 uses the public key that is generated and opened by the key generating device 20 to encrypt arbitrary contents and distribute the encrypted contents to the individual receiving devices through the communication network 12. The encrypting device 30 may be possessed by the arbitrary third party and a possessor of the key generating device 20 or a possessor of the receiving device 40 may possess the encrypting device 30.

The receiving device 40 can use the encrypted contents distributed from the encrypting device 30 by decrypting the contents using the unique secret key. The receiving device 40A and the receiving device 40B can be connected to each other through the communication network 12 or the wired network. The receiving device 40 is possessed by each contractor.

Further, the receiving device 40 is not limited to a computer device (a notebook computer or a desktop computer), such as a personal computer (PC), and may be any apparatus that has a communication function through a network. For example, the receiving device 40 may be composed of a personal digital assistant (PDA), information home appliances, such as a home game machine, a DVD/HDD recorder, a Blu-ray recorder, and a television receiver, or a decoder or a tuner for television broadcasting. In addition, the receiving device 40 may be a portable device that a contractor can carry, for example, a portable game machine, a mobile phone, a portable video/audio player, a PDA, or a PHS.

<With Respect to the Hardware Configuration of a Key Generating Device 20>

Next, the hardware configuration of the key generating device 20 according to the embodiment will be described in brief with reference to FIG. 2.

Figure 2:
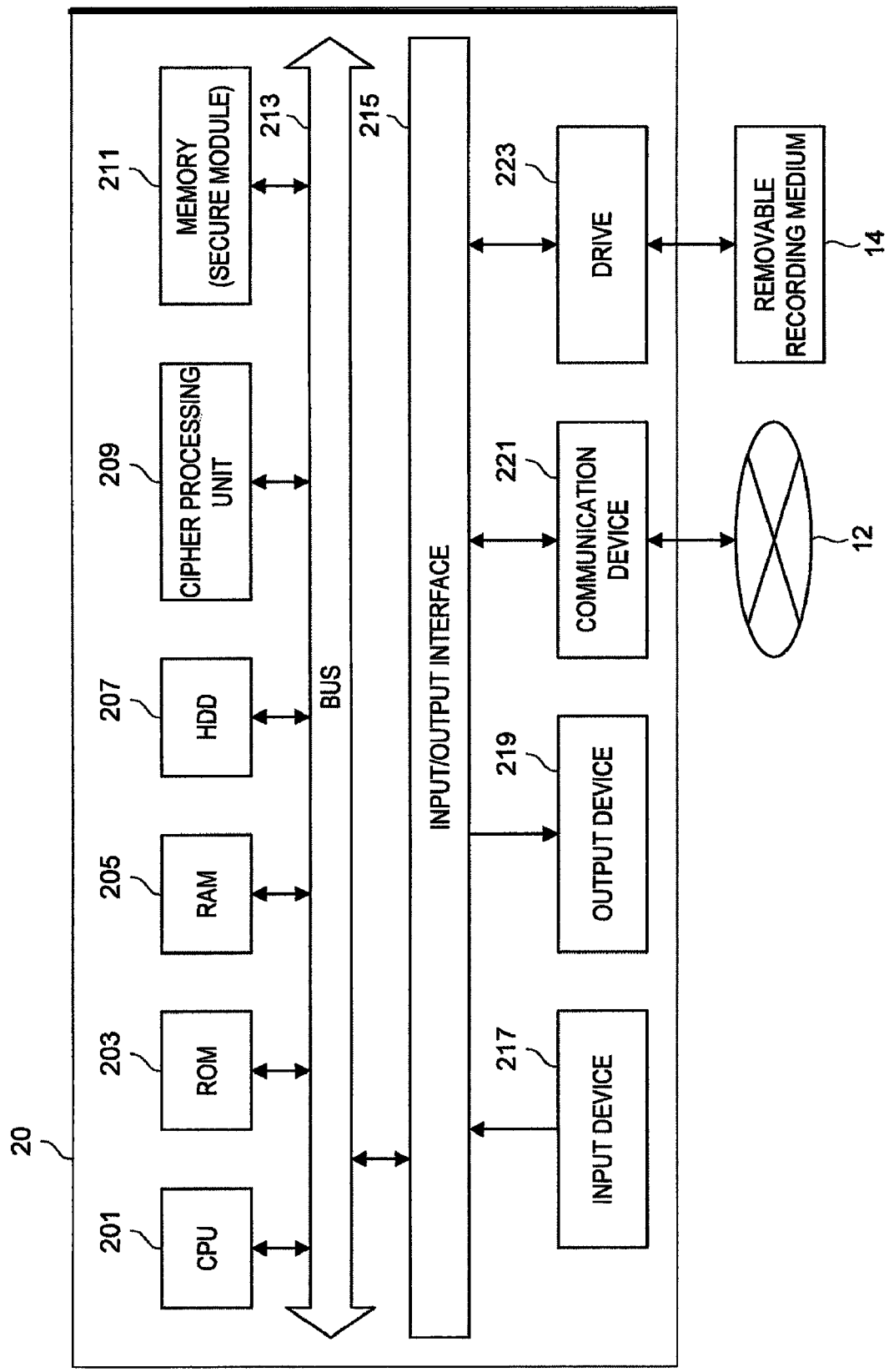
FIG. 2 is a block diagram illustrating the hardware configuration of a key generating device according to the embodiment.

FIG. 2 is a block diagram illustrating the hardware configuration of the key generating device 20. The key generating device 20 mainly includes a central processing unit (CPU) 201, a read only memory (ROM) 203, a random access memory (RAM) 205, a hard disk drive (HDD) 207, a cipher processing unit 209, and a memory (secure module) 211.

The CPU 201 functions as an operation processing device and a control device, and controls the entire operation of the key generating device 20 in accordance with various programs that are recorded in the ROM 203, the RAM 205, the HDD 207, or a removable recording medium 14. The ROM 203 stores operation parameters or programs that are used by the CPU 201. The RAM 205 primarily stores programs that are used when the CPU 201 is executed or parameters that appropriately change when the programs are executed.

The HDD 207 is a data storage device that is configured as an example of a storage unit of the key generating device 20 according to this embodiment. The HDD 207 drives a hard disk and stores various types of data or programs that are executed by the CPU 201. The cipher processing unit 209 executes various cipher processes that the key generating device 20 according to the embodiment executes under the control of the CPU 201. The memory (secure module) 211 safely stores information, such as a personal secret key or a random number as secret information of a center, which needs to be hidden, but information that is stored in the memory 211 can hardly be referred to from the outside. In addition, the memory (secure module) 211 may be composed of a storage device that has anti-tampering performance. In the above description, the secure module is a memory. However, the secure module according to the embodiment of the present invention is not limited to the memory, but may be a magnetic disk, an optical disk, a magneto-optical disk, or a storage medium, such as a semiconductor memory.

The CPU 201, the ROM 203, the RAM 205, the HDD 207, the cipher processing unit 209, and the memory 211 are connected to each other by a bus 213, which is composed of a CPU bus.

The bus 213 is connected to an input/output interface 215, such as a peripheral component interconnect/interface (PCI) bus, through a bridge.

The input device 217 includes an operation unit, such as a mouse, a keyboard, a touch panel, a button, a switch, and a lever, which is operated by a user, and an input control circuit that generates an input signal on the basis of the operation from the user and outputs the input signal to the CPU 201. A user who uses the key generating device 20 operates the input unit 217 to input various types of data to the key generating device 20 or instruct the key generating device 20 to perform a process operation.

The output device 219 includes a display device, such as a CRT display device, a liquid crystal display device, a plasma display device, an EL display device, and a lamp, and a voice output device, such as a speaker and a headphone. The output unit 219 can output reproduced contents. Specifically, the display device displays various types of information, such as reproduced video data, in a form of a text or image. Meanwhile, the voice output device converts reproduced music data into a voice and outputs the voice.

The communication device 221 is a communication interface that is composed of a communication device to be connected to the communication network 12. The communication device 221 transmits/receives various types of data, such as information related to a cipher key or content information between the encrypting device 30 and the receiving devices 40A and 40B through the communication network 12.

The drive 223 is a reader/writer for a recording medium, and may be incorporated in the key generating device 20 or attached to the key generating device 20. The drive 223 reads out information that is recorded in a magnetic disk, an optical disk, a magneto-optical disc, or the removable recording medium 14, such as a semiconductor memory, which is mounted thereto, and outputs the information to the RAM 205. In addition, the drive 223 can write information into the magnetic disk, the optical disk, the magneto-optical disc, or the removable recording medium 14, such as the semiconductor memory, which is mounted thereto. The removable recording medium 14 may be composed of DVD media, HD-DVD media, Blu-ray media, CompactFlash (CF) (registered trademark), a memory stick, or an SD memory card (secure digital memory card). In addition, the removable recording medium 927 may be an integrated circuit card (IC card) where a non-contact-type IC chip is mounted or an electronic apparatus.

The hardware configuration of the encrypting device 30 and the receiving device 40 is substantially the same as the hardware configuration of the key generating device 20, and thus the detailed description thereof will not be repeated herein.

The hardware configuration that can realize the functions of the key generating device 20, the encrypting device 30, and the receiving device 40 according to the embodiment has been exemplified. Each of the constituent elements may be composed of a general-purpose member or hardware that is specified to a function of each of the constituent elements. Accordingly, the hardware configuration to be used may be appropriately changed in accordance with a technology level when the embodiment is embodied. In addition, the hardware configuration is only exemplary and it is needless to say that the present invention is not limited thereto. For example, each of the HDD 207 and the memory (secure module) 211 may be composed of the same storage device. According to the utilization form, the bus 213 or the input/output interface 215 may be removed. Hereinafter, a cipher key generating method that is realized by the above-described hardware configuration will be described in detail.

[Description of a Fundamental Technology]

First, before the preferred embodiments of the present invention are described in detail, a technical matter that forms a foundation when realizing the embodiment will be described. The embodiment is configured such that a marked effect can be obtained by improving the fundamental technology, which will be described below. Accordingly, the improved technology forms the characteristics of this embodiment. That is, the embodiment follows the basic concept of a technical matter described herein. However, it is noted that the nature thereof is aggregated in the improved part and the configuration and effect thereof are different from those of the fundamental technology.

First, before describing the method according to the related art and a method according to the embodiment of the present invention, symbols, bilinear mapping, and a bilinear mapping group that are needed when describing the above methods will be described.

<Definition of Symbols>

The individual symbols that are used to describe the method according to the related art and the method according to the embodiment of the present invention are defined as follows.

$u_i$: unique number of a user i n: total number of users r: total number of revoked users R: set of revoked users. $R=\{u_{R1} \ldots uR_r\}$ M: plain text, such as contents K: temporary key (session key) that is changed for every distribution C: cipher text when a plain text M is encrypted by using a session key K $E_K(M)$: encryption operation of a plain text M using a key K. $C=E_K(M)$ $D_K(C)$: decryption operation of a cipher text C using a key K. $M=D_K(C)$ H(M): hashing operation of a plain text M <Bilinear Mapping in a Bilinear Group>

Next, bilinear mapping on a bilinear group will be described. Each of G, G', and $G_1$ is assumed as a cyclic group where a prime number p is used as an order. The bilinear mapping e means mapping that satisfies the following two properties with respect to arbitrary $G \in G$, $H \in G'$, and a, $b \in Z_P$, and realizes e: $G \times G' \to G_1$.

1. bilinear property: $e(aG, bH)=e(G, H)^{ab}$
2. non-degenerate property: $e(G, H) \neq 1$ (case of $G \neq 1$ and $H \neq 1$)

In addition, in the case where a group operation in G and G' can be efficiently executed and there is a group $G_1$ where bilinear mapping e can be efficiently calculated, G and G' are called bilinear mapping groups. In this case, G and G' may be the same group. Hereinafter, for convenience of explanation, G and G' are described as the same group. However, in both the method according to the related art and the method according to the embodiment of the present invention, which will b described below, even in the case where the conditions $G \in G$ and $H \in G'$ are set and a portion that is associated with the conditions is changed and the groups G and G' are different from each other, the same effect can be realized in each method.

<Description of a Method According to the Related Art>

The method according to the related art that is disclosed in Document 1 includes four basic processes that include Setup, Join, Encryption, and Decryption. Hereinafter, each of the basic processes will be described in detail with reference to FIGS. 3 to 8.

(Setup Process)

Figure 3:
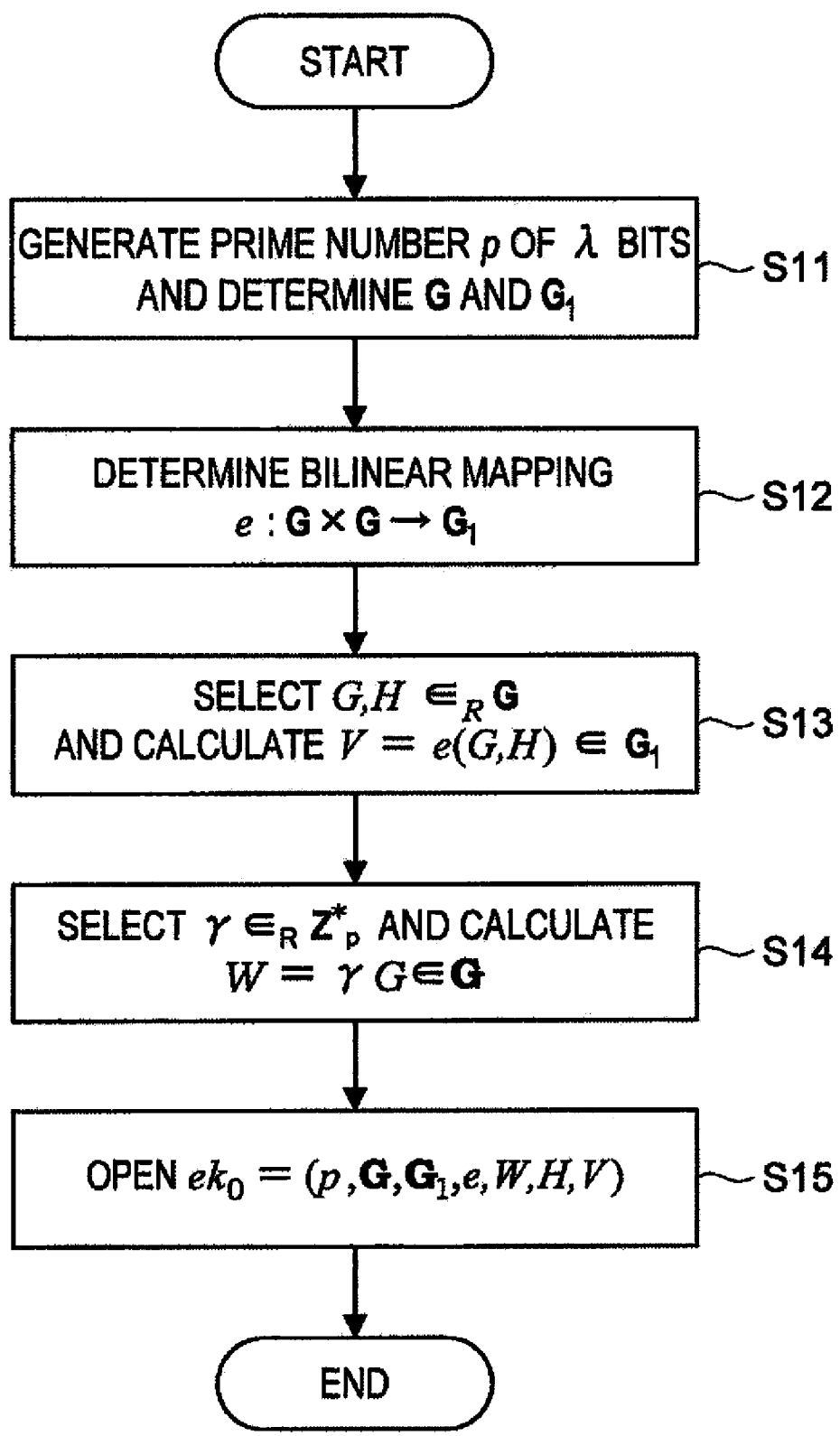
FIG. 3 is a flowchart illustrating a key generating process according to a fundamental technology of the present invention.

The setup process is a key generating process that a center having a key generating device executes once when constructing a system. The center determines a security parameter λ and the key generating device uses the input security parameter λ to execute the setup process, which will be described below. Hereinafter, the key generating process in the method according to the related art that is a fundamental technology of the present invention will be described in detail with reference to FIG. 3. FIG. 3 is a flowchart illustrating a key generating process in a method according to the related art that is a fundamental technology of the present invention.

First, the key generating device generates a prime number p of λ bits and selects a bilinear mapping group G and a cyclic multiplicative group $G_1$ where p is used as an order (Step S11).

Next, the key generating device determines bilinear mapping e: $G \times G \to G_1$ (Step S12).

Next, the key generating device selects G, H∈G and calculates V=e (G, H)∈$G_1$ (Step S13).

Then, the key generating device selects $\gamma \in_R Z_p^*$ and calculates W=γG∈G (Step S14). The γ and G that are obtained in the above way are confidentially maintained as a master key mk=(γ, G) by only the center.

Next, the key generating device uses the calculated data to configure an initial public key $ek_0$ as follows (Step S15).

$$ek_0=\{p,G,G_1,e,W,H,V\} \qquad \text{[Equation 901]}$$

The key generating device opens the initial public key $ek_0$ by executing the Set-up process as the initial public key of the entire system.

(Join Process)

The join process is a user registering process that the center executes whenever a system joining request is received from the user. This process may be executed at arbitrary timing after the center completely sets the system.

Figure 4:
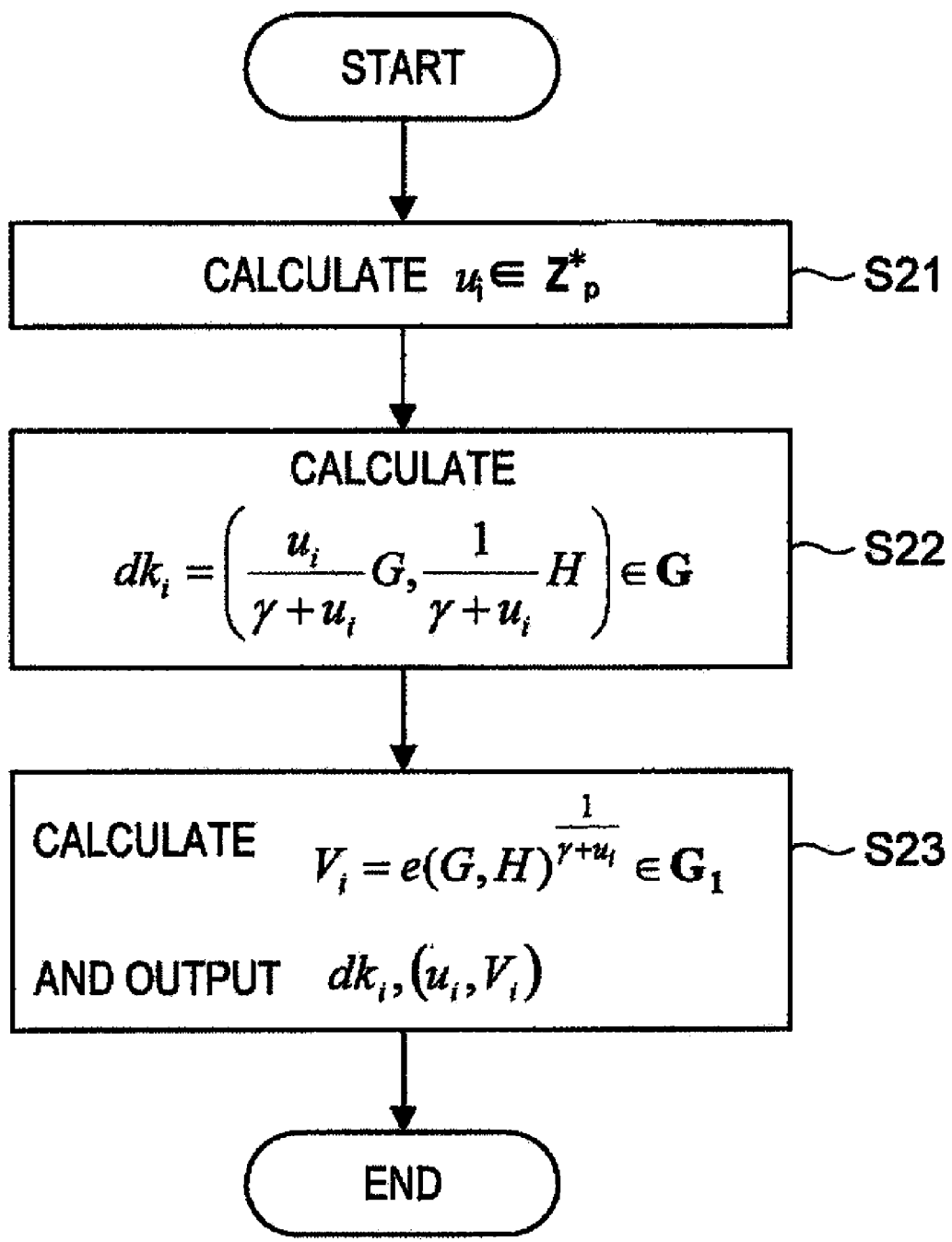
FIG. 4 is a flowchart illustrating a user registering process according to a fundamental technology of the present invention.

The center inputs a public key $ek_{i-1}$ ($1 \leq i \leq n$), a master key mk, and i that is an index of an i-th joined user to the key generating device, and executes the join process, which will be described below, thereby generating a secret key of a user who has transmitted a system joining request and executing a system joining process. Hereinafter, a user registering process in a method according to the related art that is a fundamental technology of the present invention will be described in detail with reference to FIG. 4. FIG. 4 is a flowchart illustrating a user registering process in a method according to the related art that is a fundamental technology of the present invention.

First, the key generating device calculates $u_i \in Z_p^*$ that is a unique value of a user i (Step S21). Then, the center performs calculation shown in the following Equation 902, and calculates a secret key $dk_i$ of a user i who has transmitted a system joining request (Step S22).

$$dk_i = (A_i, B_i) \in G \qquad \text{[Equation 902]}$$
$$= \left(\frac{u_i}{\gamma+u_i}G, \frac{1}{\gamma+u_i}H\right)$$

In this case, $B_i$ in Equation 902 is a portion of the secret key $dk_i$. However, $B_i$ is not secret information but public information. The user i does not need to confidentially maintain $B_i$.

Next, the key generating device calculates public information corresponding to the user i on the basis of the following Equation 903, and obtains $dk_i$ and ($u_i$, $V_i$) (Step S23).

$$V_i = e(G, H)^{\frac{1}{\gamma+u_i}} \in G_1 \qquad \text{[Equation 903]}$$

The key generating device confidentially transmits the secret key $dk_i$ of the user i that is obtained by executing the join process to the user i using a secure communication path, adds public information ($u_i$, $B_i$, $V_i$) corresponding to the user i to the current public key $ek_{i-1}$, updates the current public key $ek_{i-1}$ as a public key $ek_i$, and opens it. At this time, the new public key $ek_i$ has the configuration that is shown by the following Equation 904.

$$ek_i=(p,G,G_1,e,W,H,V,(u_1,B_1,V_1),\ldots(u_i,B_i,V_i)) \qquad \text{[Equation 904]}$$

(Encryption Process)

The encryption process is a process that an arbitrary transmitter who desires to distribute contents executes using an encrypting device, whenever the contents are distributed.

Figure 5:
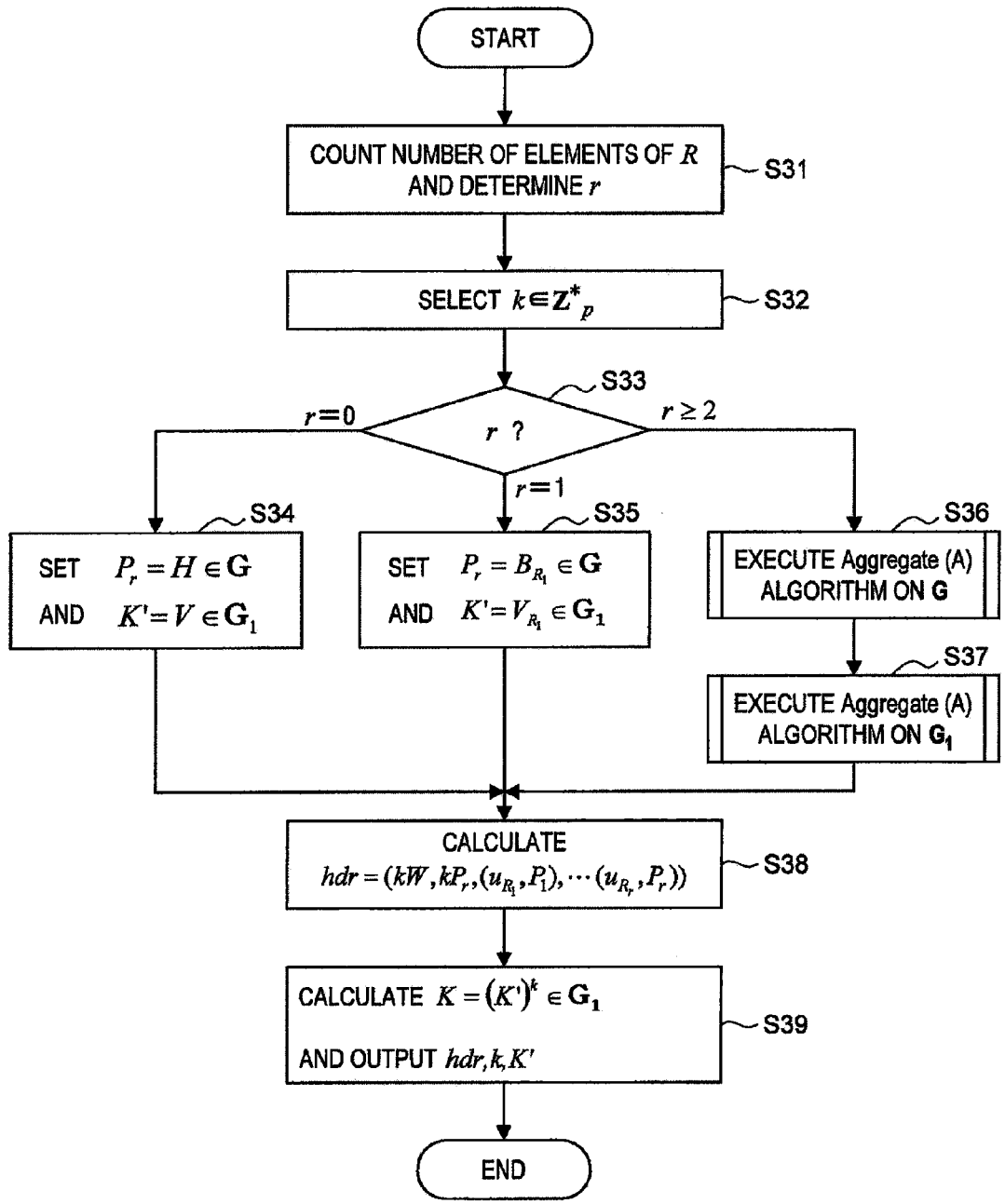
FIG. 5 is a flowchart illustrating an encryption process according to a fundamental technology of the present invention.

The transmitter inputs the public key $ek_i$ and the set of revoked users R={$u_{R1} \ldots u_{Rr}$} to the encrypting device, and executes the encryption process, which will be described below, thereby executing the encryption process on a plain text, such as contents, that the transmitter desires to distribute. Hereinafter, an encryption process in a method according to the related art that is a fundamental technology of the present invention will be described in detail with reference to FIG. 5. FIG. 5 is a flowchart illustrating an encryption process in a method according to the related art that is a fundamental technology of the present invention.

First, the encrypting device counts the number of elements of R and sets a count result as r (Step S31). Next, the transmitter selects $k \in Z_p^*$ (Step S32).

Next, the encrypting device executes a determination process on the number r of revoked users (Step S33). In the case of r=0 (that is, when there is no revoked user), the encrypting device executes Step S34, which will be described below. In addition, in the case of r=1 (that is, when only one revoked user exists), the encrypting device executes Step S35, which will be described below. In addition, in the case of r≧2 (that is, when two or more revoked users exist), the encrypting device executes Step S36, which will be described below.

When there is no revoked user, the encrypting device determines $P_r$ and K' on the basis of the following Equations 905 and 906 (Step S34), and then executes Step S38.

$$P_r=H \in G \qquad \text{[Equation 905]}$$

$$K'=V \in G_1 \qquad \text{[Equation 906]}$$

In addition, when one revoked user exists, the encrypting device determines $P_r$ and K' on the basis of the following Equations 907 and 908 (Step S35), and then executes Step S38.

$$P_r = B_{R_1} = \frac{1}{\gamma+u_{R_1}}H \in G \qquad \text{[Equation 907]}$$

$$K' = V_{R_1} \in G_1 \qquad \text{[Equation 908]}$$

In addition, when two or more revoked users exist, the encrypting device executes an operation process (Aggregate (A) algorithm) of a bilinear group with respect to the operation on G, and calculates a value that is shown in the following Equation 909 (Step S36). The Aggregate (A) algorithm that is the operation process algorithm of the bilinear group will be described in detail below.

$$P_l(l=1,\ldots,r) = \frac{1}{(\gamma+u_{R_1})\cdots(\gamma+u_{R_l})}H \in G \quad \text{[Equation 909]}$$

Next, the encrypting device executes an operation process (Aggregate (A) algorithm) of a bilinear group with respect to the operation on $G_1$, and calculates a value that is shown in the following Equation 910 (Step S37).

$$K' = e(G,H)^{\frac{1}{(\gamma+u_{R_1})\cdots(\gamma+u_{R_r})}} \quad \text{[Equation 910]}$$
$$= V^{\frac{1}{(\gamma+u_{R_1})\cdots(\gamma+u_{R_r})}} \in G_1$$

With respect to each of the cases, if calculations of $P_r$ and $K'$ are completed, the encrypting device calculates a header hdr on the basis of the following Equation 911 (Step S38).

$$hdr = (C_1, C_2, (u_{R_1}, P_1), \ldots (u_{R_r}, P_r)) \quad \text{[Equation 911]}$$
$$= (kW, kP_r, (u_{R_1}, P_1), \ldots (u_{R_r}, P_r))$$

Next, the encrypting device calculates a session key K on the basis of the following Equation 912 and outputs the calculated session key K together with the header hdr, K', and k.

$$K = (K')^k \in G_1 \quad \text{[Equation 912]}$$

The encrypting device generates a cipher text $C=E_K(M)$ using the session key K of the plain text M, and broadcasts and distributes the header hdr and the cipher text C. If this process is executed, the transmitter can transmit the encrypted contents to a desired user.

In addition to the above process, the encryption of the plain text M or the encryption and broadcasting and distributing may be executed by the encryption process. The transmitter may execute Step S31 and input the executed result to the encrypting device that executes the encryption process.
(Operation Process of a Bilinear Group-Aggregate (A) Algorithm).

Figure 6:
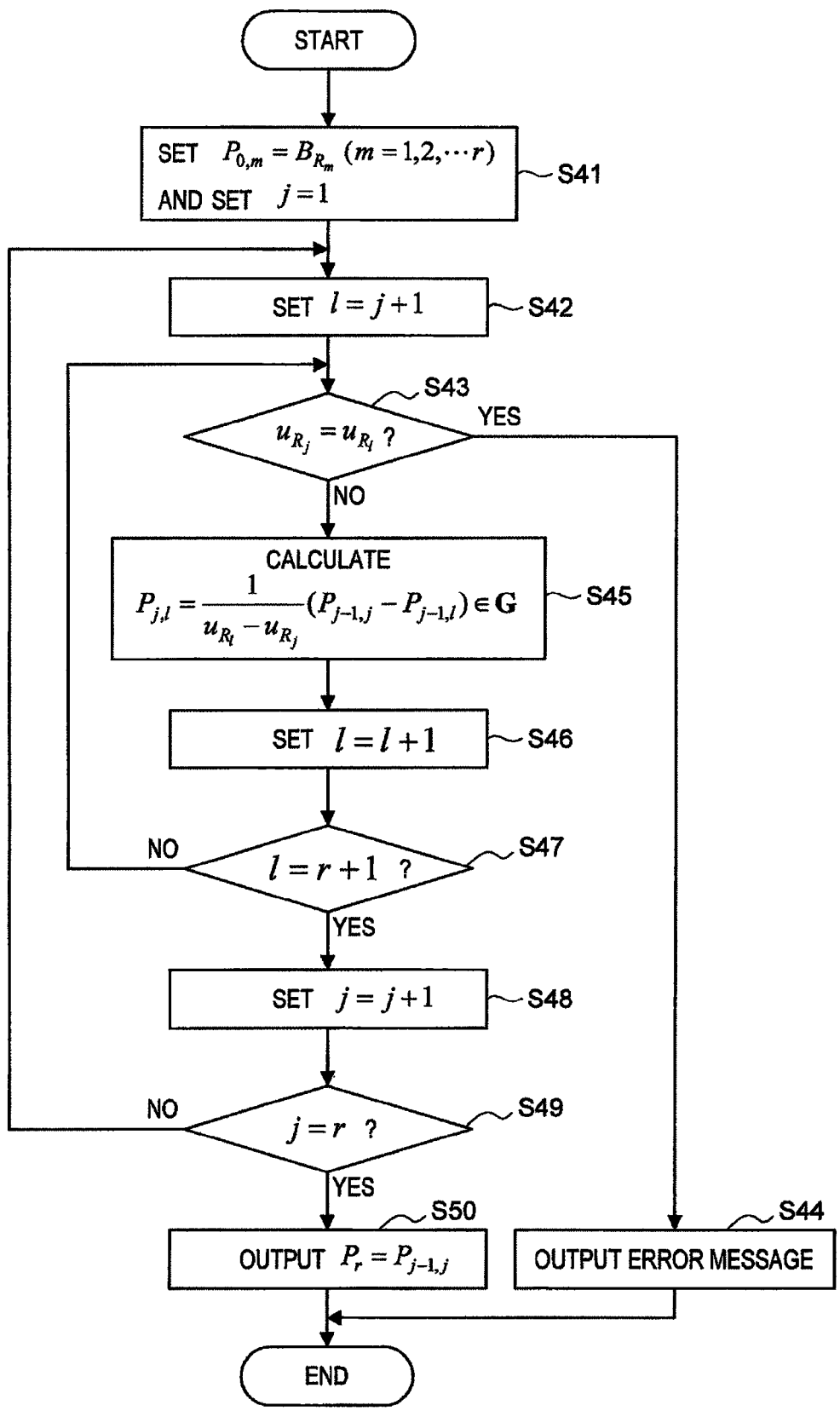
FIG. 6 is a flowchart illustrating an operation process of a bilinear group according to a fundamental technology of the present invention.

Next, an Aggregate (A) algorithm that is an operation process of a bilinear group that is executed during an encryption process will be described in detail with reference to FIG. 6. FIG. 6 is a flowchart illustrating an operation process of a bilinear group according to a fundamental technology of the present invention.

The Aggregate (A) algorithm is an algorithm that is executed when the encrypting device calculates $(P_1, \ldots P_r) \in G$.

First, the encrypting device sets the conditions $P_{0,m}=V_{Rm}$ (m=1, ..., r) and j=1 (Step S41). Next, the encrypting device sets the condition l=j+1 (Step S42).

In this case, the encrypting device compares $u_{Rj}$ and $u_{R1}$. If the condition $u_{Rj}=u_{R1}$ is satisfied, the encrypting device outputs an error message (Step S44), and completes the process. If the condition $u_{Rj}=u_{R1}$ is not satisfied, the process executes Step S45, which will be described below.

Next, the encrypting device calculates $P_{j,l}$ using the following Equation 913 (Step S45).

$$P_{j,l} = \frac{1}{u_{R_l}-u_{R_j}}(P_{j-1,j}-P_{j-1,l}) \in G \quad \text{[Equation 913]}$$

If the calculation of Equation 913 is completed, the encrypting device substitutes l+1 for l (Step S46), and compares l and r+1 (Step S47). If the condition l=r+1 is satisfied, the encrypting device executes Step S48, and if l is not equal to r+1, the encrypting device returns to Step S43, and executes the process.

Next, the encrypting device substitutes j+1 for j (Step S48), and compares j and r (Step S49). If the condition j=r is satisfied, the encrypting device executes Step S50. If j is not equal to r, the encrypting device returns to Step S42 and executes the process.

Then, the encrypting device outputs $P_{j-1,1}$ as $P_r$ (Step S50).

For example, in the case of r=3, the encrypting device executes the above-described Aggregate (A) algorithm, and outputs $P_{2,3}$ as $P_3$.

In the case of $j=1$, $$P_{1,2} = \frac{1}{u_{R_2}-u_{R_1}}(P_{0,1}-P_{0,2})$$
$$= \frac{1}{u_{R_2}-u_{R_1}}\left(\frac{1}{\gamma+u_{R_1}}-\frac{1}{\gamma+u_{R_2}}\right)H$$
$$= \left(\frac{1}{(\gamma+u_{R_1})(\gamma+u_{R_2})}\right)H$$

$$P_{1,3} = \frac{1}{u_{R_3}-u_{R_1}}(P_{0,1}-P_{0,3})$$
$$= \frac{1}{u_{R_3}-u_{R_1}}\left(\frac{1}{\gamma+u_{R_1}}-\frac{1}{\gamma+u_{R_3}}\right)H$$
$$= \left(\frac{1}{(\gamma+u_{R_1})(\gamma+u_{R_3})}\right)H$$

In the case of $j=2$, $$P_{2,3} = \frac{1}{u_{R_3}-u_{R_2}}(P_{1,2}-P_{1,3})$$
$$= \frac{1}{u_{R_3}-u_{R_2}}\left(\frac{1}{(\gamma+u_{R_1})(\gamma+u_{R_2})}-\frac{1}{(\gamma+u_{R_1})(\gamma+u_{R_3})}\right)H$$
$$= \left(\frac{1}{(\gamma+u_{R_1})(\gamma+u_{R_2})(\gamma+u_{R_3})}\right)H$$

In addition, $K' \in G_1$ can be calculated by using the above-described Aggregate (A) algorithm. In this case, after the condition $P_{0,m}=V_{Rm}$ (m=1, ..., r) is set, addition (subtraction) is changed to multiplication (division), and multiplication is changed to a power, Step S45 may be executed as an operation on $G_1$. However, $1/(u_{R1}-u_{Rj})$ that is an operation on $Z_p^*$ needs to be calculated as subtraction and an inverse element operation on $Z_p^*$ even in any of the cases.
(Decryption Process)

The decryption process is a process that is executed by a receiving device when a receiver who receives the distributed contents decrypts a cipher text and acquires a plain text.

The receiving device executes the decryption process, which will be described below, on the basis of a header hdr, a secret key $dk_i$, and $u_i$ as a unique value thereof that are transmitted by the transmitter, thereby executing a decryption process on a cipher text, such as the distributed contents.

Figure 7:
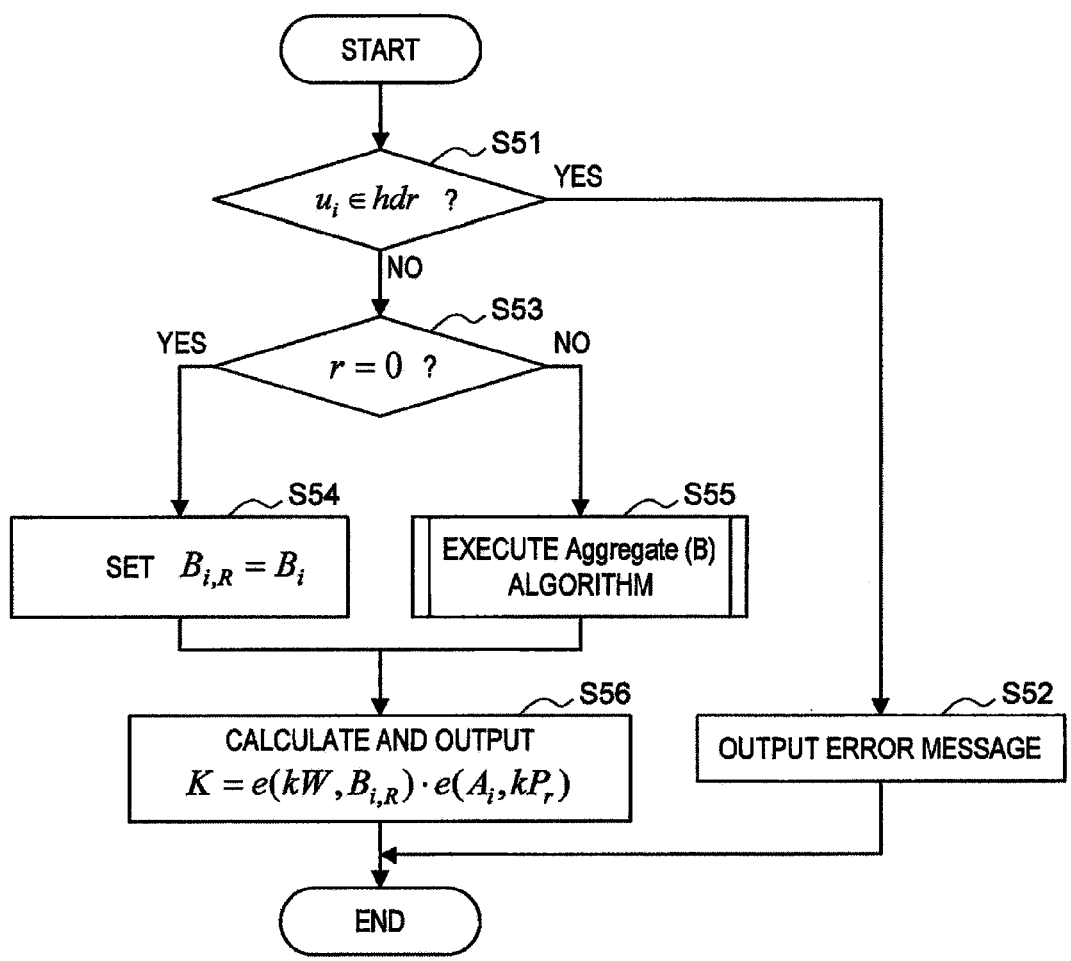
FIG. 7 is a flowchart illustrating a decryption process according to a fundamental technology of the present invention.

Hereinafter, a decryption process in a method according to the related art that is a fundamental technology of the present invention will be described in detail with reference to FIG. 7. FIG. 7 is a flowchart illustrating a decryption process in a method according to the related art that is a fundamental technology of the present invention.

First, the receiving device determines whether $u_i$ as the unique value thereof exists in the header hdr distributed from the transmitter (Step S51). When it is determined that $u_i$ as the unique value exists in the header hdr, it means that the receiver is revoked by the transmitter. Accordingly, the receiving device outputs an error message (Step S52) and completes the process. In addition, when it is determined that $u_i$ as the unique value does not exist in the header hdr, the receiving device executes the following Step S53.

Next, the receiving device determines whether r is 0 or not (Step S53). When it is determined that r is 0, the receiving device executes Step S54, which will be described below. In addition, when it is determined that r is not 0, the receiving device executes Step S55, which will be described below.

Here, in the case of r=0, the receiving device sets the condition $B_{i,R}=B_i$ and executes Step S56, which will be described below.

In addition, when r is not 0, the receiving device executes an operation process (Aggregate (B) algorithm) of a bilinear group and calculates a value shown in the following Equation 914 (Step S55). In addition, an Aggregate (B) algorithm that is an operation process algorithm of a bilinear group will be described in detail below.

$$B_{i,R} = \frac{1}{\prod_{j=1}^{r}(\gamma + u_{R_j})}$$ [Equation 916]

$$B_i = \frac{1}{(\gamma + u_i)\prod_{j=1}^{r}(\gamma + u_{R_j})}H$$

If Step S54 or S55 is completed, the receiving device uses the obtained $B_{i,R}$ to calculate a session key K on the basis of the following Equation 915 (Step S56).

$$K = e(kW, B_{i,R}) \cdot e(A_i, kP_r)$$ [Equation 915]

$$= e\left(k\gamma G, \frac{1}{(\gamma+u_i)\prod_{j=1}^{r}(\gamma+u_{R_j})}H\right) \cdot$$

$$e\left(\frac{u_i}{(\gamma+u_i)}G, \frac{k}{\prod_{j=1}^{r}(\gamma+u_{R_j})}H\right)$$

$$= e(G,H)^{\overline{(\gamma+u_i)\prod_{j=1}^{r}(\gamma+u_{R_j})}} \cdot$$

$$e(G,H)^{\overline{(\gamma+u_i)\prod_{j=1}^{r}(\gamma+u_{R_j})}}$$

$$= e(G,H)^{\prod_{j=1}^{r}\overline{(\gamma+u_{R_j})}}$$

The receiver uses the session key K that is obtained by the above-described decryption process, decrypts a cipher text C, such as contents, transmitted from the transmitter, and acquires a plain text $M=D_K(C)$.

(Operation Process of a Bilinear Group-Aggregate (B) Algorithm)

Figure 8:
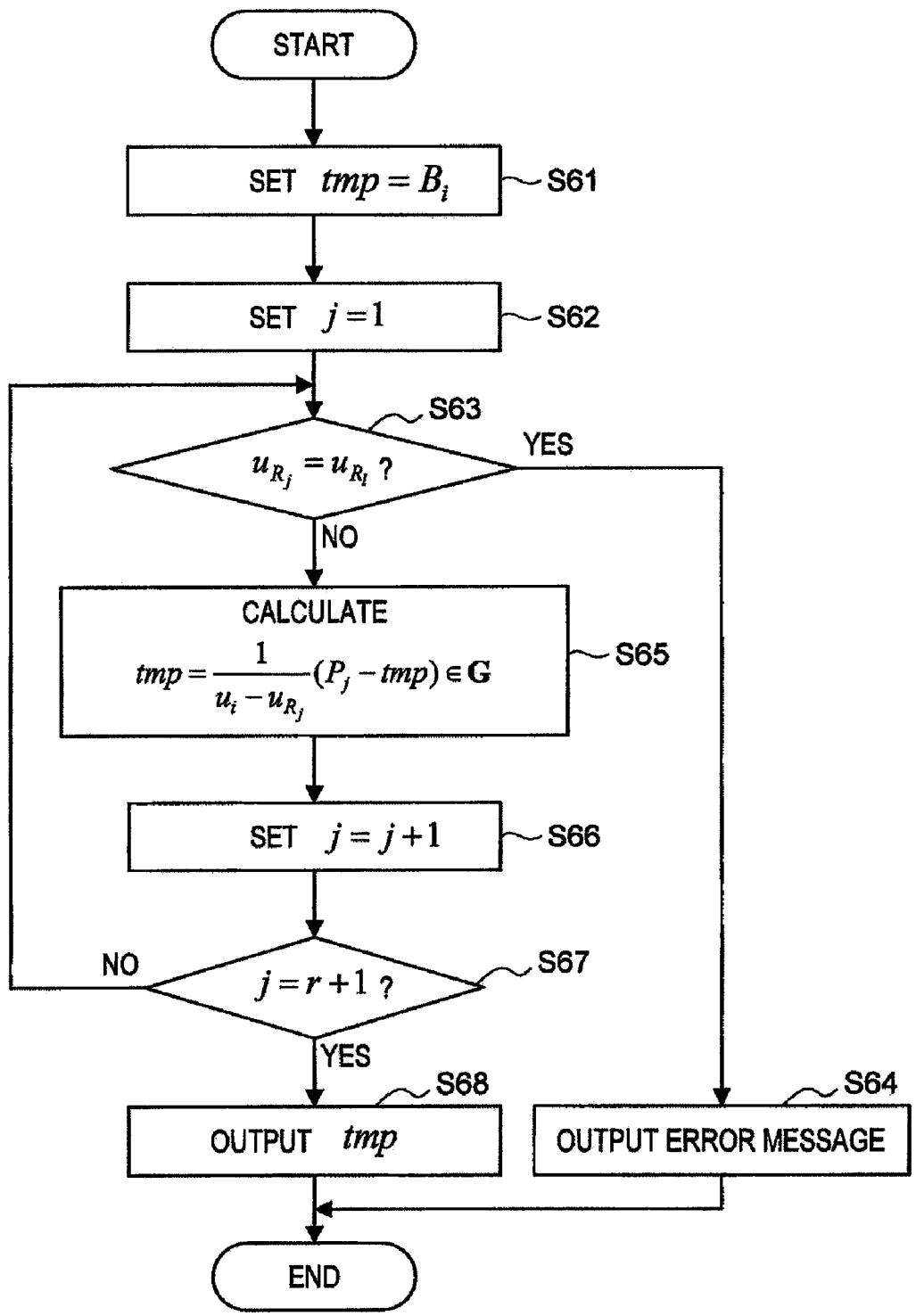
FIG. 8 is a flowchart illustrating an operation process of a bilinear group according to a fundamental technology of the present invention.

Next, an Aggregate (B) algorithm that is an operation process of a bilinear group executed during a decryption process will be described in detail with reference to FIG. 8. FIG. 8 is a flowchart illustrating an operation process of a bilinear group according to a fundamental technology of the present invention.

The Aggregate (B) algorithm is an algorithm that is executed when the receiving device calculates $B_{i,R} \in G$.

First, the receiving device sets a parameter tmp, sets an initial value of tmp as $B_i$ (Step S61). Then, the receiving device sets the condition j=1 (Step S62).

Next, the receiving device compares $u_{Rj}$ and $u_i$. If the condition $u_{Rj}=u_i$ is satisfied, the receiving device outputs an error message (Step S64) and completes the process. If the condition $u_{Rj}=u_i$ is not satisfied, the receiving device executes Step S65, which will be described below.

Next, the receiving device calculates a new value of tmp using the following Equation 916 (Step S68).

$$tmp = \frac{1}{u_i - u_{R_j}}(P_j - tmp) \in G$$ [Equation 916]

In this case, as can be seen from Equation 916, a denominator of Equation 916 includes $u_i$ that is a unique value of the receiving device. When the unique value $u_i$ is included in the header hdr that is transmitted from the encrypting device, tmp does not become a value. As a result, since the revoked user can hardly obtain $B_{i,R}$ that is needed when calculating the session key K, it may be impossible to decrypt the cipher text.

If the operation is completed, the receiving device sets a value of j as j+1 (Step S66). Then, the receiving device compares j and r+1 (Step S67). If the condition j=r+1 is satisfied, the receiving device executes Step S68, which will be described below. In addition, when j is not equal to r+1, the receiving device returns to Step S63 and continuously executes the process.

Next, the receiving device outputs tmp (Step S68). The output tmp is $B_{i,R}$, and the receiving device uses the output value to calculate the session key K.

<Issue in a Method According to the Related Art>

As described above, in the method according to the related art, when the encryption is executed, on both G and $G_1$, the Aggregate (A) algorithm needs to be executed. In this case, the calculation amount that the transmitter needs to execute at the time of encryption is shown in FIG. 9A. In FIG. 9A, "pairing" denotes an operation using bilinear mapping e, and Add and Mul in $\in G$ denotes addition of points on an elliptic curve and scalar multiplication, respectively. In addition, $\in G \in G_1$, and $\in Z_P^*$ in a table shown in FIG. 9A each denote an operation on each group.

As can be seen from FIG. 9A, an Aggregate (A) algorithm on G is executed, and thus an operation on G, that is, addition and multiplication on an elliptic curve are needed by about $r^2$ times. Further, in order to derive K', it is necessary to execute an Aggregate (A) algorithm on $G_1$. Therefore, individual operations on $G_1$, that is, multiplication, a power, and an inverse element operation in a group having a large bit size are needed by about $r^2$ times.

In particular, an operation on $G_1$ becomes an operation having a large bit size that becomes 1024 bits when 80-bit equivalent safety is secured to secure safety and 3072 bits when 128-bit equivalent safety is secured. Accordingly, at the time of encryption, the corresponding operation is a portion where the longest calculation time is needed, and the number of times of executing an operation on $G_1$ is large.

Accordingly, the inventors have studied various researches to resolve the above-described issues and have developed a cipher key distribution system according to an embodiment of the present invention, which will be described below. In the cipher key distribution system according to this embodiment, multiplication, a power, and an inverse element operation on a cyclic group having the large length of bits that are needed at the time of encryption in the method according to the related art are removed, and a one-time bilinear mapping operation (pairing) and an operation of points on an elliptic curve are slightly added. When the user, that is, an entity (an operation subject, such as a person, a device, and a server) holding a secret key executes encryption, in particular, as r increases, the calculation amount that is needed at the time of encryption, that is, the calculation time or a cost of an apparatus that is needed at the time of calculation can be reduced.

[Description of this Embodiment]

On the basis of the above-described fundamental technology, the key generating device 20, the encrypting device 30, and the receiving device 40 according to the first embodiment of the present invention will now be described in detail.

In the cipher key distribution system 10 according to this embodiment, an entity who holds the secret key $dk_j$, that is, a user j can reduce a calculation amount needed at the time of encryption. Specifically, the entity changes an encryption process and an Aggregate (A) algorithm in a method according to the related art to an encryption' process and an Aggregate (C) algorithm, which will be described below, thereby reducing the calculation amount that is needed at the time of encryption. Accordingly, the setup process, the join process, the decryption process, and the Aggregate (B) algorithm used during the decryption process, which are other basic processes, are the same as those in the method according to the related art.

<With Respect to a Key Generating Device 20 According to this Embodiment>

Figure 10:
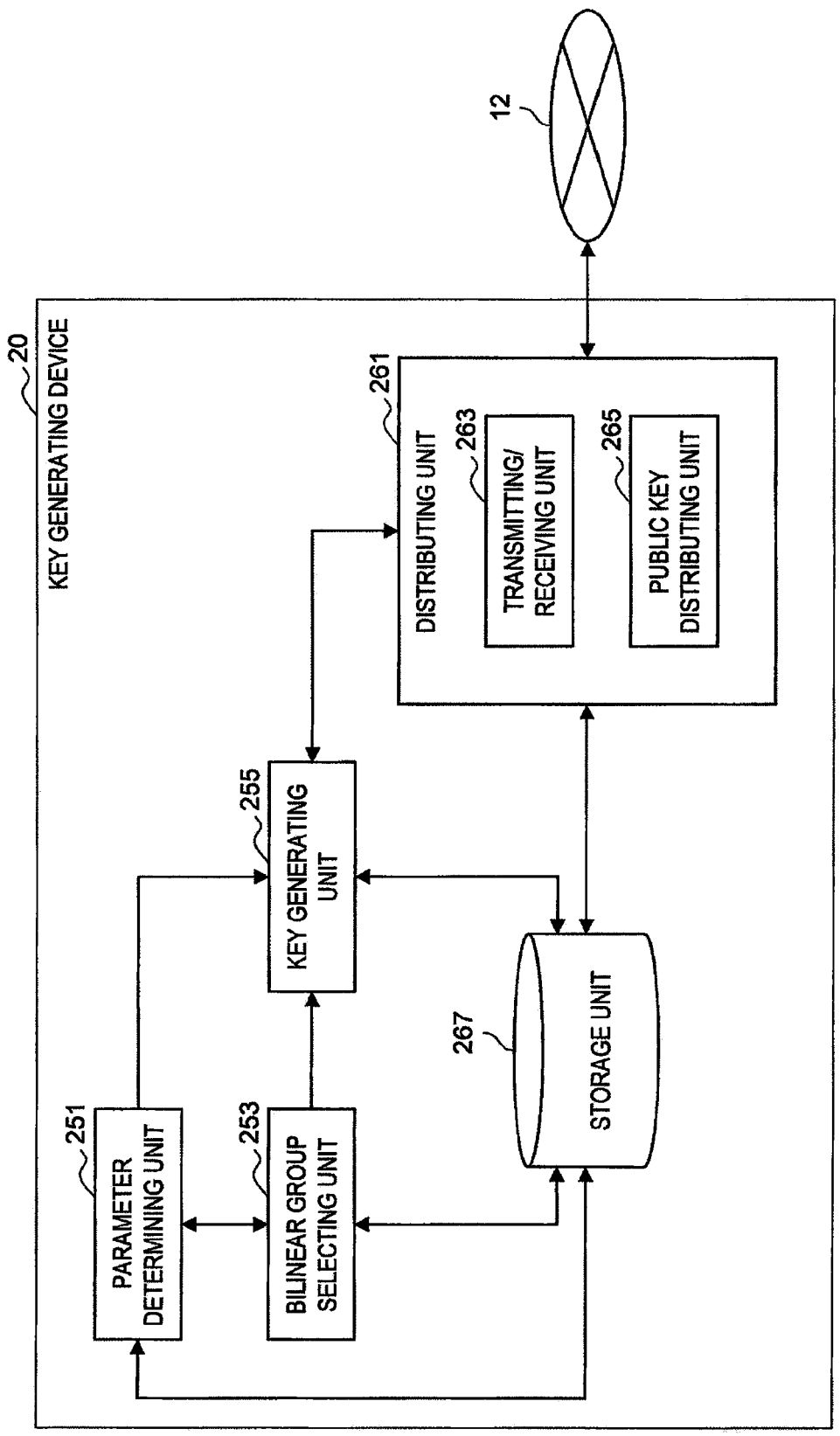
FIG. 10 is a block diagram illustrating the configuration of a key generating device according to a first embodiment of the present invention.

First, the key generating device 20 according to the embodiment will be described in detail with reference to FIG. 10. FIG. 10 is a block diagram illustrating the configuration of the key generating device 20 according to this embodiment.

The key generating device 20 according to the embodiment mainly includes a parameter determining unit 251, a bilinear group selecting unit 253, a key generating unit 255, a distributing unit 261, and a storage unit 267, as shown in FIG. 10.

The parameter determining unit 251 determines various types of parameters that the key generating device 20 according to the embodiment uses to generate the public key or the secret key, on the basis of the predetermined method. Examples of the parameters may include the prime number p or G, H, V, and γ that are used during the setup process. For example, when determining the prime number p or G, H, V, and γ, the parameter determining unit 251 uses random numbers to randomly determine values. In addition, the parameter determining unit 251 may use bilinear mapping e or various bilinear groups that are transmitted from the bilinear group selecting unit 253, which will be described below, thereby determining the parameters. The parameter determining unit 251 transmits the various determined parameters to the bilinear group selecting unit 253 or the key generating unit 255, which will be described below. In addition, the parameter determining unit 251 may record the various determined parameters in the storage unit 267, which will be described below.

The bilinear group selecting unit 253 uses the prime number p that is the parameter transmitted from the parameter determining unit 251, and selects a bilinear mapping group G and a cyclic multiplicative group $G_1$ where p is used as an order. In addition, the bilinear group selecting unit 253 determines the bilinear mapping e: $G \times G \to G_1$. The bilinear group selecting unit 253 transmits the selected bilinear groups G and $G_1$ and the determined bilinear mapping e to the parameter determining unit 251 and the key generating unit 255, which will be described below. In addition, the bilinear group selecting unit 253 may record the selected bilinear groups G and $G_1$ and the determined bilinear mapping e in the storage unit 267, which will be described below.

The key generating unit 255 uses various types of data transmitted from the parameter determining unit 251 and the bilinear group selecting unit 253, and generates keys, such as, a public key, a secret key distributed to each user, and a master key, and public information corresponding to each user. The generated keys or public information is recorded in the storage unit that is composed of an HDD or a memory including a securable module. In addition, information that is needed to be opened and distributed keys are transmitted to the distributing unit 261, which will be described below.

The distributing unit 261 distributes the public key and the secret key that are generated by the key generating device 20 and the information needed to be opened through the communication network 12. This distributing unit 261 further includes a transmitting/receiving unit 263 and a public key distributing unit 265.

The transmitting/receiving unit 263 transmits the secret key that the key generating unit 255 generates to an individual user through a secure communication path, and receives a system joining request transmitted from the receiving device 40. The received system joining request is transmitted to the key generating unit 255 and a new secret key or public key is generated by the key generating unit 255.

The public key distributing unit 265 distributes the public key or public information that the key generating unit 255 generates to the encrypting device 30 or the receiving device 40 through the communication network 12. The encrypting device 30 or the receiving device 40 uses the public key or public information to execute an encryption process of a plain text or a decryption process of a cipher text.

In the storage unit 267, various parameters that are determined by the parameter determining unit 251 or a bilinear group or bilinear mapping that is selected by the bilinear group selecting unit 253 is recorded. In addition, in the storage unit 267, various keys or public information that is generated by the key generating unit 255 is confidentially maintained. In addition to the various types of data, the key generating device 20 can appropriately store various parameters that need to be stored when any process is executed or information indicating the intermediate result of the process, or various databases in the storage unit 267. In the storage unit 267, the parameter determining unit 251, the bilinear group selecting unit 253, the key generating unit 255, and the distributing unit 261 may freely perform a read/write operation.

<With Respect to an Encrypting Device 30 According to this Embodiment>

Figure 11:
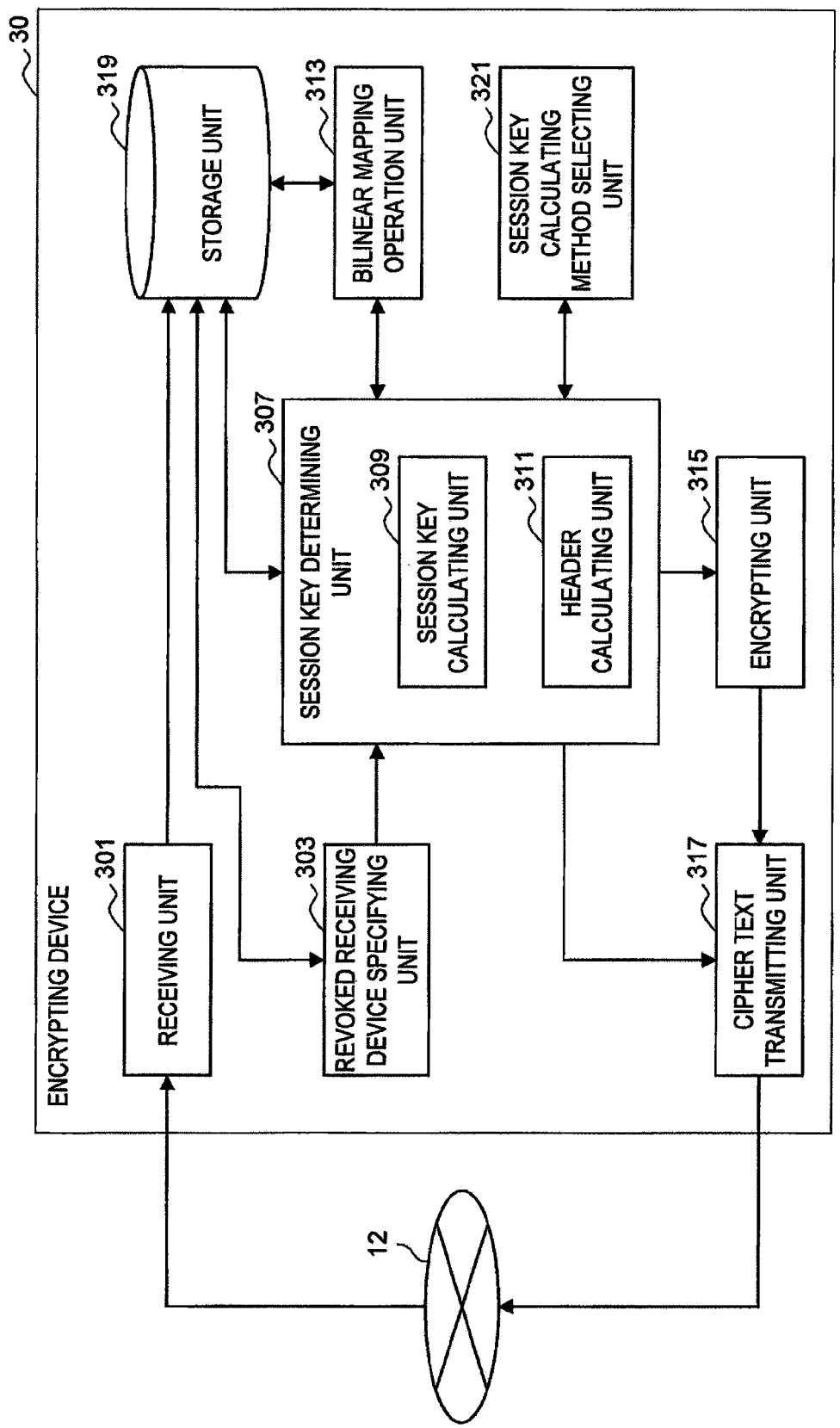
FIG. 11 is a block diagram illustrating the configuration of an encrypting device according to the embodiment.

Next, the encrypting device 30 according to the embodiment will be described in detail with reference to FIG. 11. FIG. 11 is a block diagram illustrating the configuration of the encrypting device 30 according to this embodiment.

For example, as shown in FIG. 11, the encrypting device 30 according to the embodiment mainly includes a receiving unit 301, a revoked receiving device specifying unit 303, a session key determining unit 307, a bilinear mapping operation unit 313, an encrypting unit 315, a cipher text transmitting unit 317, and a storage unit 319. The encrypting device 30 according to the embodiment may further include a session key calculating method selecting unit 321.

The receiving unit 301 receives the public key and public information that are generated and opened by the key generating device 20. The received public key and public information are recorded in the storage unit 319, which will be described below, and read and used, if necessary.

The revoked receiving device specifying unit 303 specifies receiving devices that revoke a distribution of a cipher text among a plurality of receiving devices 40 connected to the encrypting device 30 through the communication network 12, and determines a set R of revoked receiving devices. When the set R is determined, the revoked receiving device specifying unit 303 can refer to various types of data that is stored in the storage unit 319, which will be described below. The determined set R is transmitted to the session key determining unit 307, which will be described below, and used when calculating a session key used to encrypt a plain text, such as distributed contents. In addition, the revoked receiving device specifying unit 303 may record the determined set R in the storage unit 319, which will be described below.

The session key determining unit 307 determines a session key that is used to encrypt a plain text, such as distributed contents, on the basis of the public key and the public information, which are received by the receiving unit 301 and recorded in the storage unit 319, and the set R that is determined by the revoked receiving device specifying unit 303. The session key determining unit 307 further includes a session key calculating unit 309 and a header calculating unit 311.

The session key calculating unit 309 calculates a session key that is used to encrypt a plain text, such as distributed contents, on the basis of the public key and the public information obtained from the storage unit 319 and the set R of revoked receiving devices transmitted from the revoked receiving device specifying unit 303. The session key that is calculated by the session key calculating unit 309 is transmitted to the encrypting unit 315, which will be described below, and used when the plain text is encrypted. In addition, the session key calculating unit 309 may record the calculated session key in the storage unit 319.

The header calculating unit 311 uses various types of data calculated when the session key calculating unit 309 calculates the session key and the public key or the public information recorded in the storage unit 319, thereby generating a header that is distributed to the receiving device 40 together with the cipher text. The generated header is transmitted to the cipher text transmitting unit 317, which will be described below. In addition, the header calculating unit 311 may record the generated header information in the storage unit 319.

The bilinear mapping operation unit 313 is a processing unit that executes an operation of bilinear mapping that needs to be executed when the session key is calculated. The bilinear mapping operation unit 313 uses the bilinear groups G and $G_1$ that are included in the public information recorded in the storage unit 319 and data transmitted from the session key determining unit 307, and executes an operation of bilinear mapping. The operation result is retransmitted to the session key determining unit 307 and used when the session key or the header is calculated. In addition, the bilinear mapping operation unit 313 may record the operation result in the storage unit 319.

The encrypting unit 315 acquires a plain text, such as distributed contents, from the storage unit 319, uses the session key calculated by the session key determining unit 307 to execute an encryption process, and encrypts the plain text. The encrypted plain text is transmitted to the cipher text transmitting unit 317. In addition, the encrypting unit 315 may record the encrypted plain text in the storage unit 319.

The cipher text transmitting unit 317 broadcasts and distributes the cipher text encrypted by the encrypting unit 315 and the header calculated by the header calculating unit 311 to each of the receiving devices, through the communication network 12.

The storage unit 319 records the public key and the public information received by the receiving unit 301, the set R determined by the revoked receiving device specifying unit 303, or the session key or the header information calculated by the session key determining unit 307. In addition to the various types of data, the encrypting device 30 may appropriately store various parameters that need to be stored when any process is executed or information indicating the intermediate result of the process, or various databases in the storage unit 319. In the storage unit 319, the receiving unit 301, the revoked receiving device specifying unit 303, the session key determining unit 307, the bilinear mapping operation unit 313, the encrypting unit 315, the cipher text transmitting unit 317, and the session key calculating method selecting unit 321 may freely perform a read/write operation.

When the encrypting device 30 according to the embodiment stores a plurality of session key calculating methods and can appropriately select the plurality of session key calculating methods, the session key calculating method selecting unit 321 selects a used session key calculating method in accordance with the number of revoked receiving devices. When the session key calculating method is selected, the session key calculating method selecting unit 321 may compare the number of revoked receiving devices and a predetermined threshold value and determine the selected session key calculating method. The session key calculating method selecting unit 321 may calculate calculation amounts that are needed in selectable session key calculating methods on the basis of the number of revoked receiving devices, and compare the calculated calculation amounts, thereby selecting the used session key calculating method.

<With Respect to a Receiving Device 40 According to this Embodiment>

Figure 12:
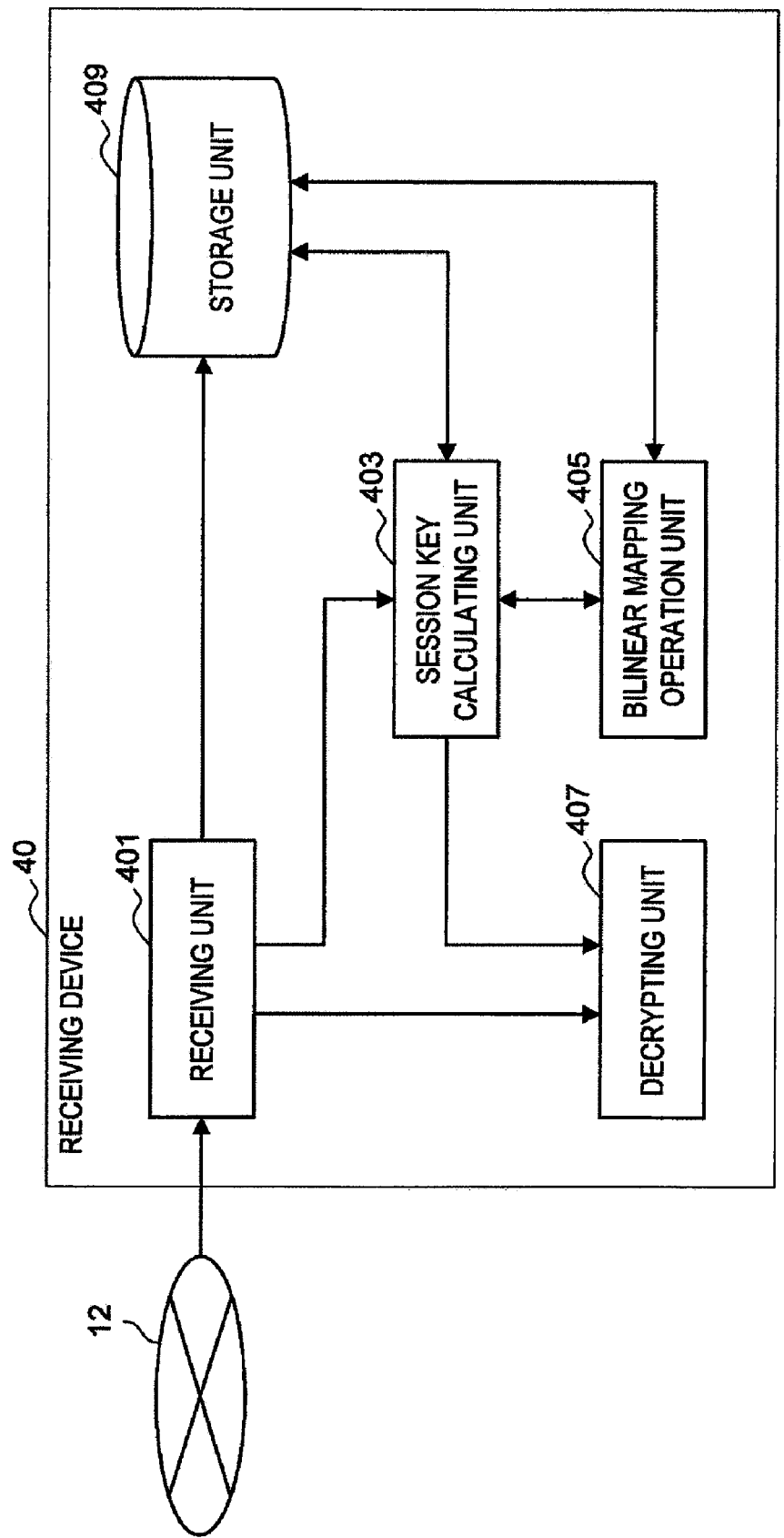
FIG. 12 is a block diagram illustrating the configuration of a receiving device according to the embodiment.

Next, the receiving device 40 according to the embodiment will be described in detail with reference to FIG. 12. FIG. 12 is a block diagram illustrating the configuration of the receiving device 40 according to this embodiment.

As shown in FIG. 12, the receiving device 40 according to the embodiment mainly includes a receiving unit 401, a session key calculating unit 403, a bilinear mapping operation unit 405, a decrypting unit 407, and a storage unit 409.

The receiving unit 401 receives a secret key, a public key, and public information that are generated by the key generating device 20. In addition, the receiving unit 401 may receive header information or a cipher text encrypted by the encrypting device 30. The receiving unit 401 transmits the secret key, the public key, and the public information received from the key generating device 20 and a header received from the encrypting device 30 to the session key calculating unit 403, which will be described below, and the cipher text received from the encrypting device 30 to the decrypting unit 407, which will be described below. In addition, the receiving unit 401 may record the received secret key, public information, cipher text, and header information in the storage unit 409, which will be described below.

The session key calculating unit 403 calculates a session key that is used when the cipher text distributed from the encrypting device 30 is subjected to a decryption process, on the basis of the secret key, the public key, and the public information acquired from the key generating device 20 and the header transmitted from the encrypting device 30. The session key calculating unit 403 transmits the calculated session key to the decrypting unit 403, which will be described below. In addition, the session key calculating unit 403 may record the calculated session key in the storage unit 409, which will be described below.

The bilinear mapping operation unit 405 is a processing unit that executes an operation related to bilinear mapping that needs to be executed when the session key is calculated. The bilinear mapping operation unit 405 uses the bilinear groups G and $G_1$ included in the public information and the data transmitted from the session key calculating unit 403 to execute an operation of bilinear mapping. The operation result is retransmitted to the session key calculating unit 403, and used when the session key is calculated. In addition, the bilinear mapping operation unit 405 may record the operation result in the storage unit 409.

The decrypting unit 407 uses the session key that is calculated by the session key calculating unit 403, decrypts a cipher text, such as contents, which is distributed from the encrypting device 30, and converts it into a plain text. The decrypting unit 407 can store the obtained plain text in the storage unit 409.

The storage unit 409 records the secret key, the public key, and the public information that are received by the receiving unit 401. In addition, the storage unit 409 may record the cipher text and the header transmitted from the encrypting device 30, the session key calculated by the session key calculating unit 403, or the plain text that has been subjected to a decryption process by the decrypting unit 407. Further, in addition to the various types of data, the receiving device 40 may appropriately store various parameters that need to be stored when any process is executed or information indicating the intermediate result of the process, or various databases in the storage unit 409. In the storage unit 409, the receiving unit 401, the session key calculating unit 403, the bilinear mapping operation unit 405, and the decrypting unit 407 may freely execute a read/write operation.

An example of a function of each of the key generating device 20, the encrypting device 30, and the receiving device 40 according to the embodiment has been described. Each of the constituent elements may be composed of a general-purpose member or a circuit or hardware that is specified to a function of each of the constituent elements. In addition, a function of each of the constituent elements may be executed by the CPU. Accordingly, in accordance with a technology level when the embodiment is embodied, the used configuration may be appropriately changed.

<Operation of a Key Generating Device 20: a Setup Process and a Join Process>

The center operates the key generating device 20 that is possessed by the center, and generates a public key and public information and a personal secret key corresponding to each user in accordance with the following sequence. The setup process and the join process that are executed by the key generating device 20 according to the embodiment are the same as the setup process and the join process in the method according to the related art. Thus, the operation of the key generating device 20 according to the embodiment (that is, the setup process and the join process) will be described in detail with reference to FIGS. 3 and 4.

(Setup Process in a Key Generating Device 20)

The setup process is a key generating process that the center possessing the key generating device 20 according to the embodiment executes once when constructing the system. The center determines a security parameter λ and the key generating device uses the input security parameter λ to execute the setup process, which will be described below.

First, the parameter determining unit 251 of the key generating device 20 generates a prime number p of λ bits. Then, the bilinear group selecting unit 253 selects a bilinear mapping group G and a cyclic multiplicative group $G_1$ where p is used as an order (Step S11).

Next, the bilinear group selecting unit 253 of the key generating device 20 determines bilinear mapping e: $G \times G \to G_1$ (Step S12).

Next, the parameter determining unit 251 of the key generating device 20 selects G, H∈G, and calculates V=e (G, H)∈$G_1$ (Step S13).

Then, the parameter determining unit 251 of the key generating device 20 selects $\gamma \in_R Z_P^*$ and calculates W=γG∈G (Step S14). γ and G that are obtained in the above way are confidentially maintained as a master key mk=(γ, G) by only the center.

Next, the key generating unit 255 of the key generating device 20 uses the calculated data to configure an initial public key $ek_0$ as follows (Step S15).

$$ek_0 = \{p, G, G_1, e, W, H, V\} \quad \text{[Equation 101]}$$

If the generation of the public key is completed, the distributing unit 261 of the key generating device 20 opens the initial public key $ek_0$ obtained by executing the setup process as an initial public key of the entire system.

(Join Process in a Key Generating Device 20)

The join process is a user registering process that is executed by the center whenever the center receives a system joining request from the user. The join process may be executed at any timing after the center completes a system setting process.

The center input the public key $ek_{i-1}$ (1≤i≤n), the master key mk, and i that is an index of an i-th joined user to the key generating device 20, and executes the join process, which will be described below, thereby generating a secret key of a user who has transmitted the system joining request and executes a system joining process.

First, the key generating unit 255 of the key generating device 20 calculates $u_i \in Z_P^*$ that is a unique value of a user i (Step S21). Then, the key generating unit 255 executes the calculation that is shown in the following Equation 102 and calculates a secret key $dk_i$ of the user i who has transmitted the system joining request (Step S22).

$$dk_i = (A_i, B_i) \in G \quad \text{[Equation 102]}$$
$$= \left( \frac{u_i}{\gamma + u_i} G, \frac{1}{\gamma + u_i} H \right)$$

In this case, $B_i$ in Equation 102 is a portion of the secret key $dk_i$. However, $B_i$ is not secret information but public information, and the user i does not need to confidentially maintain $B_i$.

Next, the key generating unit 255 of the key generating device 20 calculates public information corresponding to the user i on the basis of the following Equation 103, and obtains $dk_i$ and $(u_i, V_i)$ (Step S23).

$$V_i = e(G, H)^{\frac{1}{\gamma + u_i}} \in G_1 \quad \text{[Equation 103]}$$

The distributing unit 261 of the key generating device 30 confidentially transmits the secret key $dk_i$ of the user i that is obtained by executing the join process to the user i using a secure communication path. The distributing unit 261 adds public information ($u_i$, $B_i$, $V_i$) corresponding to the user i to the current public key $ek_{i-1}$, updates the current public key as the new public key $ek_i$, and opens the public key. At this time, the new public key $ek_i$ forms the configuration shown by the following Equation 104.

$$ek_i = (p, G, G_1, e, W, H, V, (u_1, B_1, V_1), \ldots (u_i, B_i, V_i)) \quad \text{[Equation 104]}$$

The setup process and the join process that are executed by the key generating device 20 according to the embodiment have been described. Next, the encryption process (encryption' process) that is executed by the encrypting device 30 according to the embodiment will be described.

<Operation of an Encrypting Device 30: an Encryption' Process>

Figure 13:
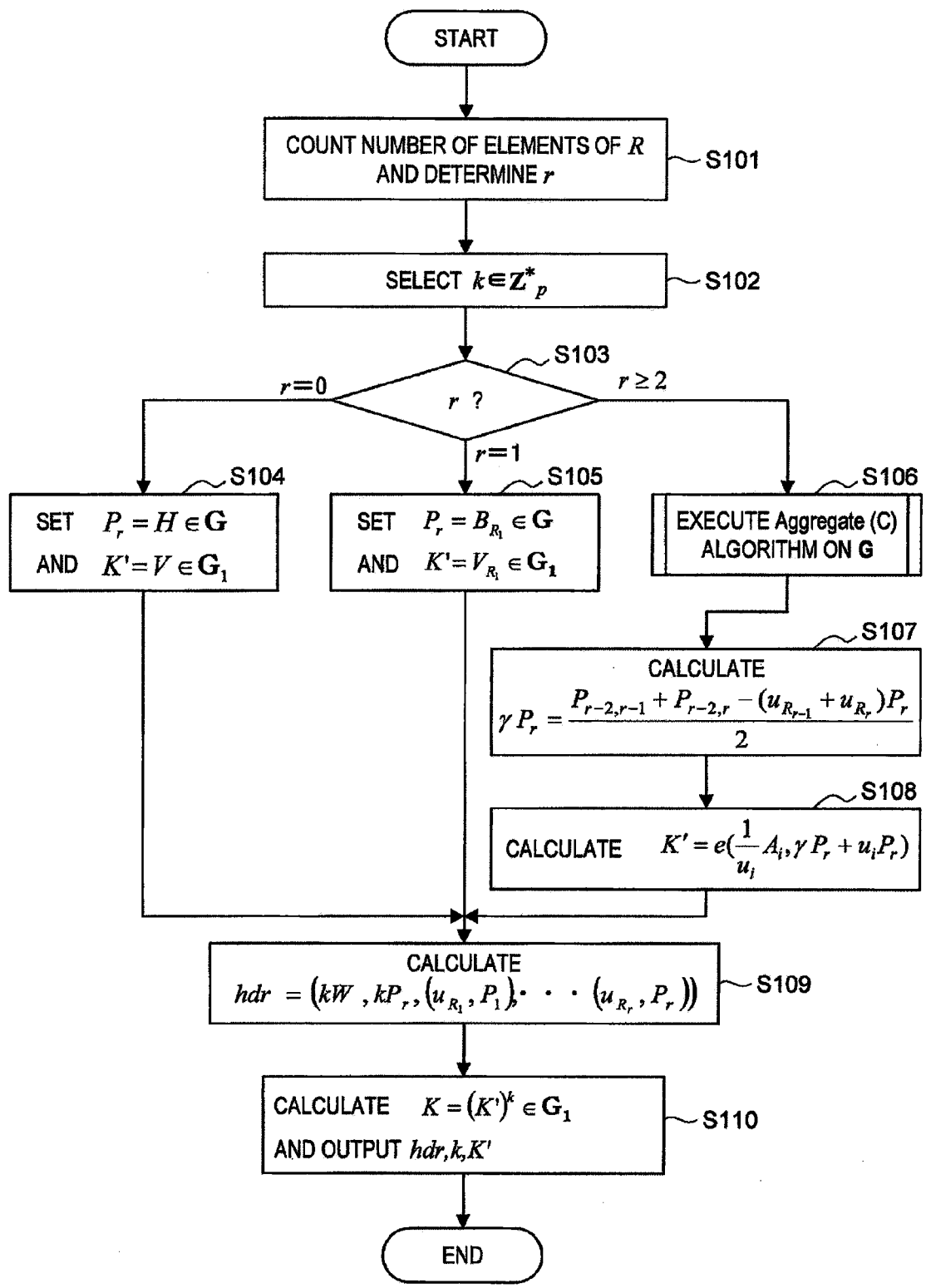
FIG. 13 is a flowchart illustrating an encryption process according to the embodiment.
Figure 14:
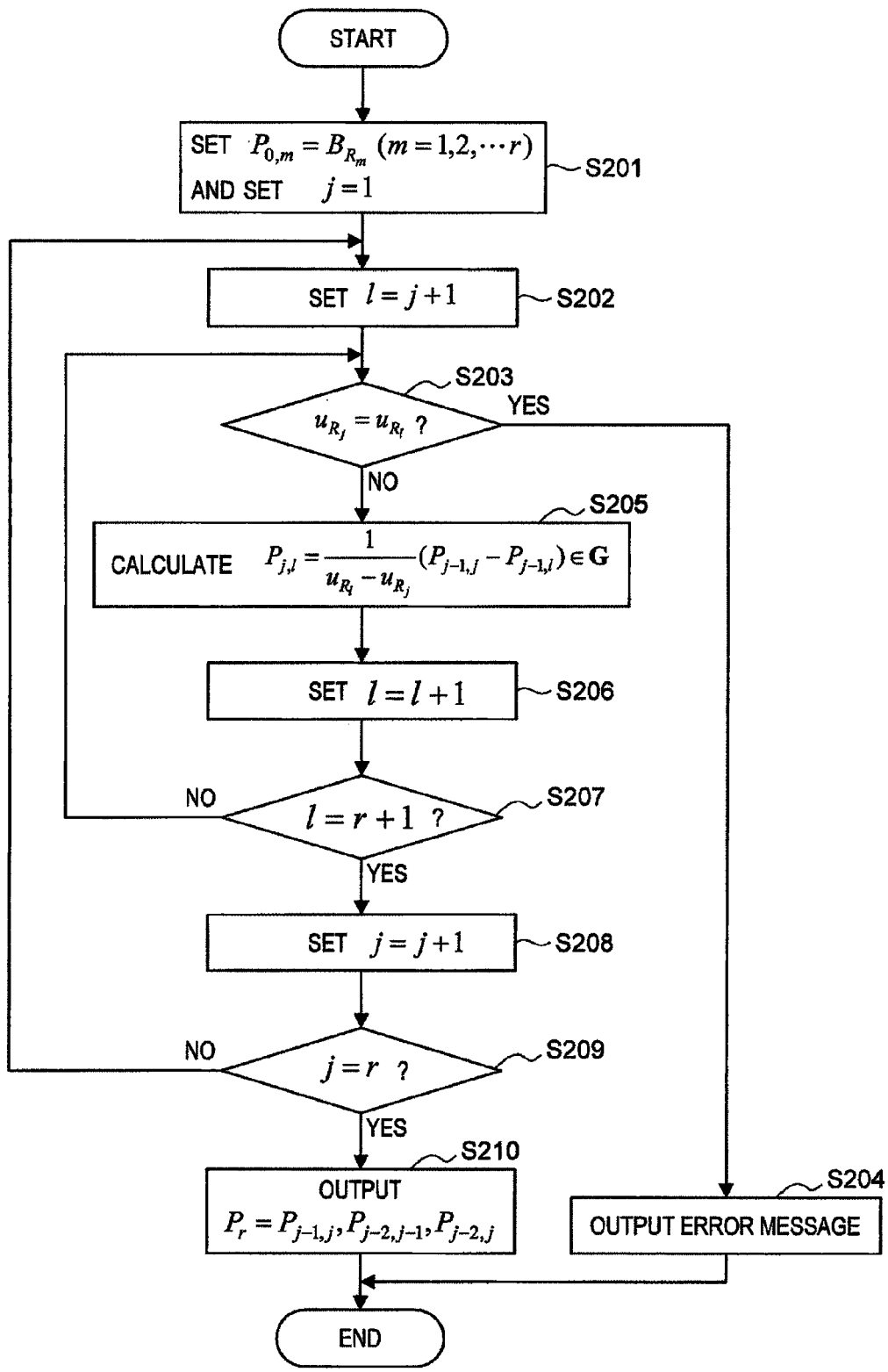
FIG. 14 is a flowchart illustrating an operation process of a bilinear group according to the embodiment.

A distributor who distributes a plain text, such as contents, operates the encrypting device 30 that is possessed by the distributor, and generates a cipher text and a header in accordance with the following sequence. Hereinafter, the operation of the encrypting device 30 according to the embodiment will be described in detail with reference to FIGS. 13 and 14. FIG. 13 is a flowchart illustrating an encryption process that is executed by the encrypting device 30 according to this embodiment. FIG. 14 is a flowchart illustrating an operation process of a bilinear group that is executed by the encrypting device 30 according to this embodiment.

The encryption' process is a process that is executed whenever an arbitrary transmitter who desires to distribute contents performs a distribution using the encrypting device 30.

The transmitter inputs the public key $ek_i$ and a set of revoked users $R = \{u_{R1} \ldots u_{Rr}\}$ to the encrypting device 30 according to the embodiment and executes the encryption' process, which will be described below, thereby executing an encryption process on a plain text, such as contents, which the transmitter desires to distribute. The set R, which is input by the user, is converted into digital data that the encrypting device 30 can use by the revoked receiving device specifying unit 303 of the encrypting device 30, and used during the encryption' process.

First, the revoked receiving device specifying unit 303 of the encrypting device 30 counts the number of elements of R, sets a count result as r (Step S101), and outputs the count result r to the session key determining unit 307. Next, the session key calculating unit 309 of the encrypting device 30 selects $k \in Z_P^*$ (Step S102).

Next, the session key calculating unit 309 of the encrypting device 30 executes a determination process on the number r of revoked users (Step S103). In the case of r=0 (that is, in the case where there is no revoked user), the session key calculating unit 309 executes Step S104, which will be described below. In addition, in the case of r=1 (that is, in the case where only one revoked user exists), the session key calculating unit 309 executes Step S105, which will be described below. In addition, in the case of r≧2 (that is, in the case where two or more revoked users exist), the session key calculating unit 309 executes Step S106, which will be described below.

In the case where there is no revoked user, the session key calculating unit 309 determines $P_r$ and K' on the basis of the following Equations 105 and 106 (Step S104), and then executes Step S109.

$$P_r = H \in G \quad \text{[Equation 105]}$$

$$K' = V \in G_1 \quad \text{[Equation 106]}$$

In addition, in the case where one revoked user exists, the session key calculating unit 309 determines $P_r$ and K' on the basis of the following Equations 107 and 108 (Step S105), and then executes Step S109.

$$P_r = B_{R_1} = \frac{1}{\gamma + u_{R_1}} H \in G \quad \text{[Equation 107]}$$

$$K' = V_{R_1} \in G_1 \quad \text{[Equation 108]}$$

In addition, in the case where two or more revoked users exist, the session key calculating unit 309 requests the bilinear mapping operation unit 313 to execute an operation process (Aggregate (C) algorithm) of a bilinear group on G and calculate values shown in the following Equations 109 to 111. The bilinear mapping operation unit 313 executes the Aggregate (C) algorithm and outputs the values of Equations 109 to 111 to the session key calculating unit 309 (Step S106). In addition, the Aggregate (C) algorithm that is an operation process algorithm of a bilinear group will be described in detail below.

$$P_l(l = 1, \ldots, r) = \frac{1}{(\gamma + u_{R_1}) \ldots (\gamma + u_{R_l})} H \in G \quad \text{[Equation 109]}$$

$$P_{r-2,r-1} = \frac{1}{(\gamma + u_{R_1}) \ldots (\gamma + u_{R_{r-2}})(\gamma + u_{R_{r-1}})} H \in G \quad \text{[Equation 110]}$$

$$P_{r-2,r} = \frac{1}{(\gamma + u_{R_1}) \ldots (\gamma + u_{R_{r-2}})(\gamma + u_{R_r})} H \in G \quad \text{[Equation 111]}$$

In this case, Equations 110 and 111 are values that are calculated as intermediate calculation values when Equation 109 ($P_r$) is derived. In the method according to the related art, the values of Equations 110 and 111 are not output as the calculation values. In the encryption process according to this embodiment, as will be described below, the calculation values of Equations 110 and 111 are effectively used, and thus it may be possible to reduce a calculation amount needed when the encryption is executed, that is, calculation time, or a cost of an apparatus that is needed in calculation.

For example, in the case of r=3, the bilinear mapping operation unit 313 executes the above-described Aggregate (C) algorithm, and outputs three values of $P_{1,2}$, $P_{1,3}$, and $P_{2,3}$ as an operation result to the session key calculating unit 309.

In the case of j = 1, $$P_{1,2} = \frac{1}{u_{R_2} - u_{R_1}} (P_{0,1} - P_{0,2})$$

$$= \frac{1}{u_{R_2} - u_{R_1}} \left( \frac{1}{\gamma + u_{R_1}} - \frac{1}{\gamma + u_{R_2}} \right) H$$

$$= \left( \frac{1}{(\gamma + u_{R_1})(\gamma + u_{R_2})} \right) H$$

$$P_{1,3} = \frac{1}{u_{R_3} - u_{R_1}} (P_{0,1} - P_{0,3})$$

$$= \frac{1}{u_{R_3} - u_{R_1}} \left( \frac{1}{\gamma + u_{R_1}} - \frac{1}{\gamma + u_{R_3}} \right) H$$

$$= \left( \frac{1}{(\gamma + u_{R_1})(\gamma + u_{R_3})} \right) H$$

-continued

In the case of $j=2$, $$P_{2,3} = \frac{1}{u_{R_3} - u_{R_2}}(P_{1,2} - P_{1,3})$$

$$= \frac{1}{u_{R_3} - u_{R_2}}\left(\frac{1}{(\gamma+u_{R_1})(\gamma+u_{R_2})} - \frac{1}{(\gamma+u_{R_1})(\gamma+u_{R_3})}\right)H$$

$$= \left(\frac{1}{(\gamma+u_{R_1})(\gamma+u_{R_2})(\gamma+u_{R_3})}\right)H$$

Next, the session key calculating unit 309 uses the operation result that is output from the bilinear mapping operation unit 313 to calculate a value shown in the following Equation 112 (Step S107).

$$\gamma P_r = \frac{1}{2}(P_{r-2,r-1} + P_{r-2,r} - (u_{R_{r-1}} + u_{R_r})P_r) \quad \text{[Equation 112]}$$

If Equation 112 is developed, it becomes the following Equation 113. If the session key calculating unit 309 according to the embodiment calculates $_\gamma P_r$, the Aggregate (C) algorithm on $G_1$ does not need to be executed, and the number of times of executing the Aggregate (C) algorithm can be reduced to 1.

$$\gamma P_r = \frac{1}{2}(P_{r-2,r-1} + P_{r-2,r} - (u_{R_{r-1}} + u_{R_r})P_r) \quad \text{[Equation 113]}$$

$$= \frac{1}{2}\left(\frac{1}{(\gamma+u_{R_1})\dots(\gamma+u_{R_{r-2}})}\left(\frac{1}{\gamma+u_{R_{r-1}}} + \frac{1}{\gamma+u_{R_r}}\right)H - (u_{R_{r-1}} + u_{R_r})P_r\right)$$

$$= \frac{1}{2}\left(\frac{1}{(\gamma+u_{R_1})\dots(\gamma+u_{R_{r-2}})} \cdot \frac{\gamma+u_{R_r}+\gamma+u_{R_{r-1}}}{(\gamma+u_{R_{r-1}})(\gamma+u_{R_r})}H - (u_{R_{r-1}} + u_{R_r})P_r\right)$$

$$= \frac{1}{2}\left(\frac{2\gamma + u_{R_r} + u_{R_{r-1}} - (u_{R_{r-1}} + u_{R_r})}{(\gamma+u_{R_1})\dots(\gamma+u_{R_r})}\right)H$$

$$= \frac{\gamma}{(\gamma+u_{R_1})\dots(\gamma+u_{R_r})}H$$

Next, the session key calculating unit 309 uses the operation result of the bilinear mapping operation unit 313 and the value of Equation 113, thereby calculating a value shown in the following Equation 114 (Step S108).

$$K' = e\left(\frac{1}{u_j}A_j, \gamma P_r + u_j P_r\right) \in G_1 \quad \text{[Equation 114]}$$

$$= e\left(\frac{1}{\gamma+u_j}G, \frac{\gamma+u_j}{(\gamma+u_{R_1})\dots(\gamma+u_{R_r})}H\right)$$

$$= e(G, H)^{\frac{1}{(\gamma+u_{R_1})\dots(\gamma+u_{R_r})}}$$

With respect to each of the cases, if calculation of $P_r$ and K' is completed, the header calculating unit 307 calculates the header hdr on the basis of the following Equation 115 (Step S109).

$$hdr = (C_1, C_2, (u_{R_1}, P_1), \dots (u_{R_r}, P_r)) \quad \text{[Equation 115]}$$

$$= (k\,W, kP_r, (u_{R_1}, P_1), \dots (u_{R_r}, P_R))$$

Next, the session key calculating unit 309 calculates the session key K on the basis of the following Equation 116, and outputs the session key K together with the header hdr, K', and k (Step S110).

$$K=(K')^k \in G_1 \quad \text{[Equation 116]}$$

The encrypting unit 315 of the encrypting device 30 generates a cipher text $C=E_K(M)$ using the session key K of the plain text M, and the cipher text transmitting unit 317 broadcasts and distributes (hdr, C). If this process is executed, the transmitter can transmit the encrypted contents to a desired user.

In addition to the above process, the encryption of the plain text M or the encryption and the broadcasting and distributing may be executed by the encryption' process. In addition, Step S101 may be executed by the transmitter, and the process result may be input to the encrypting device 30 that executes the encryption' process.

(Operation Process of a Bilinear Group-Aggregate (C) Algorithm)

Next, the Aggregate (C) algorithm that is an operation process of a bilinear group that is executed during the encryption' process will be described in detail with reference to FIG. 14.

The Aggregate (C) algorithm is an algorithm that is executed when the bilinear mapping operation unit 313 of the encrypting device 30 calculates $(P_1 \dots P_r) \in G$.

First, the bilinear mapping operation unit 313 of the encrypting device 30 sets the conditions $P_{0,m}=B_{Rm}$ (m=1, . . . , r) and j=1 (Step S201). Next, the bilinear mapping operation unit 313 sets the condition l=j+1 (Step S202).

In this case, the bilinear mapping operation unit 313 compares $u_{Rj}$ and $u_{R1}$ (Step S203). If the condition $u_{Rj}=u_{R1}$ is satisfied, the bilinear mapping operation unit 313 outputs an error message (Step S204), and completes the process. If the condition $u_{Rj}=u_{R1}$ is not satisfied, the bilinear mapping operation unit 313 executes the following Step S205.

Next, the bilinear mapping operation unit 313 uses the following Equation 117 to calculate $P_{j,l}$ (Step S205).

$$P_{j,l} = \frac{1}{u_{R_l} - u_{R_j}}(P_{j-1,j} - P_{j-1,l}) \in G \quad \text{[Equation 117]}$$

If the calculation of Equation 111 is completed, the bilinear mapping operation unit 313 substitutes l+1 for l (Step S206), and compares l and r+1 (Step S207). If the condition l=r+1 is satisfied, the bilinear mapping operation unit 313 executes Step S208, and if l is not equal to r+1, the bilinear mapping operation unit 313 returns to Step S203 and continuously executes the process.

Next, the bilinear mapping operation unit 313 substitutes j+1 for j (Step S208), and compares j and r (Step S209). If the condition j=r is satisfied, the bilinear mapping operation unit 313 executes Step S210, and if j is not equal to r, the bilinear mapping operation unit 313 returns to Step S202 and continuously executes the process.

Then, the bilinear mapping operation unit 313 outputs the conditions $Pr=P_{j-1,j}$, $P_{j-2,j-1}$, and $P_{j-2,j}$ to the session key calculating unit 309 (Step S210).

<Operation of a Receiving Device 40: a Decryption Process>

Since the decryption process that is executed by the receiving device 40 according to the embodiment is the same as the decryption process in the method according to the related art, the operation of the receiving device 40 according to the embodiment (that is, decryption process) will be described in detail with reference to FIG. 7.

The decryption process is a process that is executed by the receiving device 40 according to this embodiment, when a receiver who has received distributed contents decrypts a cipher text and acquires a plain text.

On the basis of a header hdr, a secret key $dk_i$, and a unique value $u_i$ that are transmitted by the transmitter, the receiving device 40 executes the decryption process, which will be described below, and executes a decryption process on a cipher text, such as distributed contents.

First, the session key calculating unit 403 of the receiving device 40 determines whether $u_i$ as a unique value of the session key calculating unit 403 exists in the header hdr received by the receiving unit 401 (Step S51). When it is determined that $u_i$ as the unique value exists in the header hdr, it means that the receiver is revoked by the transmitter. Accordingly, the receiving device 40 outputs an error message (Step S52) and completes a process. Meanwhile, when it is determined that $u_i$ as the unique value does not exist in the header hdr, the receiving device 40 executes the following Step S53.

Next, the session key calculating unit 403 determines whether r is 0 or not (Step S53). When it is determined that r is 0, the session key calculating unit 403 executes Step S54, which will be described below. Meanwhile, when it is determined that r is not 0, the session key calculating unit 403 executes Step S55, which will be described below.

In this case, when r is 0, the session key calculating unit 403 sets $B_{i,R}=B_i$ and executes Step S56, which will be described below.

Meanwhile, when r is not 0, the session key calculating unit 403 requests the bilinear mapping operation unit 405 to execute an operation process (Aggregate (B) algorithm) of a bilinear group on G and calculate a value shown in the following Equation 112. The bilinear mapping operation unit 405 executes the Aggregate (B) algorithm and outputs a value of Equation 118 to the session key calculating unit 403 (Step S55). In addition, the Aggregate (B) algorithm that is an operation process algorithm of a bilinear group will be described in detail below.

$$B_{i,R} = \frac{1}{\prod_{j=1}^{r}(\gamma + u_{R_j})} B_i = \frac{1}{(\gamma + u_i)\prod_{j=1}^{r}(\gamma + u_{R_j})} H \quad \text{[Equation 118]}$$

If Step S54 or S55 is completed, the session key calculating unit 403 uses the acquired $B_{i,R}$ to calculate the session key K on the basis of the following Equation 119 (Step S56).

$$K = e(C_1, B_{i,R}) \cdot e(A_i, C_2) \quad \text{[Equation 119]}$$
$$= e\left(k\gamma G, \frac{1}{(\gamma+u_i)\prod_{j=1}^{r}(\gamma+u_{R_j})} H\right) \cdot$$
$$e\left(\frac{u_i}{(\gamma+u_i)} G, \frac{k}{\prod_{j=1}^{r}(\gamma+u_{R_j})} H\right)$$
$$= e(G,H)^{\frac{k\gamma}{(\gamma+u_i)\prod_{j=1}^{r}(\gamma+u_{R_j})}} \cdot$$
$$e(G,H)^{\frac{ku_i}{(\gamma+u_i)\prod_{j=1}^{r}(\gamma+u_{R_j})}}$$
$$= e(G,H)^{\frac{k}{\prod_{j=1}^{r}(\gamma+u_{R_j})}}.$$

The decrypting unit 407 uses the session key K obtained by the above-described decryption process to decrypt a cipher text C, such as contents, which is transmitted from the transmitter, thereby acquiring a plain text $M=D_K(C)$.

(Operation Process of a Bilinear Group-Aggregate (B) Algorithm)

Next, the Aggregate (B) algorithm that is an operation process of a bilinear group that is executed during the decryption process will be described in detail with reference to FIG. 8.

The Aggregate (B) algorithm is an algorithm that is executed when the bilinear mapping operation unit 405 calculates $B_{i,R} \in G$.

First, the bilinear mapping operation unit 405 sets a parameter tmp and sets an initial value of tmp as $B_j$ (Step S61). Next, the bilinear mapping operation unit 405 sets the condition j=1 (Step S62).

Next, the bilinear mapping operation unit 405 compares $u_{R_j}$ and $u_i$. If the condition $u_{R_j}=u_i$ is satisfied, the bilinear mapping operation unit 405 outputs an error message (Step S64), and completes a process. If the condition $u_{R_j}=u_i$ is not satisfied, the bilinear mapping operation unit 405 executes Step S65, which will be described below.

Next, the bilinear mapping operation unit 405 uses the following Equation 120 to calculate a new value of tmp (Step S68).

$$tmp = \frac{1}{u_i - u_{R_j}}(P_j - tmp) \in G \quad \text{[Equation 120]}$$

In this case, as can be seen from the above Equation 114, since $u_i$ as the unique value of the receiving device is included in a denominator of Equation 114, when $u_i$ is included in the header hdr transmitted from the encrypting device, tmp does not have a value. As a result, since the revoked user can hardly obtain $B_{i,R}$ needed when calculating the session key K, it may be impossible to decrypt a cipher text.

If the operation is completed, the bilinear mapping operation unit 405 sets a value of j as j+1 (Step S66) and compares j and r+1 (Step S67). If the condition j=r+1 is satisfied, the bilinear mapping operation unit 405 executes Step S68, which will be described below. In addition, when j is not equal to r+1, the bilinear mapping operation unit 405 returns to Step S63 and continuously executes the process.

Next, the bilinear mapping operation unit 405 outputs tmp to the session key calculating unit 403 (Step S68). The output tmp is $B_{i,R}$, and the session key calculating unit 403 uses the output value to calculate the session key K.

<With Respect to a Difference with a Method According to the Related Art>

In the method according to the related art, in order to derive $P_1, \ldots, P_r$, in the case where the condition $r \geq 2$ is satisfied, the Aggregate (A) algorithm with respect to an operation on G is executed by Step S36 of the Encryption algorithm. In order to derive K', the Aggregate (A) algorithm with respect to an operation on $G_1$ is executed by Step S37.

Meanwhile, in the encrypting method according to this embodiment, similar to the method according to the related art, the Aggregate (C) algorithm with respect to an operation on G is executed by Step S106 of the encryption' algorithm. However, when K' is derived, an operation on G in Step S107 and an operation on $G_1$ in Step S108 are used, instead of the Aggregate (C) algorithm. In this case, in the Aggregate (A) algorithm and the Aggregate (C) algorithm, only the output values in Steps S50 and S210 are different from each other, and $P_{r-2, r-1}$ and $P_{r-2, r}$ that are additionally output in the Aggregate (C) algorithm are values that are used to derive $P_r$. Even though the values are additionally output, the calculation amount is the same as that of the Aggregate (A) algorithm.

That is, in regards to the calculation that is needed when a user j possessing a secret key $dk_j$ executes an encryption process, in the method according to the related art, the number of times of executing the Aggregate (A) algorithm needs to be two. Meanwhile, in the encrypting method according to this embodiment, the number of times of executing the Aggregate (C) algorithm is reduced to one, instead of a few times of operations on G and one time of bilinear mapping operation added. In addition, in regards to the calculation amount that is needed to derive K', in the method according to the related art, as r increases, the calculation amount increases in proportion to $r^2$. However, in the encrypting method according to this embodiment, the calculation amount becomes the constant calculation amount without depending on r.

In order to show an effect of the encryption process according to this embodiment, the compared result of the calculation amounts at the time of the encryption processes in both the method according to the related art and the method according to the embodiment is shown in FIG. 15. As shown in FIG. 15, according to the compared result between the method according to the embodiment and the method according to the related art, the number of times of executing the bilinear mapping operation is increased by one, the number of times of executing each operation on G, that is, addition and multiplication on an elliptic curve is increased by three and four, respectively, and the number of times of executing an inverse element operation on $Z_P^*$ is increased by two. However, each of multiplication, a power, and an inverse element operation on $G_1$, that is, a group having the largest bit size is decreased by $(r^2-r)/2$. In order to compare the calculation amounts at the time of the encryption processes in the method according to the related art and the method according to this embodiment, first, the calculation amount that is needed to execute each operation of FIG. 15 is defined as follows. At this time, according to the compared result between the method according to the related art and the method according to this embodiment, it can be seen from FIG. 15 that an increment of the calculation amount at the time of the encryption process in the method according to the embodiment is as represented by the following Equation 121. Meanwhile, a decrement thereof is as represented by the following Equation 122. Accordingly, when r satisfies the following Equation 123, it can be seen that the calculation amount at the time of the encryption process can be reduced in the method according to this embodiment.

$$3A + 4S + 2inv + P \qquad \text{[Equation 121]}$$

$$\frac{r^2 - r}{2}(M + E + I) \qquad \text{[Equation 122]}$$

$$3A + 4S + 2inv + P \leq \frac{r^2 - r}{2}(M + E + I) \qquad \text{[Equation 123]}$$

The meanings of the symbols in FIG. 15 and Equations 121 to 123 are as follows.
A: addition of a point on an elliptic curve in G
D: doubling of a point on an elliptic curve in G
S: scalar multiplication of a point on an elliptic curve in G
M: multiplication in $G_1$
Q: squaring in $G_1$
E: power in $G_1$
I: Inverse element operation in $G_1$
mul: multiplication in $Z_P^*$
sqr: squaring in $Z_P^*$
inv: inverse element operation in $Z_P^*$
P: bilinear mapping operation A numerical value example is used to derive r that satisfies Equation 123. In the description below, the case where 128-bit equivalent safety is satisfied is considered. At this time, a bit size of p becomes 256 bits and an original bit size of $G_1$ becomes 3072 bits. Hereinafter, on the basis of the multiplication mul on $Z_P^*$, a specific numerical example is shown. In both the method according to the related art and the method according to this embodiment, an operation of a point on an elliptic curve on G, various operations on $G_1$ and $Z_P^*$, and a bilinear mapping operation are used. In these operations, since various operation methods exist, operation estimations that are shown in Document 2 are used herein.

In Document 2, with respect to an operation on $Z_P^*$, a relationship of the following Equation 124 is applied. In addition, by $3072/256=12=2^2\times 3$, with respect to the operation on $G_1$, the following Equation 125 is obtained. In addition, in regards to an operation of a point on an elliptic curve, the following Equation 126 is obtained using a projective coordinate system. In this case, since the scalar multiplication S is calculated by repeatedly executing doubling and addition, an average calculation amount can be estimated by executing doubling $\log_2 p$ times, which corresponds to a bit length of a coefficient of a point, and executing addition $(\frac{1}{2})\log_2 p$ times. Accordingly, the scalar multiplication S can be estimated as represented by the following Equation 127. In addition, in a power E on $G_1$, a bit size of an exponential part is $\log_2 p$ by the order p and the power E is calculated by repeatedly executing doubling and multiplication. Accordingly, similar to the scalar multiplication, the power can be estimated. The power can be estimated as represented by the following Equation 128.

In regards to the bilinear mapping operation P, since the bilinear mapping operation includes an operation using a Miller's algorithm and a power residue operation called a final power, if $C_{Full}$ is defined as a calculation amount of the Miller's algorithm that varies by an elliptic curve parameter, the bilinear mapping operation P can be estimated as $C_{Full}$+ 3E. In this case, 3E is a cost of a final power with respect to a currently assumed parameter. As seen from a Table in Document 2, if an average value of an Ate pairing operation in the projective coordinate system is defined as $C_{Lite}$, the bilinear mapping operation P becomes the following Equation 129.

$$sqr \cong mul, inv = 10 \; mul \qquad \text{[Equation 124]}$$

$$M = 45 \; mul, Q \cong M, I = 152 \; mul \qquad \text{[Equation 125]}$$

$$A = 12 \; mul + 2sqr \cong 14 \; mul, \qquad \text{[Equation 126]}$$
$$D = 7 \; mul + 5sqr \cong 12 \; mul$$

$$S = \{\log_2 P\}D + \frac{1}{2}\{\log_2 P\}A \qquad \text{[Equation 127]}$$
$$= 256D + 128A$$
$$= (256 \times 12 + 128 \times 14) \; mul$$
$$= 4864 \; mul$$

$$E = 256Q + 128M \qquad \text{[Equation 128]}$$
$$\cong (256 + 128) \times 45 \; mul$$
$$= 17280 \; mul$$

$$P = (16256 + 3 \times 17280) \; mul = 68096 \; mul \qquad \text{[Equation 129]}$$

Figure 16:
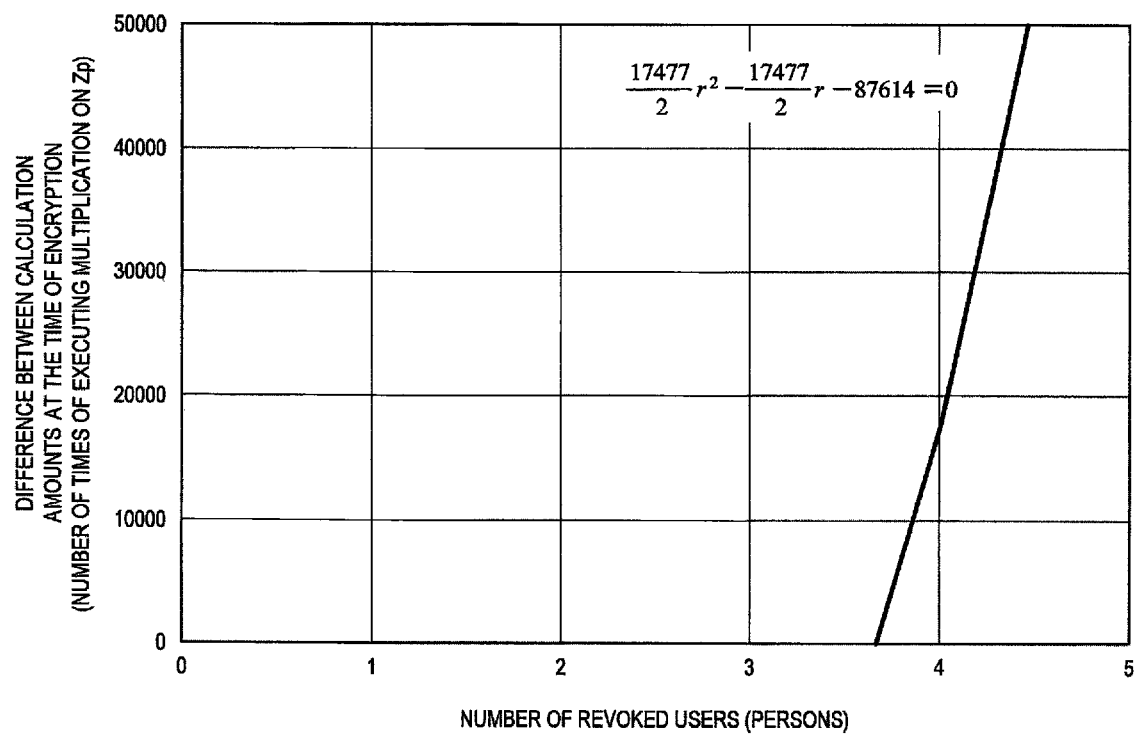
FIG. 16 is a graph illustrating a result that is obtained by comparing calculation amounts at the time of an encryption process.

If using Equations 124 to 129, Equation 123 can be changed to the following Equation 130. If Equation 130 is shown, it is as shown in FIG. 16.

$$3A + 4S + 2inv + P \le \frac{r^2 - r}{2}(M + E + 1) \Rightarrow$$

$$(3 \times 14 + 4 \times 4864 + 2 \times 10 + 68096) mul \le$$

$$\frac{r^2 - r}{2}(45 + 17280 + 152) mul \Leftrightarrow$$

$$\frac{17477}{2}r^2 - \frac{17477}{2}r - 87614 \ge 0$$

[Equation 130]

As seen from FIG. 16, in the case where the above-described parameter setting is performed, when the number of revoked users becomes 4 or more, in the method according to this embodiment, an operation can be efficiently performed.

(Modification of an Encrypting Method According to this Embodiment)

In the encrypting method according to this embodiment, since $u_i$ that is a unique value of a user is used during the encryption process, the corresponding user can efficiently execute the encryption process, but an entity that is not the corresponding user can hardly execute the encryption process. For this reason, when only the above-described encrypting method is used, the number of entities that can execute the encryption process is restricted as compared with method according to the related art. In addition, when r is excessively small, it may be preferable that the corresponding user execute the encryption process at a high speed using the method according to the related art. Accordingly, if the method according to the related art and the method according to the embodiment are appropriately used, it may be possible to efficiently execute the encryption process.

For example, if the following process is executed before the encrypting device 30 executes the encryption process or the encryption' process, an efficient encryption process can be selected.

The session key determining unit 307 of the encrypting device 30 determines whether the session key determining unit 307 holds a secret key $dk_j$. When it is determined that the session key determining unit 307 does not hold the secret key $dk_j$, the session key determining unit 307 executes the encryption process. Meanwhile, when it is determined that the session key determining unit 307 holds the secret key $dk_j$, the revoked receiving device specifying unit 303 counts the number of elements of a set R of revoked users and sets the number of elements as r.

Next, the session key calculating unit 309 executes the process until Step S106 of the encryption process according to this embodiment.

Next, the session key calculating method selecting unit 321 compares a calculation amount at the time of executing the encryption process and a calculation amount at the time of executing the encryption' process with respect to r, and determines a session key calculating method to be used.

As a result, when the calculation amount at the time of executing the encryption process is smaller than the calculation amount at the time of executing the encryption' process, the session key calculating method selecting unit 321 outputs a message indicating that it is preferable to execute the encryption process to the session key calculating unit 309. Then, the session key calculating unit 309 executes Steps after Step S37 of the encryption process.

Meanwhile, when the calculation amount at the time of executing the encryption' process is smaller than the calculation amount at the time of executing the encryption process, the session key calculating method selecting unit 321 outputs a message indicating that it is preferable to execute the encryption' process to the session key calculating unit 309. Then, the session key calculating unit 309 executes Steps after Step S107 of the encryption' process.

The encrypting device 30 executes the above determination, thereby selecting an efficient encryption process.

In the above-described modification, the encrypting device 30 selects the efficient encryption process. However, a transmitter that operates the encrypting device 30 may calculate the calculation amount required for the process and select a process to be used.

As described above, in the method according to this embodiment, multiplication, a power, and an inverse element operation on a cyclic group where a bit length is long, which are needed when executing the encryption process in the method according to the related art, are removed, and a one-time bilinear mapping operation (pairing) and an operation of a point on an elliptic curve are slightly added. As a result, when a user, that is, an entity (an operation subject, such as a person, a device, and a server) holding a secret key executes an encryption process, as r increases, a calculation amount that is needed when the encryption process is executed, that is, a calculation time or a cost of an apparatus required for calculation can be reduced.

(Second Embodiment)

<Issue in a Method According to the Related Art>

In the method according to the related art, in addition to the above-described issues, the following issues exist. In the method according to the related art, in addition to an initial public key $ek_0 = \{p, G, G_1, e, W, H, V\}$ that is generated when a setup process is executed, public information $(u_i, B_i, V_i)$ with respect to a user i is added whenever the join process is executed. Accordingly, when n users exist, the public key in the method according to the related art is as represented by the following Equation 917.

$$ek_n = (p, G, G_1, e, W, H, V, (u_1, B_1, V_1), \ldots (u_n, B_n, V_n))$$  [Equation 917]

That is, in the method according to the related art, as shown in FIG. 9B, the number of elements of the public key with respect to the n users becomes 3n+3, and the size of the public key is excessively increased in accordance with an increase in the number of users. For example, when 128-bit equivalent safety is considered, a bit size of a prime number p becomes 256 bits and an original bit size on $G_1$ becomes 3072 bits. In this case, a system is considered in which a bit size of a unique value $u_i$ (i=1, ..., and n) of each user is defined as 32 bits and the condition n=1000 is satisfied. At this time, the size of the public key in the method according to the related art may finally become about 4.3 MB.

In the above-described public key, since p, G, $G_1$, and e are system parameters, they are not counted as the number of elements of the public key.

Accordingly, the inventors have studied various researches to resolve the above-described issues and have developed a cipher key distribution system according to an embodiment of the present invention that can reduce a size of a public key and a calculation amount needed when an encryption process is executed, which will be described below.

[Description of the Present Embodiment]

On the basis of the fundamental technology that has been described above, a cipher key distribution system 10 according to a second embodiment of the present invention will now be described in detail. In addition, since the cipher key distribution system 10 according to the embodiment has the same configuration as the cipher key distribution system according to the first embodiment of the present invention, the detailed description thereof will not be repeated.

In the cipher key distribution system 10 according to this embodiment, the individual basic processes of the setup process, the join process, and the encryption process in the method according to the related art are changed to a setup' process, a join' process, and an Encryption" process. Instead of the Aggregate (A) algorithm, the Aggregate (C) algorithm that has been described in the first embodiment is used, thereby decreasing the size of the public key and the calculation amount needed when the encryption process is executed. Accordingly, in regards to the decryption process and the Aggregate (B) algorithm used during the decryption process, the same method as the method according to the first embodiment of the present invention is used.

In addition, since the hardware configurations of the key generating device 20, the encrypting device 30, and the receiving device 40 according to the embodiment are the same as the hardware configurations of the key generating device 20, the encrypting device 30, and the receiving device 40 according to the first embodiment of the present invention, the detailed description thereof will not be repeated.

<With Respect to a Key Generating Device 20 According to this Embodiment>

Figure 17:
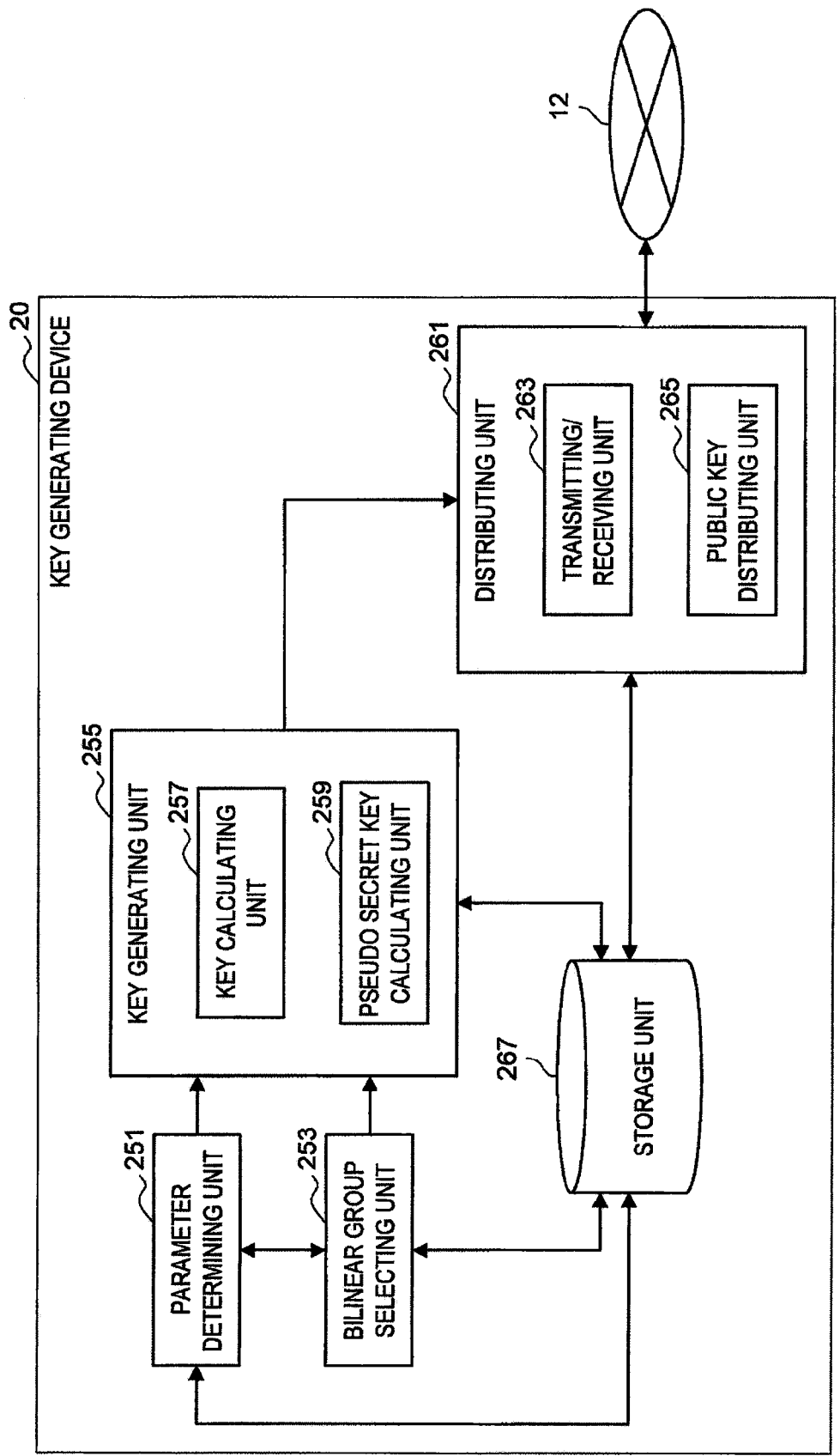
FIG. 17 is a block diagram illustrating the configuration of a key generating device according to a second embodiment of the present invention.

First, the key generating device 20 according to the embodiment will be described in detail with reference to FIG. 17. FIG. 17 is a block diagram illustrating the configuration of the key generating device 20 according to this embodiment.

The key generating device 20 according to the embodiment mainly includes a parameter determining unit 251, a bilinear group selecting unit 253, a key generating unit 255, and a distributing unit 261, as shown in FIG. 17.

The parameter determining unit 251 determines various types of parameters that the key generating device 20 according to the embodiment uses to generate a public key or a secret key, on the basis of a predetermined method. Examples of these parameters may include the prime number p or G, H, V, and γ that are used during the setup process. The parameter determining unit 251 randomly determines a value using a random number, when the prime number p or G, H, V, and γ are determined. In addition, the parameter determining unit 251 may use various bilinear groups or bilinear mapping e transmitted from the bilinear group selecting unit 253, which will be described below, to determine the parameters. The parameter determining unit 251 transmits the various determined parameters to the bilinear group selecting unit 253 or the key generating unit 255, which will be described below. In addition, the parameter determining unit 251 may record the various determined parameters in the storage unit 267, which will be described below.

The bilinear group selecting unit 253 uses a prime number p that is a parameter transmitted from the parameter determining unit 251 to select a bilinear mapping group G and a cyclic multiplicative group $G_1$ where p is used as an order. In addition, the bilinear group selecting unit 253 determines bilinear mapping e: G×G→$G_1$. The bilinear group selecting unit 253 transmits the selected bilinear groups G and $G_1$ and the determined bilinear mapping e to the parameter determining unit 251 and the key generating unit 255, which will be described below. In addition, the bilinear group selecting unit 253 may record the selected bilinear groups G and $G_1$ and the determined bilinear mapping e in the storage unit 267, which will be described below.

The key generating unit 255 uses various types of data transmitted from the parameter determining unit 251 and the bilinear group selecting unit 253 to generate keys, such as a public key, a secret key distributed to each user, a master key, and a pseudo secret key, or public information corresponding to each user. The key generating unit 255 further includes a key calculating unit 257 and a pseudo secret key calculating unit 259.

The key generating unit 255 uses various types of data transmitted from the parameter determining unit 251 and the bilinear group selecting unit 253 to generate a public key, a secret key distributed to each user, a master key, and public information corresponding to each user. The generated keys and public information are recorded in a storage unit that is composed of an HDD or a memory that includes a secure module. In addition, information that needs be opened and distributed keys are transmitted to the distributing unit 261, which will be described below.

The pseudo secret key calculating unit 259 uses various types of data transmitted from the parameter determining unit 251 and the bilinear group selecting unit 253 to generate a pseudo secret key $dk_0$. The generated pseudo secret key is transmitted to the distributing unit 261, which will be described below, and recorded in a storage unit which is composed of an HDD or a memory that includes a secure module.

The distributing unit 261 distributes the public key, the secret key, and the pseudo secret key that the key generating device 20 generates and information that needs to be opened, through the communication network 12. This distributing unit 261 further includes a transmitting/receiving unit 263 and a public key distributing unit 265.

The transmitting/receiving unit 263 transmits the secret key that the key generating unit 255 generates to an individual user through a secure communication path, and receives a system joining request transmitted from the receiving device 40. The received system joining request is transmitted to the key generating unit 255, and a new secret key or public key is generated by the key generating unit 255.

The public key distributing unit 261 distributes the public key, the pseudo secret key, and the public information that the key generating unit 255 generates to the encrypting device 30 or the receiving device 40 through the communication network 12. The encrypting device 30 or the receiving device 40 uses the public key, the pseudo secret key, and the public information to execute an encryption process on a plain text and a decryption process on a cipher text.

The storage unit 267 records various types of parameters that are determined by the parameter determining unit 251 or a bilinear group or bilinear mapping that is selected by the bilinear group selecting unit 253. In addition, various keys or public information that is generated by the key generating unit 255 is confidentially maintained in the storage unit 267. In addition to the various types of data, the key generating device 20 can appropriately store various parameters that need to be stored when any process is executed or information indicating the intermediate result of the process, or various databases in the storage unit 267. In the storage unit 267, the parameter determining unit 251, the bilinear group selecting unit 253, the key generating unit 255, and the distributing unit 261 may freely execute a read/write operation.

<With Respect to an Encrypting Device 30 According to this Embodiment>

Figure 18:
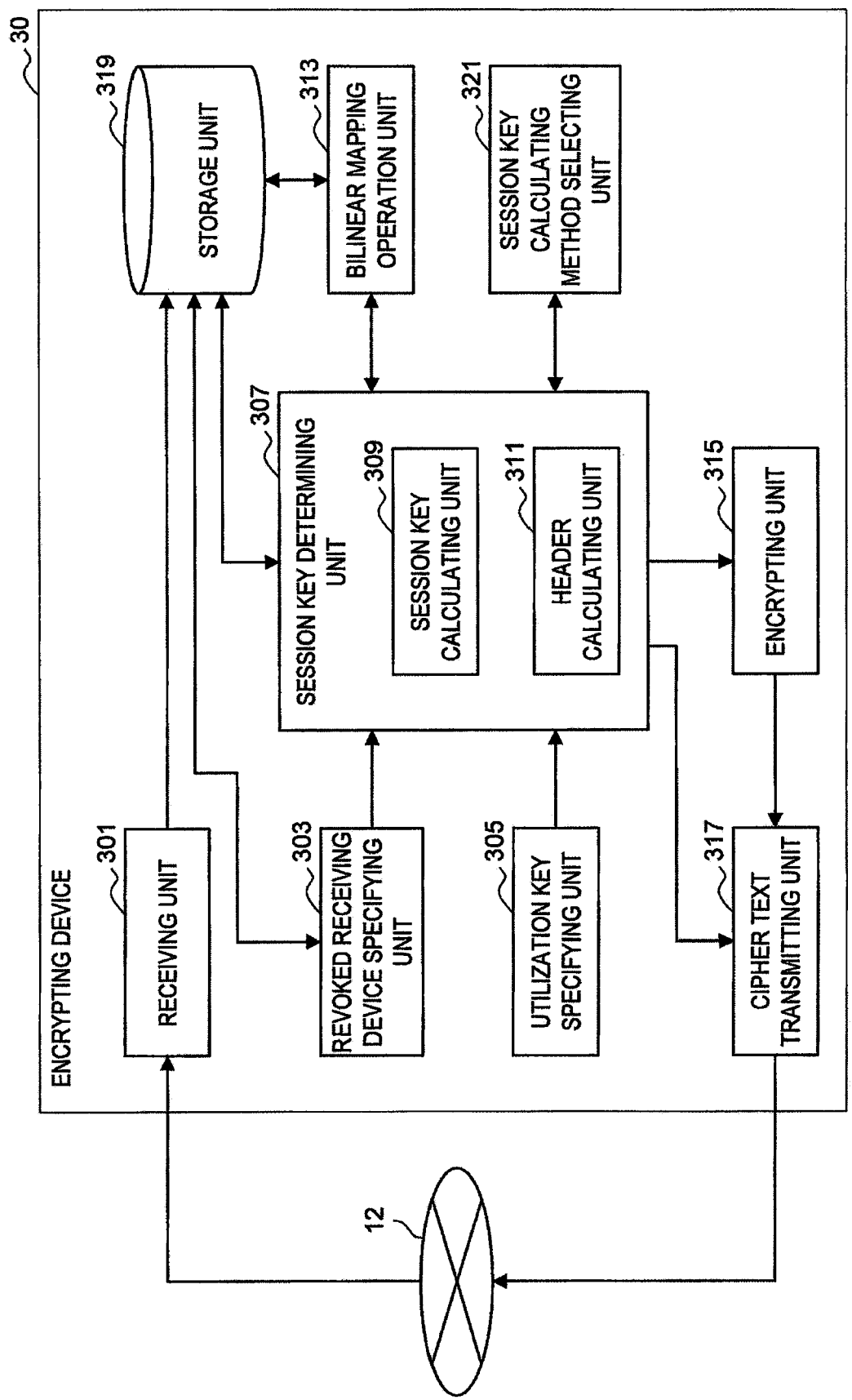
FIG. 18 is a block diagram illustrating the configuration of an encrypting device according to the embodiment.

Next, the encrypting device 30 according to the embodiment will be described in detail with reference to FIG. 18. FIG. 18 is a block diagram illustrating the configuration of the encrypting device 30 according to this embodiment.

The encrypting device 30 according to the embodiment mainly includes a receiving unit 301, a revoked receiving device specifying unit 303, a utilization key specifying unit 305, a session key determining unit 307, a bilinear mapping operation unit 313, an encrypting unit 315, a cipher text transmitting unit 317, and a storage unit 319, as shown in FIG. 18. In addition, the encrypting device 30 according to the embodiment may further include a session key calculating method selecting unit 321.

The receiving unit 301 receives a public key, a pseudo secret key, and public information that are generated and opened by the key generating device 20. The received public key, pseudo secret key, and public information are recorded in the storage unit 319, which will be described below, and read and used, if necessary.

The revoked receiving device specifying unit 303 specifies receiving devices that revoke a distribution of a cipher text among a plurality of receiving devices 40 that are connected to the encrypting device 30 through the communication network 12, and determines a set R of revoked receiving devices. When the set R is determined, the revoked receiving device specifying unit 303 can refer to various types of data that is stored in the storage unit 317, which will be described below. The determined set R is transmitted to the session key determining unit 307, which will be described below, and used when calculating a session key that is used to encrypt a plain text, such as distributed contents. In addition, the revoked receiving device specifying unit 303 may record the determined set R in the storage unit 319, which will be described below.

The utilization key specifying unit 305 refers to the storage unit 319, which will be described below, and determines whether a personal secret key is provided to the encrypting device 30. When the personal secret key is recorded in the storage unit 319, the utilization key specifying unit 305 outputs a message indicating that the personal secret key exists to the session key determining unit 305, which will be described below. In addition, when the personal secret key is not recorded in the storage unit 319, the utilization key specifying unit 305 outputs a message indicating that the personal secret key does not exist and only a pseudo secret key exists to the session key determining unit 305. In addition, the utilization key specifying unit 305 may record a determination result in the storage unit 319, which will be described below, and omit the following determination process.

On the basis of the public key, the personal secret key, and the public information that are received by the receiving unit 301 and stored in the storage unit 319, the set R that is determined by the revoked receiving device specifying unit 303, and the determination result that is output by the utilization key specifying unit 305, the session key determining unit 307 determines a session key that is used to encrypt a plain text, such as distributed contents. The session key determining unit 307 further includes a session key calculating unit 309 and a header calculating unit 311.

On the basis of the public key and the public information that are acquired from the storage unit 319, the set R of revoked receiving devices that are transmitted from the revoked receiving device specifying unit 303, and the determination result that is output by the utilization key specifying unit 305, the session key calculating unit 309 calculates a session key that is used to encrypt a plain text, such as distributed contents. The session key that is calculated by the session key calculating unit 309 is transmitted to the encrypting unit 315, which will be described below, and used when a plain text is encrypted. In addition, the session key calculating unit 309 may record the calculated session key in the storage unit 319.

The header calculating unit 311 uses various data that is calculated when the session key calculating unit 309 calculates the session key and the public key or public information recorded in the storage unit 319, thereby generating a header distributed to the receiving device 40 together with a cipher text. The generated header is transmitted to the cipher text transmitting unit 317, which will be described below. In addition, the header calculating unit 311 may record the generated header information in the storage unit 319.

The bilinear mapping operation unit 313 is a processing unit that executes an operation related to bilinear mapping that needs to be executed when a session key is calculated. The bilinear mapping operation unit 313 uses bilinear groups $G$ and $G_1$ included in the public information that is recorded in the storage unit 319 and data transmitted from the session key determining unit 307 to execute an operation of bilinear mapping. The operation result is retransmitted to the session key determining unit 307 and used when the session key or the header is calculated. In addition, the bilinear mapping operation unit 313 may record the operation result in the storage unit 319.

The encrypting unit 315 acquires a plain text, such as contents, which is distributed from the storage unit 319, uses the session key calculated by the session key determining unit 307 to execute an encryption process, and encrypts a plain text. The encrypted plain text is transmitted to the cipher text transmitting unit 317. In addition, the encrypting unit 315 may record the encrypted plain text in the storage unit 319.

The cipher text transmitting unit 317 broadcasts and distributes the cipher text encrypted by the encrypting unit 315 and the header calculated by the header calculating unit 311 to the individual receiving devices through the communication network 12.

In the storage unit 319, the public key, the pseudo secret key, and the public information received by the receiving unit 301, the set R determined by the revoked receiving device specifying unit 303, or the session key or the header information calculated by the session key determining unit 307 is recorded. In addition to the various data, the encrypting device 30 may appropriately store various parameters that need to be stored when any process is executed or information indicating the intermediate result of the process, or various databases in the storage unit 319. In the storage unit 319, the receiving unit 301, the revoked receiving device specifying unit 303, the utilization key specifying unit 305, the session key determining unit 307, the bilinear mapping operation unit 313, the encrypting unit 315, the cipher text transmitting unit 317, and the session key calculating method selecting unit 321 may freely execute a read/write operation.

When the encrypting device 30 according to the embodiment stores a plurality of session key calculating methods and the plurality of session key calculating methods can be appropriately selected, the session key calculating method selecting unit 321 selects a session key calculating method to be used in accordance with the number of revoked receiving devices. When the session key calculating method is selected, the session key calculating method selecting unit 321 may compare the number of revoked receiving devices and the predetermined threshold value and determine a session key calculating method to be selected. On the basis of the number of revoked receiving devices, the session key calculating method selecting unit 321 may calculate calculation amounts required for selectable session key calculating methods and compare the calculated calculation amounts, thereby selecting a session key calculating method to be used.

<With Respect to a Receiving Device 40 According to this Embodiment>

Figure 19:
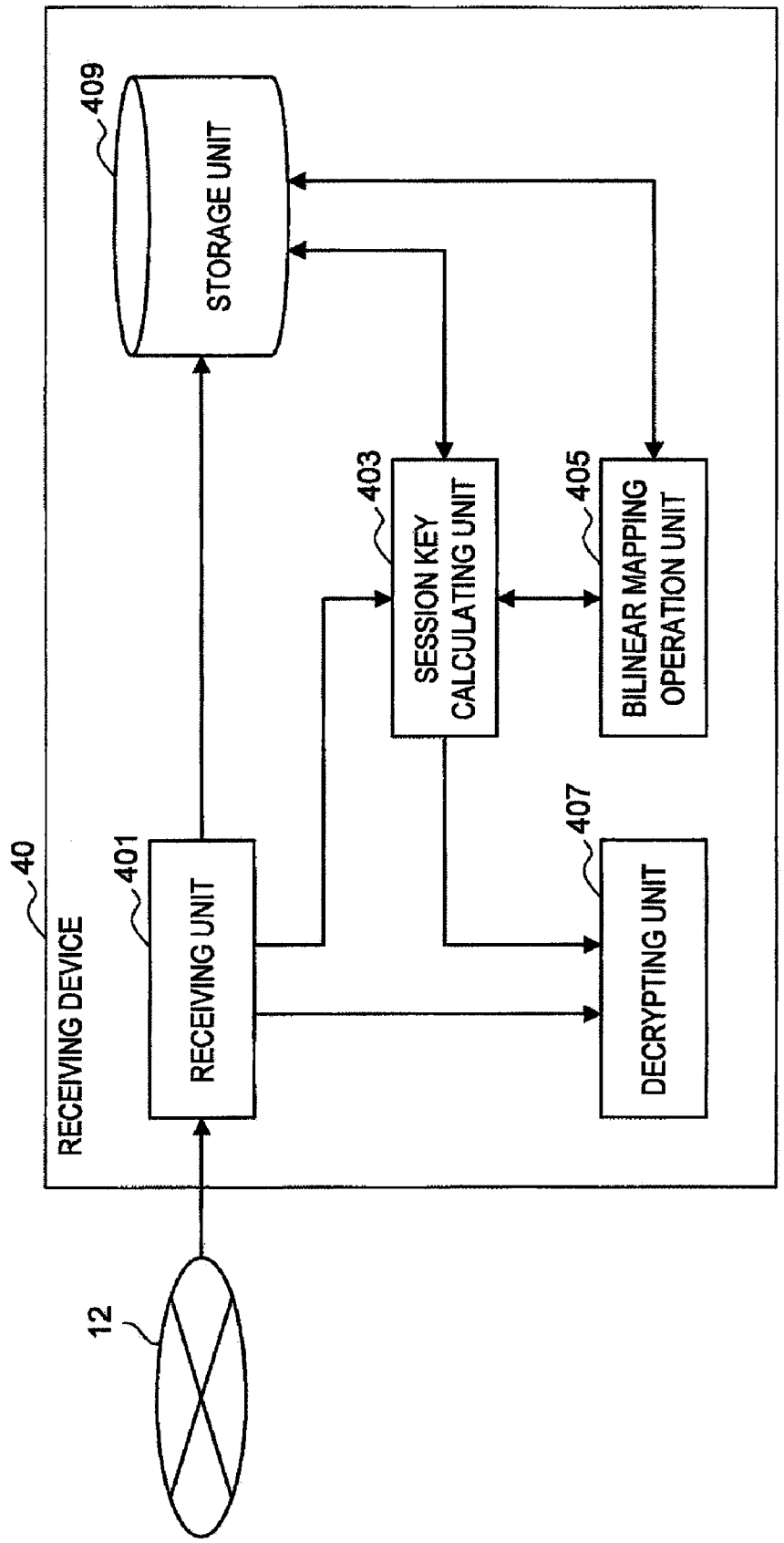
FIG. 19 is a block diagram illustrating the configuration of a receiving device according to the embodiment.

Next, the receiving device 40 according to the embodiment will be described in detail with reference to FIG. 19. FIG. 19 is a block diagram illustrating the configuration of the receiving device 40 according to this embodiment.

The receiving device 40 according to the embodiment mainly includes a receiving unit 401, a session key calculating unit 403, a bilinear mapping operation unit 405, a decrypting unit 407, and a storage unit 409, as shown in FIG. 19.

The receiving unit 401 receives a secret key, a public key, and public information that are generated by the key generating device 20. In addition, the receiving unit 401 can receive header information or a cipher text encrypted by the encrypting device 30. The receiving unit 401 transmits the secret key, the public key, and the public information that are received from the key generating device 20 and the header received from the encrypting device 30 to the session key calculating unit 403, which will be described below, and transmits the cipher text received from the encrypting device 30 to the decrypting unit 407, which will be described below. In addition, the receiving unit 401 may record the received secret key, public information, cipher text, and header information in the storage unit 409, which will be described below.

On the basis of the secret key, the public key, and the public information that are acquired from the key generating device 20 and the header transmitted from the encrypting device 30, the session key calculating unit 403 calculates a session key, which is used when the cipher text distributed from the encrypting device 30 is decrypted. The session key calculating unit 403 transmits the calculated session key to the decrypting unit 403, which will be described below. In addition, the session key calculating unit 403 may record the calculated session key in the storage unit 409, which will be described below.

The bilinear mapping operation unit 405 is a processing unit that executes an operation related to bilinear mapping that needs to be executed when the session key is calculated. The bilinear mapping operation unit 405 uses the bilinear groups G and $G_1$ included in the public information and the data transmitted from the session key calculating unit 403, thereby executing an operation of bilinear mapping. The operation result is retransmitted to the session key calculating unit 403 and used when the session key is calculated. In addition, the bilinear mapping operation unit 405 may record the operation result in the storage unit 409.

The decrypting unit 407 uses the session key that the session key calculating unit 403 calculates, decrypts the cipher text, such as contents, which is distributed from the encrypting device 30, and converts the cipher text into a plain text. The decrypting unit 407 can store the obtained plain text in the storage unit 409.

The storage unit 409 records the secret key, the public key, and the public information, which are received by the receiving unit 401. In addition, the storage unit 409 may record the cipher text and the header transmitted from the encrypting device 30, the session key calculated by the session key calculating unit 403, or the plain text on which the decrypting unit 407 has executed a decryption process. In addition to the various data, the receiving device 40 may appropriately store various parameters that need to be stored when any process is executed or information indicating the intermediate result of the process, or various databases in the storage unit 409. In the storage unit 409, the receiving unit 401, the session key calculating unit 403, the bilinear mapping operation unit 405, and the decrypting unit 407 may freely execute a read/write operation.

An example of a function of each of the key generating device 20, the encrypting device 30, and the receiving device 40 according to the embodiment has been described. Each of the constituent elements may be composed of a general-purpose member or circuit, or hardware that is specified to a function of each of the constituent elements. In addition, all of the functions of the individual constituent elements may be executed by the CPU. Accordingly, in accordance with a technical level when the embodiment is embodied, the configuration to be used may be appropriately changed.

<Operation of the Key Generating Device 20: a Setup' Process and a Join' Process>

Figure 20:
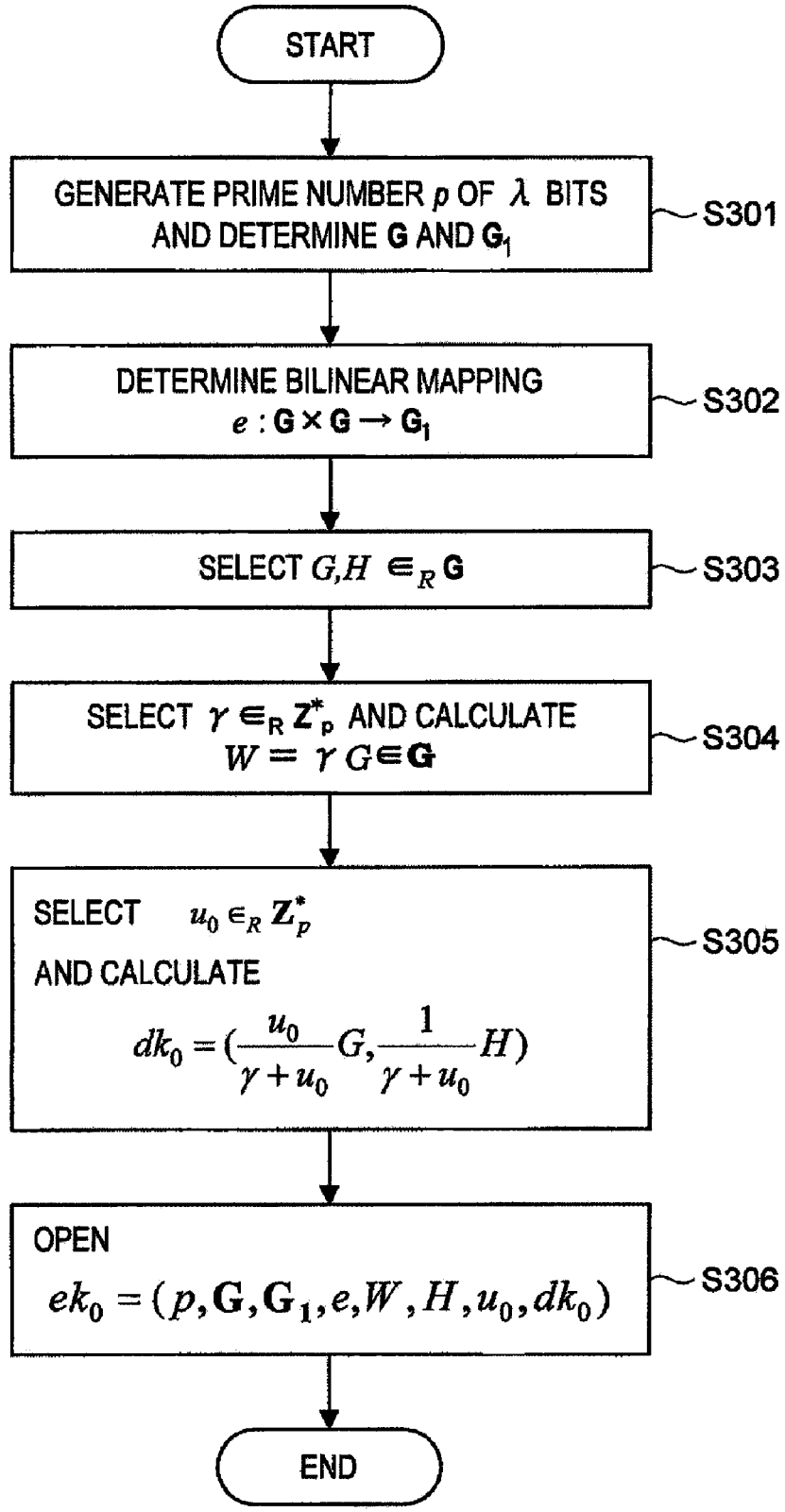
FIG. 20 is a flowchart illustrating a key generating process according to the embodiment.
Figure 21:
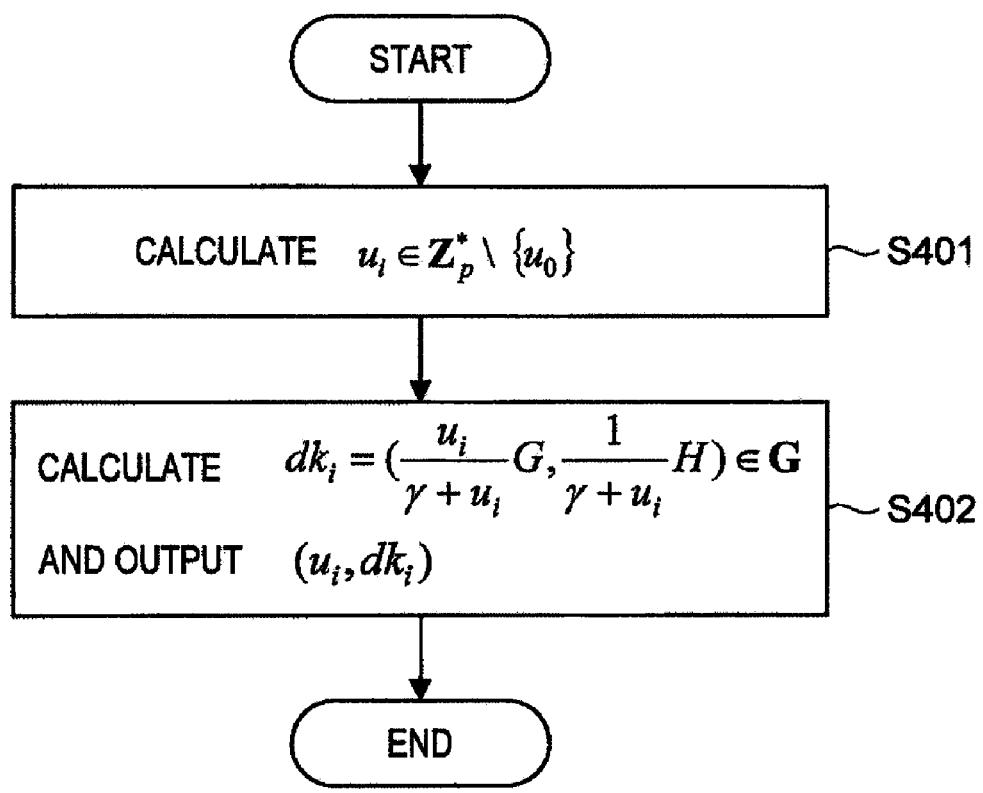
FIG. 21 is a flowchart illustrating a user registering process according to the embodiment.

The center operates the key generating device 20 that is possessed by the center, and generates the public key and public information and the personal secret key corresponding to each user in accordance with the following sequence. Hereinafter, the operation of the key generating device 20 according to the embodiment (that is, a setup' process and a join' process) will be described in detail with reference to FIGS. 20 and 21. FIG. 20 is a flowchart illustrating a key generating process according to this embodiment, and FIG. 21 is a flowchart illustrating a user registering process according to this embodiment.

(Setup' Process in a Key Generating Device 20)

The setup' process is a key generating process that is executed once when the center having the key generating device 20 according to the embodiment constructs a system. The center determines a security parameter λ, and the key generating device uses the input security parameter λ to execute the setup' process, which will be described below.

First, the parameter determining unit 251 of the key generating device 20 generates a prime number p of λ bits. Next, the bilinear group selecting unit 253 selects a bilinear mapping group G and a cyclic multiplicative group $G_1$ where p is used as an order (Step S301).

Next, the bilinear group selecting unit 253 of the key generating device 20 determines bilinear mapping e: $G \times G \rightarrow G_1$ (Step S302).

Next, the parameter determining unit 251 of the key generating device 20 selects G, H∈G (Step S303).

Then, the parameter determining unit 251 of the key generating device 20 selects $\gamma \in_R Z_P^*$ and calculates W=γG∈G (Step S304). γ and G that are obtained in the above method are confidentially maintained as a master key mk=(γ, G) by only the center.

Next, the parameter determining unit 251 of the key generating device 20 selects a value $u_0 \in_R Z_P^*$ that is not used as a unique value of a user and outputs the value to the pseudo secret key calculating unit 259. On the basis of the transmitted $u_0$, the pseudo secret key calculating unit 259 uses the following Equation 201 to calculate the pseudo secret key $dk_0$ (Step S305).

$$dk_0 = (A_0, B_0) \in G \qquad \text{[Equation 201]}$$
$$= \left( \frac{u_0}{\gamma + u_0} G, \frac{1}{\gamma + u_0} H \right)$$

Next, the key calculating unit 257 of the key generating device 20 uses the calculated data to configure an initial public key $ek_0$ as follows (Step S306).

$$ek_0 = \{p, G, G_1, e, W, H, u_0, dk_0\} \qquad \text{[Equation 202]}$$

If the generation of the public key is completed, the distributing unit 261 of the key generating device 20 opens the pseudo secret key $dk_0$ and the initial public key $ek_0$ that are obtained by executing the setup process as the initial public keys of the entire system.

(Join' Process in a Key Generating Device 20)

The join' process is a user registering process that the center executes whenever a system joining request is received from the user. This join' process may be executed at arbitrary timing after the center completes a system setting process.

The center inputs the public key $ek_{i-1}$ ($1 \leq i \leq n$), the master key mk, and i as an index of the i-th joined user to the key generating device 20 and executes the join' process, which will be described below, thereby executing generating a secret key of the user who has transmitted the system joining request and executing a system joining process.

First, the key calculating unit 257 of the key generating device 20 calculates $u_i \in Z_P^* \setminus \{u_0\}$ that is a unique value of the user i (Step S401). Then, the key calculating unit 257 executes the calculation shown in the following Equation 203, and calculates the secret key $dk_i$ of the user i who has transmitted the system joining request (Step S402).

$$dk_i = (A_i, B_i) \in G \qquad \text{[Equation 203]}$$
$$= \left( \frac{u_i}{\gamma + u_i} G, \frac{1}{\gamma + u_i} H \right)$$

In this case, $B_i$ in Equation 203 is a portion of the secret key $dk_i$. However, $B_i$ is not secret information but public information, and the user i does not need to confidentially maintain $B_i$.

The distributing unit 261 of the key generating device 30 confidentially transmits the secret key $dk_i$ of the user i obtained by executing the join' process to the user i through a secure communication path, adds public information ($u_i$ and $B_i$) corresponding to the user i to the current public key $ek_{i-1}$, updates the current public key as a public key $ek_i$, and opens the public key. At this time, the new public key $ek_i$ forms the configuration shown by the following Equation 204.

$$ek_i = (p, G, G_1, e, W, H, u_0, dk_0, (u_1, B_1), \ldots (u_i, B_i)) \qquad \text{[Equation 204]}$$

The setup' process and the join' process that are executed by the key generating device 20 according to the embodiment have been described. Next, an encryption" process that is executed by the encrypting device 30 according to the embodiment will be described.

<Operation of an Encrypting Device 30: an Encryption" Process>

Figure 22:
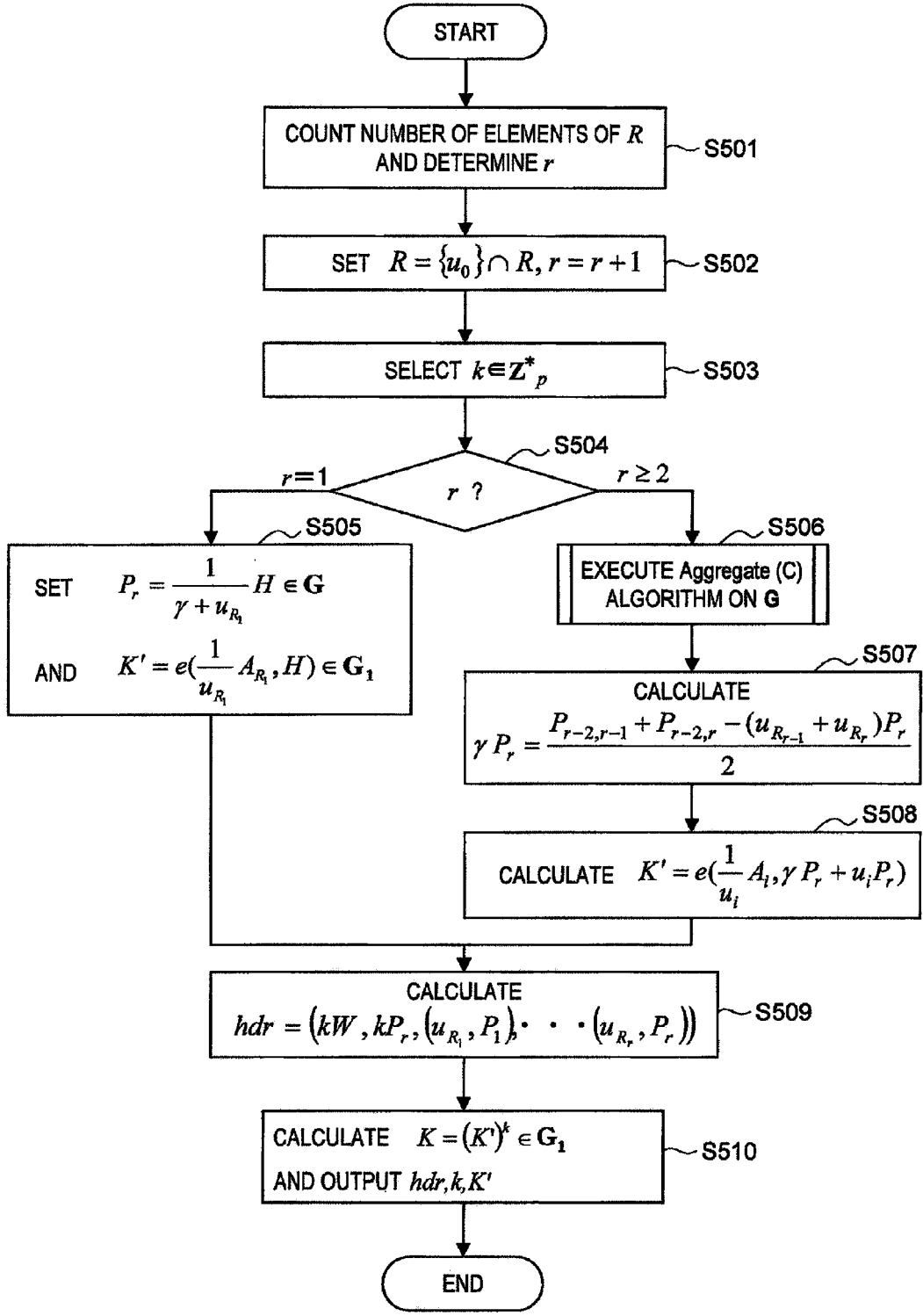
FIG. 22 is a flowchart illustrating an encryption process according to the embodiment.

A distributor who distributes a plain text, such as contents, operates the encrypting device 30 possessed by the distributor, and generates a cipher text and a header in accordance with the following sequence. Hereinafter, the operation of the encrypting device 30 according to the embodiment will be described in detail with reference to FIG. 22. FIG. 22 is a flowchart illustrating an encryption process that is executed by the encrypting device 30 according to this embodiment.

The encryption" process is a process that an arbitrary transmitter who desires to distribute contents executes using the encrypting device 30, whenever a distribution is made.

The transmitter inputs the public key $ek_i$ and a set of revoked users $R = \{u_{R1} \ldots u_{Rr}\}$ to the encrypting device 30 according to the embodiment and executes the encryption" process, which will be described below, thereby executing an encryption process on a plain text, such as contents, which the transmitter desires to distribute. The set R, which is input by the user, is converted into digital data that can be used by the encrypting device 30 by the revoked receiving device specifying unit 303 of the encrypting device 30, and used during the encryption" process.

In addition, the utilization key specifying unit 305 of the encrypting device 30 determines whether the encrypting device 30 holds the personal secret key $dk_j$, and informs the session key determining unit 305 of the determination result in advance. When a message indicating that the personal secret key $dk_j$ exists is received from the utilization key specifying unit 305, the session key determining unit 305 uses a unique value $u_j$ of the encrypting device 30 and a unique secret key $dk_j$ of the encrypting device 30 during a process, which will be described below. In addition, when a message indicating that the personal secret key $dk_j$ does not exist is received from the utilization key specifying unit 305, the session key determining unit 305 uses a unique value $u_0$ of a pseudo user and a pseudo secret key $dk_0$ thereof during a process, which will be described below.

In the description below, Equations are represented using $u_j$ and $dk_j$. However, when $u_0$ and $dk_0$ are used in the encryption process, $u_j$ becomes $u_0$ and $dk_j$ becomes $dk_0$ in Equations.

First, the revoked receiving device specifying unit 303 of the encrypting device 30 counts the number of elements of R and sets a count result as r (Step S501). Next, the revoked receiving device specifying unit 303 adds $u_0$ to the set R, and sets a value of r+1 as a new count result r (Step S502). The revoked receiving device specifying unit 303 outputs the count result r to the session key determining unit 307.

Next, the session key calculating unit 309 of the encrypting device 30 selects $k \in Z_P^*$ (Step S503).

Next, the session key calculating unit 309 of the encrypting device 30 executes a determination process on the number r of revoked users (Step S504). In the case of r=1 (that is, in the case where only one revoked user exists), the session key calculating unit 309 executes Step S505, which will be described below. In addition, in the case of $r \geq 2$ (that is, in the case where two or more revoked users exist), the session key calculating unit 309 executes Step S506, which will be described below.

In the case where one revoked user exists, the session key calculating unit 309 determines $P_r$ and K' on the basis of the following Equations 205 and 206 (Step S505), and then executes Step S509.

$$P_r = B_{R_1} = \frac{1}{\gamma + u_{R_1}} H \in G \qquad \text{[Equation 205]}$$

$$K' = e\left( \frac{1}{u_{R_1}} A_{R_1}, H \right) \in G_1 \qquad \text{[Equation 206]}$$

In addition, in the case where two or more revoked users exist, the session key calculating unit 309 requests the bilinear mapping operation unit 313 to execute an operation process (Aggregate (C) algorithm) of a bilinear group on G and calculate values shown in the following Equations 207 to 209. The bilinear mapping operation unit 313 executes the Aggregate (C) algorithm, and outputs values of Equations 207 to 209 to the session key calculating unit 309 (Step S506). In addition, since the Aggregate (C) algorithm that is an operation process algorithm of a bilinear group is the same as the Aggregate (C) algorithm according to the first embodiment of the present invention, the detailed description thereof will not be repeated.

$$P_l(l=1,\ldots,r) = \frac{1}{(\gamma+u_{R_1})\ldots(\gamma+u_{R_l})}H \in G \quad \text{[Equation 207]}$$

$$P_{r-2,r-1} = \frac{1}{(\gamma+u_{R_1})\ldots(\gamma+u_{R_{r-2}})(\gamma+u_{R_{r-1}})}H \in G \quad \text{[Equation 208]}$$

$$P_{r-2,r} = \frac{1}{(\gamma+u_{R_1})\ldots(\gamma+u_{R_{r-2}})(\gamma+u_{R_r})}H \in G \quad \text{[Equation 209]}$$

In this case, Equations 208 and 209 are values that are calculated as intermediate calculation values when Equation 207 ($P_r$) is derived. In the method according to the related art, the values of Equations 208 and 209 are not output as the calculation values. During the encryption process according to this embodiment, if the calculation values of Equations 208 and 209 are effectively used, a calculation amount that is needed at the time of encryption, that is, a calculation time or a cost of an apparatus required for calculation can be reduced.

For example, in the case of r=3, the bilinear mapping operation unit 313 executes the above-described Aggregate (C) algorithm, and outputs three values of $P_{1,2}$, $P_{1,3}$, and $P_{2,3}$ as the calculation result to the session key calculating unit 307.

In the case of $j=1$, $$P_{1,2} = \frac{1}{u_{R_2}-u_{R_1}}(P_{0,1}-P_{0,2})$$
$$= \frac{1}{u_{R_2}-u_{R_1}}\left(\frac{1}{\gamma+u_{R_1}}-\frac{1}{\gamma+u_{R_2}}\right)H$$
$$= \left(\frac{1}{(\gamma+u_{R_1})(\gamma+u_{R_2})}\right)H$$

$$P_{1,3} = \frac{1}{u_{R_3}-u_{R_1}}(P_{0,1}-P_{0,3})$$
$$= \frac{1}{u_{R_3}-u_{R_1}}\left(\frac{1}{\gamma+u_{R_1}}-\frac{1}{\gamma+u_{R_3}}\right)H$$
$$= \left(\frac{1}{(\gamma+u_{R_1})(\gamma+u_{R_3})}\right)H$$

In the case of $j=2$, $$P_{2,3} = \frac{1}{u_{R_3}-u_{R_2}}(P_{1,2}-P_{1,3})$$
$$= \frac{1}{u_{R_3}-u_{R_2}}\left(\frac{1}{(\gamma+u_{R_1})(\gamma+u_{R_2})}-\frac{1}{(\gamma+u_{R_1})(\gamma+u_{R_3})}\right)H$$
$$= \left(\frac{1}{(\gamma+u_{R_1})(\gamma+u_{R_2})(\gamma+u_{R_3})}\right)H$$

Next, the session key calculating unit 309 uses the operation result output from the bilinear mapping operation unit 313 to calculate a value of the following Equation 210 (Step S507).

$$\gamma P_r = \frac{1}{2}(P_{r-2,r-1}+P_{r-2,r}-(u_{R_{r-1}}+u_{R_r})P_r) \quad \text{[Equation 210]}$$

If Equation 210 is developed, it becomes the following Equation 211. If the session key calculating unit 309 according to the embodiment calculates $_\gamma P_r$, the Aggregate (C) algo-rithm on $G_1$ does not need to be executed, and the number of times of executing the Aggregate (C) algorithm can be reduced to one.

$$\gamma P_r = \frac{1}{2}(P_{r-2,r-1}+P_{r-2,r}-(u_{R_{r-1}}+u_{R_r})P_r) \quad \text{[Equation 211]}$$
$$= \frac{1}{2}\left(\frac{1}{(\gamma+u_{R_1})\ldots(\gamma+u_{R_{r-2}})}\left(\frac{1}{\gamma+u_{R_{r-1}}}+\frac{1}{\gamma+u_{R_r}}\right)H-(u_{R_{r-1}}+u_{R_r})P_r\right)$$
$$= \frac{1}{2}\left(\frac{1}{(\gamma+u_{R_1})\ldots(\gamma+u_{R_{r-2}})}\cdot\frac{\gamma+u_{R_r}+\gamma+u_{R_{r-1}}}{(\gamma+u_{R_{r-1}})(\gamma+u_{R_r})}H-(u_{R_{r-1}}+u_{R_r})P_r\right)$$
$$= \frac{1}{2}\left(\frac{2\gamma+u_{R_r}+u_{R_{r-1}}-(u_{R_{r-1}}+u_{R_r})}{(\gamma+u_{R_1})\ldots(\gamma+u_{R_r})}\right)H$$
$$= \frac{\gamma}{(\gamma+u_{R_1})\ldots(\gamma+u_{R_r})}H$$

Next, the session key calculating unit 309 uses the operation result of the bilinear mapping operation unit 313, the value of Equation 211, the secret key $dk_j$ or $dk_0$ to calculate a value shown in the following Equation 212 (Step S508).

$$K' = e\left(\frac{1}{u_j}A_j, \gamma P_r+u_jP_r\right) \in G_1 \quad \text{[Equation 212]}$$
$$= e\left(\frac{1}{\gamma+u_j}G, \frac{\gamma+u_j}{(\gamma+u_{R_1})\ldots(\gamma+u_{R_r})}H\right)$$
$$= e(G,H)^{\frac{1}{(\gamma+u_{R_1})\ldots(\gamma+u_{R_r})}}$$

With respect to each of the cases, if calculations of $P_r$ and K' are completed, the header calculating unit 311 calculates a header hdr on the basis of the following Equation 213 (Step S509).

$$hdr = (C_1, C_2, (u_{R_1}, P_1), \ldots (u_{R_r}, P_r)) \quad \text{[Equation 213]}$$
$$= (kW, kP_r, (u_{R_1}, P_1), \ldots (u_{R_r}, P_r))$$

Next, the session key calculating unit 307 calculates the session key K on the basis of the following Equation 214, and outputs the session key K together with the header hdr, K', and k (Step S510).

$$K=(K')^k \in G_1 \quad \text{[Equation 214]}$$

The encrypting unit 315 of the encrypting device 30 generates a cipher text $C=E_K(M)$ using a session key K of a plain text M, and the cipher text transmitting unit 317 broadcasts and distributes (hdr, C). If this process is executed, a transmitter can transmit encrypted contents to a desired user.

In addition to the above process, the encryption of the plain text M or the encryption and broadcasting and distributing may be executed by the encryption" process. The transmitter may execute Steps S501 and S502 and input the executed result to the encrypting device 30 that executes the encryption" process.

In addition, during the encryption" process, $u_{R_1}$ needs to be $u_0$.

<Operation of a Receiving Device 40: a Decryption Process>

Since the decryption process that is executed by the receiving device 40 according to the embodiment is the same as the decryption process according to the first embodiment of the present invention, the detailed description thereof will not be repeated.

<With Respect to a Difference with a Method According to the Related Art>

In the method according to the related art, in order to derive $P_1, \ldots,$ and $P_r$, in the case where the condition $r \geq 2$ is satisfied, the Aggregate (A) algorithm with respect to an operation on G is executed by Step S36 of the Encryption algorithm. Then, in order to derive K', the Aggregate (A) algorithm with respect to an operation on $G_1$ is executed by Step S37.

Meanwhile, in the encrypting method according to this embodiment, similar to the method according to the related art, the Aggregate (C) algorithm with respect to an operation on G is executed by Step S506 of the Encryption'' algorithm. However, when K' is derived, an operation on G in Step S507 and an operation on $G_1$ in Step S508 are utilized instead of the Aggregate (C) algorithm. In this case, in the Aggregate (A) algorithm and the Aggregate (C) algorithm, only the output values in Steps S50 and S210 are different from each other, and $P_{r-2, r-1}$ and $P_{r-2, r}$ that are additionally output in the Aggregate (C) algorithm are values that are used to derive $P_r$. Even though the values are additionally output, the calculation amount is the same as that of the Aggregate (A) algorithm.

That is, in regards to the calculation amount that is needed when a user j possessing a secret key $dk_j$ executes an encryption process, in the method according to the related art, the number of times of executing the Aggregate (A) algorithm needs to be two. Meanwhile, in the encrypting method according to this embodiment, the number of times of executing the Aggregate (C) algorithm is reduced to one, instead of a few times of operations on G and one time of bilinear mapping operation added. In addition, in regards to the calculation amount that is needed to derive K', in the method according to the related art, as r increases, the calculation amount increases in proportion to $r^2$. However, in the encrypting method according to this embodiment, the calculation amount becomes the constant calculation amount without depending on r.

In addition, the setup process and the join process are changed to the setup' process and the join' process, respectively, and a secret key of a pseudo user (pseudo secret key) $dk_0$ is generated and opened. During the encryption'' process, $u_0$ that is a unique value of the pseudo user is typically added to R, and the encryption'' process can be executed by a user that does not hold a secret key. As a result, even in the case of an arbitrary user, that is, a user who does not hold a secret key, the calculation amount that is needed to execute an encryption process can be reduced.

In this case, in the encrypting method according to this embodiment, the encryption' process according to the first embodiment of the present invention is changed such that the arbitrary entity can utilize the encryption' process. Accordingly, in regards to the calculation amount during the encryption process, the arbitrary entity can obtain a calculation amount reduction effect in the encryption process that is described in the first embodiment of the present invention. In addition, since the detailed description of the obtained calculation amount reduction effect is given in the first embodiment, the detailed description thereof will not be repeated herein.

In addition, in the method according to the related art, in addition to the execution of the Aggregate (A) algorithm on G at the time of the encryption process, the Aggregate (A) algorithm on $G_1$ needs to be executed. At this time, in the Aggregate (A) algorithm on $G_1$, $V_i$ needs to be used, and thus, when the join process is executed, the center needs to open $V_i$. Accordingly, when the join process is executed with respect to n users, the public key is as shown in FIG. 23, and the number of elements excluding the system parameters becomes 3n+3.

Meanwhile, in the method according to this embodiment, since the secret key of the pseudo user (pseudo secret key) $dk_0$ is opened by executing the setup' process, an arbitrary entity can execute the encryption'' process, and the Aggregate (A) algorithm on $G_1$ does not need to be executed. For this reason, since the center does not need to open $V_i$, during the join' process, calculation and output of $V_i$ which is needed during the join process become unnecessary. As a result, when the join' process is executed with respect to n users, the public key is as shown in FIG. 23, and the number of elements excluding the system parameters becomes 2n+5.

As described above, when the condition $3n+3 \geq 2n+5$ is satisfied, that is, the condition $n \geq 2$ is satisfied, it can be seen that the size of the public key can be reduced as compared with the related art.

In regards to the number of elements in the public key, when the condition $n \geq 2$ is satisfied, the method according to the embodiment is effective. However, since the individual elements in the public key are an original set in a different group, the bit sizes that are needed to secure safety are different from each other. Accordingly, in the description below, on the assumption of the specific bit sizes, the sizes of the public keys are compared with each other. In the description below, the case where 128-bit equivalent safety is satisfied is considered. At this time, the bit size of the prime number p becomes 256 bits and the original bit size of $G_1$ becomes 3072 bits.

In each of the elements of the public key in the method according to the related art, W, H, and Bi (i=1, ..., and n) are points on an elliptic curve, that is, the origin of G, and $V_i$ (i=1, ..., and n) becomes the origin of $G_1$. For simplicity of description, if the bit size of $u_i$ (i=1, ..., and n) that is a unique value of each user is set to 32 bits, the bit size of the public key in the method according to the related art becomes a value shown in the following Equation 215.

$$(32+256\times2+3072)\times n+2\times(256\times2)+3072=(3616n+4096)\text{bit} \quad [\text{Equation 215}]$$

Meanwhile, in the method according to this embodiment, the bit size of the public key becomes a value shown in the following Equation 216.

$$(32+256\times2)\times(n+1)+3\times(256\times2)=(544n+2080)\text{bit} \quad [\text{Equation 216}]$$

Figure 24:
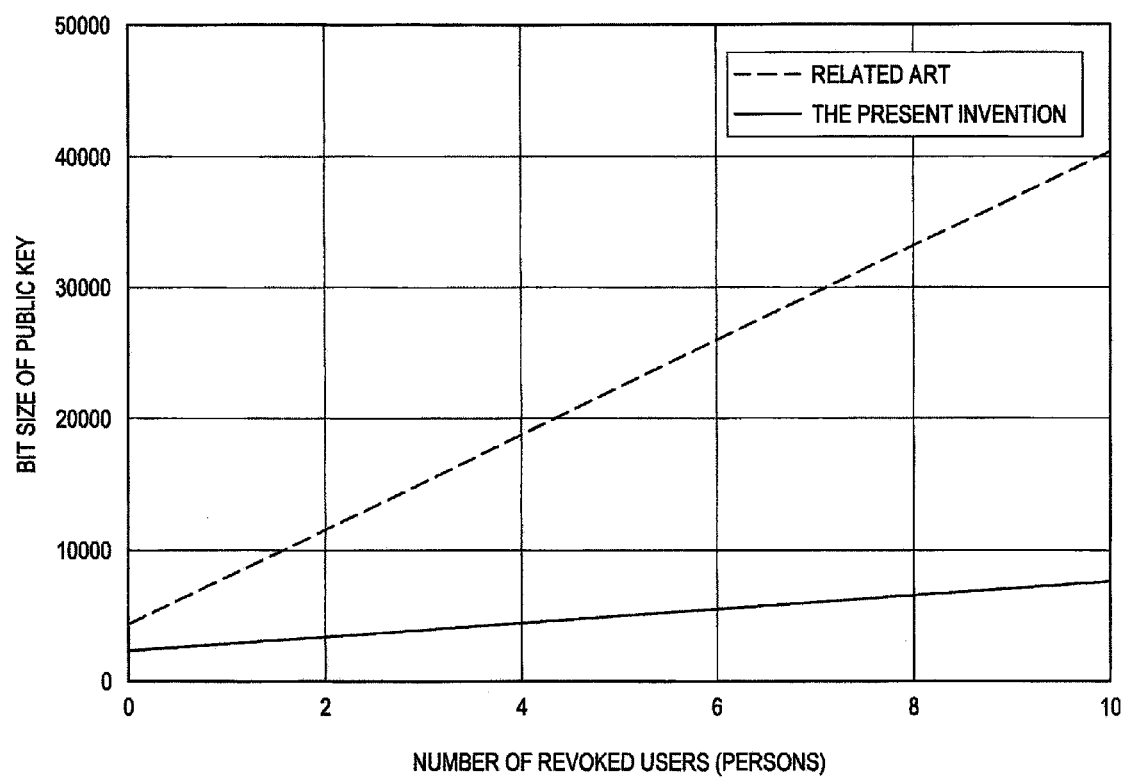
FIG. 24 is a graph illustrating a result that is obtained by comparing public key sizes in an encryption process.

The compared result of values obtained when n increases is shown in FIG. 24. As can be seen from FIG. 24, when the bit sizes are compared with each other, the bit size can be reduced with respect to the arbitrary n in the method according to this embodiment.

(Modification of an Encrypting Method According to this Embodiment)

During the encryption process (encryption'' process) according to this embodiment, when the number of revoked users is substantially zero, that is, only the pseudo user is revoked, K' is calculated using Equation 212 in Step S505. However, the calculation amount of K' in Step S505 can be reduced, if using the following method.

That is, during the setup' process in the key generating device 20, the following Equation 217 is calculated in advance and a value related to a public key is added. In this way, the calculation amount of K' in Step S505 can be reduced.

$$V_0 = e(G, H)^{\frac{1}{\gamma + u_0}} \in G_1 \qquad \text{[Equation 217]}$$

In addition, during the encryption" process according to this embodiment, in the case where the transmitter does not hold the personal secret key, the transmitter uses the pseudo secret key $dk_0$, and in the case where the transmitter corresponds to a user, that is, the transmitter holds the personal secret key, the transmitter uses the secret key that is possessed by the transmitter. However, in order to safely hold the secret key, the utilization frequency of the secret key is desirably minimized. Accordingly, regardless of whether the transmitter holds the personal secret key, the pseudo secret key may be used at the time of encryption.

In this case, Equation 212 of Step S508 during the encryption" process can be converted into the following Equation 218.

$$K' = \qquad \text{[Equation 218]}$$
$$e\left(\frac{1}{u_0}A_0, \gamma P_r + u_0 P_r\right) \in G_1 = e(G, H)^{\frac{1}{(\gamma + u_{R_1}) \cdots (\gamma + u_{R_r})}}$$

If the above method is used, it may be possible to reduce the calculation amount of K' in Step S508.

In addition, during the setup' process according to this embodiment, in Step S306, the following Equation 202 is opened as an initial public key $ek_0$.

$$ek_0 = (p, G, G_1, e, W, H, u_0, dk_0 = (A_0, B_0)) \qquad \text{[Equation 202]}$$

Meanwhile, the following Equation 219 is calculated, and the initial public key $ek_0$ is set to a value shown in the following Equation 220. In the case where the initial public key is used, $H_0$ that is calculated by using Equation 219 is used, instead of H. If the initial public key is used, it may be possible to omit Step S502 in the encryption" process.

$$H_0 = \frac{1}{\gamma + u_0} H \qquad \text{[Equation 219]}$$

$$ek_0 = (p, G, G_1, e, W, H_0, u_0, A_0) \qquad \text{[Equation 220]}$$

As described above, in the method according to this embodiment, multiplication, a power, and an inverse element operation on a cyclic group where a bit length is long, which are needed when executing the encryption process in the method according to the related art, are removed, and a one-time bilinear mapping operation (pairing) and an operation of a point on an elliptic curve are added. As a result, when a user, that is, an entity (an operation subject, such as a person, a device, and a server) holding a secret key executes an encryption process, as r increases, a calculation amount that is needed when the encryption process is executed, that is, a calculation time or a cost of an apparatus required for calculation can be reduced.

In addition, if a pseudo secret key is opened as public information, it is not necessary to open an element on a cyclic group where a bit length is long, which are needed when executing the encryption process in the method according to the related art. Accordingly, the size of the public key can be reduced.

(With Respect to a Third Embodiment and a Fourth Embodiment)

Meanwhile, in the method according to the related art, since the arbitrary entity can generate a header, the receiver can hardly confirm a header generator. In order to resolve the above-described issue, the above-described issue can be resolved by using a signing method in addition to the method according to the related art. However, since a method where broadcast encryption and signing are simultaneously realized does not exist in the past, two kinds of secret keys that include a key for Broadcast Encryption and a key for signing generation need to be confidentially maintained, and a memory capacity is increased due to confidential maintenance of the secret keys.

Accordingly, an object of the third embodiment and the fourth embodiment of the present invention that will be described below is to provide a key generating device, an encrypting device, a receiving device, a key generating method, an encrypting method, a key processing method, and a program that can detect whether the received contents are tampered at the side of the receiver, confirm the transmitter, and suppress the number of keys maintained by the side of the receiver from increasing.

According to the third embodiment and the fourth embodiment of the present invention, transmitter authentication information is generated using the key for Broadcast Encryption and the generated transmitter authentication information is distributed together with the header and the cipher text. As a result, it may be possible to detect whether the received contents are tampered at the side of the receiver, confirm the transmitter, and suppress the number of keys maintained by the side of the receiver from increasing.

(Third Embodiment)
<With Respect to a Cipher Key Distribution System>

Hereinafter, a cipher key distribution system according to the third embodiment of the present invention will be described in detail.

Figure 25:
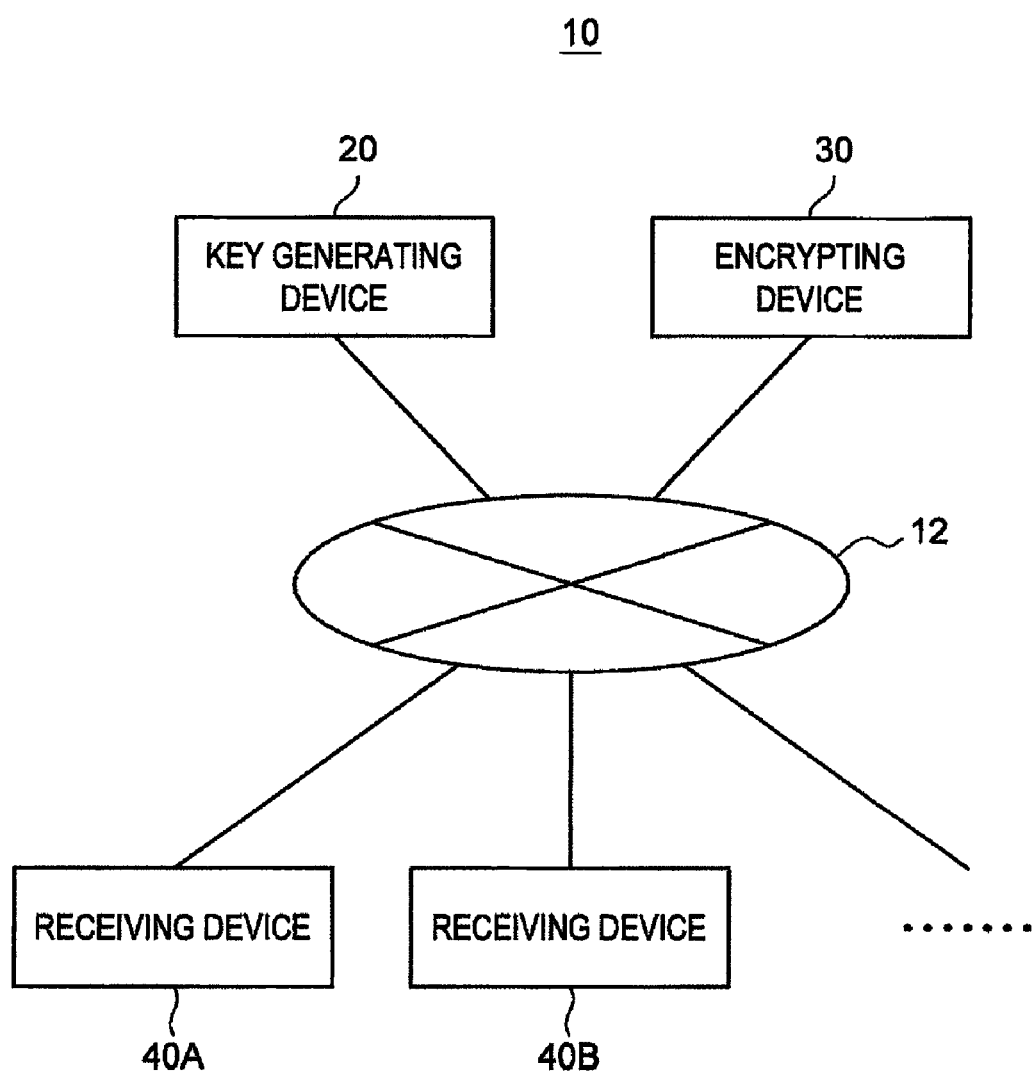
FIG. 25 is a diagram illustrating a cipher key distribution system according to a third embodiment of the present invention.

FIG. 25 is a diagram illustrating a cipher key distribution system 10 according to this embodiment. The cipher key distribution system 10 includes a communication network 12, a key generating device 20, an encrypting device 30, a receiving device 40A, and a receiving device 40B, for example.

The communication network 12 is a communication circuit switching network that connects the key generating device 20, the encrypting device 30, and the receiving device 40 to enable two-way communication or one-way communication. The communication network is composed of the Internet, a telephone circuit switching network, a satellite communication network, a public switched telephone network, such as a multicasting path, or a leased line network, such as a wide area network (WAN), a local area network (LAN), an Internet protocol-virtual private network (IP-VPN), and a wireless LAN, and may be a wired network or a wireless network.

The key generating device 20 generates a public key and unique secret keys of a plurality of receiving devices, opens the public key, and distributes the secret keys to the individual receiving devices through a secure communication path. In addition, the key generating device 20 is possessed by a center that generates and manages the public key and the secret keys.

The encrypting device 30 uses the public key that is generated and opened by the key generating device 20 to encrypt arbitrary contents, and distributes the encrypted contents to the individual receiving devices through the communication network 12. The encrypting device 30 can be possessed by the arbitrary third party and a possessor of the key generating device 20 or a possessor of the receiving device 40 can possess the encrypting device 30.

The receiving device 40 can use the encrypted contents distributed from the encrypting device 30 by decrypting the contents using the unique secret key. The receiving device 40A and the receiving device 40B can be connected to each other through the communication network 12 or the wired network. The receiving device 40 is possessed by each contractor.

The receiving device 40 is not limited to a computer device (a notebook computer or a desktop computer), such as a personal computer (PC), and may be any apparatus that has a communication function through a network. For example, the receiving device 40 may be composed of a personal digital assistant (PDA), information home appliances, such as a home game machine, a DVD/HDD recorder, a Blu-ray recorder, and a television receiver, or a tuner or decoder for television broadcasting. In addition, the receiving device 40 may be a portable device that a contractor can carry, for example, a portable game machine, a mobile phone, a portable video/audio player, a PDA, or a PHS.

<With Respect to the Hardware Configuration of a Key Generating Device 20>

Next, the hardware configuration of the key generating device 20 according to the embodiment will be described in brief with reference to FIG. 26.

Figure 26:
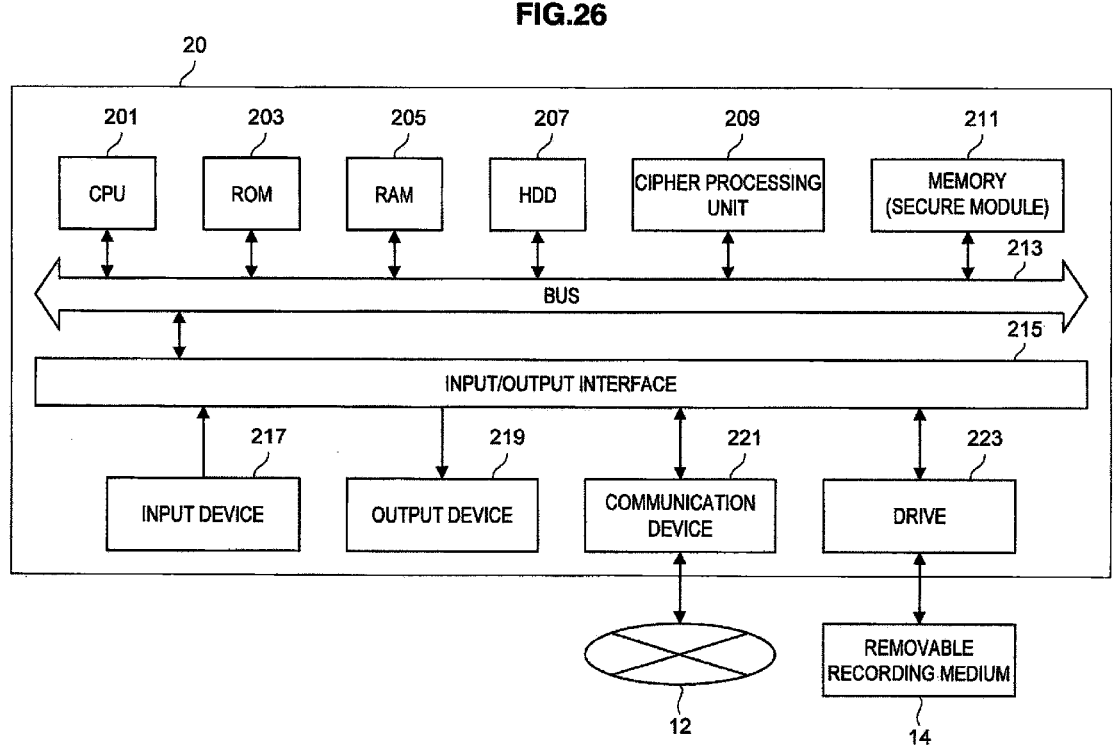
FIG. 26 is a block diagram illustrating the hardware configuration of a key generating device according to the embodiment.

FIG. 26 is a block diagram illustrating the hardware configuration of the key generating device 20. The key generating device 20 mainly includes a central processing unit (CPU) 201, a read only memory (ROM) 203, a random access memory (RAM) 205, a hard disk drive (HDD) 207, a cipher processing unit 209, and a memory (secure module) 211.

The CPU 201 functions as an operation processing device and a control device, and controls the entire operation of the key generating device 20 in accordance with various programs that are recorded in the ROM 203, the RAM 205, the HDD 207, or a removable recording medium 14. The ROM 203 stores operation parameters or programs that are used by the CPU 201. The RAM 205 primarily stores programs that are used when the CPU 201 is executed or parameters that appropriately change when the programs are executed.

The HDD 207 is a data storage device that is configured as an example of a storage unit of the key generating device 20 according to this embodiment. The HDD 207 drives a hard disk and stores various types of data or programs that are executed by the CPU 201. The cipher processing unit 209 executes various cipher processes that the key generating device 20 according to the embodiment executes under the control of the CPU 201. The memory (secure module) 211 safely stores information, such as a personal secret key or a random number as secret information of a center, which needs to be hidden, but information that is stored in the memory 211 can hardly be referred to from the outside. In addition, the memory (secure module) 211 may be composed of a storage device that has anti-tampering performance, for example. In the above description, the secure module is a memory. However, the secure module according to the embodiment of the present invention is not limited to the memory, but may be a magnetic disk, an optical disk, a magneto-optical disk, or a storage medium, such as a semiconductor memory, for example.

The CPU 201, the ROM 203, the RAM 205, the HDD 207, the cipher processing unit 209, and the memory 211 are connected to each other through a bus 213, which is composed of a CPU bus.

The bus 213 is connected to an input/output interface 215, such as a peripheral component interconnect/interface (PCI) bus, through a bridge.

The input device 217 includes an operation unit, such as a mouse, a keyboard, a touch panel, a button, a switch, and a lever, which is operated by a user, and an input control circuit that generates an input signal on the basis of the operation from the user and outputs the input signal to the CPU 201. A user of the key generating device 20 operates the input unit 217 to input various types of data to the key generating device 20 or instruct the key generating device 20 to perform a process operation.

The output device 219 includes a display device, such as a CRT display device, a liquid crystal display device, a plasma display device, an EL display device, and a lamp, and a voice output device, such as a speaker and a headphone. The output unit 219 can output reproduced contents, for example. Specifically, the display device displays various types of information, such as reproduced video data, in a form of a text or image. Meanwhile, the voice output device converts reproduced music data into a voice and outputs the voice.

The communication device 221 is a communication interface that is composed of a communication device to be connected to the communication network 12. The communication device 221 transmits/receives various types of data, such as information related to an encryption key or content information between the encrypting device 30 and the receiving devices 40A and 40B through the communication network 12.

The drive 223 is a reader/writer for a recording medium, and may be incorporated in the key generating device 20 or attached to the key generating device 20. The drive 223 reads out information that is recorded in a magnetic disk, an optical disk, a magneto-optical disc, or a removable recording medium 14, such as a semiconductor memory, which is mounted thereto, and outputs the information to the RAM 205. In addition, the drive 223 can write information into the magnetic disk, the optical disk, the magneto-optical disc, or the removable recording medium 14, such as the semiconductor memory, which is mounted thereto. The removable recording medium 14 is composed of DVD media, HD-DVD media, Blu-ray media, CompactFlash (CF) (registered trademark), a memory stick, or an SD memory card (secure digital memory card). In addition, the removable recording medium 927 may be an integrated circuit card (IC card) where a non-contact-type IC chip is mounted or an electronic apparatus.

The hardware configuration of the encrypting device 30 and the receiving device 40 is substantially the same as the hardware configuration of the key generating device 20, and thus the detailed description thereof will not be repeated.

The hardware configuration that can realize the functions of the key generating device 20, the encrypting device 30, and the receiving device 40 according to the embodiment has been exemplified. Each of the constituent elements may be composed of a general-purpose member and hardware that is specialized to a function of each of the constituent elements. Accordingly, the hardware configuration to be used may be appropriately changed in accordance with a technology level when the embodiment is embodied. In addition, the above hardware configuration is only exemplary and it is needless to say that the present invention is not limited thereto. For example, each of the HDD 207 and the memory (secure module) 211 may be composed of the same storage device. According to the utilization form, the bus 213 or the input/output interface 215 may be removed. Hereinafter, a cipher key generating method that is realized by the above-described hardware configuration will be described in detail.

<Issue in a Method According to the Related Art>

In this case, as described above, in the method according to the related art, the public key Broadcast Encrypting method is realized, in which an encryption process is executed by the arbitrary entity and a decryption process is executed by only a user who belongs to a user set designated by the transmitter. However, there is an issue in that a unit that verifies validity of the entity that has generated the header hdr does not exist.

For example, the following case using the related art is considered. That is, a content distribution system using Internet, updating firmware of a device in the system may be encrypted and distributed using the same method as the contents. In this case, because of safety in the method according to the related art, the entity other than the user that is designated by the transmitter can hardly know the contents of the firmware. However, when the method according to the related art is used, since the transmitter authentication function is not added, the device can hardly determine whether the transmitted header hdr and the encrypted firmware are generated by the fair entity (manufacturer of the device). In the case where the encrypted firmware is decrypted and executed using the session key that is obtained by decrypting the header hdr without confirming the transmitter, since the header hdr and the session key K can be generated by the arbitrary entity, even when the firmware is unfair firmware that is generated by the a malicious entity, the firmware may be executed (first issue).

In order to avoid the above-described issue, generally, different from the secret key in the method according to the related art, the center supplies a pair of signing and verifying keys to each user, and when the header is transmitted, the transmitter generates the session key, the cipher text, and the signing, and distributes the session key, the cipher text, the signing, and the header. The receiver uses the verifying key of the transmitter to verify the session key, the cipher text, and validity of the signing. If the verification is successfully made, the corresponding header and cipher text are decrypted as the header and the cipher text transmitted from the valid user. By this configuration, the above-described issue can be resolved. However, in this case, in addition to the secret key in the method according to the related art, each user needs to hold a pair of signing and verifying keys. As a result, in the device that is possessed by the user, there is an issue in that the amount of information to be held, that is, a memory capacity increases (second issue).

Then, the inventors have studied various researches to resolve the above-described issues and have developed a cipher key distribution system according to an embodiment of the present invention, which will be described below.

[Description of this Embodiment]

In view of the above-described fundamental technology, a key generating device 20, an encrypting device 30, and a receiving device 40 according to the third embodiment of the present invention will be described in detail.

In the cipher key distribution system 10 according to this embodiment, the Setup algorithm in a method according to the related art is changed to a Setup" algorithm, a transmitter authentication information generating process is added as a header signing process, and a received content verifying process is added as a header verifying process.

Accordingly, in regards to the join process, the encryption process, the decryption process, the Aggregate (A) algorithm that is used during the encryption process, and the Aggregate (B) algorithm that is used during the decryption process, the same configuration as the method according to the related art is applied.

<With Respect to a Key Generating Device 20 According to this Embodiment>

Figure 27:
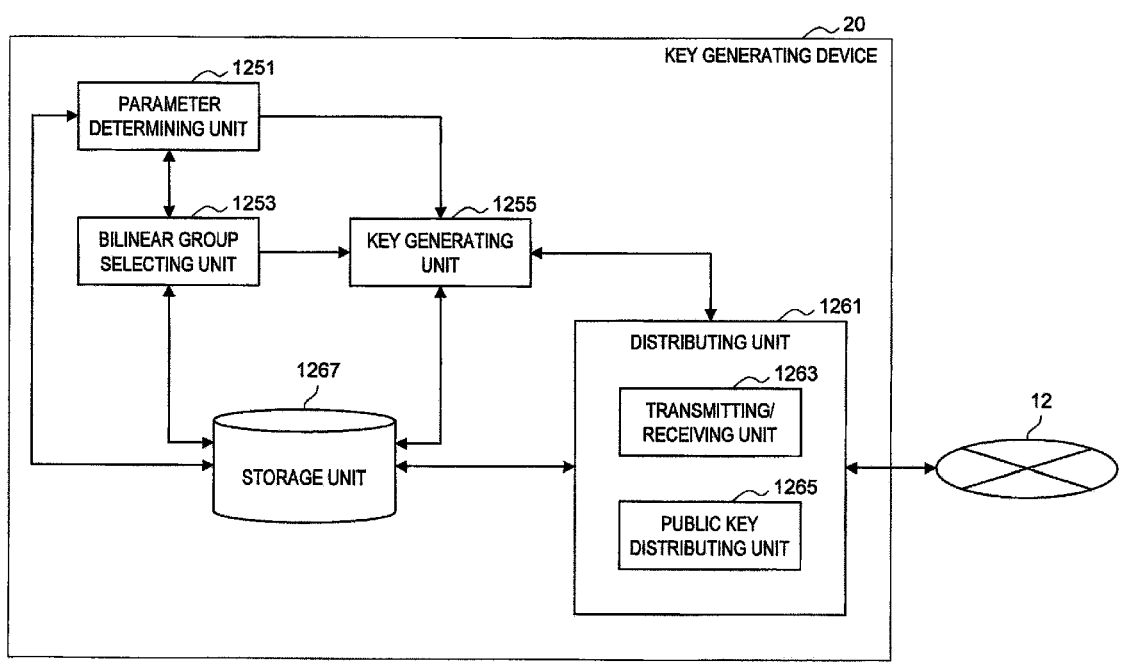
FIG. 27 is a block diagram illustrating the configuration of a key generating device according to the embodiment.

First, the key generating device 20 according to the embodiment will be described in detail with reference to FIG. 27. FIG. 27 is a block diagram illustrating the configuration of the key generating device 20 according to this embodiment.

For example, the key generating device 20 according to the embodiment mainly includes a parameter determining unit 1251, a bilinear group selecting unit 1253, a key generating unit 1255, a distributing unit 1261, and a storage unit 1267, as shown in FIG. 27.

The parameter determining unit 1251 determines various types of parameters that the key generating device 20 according to the embodiment uses to generate a public key or a secret key, on the basis of the predetermined method. Examples of the parameters may include the prime number p or G, H, V, and γ that are used during the setup process. For example, when determining the prime number p or G, H, and γ, the parameter determining unit 1251 uses random numbers to randomly determine values. In addition, the parameter determining unit 1251 may use various bilinear groups transmitted from the bilinear group selecting unit 1253, which will be described below, or bilinear mapping e, thereby determining the parameters. The parameter determining unit 1251 transmits the various determined parameters to the bilinear group selecting unit 1253 or the key generating unit 1255, which will be described below. In addition, the parameter determining unit 1251 may record the various determined parameters in the storage unit 1267, which will be described below.

The bilinear group selecting unit 1253 uses the prime number p that is a parameter transmitted from the parameter determining unit 1251, and selects a bilinear mapping G and a cyclic multiplicative group $G_1$ where p is used as an order. In addition, the bilinear group selecting unit 1253 determines bilinear mapping e: $G \times G \rightarrow G_1$. The bilinear group selecting unit 1253 transmits the selected bilinear groups G and $G_1$ and the determined bilinear mapping e to the parameter determining unit 1251 and the key generating unit 1255, which will be described below. In addition, the bilinear group selecting unit 1253 may record the selected bilinear groups G and $G_1$ and the determined bilinear mapping e in the storage unit 1267, which will be described below.

The key generating unit 1255 uses various types of data transmitted from the parameter determining unit 1251 and the bilinear group selecting unit 1253, and generates keys such as a public key, a secret key distributed to each user, and a master key, and public information corresponding to each user. The generated keys or public information is recorded in the storage unit that is composed of an HDD or a memory including a secure module. In addition, information that needs to be opened and distributed keys are transmitted to the distributing unit 1261, which will be described below.

The distributing unit 1261 distributes the public key and the secret key that are generated by the key generating device 20 and the information that needs to be opened, through the communication network 12. This distributing unit 1261 further includes a transmitting/receiving unit 1263 and a public key distributing unit 1265.

The transmitting/receiving unit 1263 transmits the secret key generated by the key generating unit 1255 to an individual user through a secure communication path, and receives a system joining request transmitted from the receiving device 40. The received system joining request is transmitted to the key generating unit 1255, and a new secret key or public key is generated by the key generating unit 1255.

The public key distributing unit 1265 distributes the public key or public information generated by the key generating unit 1255 to the encrypting device 30 or the receiving device 40 through the communication network 12. The encrypting device 30 or the receiving device 40 uses the public key or public information to execute an encryption process of a plain text or a decryption process of a cipher text.

In the storage unit 1267, various parameters that are determined by the parameter determining unit 1251 or a bilinear group or bilinear mapping that is selected by the bilinear group selecting unit 1253 is recorded. In addition, in the storage unit 1267, various keys or public information that is generated by the key generating unit 1255 is confidentially maintained. In addition to the various types of data, the key generating device 20 may appropriately store various parameters that need to be stored when any process is executed or information indicating the intermediate result of the process, or various databases in the storage unit 1267. In the storage unit 1267, the parameter determining unit 1251, the bilinear group selecting unit 1253, the key generating unit 1255, and the distributing unit 1261 may freely perform a read/write operation.

<With Respect to an Encrypting Device 30 According to this Embodiment>

Figure 28:
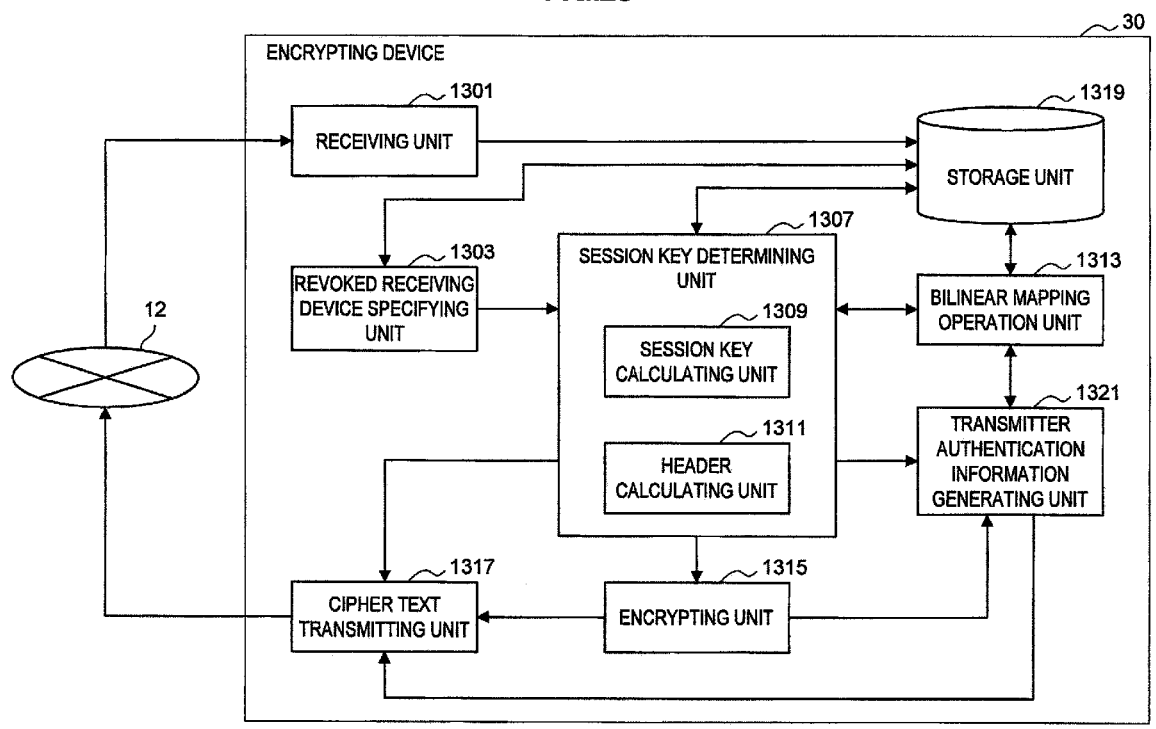
FIG. 28 is a block diagram illustrating the configuration of an encrypting device according to the embodiment.

Next, the encrypting device 30 according to the embodiment will be described in detail with reference to FIG. 28. FIG. 28 is a block diagram illustrating the configuration of the encrypting device 30 according to this embodiment.

For example, as shown in FIG. 28, the encrypting device 30 according to the embodiment mainly includes a receiving unit 1301, a revoked receiving device specifying unit 1303, a session key determining unit 1307, a bilinear mapping operation unit 1313, an encrypting unit 1315, a cipher text transmitting unit 1317, a storage unit 1319, and a transmitter authentication information generating unit 1321.

The receiving unit 1301 receives the public key and public information that are generated and opened by the key generating device 20. The received public key and public information are recorded in the storage unit 1319, which will be described below, and read and used, if necessary.

The revoked receiving device specifying unit 1303 specifies receiving devices that revoke a distribution of a cipher text among a plurality of receiving devices 40 connected to the encrypting device 30 through the communication network 12, and determines a set R of revoked receiving devices. When the set R is determined, the revoked receiving device specifying unit 1303 can refer to various types of data that is stored in the storage unit 1319, which will be described below. The determined set R is transmitted to the session key determining unit 1307, which will be described below, and used when calculating a session key used to encrypt a plain text, such as distributed contents. In addition, the revoked receiving device specifying unit 1303 may record the determined set R in the storage unit 1319, which will be described below.

The session key determining unit 1307 determines a session key that is used to encrypt a plain text, such as distributed contents, on the basis of the public key and the public information that are received by the receiving unit 1301 and recorded in the storage unit 1319 and the set R that is determined by the revoked receiving device specifying unit 1303. The session key determining unit 1307 further includes a session key calculating unit 1309 and a header calculating unit 1311.

The session key calculating unit 1309 calculates a session key that is used to encrypt a plain text, such as distributed contents, on the basis of the public key and public information acquired from the storage unit 1319 and the set R of revoked receiving devices transmitted from the revoked receiving device specifying unit 1303. The session key that is calculated by the session key calculating unit 1309 is transmitted to the encrypting unit 1315, which will be described below, and used when the plain text is encrypted. In addition, the session key that is calculated by the session key calculating unit 1309 and various parameters that are used when the session key is calculated are transmitted to the transmitter authentication information generating unit 1321, which will be described below, and used when transmitter authentication information is generated. In addition, the session key calculating unit 1309 may record the calculated session key in the storage unit 1319.

The header calculating unit 1311 uses various types of data calculated when the session key calculating unit 1309 calculates the session key and the public key or the public information recorded in the storage unit 1319, thereby generating a header that is distributed to the receiving device 40 together with the cipher text. The generated header is transmitted to the cipher text transmitting unit 1317 and the transmitter authentication information generating unit 1321, which will be described below. In addition, the header calculating unit 1311 may record the generated header information in the storage unit 1319.

The bilinear mapping operation unit 1313 is a processing unit that executes an operation related to bilinear mapping, which needs to be executed when the session key is calculated and when the transmitter authentication information is generated. When the session key is calculated, the bilinear mapping operation unit 1313 uses bilinear groups G and $G_1$ and layer linear mapping e that are included in the public information recorded in the storage unit 1319 and data transmitted from the session key determining unit 1307, thereby executing an operation of bilinear mapping. The operation result is retransmitted to the session key determining unit 1307 and used when the session key or the header is calculated.

In addition, when the transmitter authentication information is generated, the bilinear mapping operation unit 1313 uses the bilinear groups G and $G_1$ and the layer linear mapping e that are included in the public information recorded in the storage unit 1319 and data transmitted from the transmitter authentication information generating unit 1321, which will be described below, thereby executing an operation of bilinear mapping. The operation result is retransmitted to the transmitter authentication information generating unit 1321 and used when the transmitter authentication information is generated.

In addition, the bilinear mapping operation unit 1313 may record the operation result in the storage unit 1319.

The encrypting unit 1315 acquires a plain text, such as distributed contents, from the storage unit 1319, uses the session key calculated by the session key determining unit 1307 to execute an encryption process, and encrypts the plain text. The encrypted plain text is transmitted to the cipher text transmitting unit 1317 and the transmitter authentication information generating unit 1321. In addition, the encrypting unit 1315 may record the encrypted plain text in the storage unit 1319.

The cipher text transmitting unit 1317 broadcasts and distributes the cipher text encrypted by the encrypting unit 1315, the header calculated by the header calculating unit 1311, and the transmitter authentication information generated by the transmitter authentication information generating unit 1321, which will be described below, to each of the receiving devices, through the communication network 12.

The storage unit 1319 records the public key and the public information received by the receiving unit 1301, the set R determined by the revoked receiving device specifying unit 1303, or the session key or the header information calculated by the session key determining unit 1307. In addition to the various types of data, the encrypting device 30 may appropriately store various parameters that need to be held when any process is executed or information indicating the intermediate result of the process, or various databases in the storage unit 1319. In the storage unit 1319, the receiving unit 1301, the revoked receiving device specifying unit 1303, the session key determining unit 1307, the bilinear mapping operation unit 1313, the encrypting unit 1315, the cipher text transmitting unit 1317, and the transmitter authentication information generating unit 1321 may freely perform a read/write operation.

The transmitter authentication information generating unit 1321 uses the session key transmitted from the session key calculating unit 1309 and the parameters used for calculation, the header transmitted from the header calculating unit 1311, the cipher text, the public key, and the public information transmitted from the encrypting unit 1315, and the secret key and the unique value of the encrypting device, thereby generating transmitter authentication information. The transmitter authentication information is information that is used when the receiver determines whether the transmitted cipher text and header are tampered and verifies the validity of the transmitter, in the receiving device. When the transmitter authentication information is generated, the transmitter authentication information generating unit 1321 may use the bilinear mapping operation unit 1313. The generated transmitter authentication information is transmitted to the cipher text transmitting unit 1317, and broadcasted and distributed to each of the receiving devices together with the header and the cipher text. In addition, the transmitter authentication information generating unit 1321 may record the generated transmitter authentication information in the storage unit 1319.

<With Respect to a Receiving Device 40 According to this Embodiment>

Figure 29:
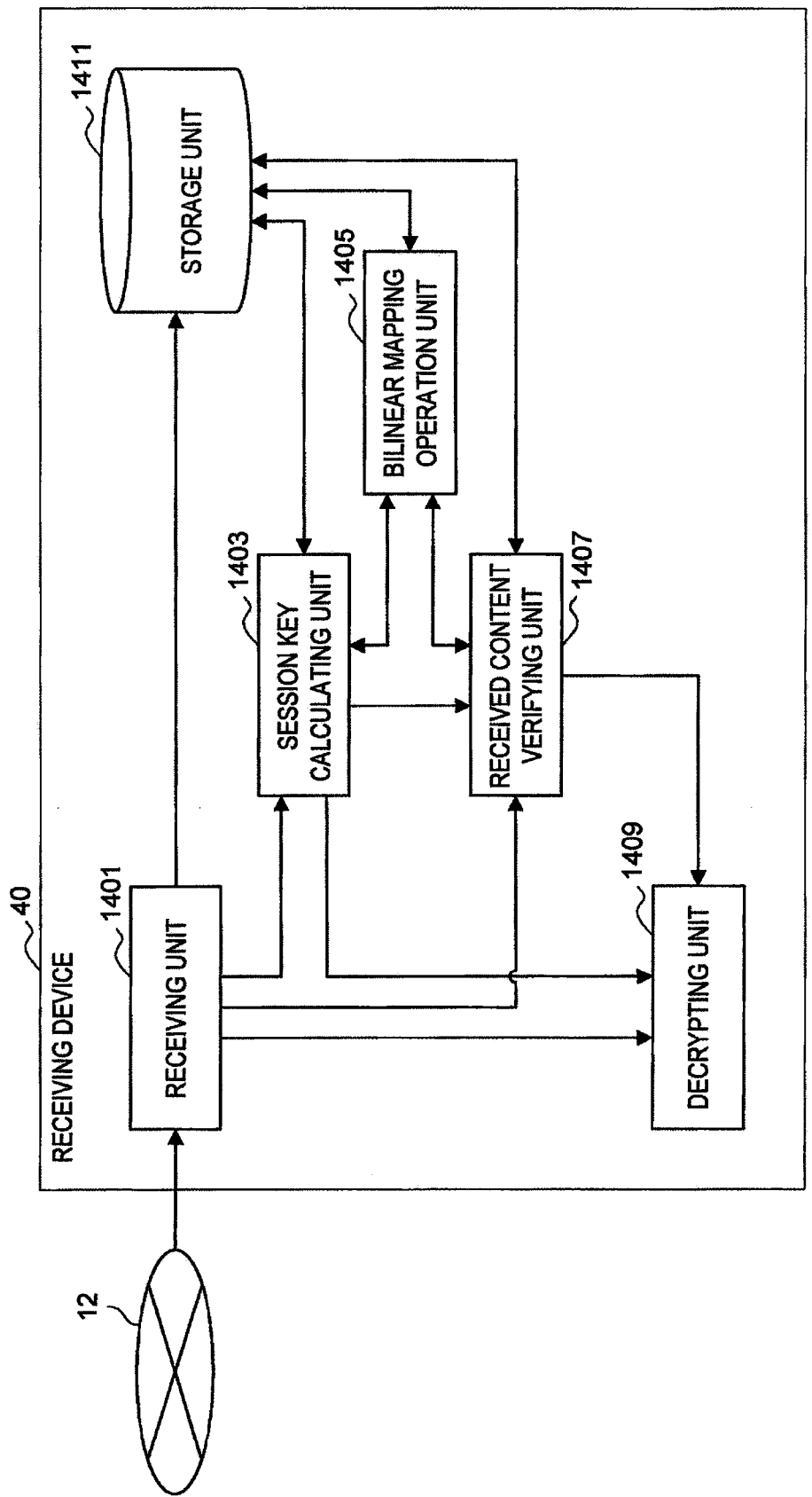
FIG. 29 is a block diagram illustrating the configuration of a receiving device according to the embodiment.

Next, the receiving device 40 according to the embodiment will be described in detail with reference to FIG. 29. FIG. 29 is a block diagram illustrating the configuration of the receiving device 40 according to this embodiment.

For example, as shown in FIG. 29, the receiving device 40 according to the embodiment mainly includes a receiving unit 1401, a session key calculating unit 1403, a bilinear mapping operation unit 1405, a received content verifying unit 1407, a decrypting unit 1409, and a storage unit 1411.

The receiving unit 1401 receives the secret key, the public key, and the public information that are generated by the key generating device 20. In addition, the receiving unit 1401 may receive the cipher text encrypted by the encrypting device 30, the header information, and the transmitter authentication information. The receiving unit 1401 transmits the secret key, the public key, and the public information received from the key generating device 20 and the header received from the encrypting device 30 to the session key calculating unit 1403, which will be described below. In addition, the receiving unit 1401 transmits the cipher text, the header, and the transmitter authentication information received from the encrypting device 30 to the received content verifying unit 1407, which will be described below. The receiving unit 1401 transmits the cipher text received from the encrypting device 30 to the decrypting unit 1409, which will be described below. In addition, the receiving unit 1401 may record the received secret key, public information, cipher text, header information, and transmitter authentication information to the storage unit 1411, which will be described below.

The session key calculating unit 1403 calculates a session key that is used when the cipher text distributed from the encrypting device 30 is subjected to a decryption process, on the basis of the secret key, the public key, and the public information acquired from the key generating device 20 and the header transmitted from the encrypting device 30. The session key calculating unit 1403 transmits the calculated session key to the received content verifying unit 1407 and the decrypting unit 1409, which will be described below. In addition, the session key calculating unit 1403 may record the calculated session key in the storage unit 1411, which will be described below.

The bilinear mapping operation unit 1405 is a processing unit that executes an operation related to bilinear mapping, which needs to be executed when the session key is calculated and the received contents are verified. The bilinear mapping operation unit 1405 uses the bilinear groups G and $G_1$ included in the public information and the data transmitted from the session key calculating unit 1403, thereby executing an operation of bilinear mapping. The operation result is retransmitted to the session key calculating unit 1403, and used when the session key is calculated.

In addition, when the received contents are verified, the bilinear mapping operation unit 1405 uses the bilinear groups G and $G_1$ and the layer linear mapping e included in the public information recorded in the storage unit 1411 and the data transmitted from the received content verifying unit 1407, which will be described below, thereby executing an operation of bilinear mapping. The operation result is retransmitted to the received content verifying unit 1407, and used when the received contents are verified.

In addition, the bilinear mapping operation unit 1405 may record the operation result in the storage unit 1411.

On the basis of the session key calculated by the session key calculating unit 1403 and the header, the cipher text, and the transmitter authentication information transmitted from the encrypting device 30, the received content verifying unit 1407 verifies validity of the transmitter and determines whether the received contents are tampered. When the verification process is executed, the received content verifying unit 1407 may use the bilinear mapping operation unit 1405. The received content verifying unit 1407 outputs the verification result to the decrypting unit 1409, which will be described below. In addition, the received content verifying unit 1407 may record the verification result in the storage unit 1411, which will be described below.

The decrypting unit 1409 uses the session key that is calculated by the session key calculating unit 1403, decrypts a cipher text, such as contents, which is distributed from the encrypting device 30, and converts the cipher text into a plain text. The decryption process that is executed by the decrypting unit 1409 may be executed in accordance with the verification result that is transmitted from the received content verifying unit 1407. That is, when receiving a message indicating that the received contents are successfully verified from the received content verifying unit 1407, the decrypting unit 1409 executes the decryption process, and when receiving a message indicating that the verification process is failed, the decrypting unit 1409 does not execute the decryption process. The decrypting unit 1409 can store the obtained plain text in the storage unit 1411.

The storage unit 1411 records the secret key, the public key, and the public information that are received by the receiving unit 1401. In addition, the storage unit 1411 may record the cipher text, the header, and the transmitter authentication information transmitted from the encrypting device 30, the session key calculated by the session key calculating unit 1403, or the plain text that is subjected to a decryption process by the decrypting unit 1409. Further, in addition to the various types of data, the receiving device 40 may appropriately store various parameters that need to be held when any process is executed or information indicating the intermediate result of the process, or various databases in the storage unit 1411. In the storage unit 1411, the receiving unit 1401, the session key calculating unit 1403, the bilinear mapping operation unit 1405, the received content verifying unit 1407, and the decrypting unit 1409 may freely execute a read/write operation.

An example of a function of each of the key generating device 20, the encrypting device 30, and the receiving device 40 according to the embodiment has been described. Each of the constituent elements may be composed of a general-purpose member or a circuit, or hardware that is specified to a function of each of the constituent elements. In addition, the function of each of the constituent elements may be executed by the CPU. Accordingly, in accordance with a technology level when the embodiment is embodied, the configuration to be used may be appropriately changed.

<Operation of a Key Generating Device 20: a Setup" Process and a Join Process>

Figure 30:
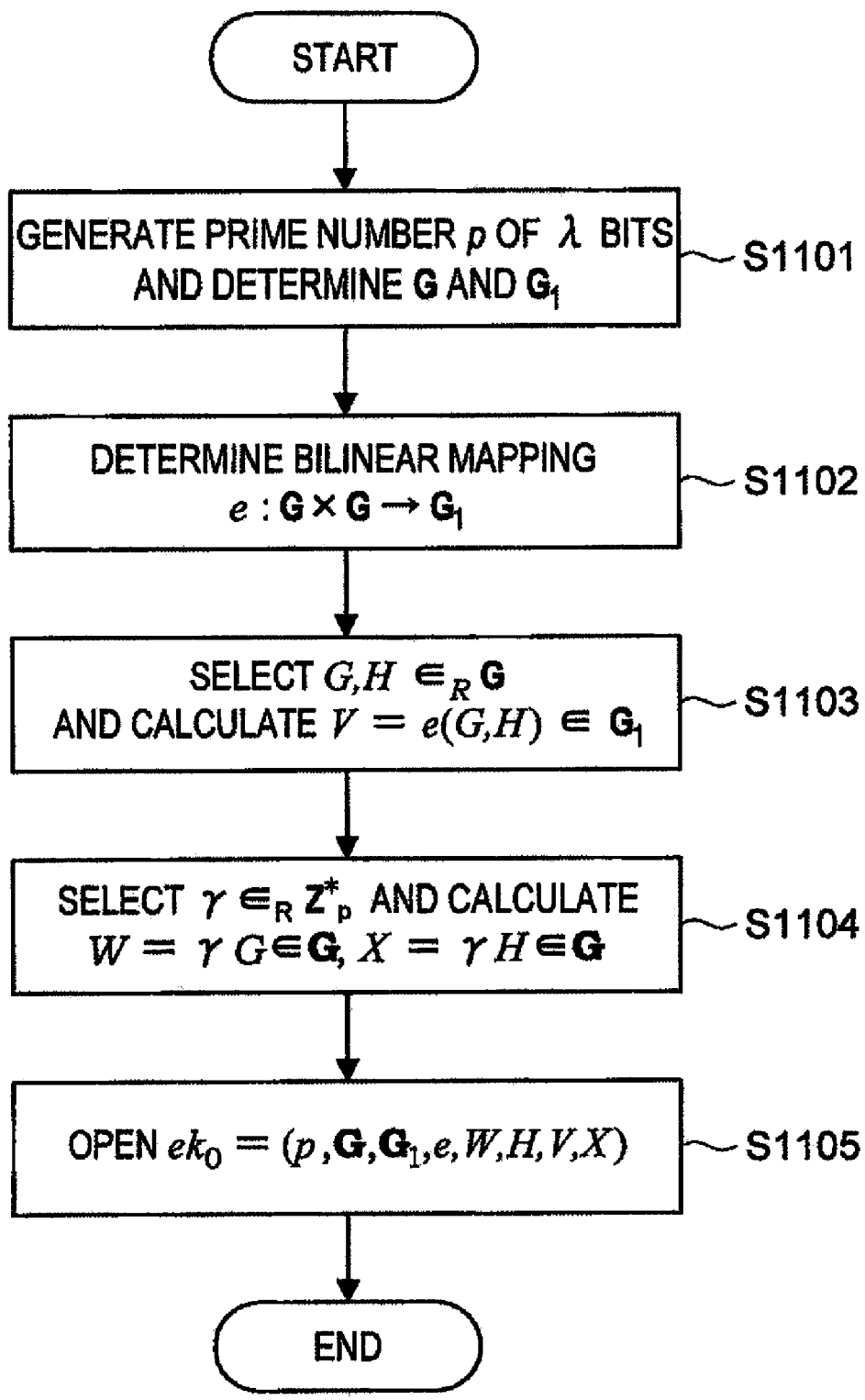
FIG. 30 is a flowchart illustrating a key generating process according to the embodiment.

The center operates the key generating device 20 that is possessed by the center, and generates a public key, public information, and a personal secret key corresponding to each user in accordance with the following sequence. The join process that is executed by the key generating device 20 according to the embodiment are the same as the join process in the method according to the related art. Thus, the join process of the key generating device 20 according to the embodiment will be described in detail with reference to FIG. 4. In addition, the setup" process that is executed by the key generating device 20 according to the embodiment will be described in detail with reference to FIG. 30. FIG. 30 is a flowchart illustrating a setup" process according to this embodiment.

(Setup" Process in a Key Generating Device 20)

The setup" process is a key generating process that the center possessing the key generating device 20 according to the embodiment executes once when constructing the system. The center determines a security parameter λ, and the key generating device uses the input security parameter λ to execute the setup" process, which will be described below.

First, the parameter determining unit 1251 of the key generating device 20 generates a prime number p of λ bits. Next, the bilinear group selecting unit 1253 selects a bilinear mapping group G and a cyclic multiplicative group $G_1$ where p is used as an order (Step S1101).

Next, the bilinear group selecting unit 1253 of the key generating device 20 determines bilinear mapping e: $G \times G \to G_1$ (Step S1102).

Next, the parameter determining unit 1251 of the key generating device 20 selects G, H∈G, and calculates V=e (G, H)∈$G_1$ (Step S1103).

Then, the parameter determining unit 1251 of the key generating device 20 selects $\gamma \in_R Z_P^*$ and the key generating unit 1255 of the key generating device 20 calculates W=γG∈G and X=γH∈G (Step S1104). γ and G that are obtained by the above method are confidentially maintained as a master key mk=(γ, G) by only the center.

Next, the key generating unit 1255 of the key generating device 20 uses the calculated data to configure an initial public key $ek_0$ as follows (Step S1105).

$$ek_0 = \{p, G, G_1, e, W, H, V, X\} \qquad \text{[Equation 301]}$$

If the generation of the public key is completed, the distributing unit 1261 of the key generating device 20 opens the initial public key $ek_0$ obtained by executing the setup" process as an initial public key of the entire system.

Since the key generating device 20 according to the embodiment opens X=γH∈G as public information, when the encryption process is executed in the encrypting device 30, it may be possible to simplify a process in the case where there is no revoked receiving device (that is, transmission is made with respect to all of the receiving devices).

(Join Process in a Key Generating Device 20)

The join process is a user registering process that is executed by the center whenever the center receives a system joining request from the user. The join process may be executed at any timing after the center completes a system setting process.

The center input a public key $ek_{i-1}$ (1≤i≤n), a master key mk, and i that is an index of an i-th joined user to the key generating device 20 and executes the join process, which will be described below, thereby generating a secret key of a user who has transmitted the system joining request and executing a system joining process.

First, the key generating unit 1255 of the key generating device 20 calculates $u_i \in Z_P^*$ that is a unique value of a user i (Step S21). Then, the key generating unit 1255 executes the calculation that is shown in the following Equation 302 and calculates the secret key $dk_i$ of the user i who has transmitted the system joining request (Step S22).

$$dk_i = (A_i, B_i) \in G \qquad \text{[Equation 302]}$$
$$= \left( \frac{u_i}{\gamma + u_i} G, \frac{1}{\gamma + u_i} H \right)$$

In this case, $B_i$ in Equation 302 is a portion of the secret key $dk_i$. However, $B_i$ is not secret information but public information, and the user i does not need to confidentially maintain $B_i$.

Next, the key generating unit 1255 of the key generating device 20 calculates public information corresponding to the user i on the basis of the following Equation 303, and obtains $dk_i$ and ($u_i$, $V_i$) (Step S23).

$$V_i = e(G, H)^{\frac{1}{\gamma + u_i}} \in G_1 \qquad \text{[Equation 303]}$$

The distributing unit 1261 of the key generating device 20 confidentially transmits the secret key $dk_i$ of the user i that is obtained by executing the join process to the user i through a secure communication path. The distributing unit 1261 adds public information ($u_i$, $B_i$, $V_i$) corresponding to the user i to the current public key $ek_{i-1}$, updates the current public key as a public key $ek_i$, and opens the public key. At this time, the new public key $ek_i$ forms the configuration shown by the following Equation 304.

$$ek_i = (p, G, G_1, e, W, H, V, X, (u_1, B_1, V_1), \ldots (u_i, B_i, V_i)) \qquad \text{[Equation 304]}$$

The setup" process and the join process that are executed by the key generating device 20 according to the embodiment have been described. Next, the encryption process and the transmitter authentication information generating process (sign process), which are executed by the encrypting device 30 according to this embodiment, will be described.

<Operation of an Encrypting Device 30: an Encryption Process and a Sign Process>

Figure 31:
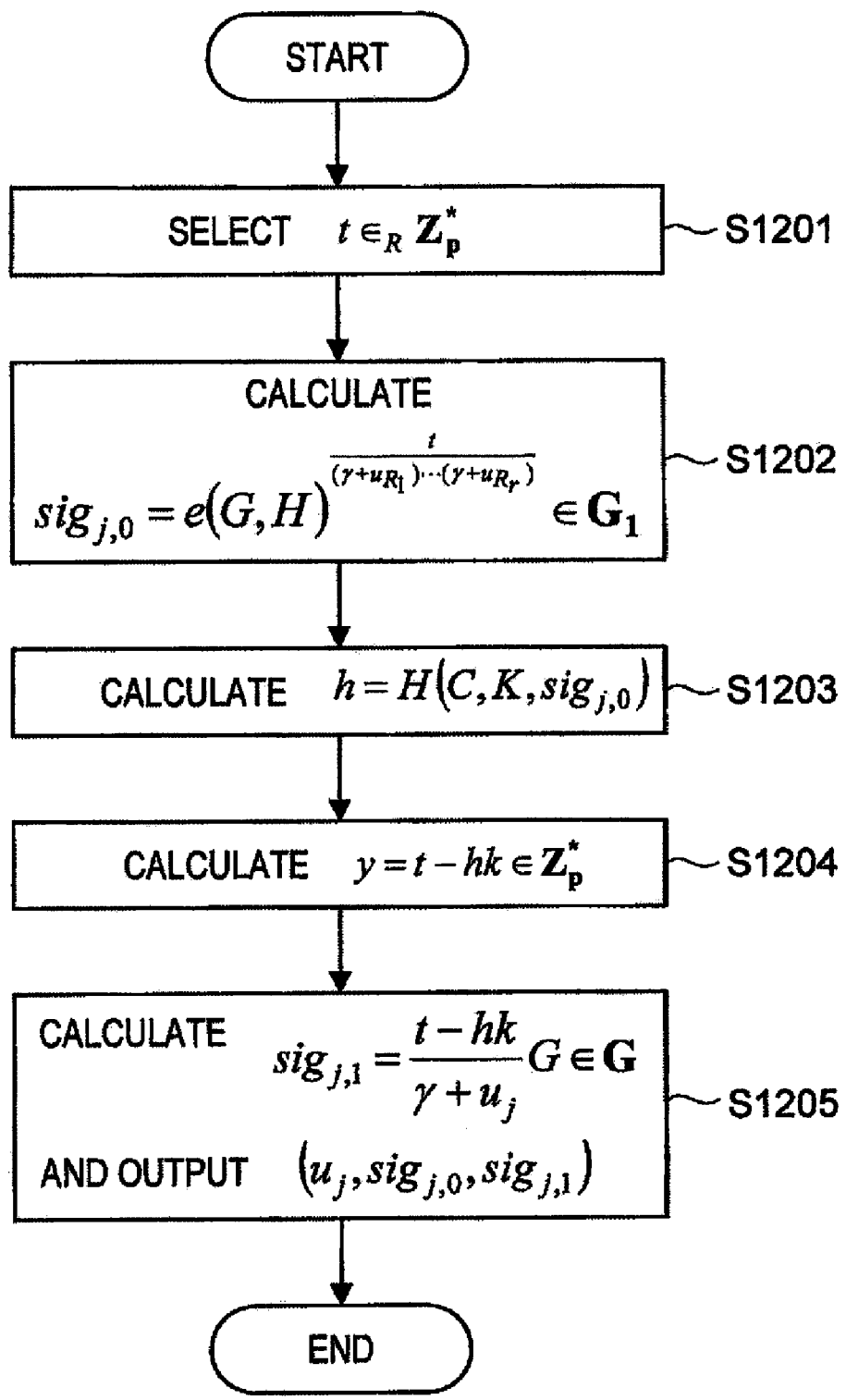
FIG. 31 is a flowchart illustrating a transmitter authentication information generating process according to the embodiment.

A distributor who distributes a plain text, such as contents, operates the encrypting device 30 that is possessed by the distributor, and generates a cipher text and a header in accordance with the following sequence. Since the encryption process that is executed by the encrypting device 30 according to the embodiment is the same as the encryption process in the method according to the related art, the encryption process of the encrypting device 30 according to the embodiment will be described in detail with reference to FIG. 5. In addition, the distributor operates the encrypting device 30, and generates transmitter authentication information that is used when the receiving device 40 verifies validity of the generated cipher text and header and determines whether the contents are tampered or not, in accordance with the following sequence. FIG. 31 is a flowchart illustrating a sign process that is executed when the encrypting device 30 according to the embodiment generates transmitter authentication information.

[Encryption Process in an Encryption Device 30]

The encryption process is a process that is executed whenever an arbitrary transmitter who desires to distribute contents performs a distribution using the encrypting device 30.

The transmitter inputs a public key $ek_t$ and a set of revoked users $R=\{u_{R1} \ldots u_{Rr}\}$ to the encrypting device and executes the encryption process, which will be described below, thereby executing an encryption process on a plain text, such as contents, which the transmitter desires to distribute.

First, the revoked receiving device specifying unit 1303 of the encrypting device 30 counts the number of elements of R, sets a count result as r (Step S31), and outputs the count result r to the session key determining unit 1307. Next, the session key calculating unit 1309 of the encrypting device 30 selects $k \in Z_p^*$ (Step S32).

Next, the session key calculating unit 1309 of the encrypting device 30 executes a determination process on the number r of revoked users (Step S33). In the case of r=0 (that is, in the case where there is no revoked user), the session key calculating unit 1309 executes Step S34, which will be described below. In addition, in the case of r=1 (that is, in the case where only one revoked user exists), the session key calculating unit 1309 executes Step S35, which will be described. In addition, in the case of r≧2 (that is in the case where two or more revoked users exist), the session key calculating unit 1309 executes Step S36, which will be described.

In the case where there is no revoked user, the session key calculating unit 1309 determines $P_r$ and K' on the basis of the following Equations 305 and 306 (Step S34), and then executes Step S38.

$P_r = H \in G$ [Equation 305]

$K' = V \in G_1$ [Equation 306]

In addition, in the case where one revoked user exists, the session key calculating unit 1309 determines $P_r$ and K' on the basis of the following Equations 307 and 308 (Step S35), and then executes Step S38.

$$P_r = B_{R_1} = \frac{1}{\gamma + u_{R_1}} H \in G$$ [Equation 307]

$$K' = V_{R_1} \in G_1$$ [Equation 308]

In addition, in the case where two or more revoked users exist, the session key calculating unit 1309 requests the bilinear mapping operation unit 1313 to execute an operation process (Aggregate (A) algorithm) of a bilinear group on G and calculate a value shown in the following Equation 309. The bilinear mapping operation unit 1313 executes the Aggregate (A) algorithm and outputs the value of Equation 309 to the session key calculating unit 1309 (Step S36). In addition, the Aggregate (A) algorithm that is an operation process algorithm of a bilinear group will be described in detail below.

$$P_l(l=1, \ldots, r) = \frac{1}{(\gamma + u_{R_1}) \ldots (\gamma + u_{R_l})} H \in G$$ [Equation 309]

Next, in the encrypting device, the session key calculating unit 1309 requests the bilinear mapping operation unit 1313 to execute an operation process (Aggregate (A) algorithm) of a bilinear group on $G_1$ and calculate a value shown in the following Equation 310. The bilinear mapping operation unit 1313 executes the Aggregate (A) algorithm and outputs the value of Equation 310 to the session key calculating unit 1309 (Step S37).

$$K' = e(G, H)^{\overline{(\gamma+u_{R_1}) \ldots (\gamma+u_{R_r})}} = V^{\overline{(\gamma+u_{R_1}) \ldots (\gamma+u_{R_r})}} \in G_1$$ [Equation 310]

With respect to each of the cases, if calculation of $P_r$ and K' is completed, the header calculating unit 1311 of the encrypting device 30 calculates the header hdr on the basis of the following Equation 311 (Step S38).

$$hdr = (C_1, C_2, (u_{R_1}, P_1), \ldots (u_{R_r}, P_r))$$ [Equation 311]
$$= (kW, kP_r, (u_{R_1}, P_1), \ldots (u_{R_r}, P_r))$$

Next, the session key calculating unit 1309 of the encrypting device calculates the session key K on the basis of the following Equation 312, and outputs the session key K together with the header hdr, K', and k.

$K=(K')^k \in G_1$ [Equation 312]

The encrypting unit 1315 of the encrypting device generates a cipher text $C=E_K(M)$ using the session key K of the plain text M and transmits the cipher text to the transmitter authentication information generating unit 1321. In addition, the cipher text transmitting unit 1317 broadcasts and distributes the generated (hdr, C) together with the transmitter authentication information, which will be described below. If this process is executed, the transmitter can transmit the encrypted contents to a desired user.

In addition to the above process, the encryption of the plain text M or the encryption and broadcasting and distributing may be executed by the encryption process. The transmitter may execute Step S31 and input the executed result to the encrypting device that executes the encryption process.

(Operation Process of a Bilinear Group-Aggregate (A) Algorithm)

Next, the Aggregate (A) algorithm that is an operation process of a bilinear group that is executed during the encryption process will be described in detail with reference to FIG. 6.

The Aggregate (A) algorithm is an algorithm that is executed when the bilinear mapping operation unit 1313 calculates $(P_1 \ldots P_r) \in G$.

First, the bilinear mapping operation unit 1313 sets the conditions $P_{0,m}=V_{Rm}$ (m=1, . . . , r) and j=1 (Step S41). Next, the bilinear mapping operation unit 1313 sets the condition l=j+1 (Step S42).

In this case, the bilinear mapping operation unit 1313 compares $u_{Rj}$ and $u_{R1}$. If the condition $u_{Rj}=u_{R1}$ is satisfied, the bilinear mapping operation unit 1313 outputs an error message (Step S44), and completes the process. If the condition $u_{Rj}=u_{R1}$ is not satisfied, the bilinear mapping operation unit 1313 executes the following Step S45.

Next, the bilinear mapping operation unit 1313 uses the following Equation 313 to calculate $P_{j,1}$ (Step S45).

$$P_{j,l} = \frac{1}{u_{R_l} - u_{R_j}}(P_{j-1,j} - P_{j-1,l}) \in G \qquad \text{[Equation 313]}$$

If the calculation of Equation 313 is completed, the bilinear mapping operation unit 1313 substitutes l+1 for l (Step S46), and compares l and r+1 (Step S47). If the condition l=r+1 is satisfied, the bilinear mapping operation unit 1313 executes Step S48, and if l is not equal to r+1, the bilinear mapping operation unit 1313 returns to Step S43 and continuously executes the process.

Next, the bilinear mapping operation unit 1313 substitutes j+1 for j (Step S48), and compares j and r (Step S49). If the condition j=r is satisfied, the bilinear mapping operation unit 1313 executes Step S50, and if j is not equal to r, the bilinear mapping operation unit 1313 returns to Step S42 and continuously executes the process.

Then, the bilinear mapping operation unit 1313 outputs $P_{j-1,1}$ as $P_r$ (Step S50).

For example, in the case where the condition r=3 is satisfied, the bilinear mapping operation unit 1313 executes the above-described Aggregate (A) algorithm and outputs $P_{2,3}$ as $P_3$.

In the case of j = 1, $$P_{1,2} = \frac{1}{u_{R_2} - u_{R_1}}(P_{0,1} - P_{0,2})$$
$$= \frac{1}{u_{R_2} - u_{R_1}}\left(\frac{1}{\gamma + u_{R_1}} - \frac{1}{\gamma - u_{R_2}}\right)H$$
$$= \left(\frac{1}{(\gamma + u_{R_1})(\gamma + u_{R_2})}\right)H$$

$$P_{1,3} = \frac{1}{u_{R_3} - u_{R_1}}(P_{0,1} - P_{0,3})$$
$$= \frac{1}{u_{R_3} - u_{R_1}}\left(\frac{1}{\gamma + u_{R_1}} - \frac{1}{\gamma - u_{R_3}}\right)H$$
$$= \left(\frac{1}{(\gamma + u_{R_1})(\gamma + u_{R_3})}\right)H$$

In the case of j = 2, $$P_{2,3} = \frac{1}{u_{R_3} - u_{R_2}}(P_{1,2} - P_{1,3})$$
$$= \frac{1}{u_{R_3} - u_{R_2}}\left(\frac{1}{(\gamma + u_{R_1})(\gamma + u_{R_2})} - \frac{1}{(\gamma + u_{R_1})(\gamma + u_{R_3})}\right)H$$
$$= \left(\frac{1}{(\gamma + u_{R_1})(\gamma + u_{R_2})(\gamma + u_{R_3})}\right)H$$

In addition, $K' \in G_1$ can be calculated by using the above-described Aggregate (A) algorithm. In this case, after setting the condition $P_{0,m}=V_{Rm}$ (m=1, . . . , r) and changing addition (subtraction) to multiplication (division) and multiplication to a power, the bilinear mapping operation unit 1313 may execute Step S45 as an operation on $G_1$. However, $1/(u_{R1}-u_{Rj})$ that is an operation on $Z_P^*$ needs to be calculated as subtraction and an inverse element operation on $Z_P^*$ even in any of the cases.

[Transmitter Authentication Information Generating Process—a Sign Process]

Next, a transmitter authentication information generating process (sign process) that a transmitter authentication information generating unit 321 according to the embodiment executes will be described in detail with reference to FIG. 31. FIG. 31 is a flowchart illustrating a sign process according to this embodiment.

The sign process is a process that a transmitter having the encrypting device 30 according to the embodiment executes after generating a header hdr. In addition, the sign process is a process that can be executed by only a transmitter (encrypting device 30) who has a valid secret key.

The transmitter inputs, to the encrypting device 30, a public key $ek_j$, a unique value $u_j$ of the transmitter, a secret key $dk_j$ that is held by the transmitter, and k, K', a session key K, and a cipher text C output from the session key calculating unit 1309 after executing the encryption process, and executes the sign process, which will be described below.

First, the transmitter authentication information generating unit 1321 randomly selects a parameter $t \in Z_P^*$ (Step S1201). Next, the transmitter authentication information generating unit 1321 calculates $sig_{j,0}$ that is one of elements of transmitter authentication information, on the basis of the following Equation 314 (Step S1202).

$$sig_{j,0} = (K')^t = e(G, H)^{\frac{1}{(\gamma+u_{R_1})\cdots(\gamma+u_{R_r})}} \in G_1 \qquad \text{[Equation 314]}$$

Next, the transmitter authentication information generating unit 1321 uses the calculated $sig_{j,0}$, the cipher text C, and the session key K, and calculates a hash value h of these values using a hash function as represented by the following Equation 315 (Step S1203).

$$h=H(C,K,sig_{j,0}) \qquad \text{[Equation 315]}$$

Next, the transmitter authentication information generating unit 1321 uses the calculated hash value h, the selected parameter t, and the value k transmitted from the session key calculating unit 1309, thereby calculating secret information y of the transmitter on the basis of the following Equation 316 (Step S1204).

$$y=t-hk \in Z_P^* \qquad \text{[Equation 316]}$$

Next, the transmitter authentication information generating unit 1321 uses the calculated secret information y and the unique secret key $dk_j$ of the encrypting device 30 to calculate $sig_{j,1}$ that is one of elements of the transmitter authentication information on the basis of the following Equation 317. The transmitter authentication information generating unit 1321 outputs ($u_j$, $sig_{j,0}$, and $sig_{j,1}$) as the transmitter authentication information to the cipher text transmitting unit 1317 (Step S1205).

$$sig_{j,1} = \frac{y}{u_j} A_j = \frac{t - hk}{\gamma + u_j} G \in G \qquad \text{[Equation 317]}$$

As described above, the transmitter authentication information generating unit 1321 according to the embodiment uses a hash value that is related to the value calculated on the basis of the parameter arbitrarily selected by the transmitter, the cipher text C, and the session key K, thereby generating transmitter authentication information. Accordingly, when the malicious third party tampers contents of the cipher text or the session key and regenerates transmitter authentication information, the calculated hash value becomes a different value. For this reason, the receiving device 40 that has received the transmitter authentication information can use the transmitter authentication information to verify validity of the transmitter and determine whether the transmitted contents are tampered.

The encryption process and the sign process that are executed by the encrypting device 30 according to the embodiment have been described. Next, the session key calculating process (decryption process) and the received content verifying process (verification process) that are executed by the receiving device 40 according to the embodiment will be described.

<Operation of a Receiving Device 40: a Decryption Process and a Verification Process>

Figure 32:
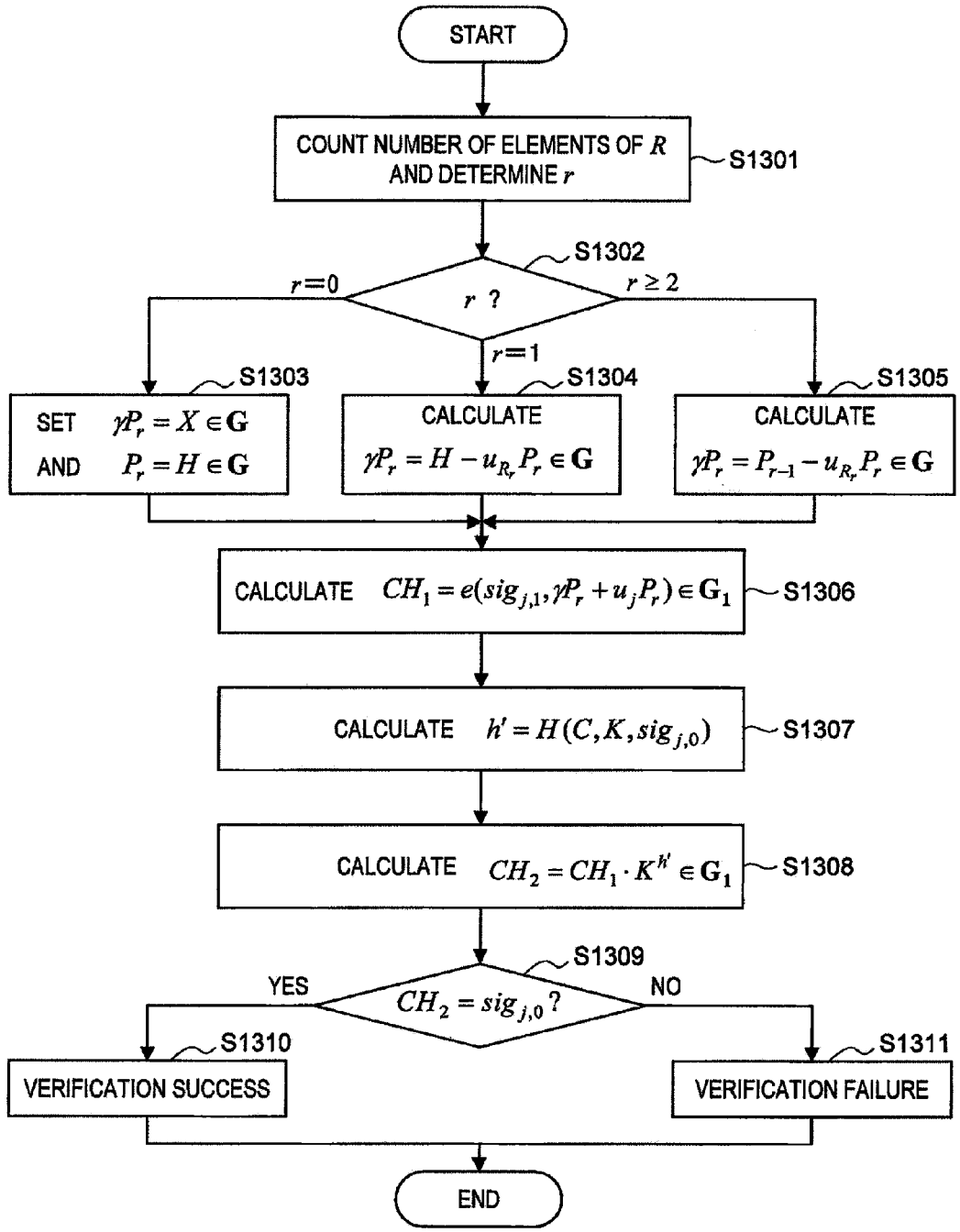
FIG. 32 is a flowchart illustrating a received content verifying process according to the embodiment.

A receiver who receives a cipher text transmitted from the encrypting device 30 operates the receiving device 40 that is possessed by the receiver, and executes the decryption process that is a session key calculating process in accordance with the following sequence. Since the decryption process that is executed by the receiving device 40 according to the embodiment is the same as the decryption process in the method according to the related art, the decryption process according to the embodiment will be described in detail with reference to FIG. 7. In addition, the receiver operates the receiving device 40 and executes the verification process of the received contents in accordance with the following sequence. FIG. 32 is a flowchart illustrating a verification process that is executed when the receiving device 40 according to the embodiment verifies the received contents.

[Session Key Calculating Process—Decryption Process]

The decryption process is a process that calculates a session key needed when a receiver who receives a distribution such as contents decrypts a cipher text and acquires a plain text. The decryption process is executed by the receiving device 40 according to this embodiment.

The receiving device 40 executes the decryption process, which will be described below, on the basis of the header hdr transmitted by the transmitter, the secret key $dk_i$, and $u_i$ as the unique value thereof, and calculates a session key to decrypt a cipher text, such as the distributed contents. In addition, the receiving device 40 uses the calculated session key to execute a decryption process on the cipher text.

First, the session key calculating unit 1403 of the receiving device 40 determines whether $u_i$ as the unique value exists in the header hdr received by the receiving unit 1401 (Step S51). When it is determined that $u_i$ as the unique value exists in the header hdr, it means that the receiver is revoked by the transmitter. Accordingly, the receiving device 40 outputs an error message (Step S52) and completes the process. In addition, when it is determined that $u_i$ as the unique value does not exist in the header hdr, the receiving device 40 executes the following Step S53.

Next, the session key calculating unit 1403 determines whether r is 0 or not (Step S53). When it is determined that r is 0, the session key calculating unit 1403 executes Step S54, which will be described below. Meanwhile, when it is determined that r is not 0, the session key calculating unit 1403 executes Step S55, which will be described below.

Here, in the case where r is 0, the session key calculating unit 1403 sets $B_{i,R}=B_i$ and executes Step S56, which will be described below.

Meanwhile, in the case where r is not 0, the session key calculating unit 1403 requests the bilinear mapping operation unit 1405 to execute an operation process (Aggregate (B) algorithm) of a bilinear group on G and calculate a value shown in the following Equation 318. The bilinear mapping operation unit 1405 executes the Aggregate (B) algorithm and outputs a value of Equation 318 to the session key calculating unit 1403 (Step S55). In addition, the Aggregate (B) algorithm that is an operation process algorithm of a bilinear group will be described in detail below.

$$B_{i,R} = \frac{1}{\prod_{j=1}^{r}(\gamma + u_{R_j})} B_i = \frac{1}{(\gamma + u_i)\prod_{j=1}^{r}(\gamma + u_{R_j})} H \qquad \text{[Equation 318]}$$

If Step S54 or S55 is completed, the session key calculating unit 1403 uses the acquired $B_{i,R}$ to calculate a session key K on the basis of the following Equation 319 (Step S56).

$$\begin{aligned}
K &= e(kW, B_{i,R}) \cdot e(A_i, kP_r) \qquad \text{[Equation 319]} \\
&= e\left(k\gamma G, \frac{1}{(\gamma + u_i)\prod_{j=1}^{r}(\gamma + u_{R_j})} H\right) \cdot \\
&\quad e\left(\frac{u_i}{(\gamma + u_i)} G, \frac{k}{\prod_{j=1}^{r}(\gamma + u_{R_j})} H\right) \\
&= e(G, H)^{\frac{k\gamma}{(\gamma + u_i)\prod_{j=1}^{r}(\gamma + u_{R_j})}} \cdot \\
&= e(G, H)^{\frac{ku_i}{(\gamma + u_i)\prod_{j=1}^{r}(\gamma + u_{R_j})}} \\
&= e(G, H)^{\frac{k}{\prod_{j=1}^{r}(\gamma + u_{R_j})}}
\end{aligned}$$

The session key calculating unit 1403 outputs the session key K that is obtained by the above-described decryption process to the received content verifying unit 1407. When receiving a message indicating that verification is successfully performed from the received content verifying unit 1407, the decrypting unit 1409 uses the session key K that is obtained by the above-described decryption process, decrypts a cipher text C such as contents transmitted from the transmitter, and acquires a plain text $M=D_K(C)$. In addition, when receiving a message indicating that verification is failed from the received content verifying unit 1407, the decrypting unit 1409 may not execute a decryption process on the received cipher text.

(Operation Process of a Bilinear Group-Aggregate (B) Algorithm)

Next, the Aggregate (B) algorithm that is an operation process of a bilinear group executed during the decryption process will be described in detail with reference to FIG. 8.

The Aggregate (B) algorithm is an algorithm that is executed when the bilinear mapping operation unit 1405 calculates $B_{i,R} \in G$.

First, the bilinear mapping operation unit 1405 sets a parameter tmp, and sets an initial value of tmp as $B_i$ (Step S61). Next, the bilinear mapping operation unit 1405 sets the condition j=1 (Step S62).

Next, the bilinear mapping operation unit 1405 compares $u_{Rj}$ and $u_i$. If the condition $u_{Rj}=u_i$ is satisfied, the bilinear mapping operation unit 1405 outputs an error message (Step S64) and completes the process. If the condition $u_{Rj}=u_i$ is not satisfied, the bilinear mapping operation unit 1405 executes the following Step S65.

Next, the bilinear mapping operation unit 1405 calculates a new value of tmp using the following Equation 320 (Step S68).

$$tmp = \frac{1}{u_i - u_{R_j}}(P_j - tmp) \in G \qquad \text{[Equation 320]}$$

In this case, as can be seen from Equation 314, a denominator of Equation 320 includes $u_i$ that is a unique value of the receiving device. Accordingly, when the unique value $u_i$ is included in the header hdr that is transmitted from the encrypting device, tmp does not have a value. As a result, since the revoked user can hardly obtain $B_{i,R}$ that is needed to calculate the session key K, it may be impossible to decrypt the cipher text.

If the above operation is completed, the bilinear mapping operation unit 1405 sets a value of j as j+1 (Step S66), and compares j and r+1 (Step S67). If the condition j=r+1 is satisfied, the bilinear mapping operation unit 1405 executes Step S68, which will be described below. In addition, if j is not equal to r+1, the bilinear mapping operation unit 1405 returns to Step S63 and continuously executes the process.

Next, the bilinear mapping operation unit 1405 outputs tmp to the session key calculating unit 1403 (Step S68). The output tmp is $B_{i,R}$, and the session key calculating unit 1403 uses the output value to calculate the session key K.

[Received Content Verifying Process—Verification Process]

The verification process is a process that is executed when it is confirmed whether a non-revoked user that uses the transmitted header hdr and transmitter authentication information ($u_j$, $sig_{j,0}$, $sig_{j,1}$) to generate the header hdr and the cipher text C is a user having a valid secret key, and the header hdr and the cipher text C are tampered or not.

A verifier inputs the received header hdr, and the session key K, the cipher text C, and the transmitter authentication information ($u_j$, $sig_{j,0}$, $sig_{j,1}$), which are obtained as a decryption result of the header hdr, to the receiving device 40, and the receiving device 40 executes the verification process, which will be described below.

In addition, during the verification process, only p, G, $G_1$, and e that are the system parameter portions of the public key $ek_i$ are used. However, since theses values are generally held by each user (or receiving device 40 that is held by the user) in advance, the public key does not need to be input in this case.

First, the received content verifying unit 1407 of the receiving device 40 counts the number of elements of a set R of revoked users and sets a count result as r (Step S1301), and then executes a determination process on the count result (Step S1302). In the case where the count result r is 0 (that is, in the case where there is no revoked user and all users can execute a decryption process), the received content verifying unit 1407 executes Step S1303, which will be described below. In addition, in the case where the count result r is 1, the received content verifying unit 1407 executes Step S1304, which will be described below. In addition, in the case where the count result r is 2 or more, the received content verifying unit 1407 executes Step S1305, which will be described below.

In the case where the count result r is 0, the received content verifying unit 1407 uses a value included in the public information to set the conditions $_\gamma P_r = X$ and $P_r = H$ (Step S1303), and executes Step S1306, which will be described below.

In addition, when the count result r is 1, the received content verifying unit 1407 calculates $_\gamma P_r$ on the basis of the following Equation 321 (Step S1304), and executes Step S1306, which will be described below.

$$\gamma P_r = H - u_{R_r} P_r \in G \qquad \text{[Equation 321]}$$

In addition, in the case where the count result r is 2 or more, the received content verifying unit 1407 calculates $_\gamma P_r$ on the basis of the following Equation 322 (Step S1305), and executes Step S1306, which will be described below.

$$\gamma P_r = P_{r-1} - u_{R_r} P_r \in G \qquad \text{[Equation 322]}$$

Next, the received content verifying unit 1407 uses the calculated $_\gamma P_r$, the transmitter authentication information, and the public information to calculate a parameter $CH_1$ used for verification on the basis of the following Equation 323 (Step S1306).

$$CH_1 = e(sig_{j,1}, \gamma P_r + u_j P_r) \in G_1 \qquad \text{[Equation 323]}$$

Next, the received content verifying unit 1407 uses the cipher text C and the transmitter authentication information transmitted from the encrypting device 30 and the session key K transmitted from the session key calculating unit 1403 to calculate a hash value h' on the basis of the following Equation 324 (Step S1307).

$$h' = H(C, K, sig_{j,0}) \qquad \text{[Equation 324]}$$

Next, the received content verifying unit 1407 uses the calculated verifying parameter $CH_1$ and hash value h' and the session key K transmitted from the session key calculating unit 1403 to calculate a verifying value $CH_2$ on the basis of the following Equation 325 (Step S1308).

$$CH_2 = CH_1 \cdot K^{h'} \in G_1 \qquad \text{[Equation 325]}$$

Next, the received content verifying unit 1407 compares the calculated verifying value $CH_2$ and $sig_{j,0}$ included in the transmitter authentication information (Step S1309). If the condition $CH_2 = sig_{j,0}$ is satisfied, the received content verifying unit 1407 determines that the cipher text C and the header hdr received from the encrypting device 30 are transmitted from a user j having a valid secret key, and the cipher text C and the header hdr are not tampered (that is, authentication is successfully made) (Step S1310). In addition, if the condition $CH_2 \neq sig_{j,0}$ is satisfied, the received content verifying unit 1407 determines that the cipher text C and the header hdr received from the encrypting device 30 are not transmitted from the user j having a valid secret key or the cipher text C and the header hdr are tampered (that is, authentication is failed) (Step S1311).

If the authentication result is fixed, the received content verifying unit 1407 transmits the authentication result to the decrypting unit 1409.

In addition, the receiver may execute Step S1301 that is described above and input the execution result to the receiving device 40 that executes the verification process.

<With Respect to Validity of Authentication>

The operation of the receiving device 40 according to the embodiment has been described in detail. Next, the case is described, in which the encrypting device 30 adds the transmitter authentication information ($u_j$, $sig_{j,0}$, $sig_{j,1}$), and the receiver can recognize that the header hdr and the cipher text C are generated by the user j (or the user j authenticates the header hdr and the cipher text C that are generated by another person) and that the header hdr and the cipher text C are not tampered.

The user i who is a verifier allows the receiving device 40 to decrypt the header and acquire the session key K, and executes the verification process using the receiving device 40. During the verification process, in Steps S1303 to S1305, $_γP_r$ is derived, and in Step S1306, a verifying parameter $CH_1$ is calculated.

In this case, since $sig_{j,1}$ has a value shown in Equation 317, if Equation 323 is developed, the verifying parameter $CH_1$ becomes a value in shown in the following Equation 326.

$$CH_1 = e(sig_{j,1}, γP_r + u_j P_r) \in G_1 \quad \text{[Equation 326]}$$
$$= e\left(\frac{t-hk}{γ+u_j}G, \frac{γ+u_j}{(γ+u_{R_1}) \ldots (γ+u_{R_r})}H\right)$$
$$= e(G, H)^{\frac{t-hk}{(γ+u_{R_1}) \ldots (γ+u_{R_r})}}$$

Meanwhile, in the case where the header hdr, the cipher text C, and the transmitter authentication information $sig_{j,0}$ are not tampered, the transmitter authentication information $sig_{j,0}$ is generated by the user j, and the valid session key K is derived by the header hdr, the condition h=h' is satisfied by Step S1307. Accordingly, in the above-described case, the verifying value $CH_2$ that is calculated in Step S1308 becomes a value shown in the following Equation 327.

$$CH_2 = CH_1 \cdot K^h \in G_1 \quad \text{[Equation 327]}$$
$$= e(G, H)^{\frac{t-hk}{(γ+u_{R_1}) \ldots (γ+u_{R_r})}} \cdot$$
$$\left\{e_{(G, H)^{\frac{k}{(γ+u_{R_1}) \ldots (γ+u_{R_r})}}}\right\}^h$$
$$= e(G, H)^{\frac{t}{(γ+u_{R_1}) \ldots (γ+u_{R_r})}}$$
$$= sig_{j,0}$$

Accordingly, if $CH_2 = sig_{j,0}$ is satisfied, it can be understood that verification is realized.

<Difference with the Related Art>

In the method according to the related art, a function of the public key Broadcast Encryption where the arbitrary entity can generate and transmit the header hdr and only a non-revoked user can execute a decryption process is realized. Meanwhile, in the method according to this embodiment, in addition to the function of the public key Broadcast Encryption that is realized in the method according to the related art, if the corresponding user is a verified user, the header hdr is generated and the sign process is executed, thereby adding transmitter authentication information. As a result, the embodiment is different from the related art in that the user who has received the header hdr and the transmitter authentication information ($u_j$, $sig_{j,0}$, and $sig_{j,1}$) can detect whether the header hdr and the cipher text C are tampered and confirm the generator thereof.

When the method according to the related art is used alone, the receiver can hardly confirm validity of the transmitter. However, in addition to the method according to the related art, if the existing signing method is separately used, it may become possible to add the transmitter authentication information to the header. However, in this case, it is necessary to confidentially maintain two kinds of secret keys that include a secret key $dk_i$ used to protect contents in the method according to the related art, and a signing key used to generate transmitter authentication information used in the signing method. Meanwhile, in the method according to this embodiment, if adding the sign process and the verification process during which the same operation as the operation, which is used when the public key Broadcast Encryption method is used to protect contents, is executed, it becomes possible to generate transmitter authentication information using the content protecting secret key in the public key broadcast encryption method, and the secret key to be held may be only one. This point is different from a combination of existing technologies where the signing method is separately added to the method according to the related art.

As described above, in the method according to the related art, the arbitrary entity can transmit a cipher text on which only a user who belongs to a set of designated users can execute a decryption process. However, the header can be generated by the arbitrary entity, and information from which a header generator can be confirmed is not included in the header hdr. Accordingly, the receiver cannot confirm whether the received header hdr and the cipher text C are tampered and whether the received header hdr and the cipher text C are generated by the valid user. In addition, in order to realize the above-described confirmation, since the sign needs to be generated and the verification needs to be executed, the number of keys that are held by each user increases.

Meanwhile, in the method according to this embodiment, at the side of the transmitter, a user who is the transmitter uses the parameter k, the secret key $dk_j$, and the session key K, which are used when the header is generated, and executes a sign process so that the transmitter can detect whether the header hdr and the cipher text C generated by the transmitter are tampered and confirm validity. At the side of the receiver, the receiver executes the verification process, thereby detecting whether the header and the cipher text are tampered and verifying a generator of the header hdr. As a result, in the example that is described as the first issue in the method according to the related art, even though a malicious entity transmits unfair firmware, the receiver can verify the generator thereof. Therefore, the receiver can remove the unfair firmware before executing the unfair firmware. However, in addition, in the method according to the related art, the same function can be realized by using the separate signing, the verifying algorithm, and the key pair. In this case, there is a second issue in that the two keys including a key for Broadcast Encryption and a key for signing are needed. Meanwhile, in the method according to this embodiment, the transmitter can use only a secret key for Broadcast Encryption to generate the header hdr and the transmitter authentication information ($u_j$, $sig_{j,0}$, $sig_{j,1}$). Also, after acquiring the session key, the receiver uses only the header hdr and the transmitter authentication information ($u_j$, $sig_{j,0}$, $sig_{j,1}$) to realize the same function. For this reason, in the method according to this embodiment, it is not necessary to increase the number of keys that are held by the device.

(First Modification)

Next, a first modification of an encrypting device 30 according to the embodiment will be described in detail with reference to FIGS. 33 to 36. The encrypting device 30 according to this modification is a device that changes the encryption process executed by the session key determining unit 1307 according to the embodiment to the encryption' process, which will be described below, and executes the encryption' process. The transmitter authentication information generating process executes the sign process according to this embodiment.

The encrypting device 30 according to this modification executes the changing process, thereby realizing the reduction of the calculation amount at the time of the encryption process.

<Operation of an Encrypting Device 30: an Encryption' Process>

Figure 33:
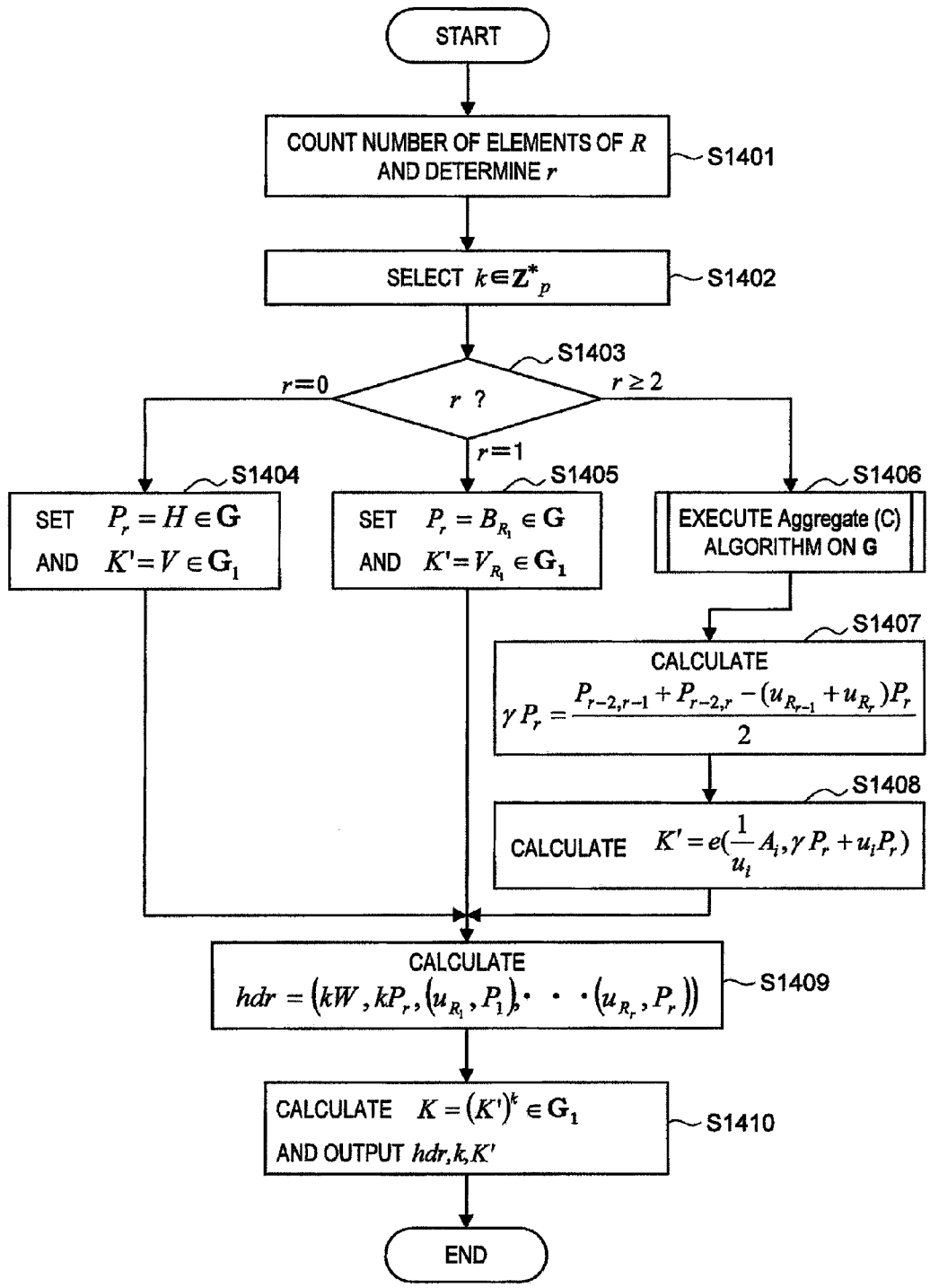
FIG. 33 is a flowchart illustrating a first modification of an encryption process according to the embodiment.
Figure 34:
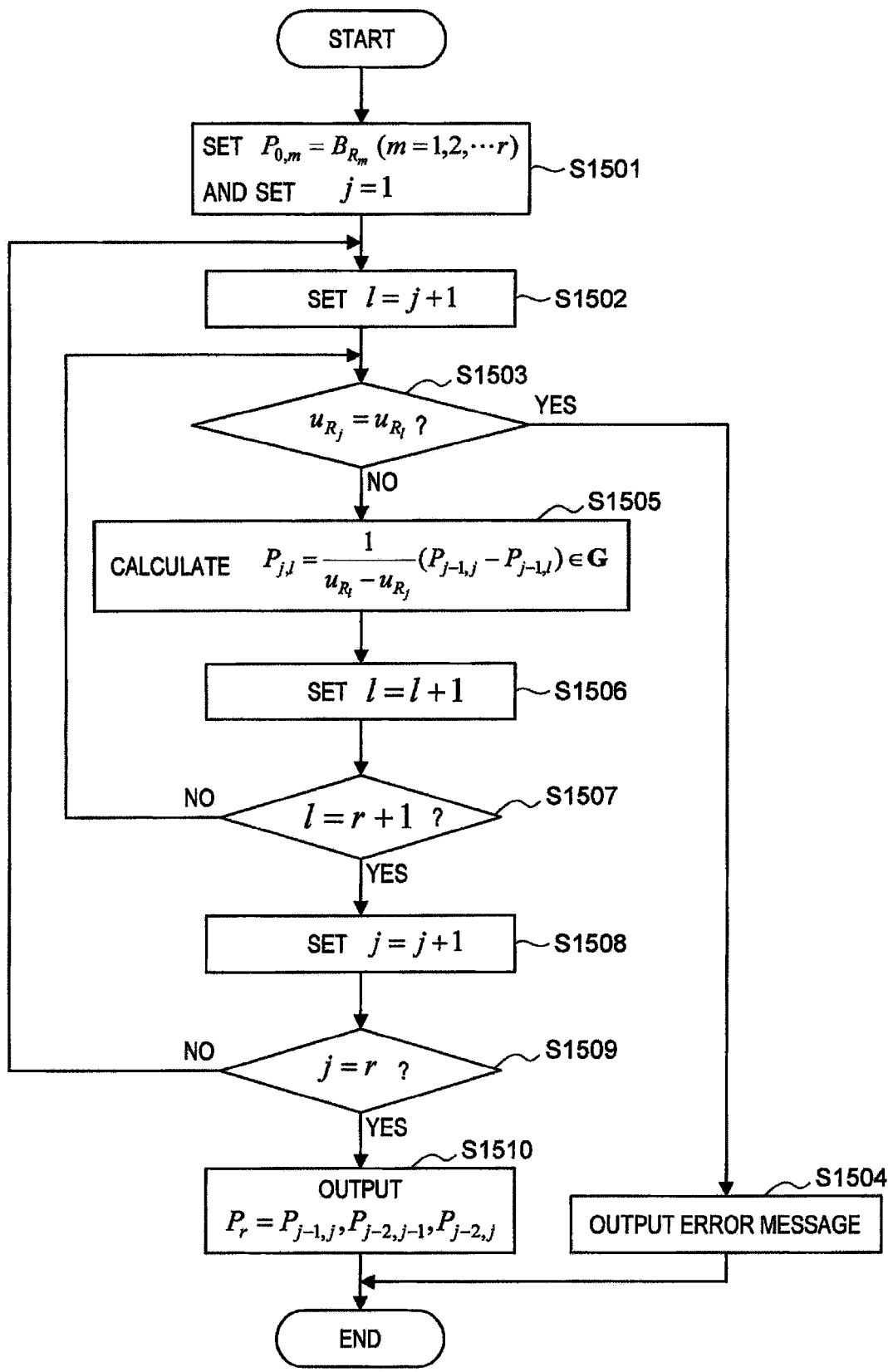
FIG. 34 is a flowchart illustrating an operation process of a bilinear group according to the same modification.

A distributor who distributes a plain text, such as contents, operates the encrypting device 30 that is possessed by the distributor, and generates a cipher text and a header in accordance with the following sequence. Hereinafter, the operation of the encrypting device 30 according to this modification will be described in detail with reference to FIGS. 33 and 34. FIG. 33 is a flowchart illustrating an encryption process that is executed by the encrypting device 30 according to this modification. FIG. 34 is a flowchart illustrating an operation process of a bilinear group that is executed by the encrypting device 30 according to this modification.

The encryption' process is a process that is executed whenever an arbitrary transmitter who desires to distribute contents performs a distribution using the encrypting device 30.

The transmitter inputs a public key $ek_i$ and a set of revoked users $R=\{u_{R1} \ldots u_{Rr}\}$ to the encrypting device 30 according to this modification and executes the encryption' process, which will be described below, thereby executing an encryption process on a plain text, such as contents, which the transmitter desires to distribute. The set R that is input by the user is converted into digital data that can be utilized by the encrypting device 30 by means of the revoked receiving device specifying unit 1303 of the encrypting device 30, and used in the encryption' process.

First, the revoked receiving device specifying unit 1303 of the encrypting device 30 counts the number of elements of R, sets a count result as r (Step S1401), and outputs the count result r to the session key determining unit 1307. Next, the session key calculating unit 1309 of the encrypting device 30 selects $k \in Z_P^*$ (Step S1402).

Next, the session key calculating unit 1309 of the encrypting device 30 executes a determination process on the number r of revoked users (Step S1403). In the case of r=0 (that is, in the case where there is no revoked user), the session key calculating unit 1309 executes Step S1404, which will be described below. In addition, in the case of r=1 (that is, in the case where only one revoked user exists), the session key calculating unit 1309 executes Step S1405, which will be described below. In addition, in the case of r≧2 (that is, in the case where two or more revoked users exist), the session key calculating unit 1309 executes Step S1406, which will be described below.

In the case where there is no revoked user, the session key calculating unit 1309 determines $P_r$ and $K'$ on the basis of the following Equations 351 and 352 (Step S1404), and then executes Step S1409.

$$P_r = H \in G \qquad \text{[Equation 351]}$$

$$K' = V \in G_1 \qquad \text{[Equation 352]}$$

In addition, in the case where one revoked user exists, the session key calculating unit 1309 determines $P_r$ and $K'$ on the basis of the following Equations 353 and 354 (Step S1405), and then executes Step S1409.

$$P_r = B_{R_1} = \frac{1}{\gamma + u_{R_1}} H \in G \qquad \text{[Equation 353]}$$

$$K' = V_{R_1} \in G_1 \qquad \text{[Equation 354]}$$

In addition, in the case where two or more revoked users exist, the session key calculating unit 1309 requests the bilinear mapping operation unit 1313 to execute an operation process (Aggregate (C) algorithm) of a bilinear group on G and calculate values shown in the following Equations 353 to 357. The bilinear mapping operation unit 1313 executes the Aggregate (C) algorithm and outputs the values of Equations 355 to 357 to the session key calculating unit 1309 (Step S1406). In addition, the Aggregate (C) algorithm that is an operation process algorithm of a bilinear group will be described in detail below.

$$P_l(l=1, \ldots, r) = \frac{1}{(\gamma + u_{R_1}) \ldots (\gamma + u_{R_l})} H \in G \qquad \text{[Equation 355]}$$

$$P_{r-2,r-1} = \frac{1}{(\gamma + u_{R_1}) \ldots (\gamma + u_{R_{r-2}})(\gamma + u_{R_{r-1}})} H \in G \qquad \text{[Equation 356]}$$

$$P_{r-2,r} = \frac{1}{(\gamma + u_{R_1}) \ldots (\gamma + u_{R-2})(\gamma + u_{R_r})} H \in G \qquad \text{[Equation 357]}$$

In this case, Equations 356 and 357 are values that are calculated as intermediate calculation values when Equation 355 ($P_r$) is derived. In the method according to the related art, the values of Equations 356 and 357 are not output as the calculation values. In the encryption process according to this modification, as described in detail below, if the calculation values of Equations 356 and 357 are effectively used, it may be possible to reduce a calculation amount needed when the encryption process is executed, that is, a calculation time or a cost of an apparatus required for calculation.

For example, in the case of r=3, the bilinear mapping operation unit 1313 executes the above-described Aggregate (C) algorithm and outputs three values of $P_{1,2}$, $P_{1,3}$, and $P_{2,3}$ as an operation result to the session key calculating unit 1309.

In the case of $j = 1$, $$P_{1,2} = \frac{1}{u_{R_2} - u_{R_1}}(P_{0,1} - P_{0,2})$$

$$= \frac{1}{u_{R_2} - r_{R_1}}\left(\frac{1}{\gamma + u_{R_1}} - \frac{1}{\gamma + u_{R_2}}\right)H$$

$$= \left(\frac{1}{(\gamma + u_{R_1})(\gamma + u_{R_2})}\right)H$$

-continued $$P_{1,3} = \frac{1}{u_{R_3} - u_{R_1}}(P_{0,1} - P_{0,3})$$

$$= \frac{1}{u_{R_3} - u_{R_1}}\left(\frac{1}{\gamma + u_{R_1}} - \frac{1}{\gamma + u_{R_3}}\right)H$$

$$= \left(\frac{1}{(\gamma + u_{R_1})(\gamma + u_{R_3})}\right)H$$

In the case of $j = 2$, $$P_{2,3} = \frac{1}{u_{R_3} - u_{R_2}}(P_{1,2} - P_{1,3})$$

$$= \frac{1}{u_{R_3} - u_{R_2}}\left(\frac{1}{(\gamma + u_{R_1})(\gamma + u_{R_2})} - \frac{1}{(\gamma + u_{R_1})(\gamma + u_{R_3})}\right)H$$

$$= \left(\frac{1}{(\gamma + u_{R_1})(\gamma + u_{R_2})(\gamma + u_{R_3})}\right)H$$

Next, the session key calculating unit 1309 uses the operation result output from the bilinear mapping operation unit 1313 to calculate a value of the following Equation 358 (Step S1407).

$$\gamma P_r = \frac{1}{2}(P_{r-2,r-1} + P_{r-2,r} - (u_{R_{r-1}} + u_{R_r})P_r) \quad \text{[Equation 358]}$$

If Equation 358 is developed, it becomes the following Equation 359. The session key calculating unit 1309 according to this modification calculates $_\gamma P_r$, and does not need to execute an Aggregate (C) algorithm on $G_1$, thereby reducing the number of times of executing the Aggregate (C) algorithm to one.

$$\gamma P_r = \frac{1}{2}(P_{r-2,r-1} + P_{r-2,r} - (u_{R_{r-1}} + u_{R_1})P_r) \quad \text{[Equation 359]}$$

$$= \frac{1}{2}\left(\frac{1}{(\gamma + u_{R_1}) \ldots (\gamma + u_{R_{r-2}})}\left(\frac{1}{\gamma + u_{R_{r-1}}} + \frac{1}{\gamma + u_{R_r}}\right)H - (u_{R_{r-1}} + u_{R_r})P_r\right)$$

$$= \frac{1}{2}\left(\frac{1}{(\gamma + u_{R_1}) \ldots (\gamma + u_{R_{r-2}})} \cdot \frac{\gamma + u_{R_r} + \gamma + u_{R_{r-1}}}{(\gamma + u_{R_{r-1}})(\gamma + u_{R_r})}H - (u_{R_{r-1}} + u_{R_r})P_r\right)$$

$$= \frac{1}{2}\left(\frac{2\gamma + u_{R_r} + u_{R_{r-1}} - (u_{R_{r-1}} + u_{R_r})}{(\gamma + u_{R_1}) \ldots (\gamma + u_{R_r})}\right)H$$

$$= \frac{\gamma}{(\gamma + u_{R_1}) \ldots (\gamma + u_{R_r})}H$$

Next, the session key calculating unit 1309 uses the operation result from the bilinear mapping operation unit 1313 and the value of Equation 359, thereby calculating a value shown in the following Equation 360 (Step S1408).

$$K' = e\left(\frac{1}{u_j}A_j, \gamma P_r + u_j P_r\right) \in G_1 \quad \text{[Equation 360]}$$

$$= e\left(\frac{1}{\gamma + u_j}G, \frac{\gamma + u_j}{(\gamma + u_{R_1}) \ldots (\gamma + u_{R_r})}H\right)$$

$$= e(G, H)^{\frac{1}{(\gamma + u_{R_1}) \ldots (\gamma + u_{R_r})}}$$

With respect to each of the cases, if calculations of $P_r$ and K' are completed, the header calculating unit 1307 calculates the header hdr on the basis of the following Equation 361 (Step S1409).

$$hdr = (C_1, C_2, (u_{R_1}, P_1), \ldots (u_{R_r}, P_r)) \quad \text{[Equation 361]}$$

$$= (kW, kP_r, (u_{R_1}, P_1), \ldots (u_{R_r}, P_r))$$

Next, the session key calculating unit 1309 calculates the session key K on the basis of the following Equation 362, and outputs the session key K together with the header hdr, K', and k (Step S1410).

$$K = (K')^k \in G_1 \quad \text{[Equation 362]}$$

The encrypting unit 1315 of the encrypting device generates a cipher text $C = E_K(M)$ using a session key K of a plain text M, and transmits the cipher text to the transmitter authentication information generating unit 1321. In addition, the cipher text transmitting unit 1317 broadcasts and distributes the generated (hdr, C) and transmitter authentication information, which will be described below. If this process is executed, the transmitter can transmit the encrypted contents to a desired user.

In addition to the above process, the encryption of the plain text M or the encryption and broadcasting and distributing may be executed by the encryption' process. The transmitter may execute Step S1401 and input the executed result to the encrypting device 30 that executes the encryption' process.

(Operation Process of a Bilinear Group-Aggregate (C) Algorithm)

Next, the Aggregate (C) algorithm that is an operation process of a bilinear group that is executed during the encryption' process will be described in detail with reference to FIG. 34.

The Aggregate (C) algorithm is an algorithm that is executed when the bilinear mapping operation unit 1313 of the encrypting device 30 calculates $(P_1 \ldots P_r) \in G$.

First, the bilinear mapping operation unit 1313 of the encrypting device 30 sets the conditions $P_{0,m} = B_{Rm}$ (m = 1, . . . , r) and j=1 (Step S1501). Next, the bilinear mapping operation unit 1313 sets the condition l=j+1 (Step S1502).

In this case, the bilinear mapping operation unit 1313 compares $u_{Rj}$ and $u_{R1}$ (Step S1503). If the condition $u_{Rj} = u_{R1}$ is satisfied, the bilinear mapping operation unit 1313 outputs an error message (Step S1504), and completes the process. If the condition $u_{Rj} = u_{R1}$ is not satisfied, the bilinear mapping operation unit 1313 executes the following Step S1505.

Next, the bilinear mapping operation unit 1313 uses the following Equation 363 to calculate $P_{j,1}$ (Step S505).

$$P_{j,J} = \frac{1}{u_{R_1} - u_{R_j}}(P_{j-1,j} - P_{j-1,l}) \in G \quad \text{[Equation 363]}$$

If the calculation of Equation 363 is completed, the bilinear mapping operation unit 1313 substitutes l+1 for l (Step S1506), and compares l and r+1 (Step S1507). If the condition l=r+1 is satisfied, the bilinear mapping operation unit 1313 executes Step S1508, and if l is not equal to r+1, the bilinear mapping operation unit 1313 returns to Step S1503 and continuously executes the process.

Next, the bilinear mapping operation unit 1313 substitutes j+1 for j (Step S1508), and compares j and r (Step S1509). If the condition j=r is satisfied, the bilinear mapping operation unit 1313 executes Step S1510, and if j is not equal to r, the bilinear mapping operation unit 1313 returns to Step S1502 and continuously executes the process.

Then, the bilinear mapping operation unit 1313 outputs the conditions $Pr=P_{j-1,j}$, $P_{j-2,j-1}$, and $P_{j-2,j}$ to the session key calculating unit 1309 (Step S1510).

In order to show an effect of the encryption process according to this modification, the compared result of the calculation amounts at the time of the encryption processes in both the method according to the related art and the method according to this modification is shown in FIG. 35. As shown in FIG. 35, according to the compared result between the method according to this modification and the method according to the related art, the number of times of executing the bilinear mapping operation is increased by one, the number of times of executing each operation on G, that is, addition and multiplication on an elliptic curve is increased by three and four, respectively, and the number of times of executing an inverse element operation on $Z_P^*$ is increased by two. However, each of multiplication, a power, and an inverse element operation on $G_1$, that is, a group having the largest bit size is decreased by $(r^2-r)/2$. In order to compare the calculation amounts at the time of the encryption processes in the method according to the related art and the method according to this modification, first, the operation amount that is needed to execute each operation of FIG. 35 is defined as follows. At this time, according to the compared result between the method according to the related art and the method according to this modification, it can be seen from FIG. 35 that an increment of the calculation amount at the time of the encryption process in the method according to this modification is as represented by the following Equation 364. Meanwhile, a decrement thereof is as represented by the following Equation 365. Accordingly, when r satisfies the following Equation 366, it can be seen that the calculation amount at the time of the encryption process can be reduced in the method according to this modification.

$$3A + 4S + 2inv + P \quad \text{[Equation 364]}$$

$$\frac{r^2-r}{2}(M+E+I) \quad \text{[Equation 365]}$$

$$3A + 4S + 2inv + P \leq \frac{r^2-r}{2}(M+E+I) \quad \text{[Equation 366]}$$

The meanings of the symbols in FIG. 35 and Equations 364 to 366 are as follows.

A: addition of a point on an elliptic curve in G
D: doubling of a point on an elliptic curve in G
S: scalar multiplication of a point on an elliptic curve in G
M: multiplication in $G_1$
Q: squaring in $G_1$
E: power in $G_1$
I: Inverse element operation in $G_1$
mul: multiplication in $Z_P^*$
sqr: squaring in $Z_P^*$
inv: inverse element operation in $Z_P^*$
P: bilinear mapping operation A numerical value example is used to derive r that satisfies Equation 366. In the description below, the case where 128-bit equivalent safety is satisfied is considered. At this time, a bit size of p becomes 256 bits and an original bit size of $G_1$ becomes 3072 bits. Hereinafter, on the basis of the multiplication mul on $Z_P^*$, a specific numerical example is shown. In both the method according to the related art and the method according to this modification, an operation of a point on an elliptic curve in G, various operations on $G_1$ and $Z_P^*$, and a bilinear mapping operation are used. In these operations, since various operation methods exist, operation estimations that are shown in Document 2 are used herein.

In Document 2, with respect to an operation on $Z_P^*$, a relationship of the following Equation 367 is applied. In addition, by $3072/256=12=2^2\times3$, with respect to the operation on $G_1$, the following Equation 368 is obtained. In addition, in regards to an operation of a point on an elliptic curve, the following Equation 369 is obtained using a projective coordinate system. In this case, since the scalar multiplication S is calculated by repeatedly executing doubling and addition, an average calculation amount can be estimated by executing doubling $\log_2 p$, which corresponds to a bit length of a coefficient of a point, times, and executing addition $(½)\log_2 p$ times. Accordingly, the scalar multiplication S can be estimated as represented by the following Equation 370. In addition, in a power E on $G_1$, a bit size of an exponential part is $\log_2 p$ by the order p and the power E is calculated by repeatedly executing doubling and multiplication. Accordingly, similar to the scalar multiplication, the power can be estimated. The power can be estimated as represented by the following Equation 371.

In regards to the bilinear mapping operation P, since the bilinear mapping operation includes an operation using a Miller's algorithm and a power residue operation called a final power, if $C_{Full}$ is defined as a calculation amount of the Miller's algorithm that varies by an elliptic curve parameter, the bilinear mapping operation P can be estimated as $C_{Full}$+ 3E. In this case, 3E is a cost of a final power with respect to a currently assumed parameter. As described in Document 2, if an average value of an Ate pairing operation in the projective coordinate system is defined as $C_{Lite}$, the bilinear mapping operation P becomes the following Equation 372.

$$sqr \cong mul, \; inv = 10 \; mul \quad \text{[Equation 367]}$$

$$M = 45 \; mul, \quad \text{[Equation 368]}$$
$$Q \cong M,$$
$$I = 152 \; mul$$

$$A = 12 \; mul + 2sqr \cong 14 \; mul, \quad \text{[Equation 369]}$$
$$D = 7 \; mul + 5sqr \cong 12 \; mul$$

$$S = \{\log_2 P\}D + \frac{1}{2}\{\log_2 P\}A \quad \text{[Equation 370]}$$
$$= 256D + 128A$$
$$= (256 \times 12 + 128 \times 14) \; mul$$
$$= 4864 \; mul$$

$$E = 256Q + 128M \quad \text{[Equation 371]}$$
$$\cong (256 + 128) \times 45 \; mul$$
$$= 17280 \; mul$$

$$P = (16256 + 3 \times 17280) \; mul \quad \text{[Equation 372]}$$
$$= 68096 \; mul$$

Figure 36:
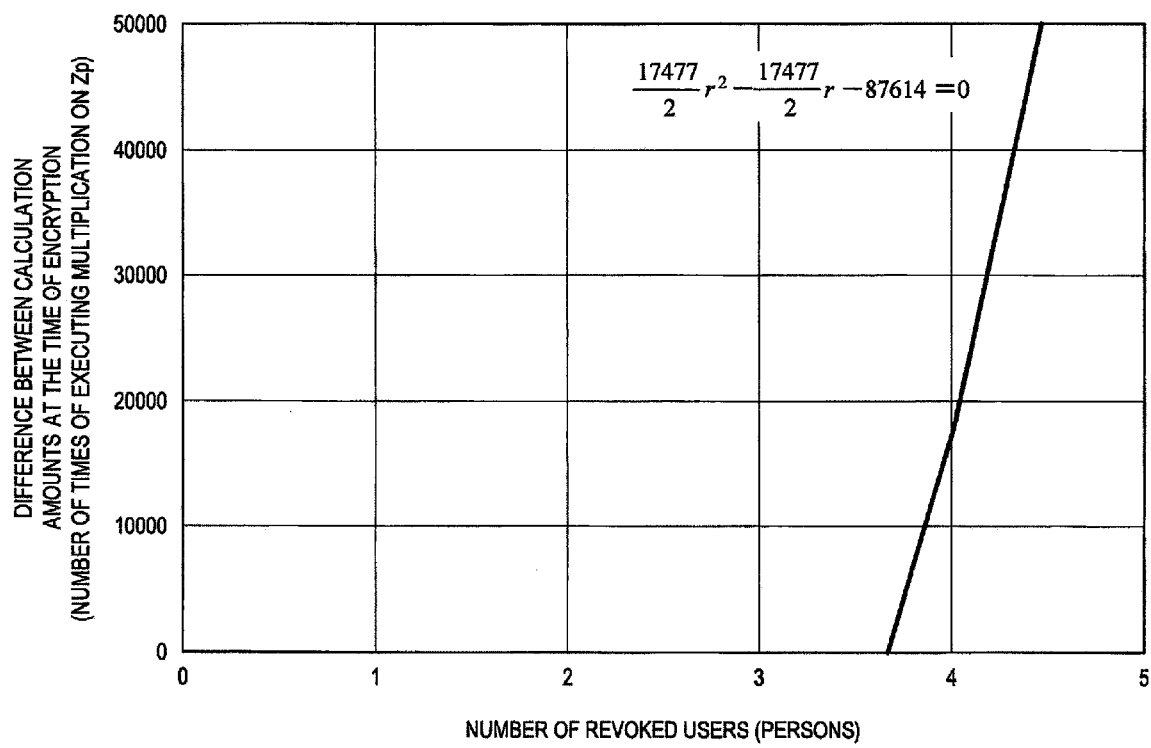
FIG. 36 is a graph illustrating a result that is obtained by comparing calculation amounts at the time of an encryption process.

If using Equations 367 to 372, Equation 366 can be converted into the following Equation 373. Equation 373 is as shown in FIG. 36.

$$3A + 4S + 2inv + P \le \frac{r^2 - r}{2}(M + E + I) \Rightarrow \quad \text{[Equation 373]}$$

$$(3 \times 14 + 4 \times 4864 + 2 \times 10 + 68096)$$

$$mul \le \frac{r^2 - r}{2}(45 + 17280 + 152)mul \Leftrightarrow$$

$$\frac{17477}{2}r^2 - \frac{17477}{2}r - 87614 \ge 0$$

As seen from FIG. 36, in the case where the above-described parameter setting process is executed, when the number of revoked users becomes 4 or more, it can be seen that an operation can be efficiently performed in the method according to this modification.

As described above, in the method according to this modification, multiplication, a power, and an inverse element operation on a cyclic group where a bit length is long, which are needed when executing the encryption process in the method according to the related art, are removed, and a one-time bilinear mapping operation (pairing) and an operation of a point on an elliptic curve are added. As a result, when a user, that is, an entity (an operation subject, such as a person, a device, and a server) holding a secret key executes an encryption process, as r increases, a calculation amount that is needed when the encryption process is executed, that is, a calculation time or a cost of an apparatus required for calculation can be reduced.

(Fourth Embodiment)

Next, a cipher key distribution system according to a fourth embodiment of the present invention will be described in detail with reference to FIGS. 37 to 46. Since a cipher key distribution system 10 according to the embodiment has the same configuration as the cipher key distribution system according to the third embodiment of the present invention, the detailed description thereof will not be repeated.

The cipher key distribution system according to the embodiment changes the setup" process, the join process, the encryption process, and the Aggregation (A) algorithm used in the encryption process according to the third embodiment of the present invention to a setup' process, a join' process, an encryption" process, and an Aggregate (C) algorithm according to a first modification of the third embodiment, which will be described below, and changes the sign process and the verification process according to the third embodiment of the present invention to a Sign' process and a verification' process, which will be described below. Accordingly, the decryption process and the Aggregate algorithm (B) algorithm used in the decryption process are the same as those according to the third embodiment of the present invention.

In addition, since the hardware configuration of the key generating device 20, the encrypting device 30, and the receiving device 40 according to the embodiment is the same as the hardware configuration of the key generating device 20, the encrypting device 30, and the receiving device 40 according to the third embodiment of the present invention, the detailed description thereof will not be repeated.

<With Respect to a Key Generating Device 20 According to this Embodiment>

Figure 37:
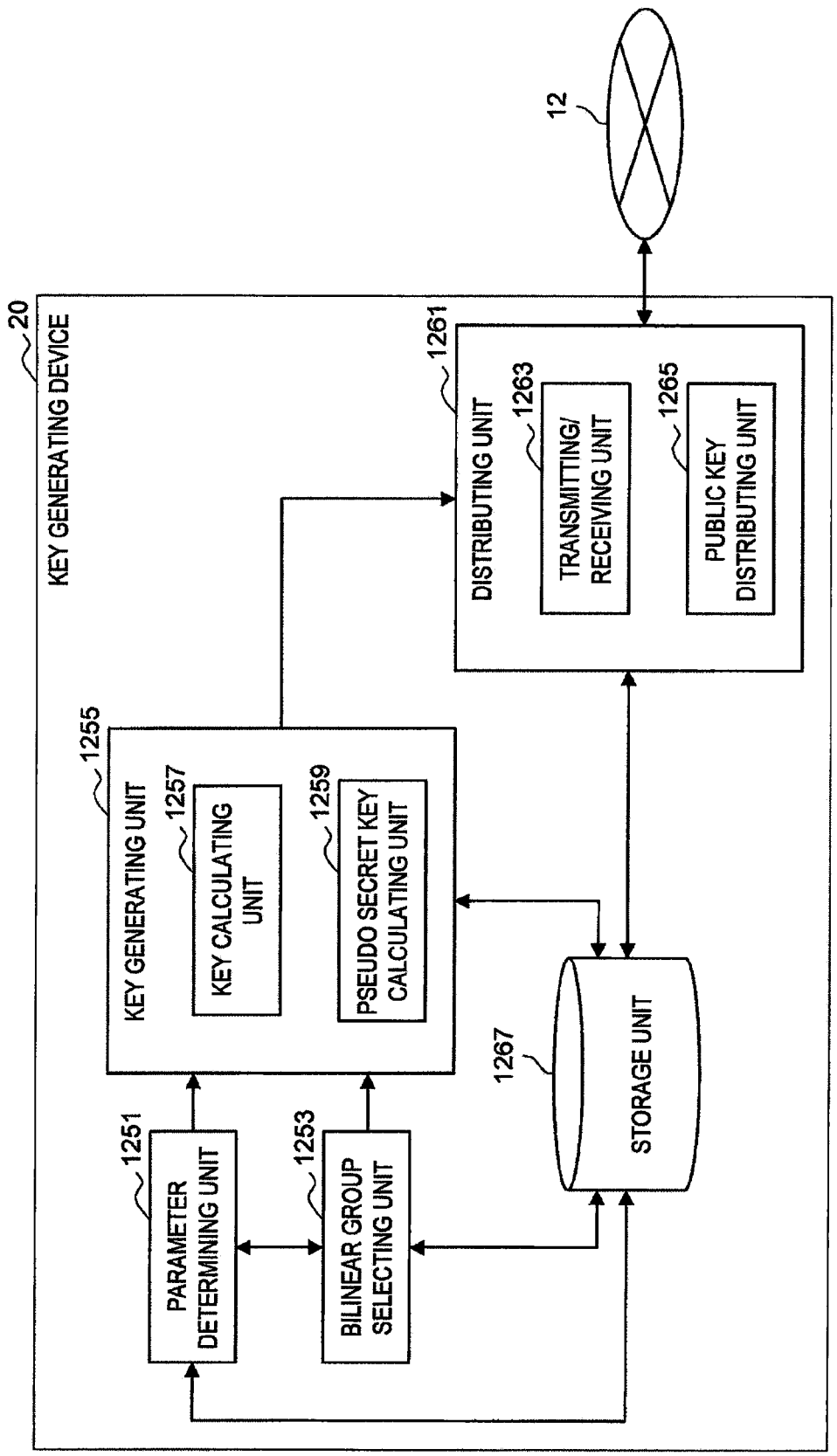
FIG. 37 is a block diagram illustrating the configuration of a key generating device according to a fourth embodiment of the present invention.

First, the key generating device 20 according to the embodiment will be described in detail with reference to FIG. 37. FIG. 37 is a block diagram illustrating the configuration of the key generating device 20 according to this embodiment.

The key generating device 20 according to the embodiment mainly includes a parameter determining unit 1251, a bilinear group selecting unit 1253, a key generating unit 1255, a distributing unit 1261, and a storage unit 1267, as shown in FIG. 37.

In this case, since the parameter determining unit 1251, the bilinear group selecting unit 1253, and the storage unit 1267 according to the embodiment have almost the same configuration as the parameter determining unit 1251, the bilinear group selecting unit 1253, and the storage unit 1267 according to the third embodiment of the present invention and achieve the same effect as that of the third embodiment, the detailed description thereof will not be repeated.

The key generating unit 1255 uses various types of data transmitted from the parameter determining unit 1251 and the bilinear group selecting unit 1253, and generates keys, such as a public key, a secret key distributed to each user, a master key, and a pseudo secret key, and public information corresponding to each user. The key generating unit 1255 further includes a key calculating unit 1257 and a pseudo secret key calculating unit 1259.

The key generating unit 1255 uses various types of data transmitted from the parameter determining unit 1251 and the bilinear group selecting unit 1253, and generates keys, such as a public key, a secret key and a master key distributed to each user, and public information corresponding to each user. The generated keys and public information are recorded in the storage unit that is composed of an HDD or a memory including a secure module. In addition, information that is needed to be opened and distributed keys are transmitted to the distributing unit 1261, which will be described below.

The pseudo secret key calculating unit 1259 uses various types of data transmitted from the parameter determining unit 1251 and the bilinear group selecting unit 1253, and generates a pseudo secret key $dk_0$. The generated pseudo secret key is transmitted to the distributing unit 1261, which will be described below, and stored in the storage unit that is composed of an HDD or a memory including a secure module.

The distributing unit 1261 distributes the public key, the secret key, and the pseudo secret key that are generated by the key generating device 20 and information that needs to be opened, through the communication network 12. This distributing unit 1261 further includes a transmitting/receiving unit 1263 and a public key distributing unit 1265.

The transmitting/receiving unit 1263 transmits a secret key generated by the key generating unit 1255 to an individual user through a secure communication path and receives a system joining request transmitted from the receiving device 40. The received system joining request is transmitted to the key generating unit 1255, and a new secret key or public key is generated by the key generating unit 1255.

The public key distributing unit 1265 distributes the public key, the pseudo secret key, and the public information that are generated by the key generating unit 1255 to the encrypting device 30 or the receiving device 40 through the communication network 12. The encrypting device 30 or the receiving device 40 uses the public key, the pseudo secret key, and the public information to execute an encryption process of a plain text or a decryption process of a cipher text.

<With Respect to an Encrypting Device 30 According to this Embodiment>

Figure 38:
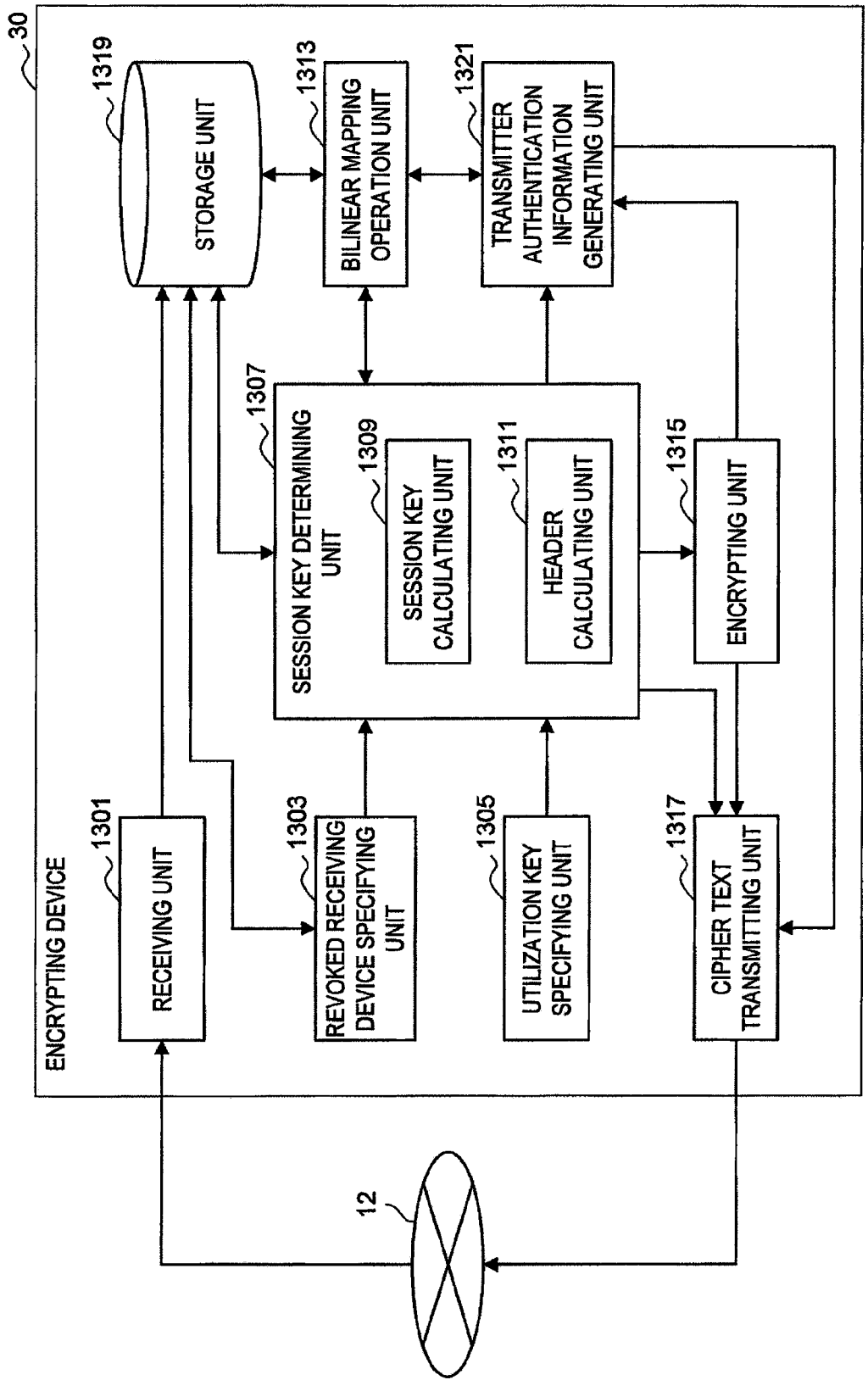
FIG. 38 is a block diagram illustrating the configuration of an encrypting device according to the embodiment.

Next, the encrypting device 30 according to the embodiment will be described in detail with reference to FIG. 38. FIG. 38 is a block diagram illustrating the configuration of the encrypting device 30 according to this embodiment.

For example, as shown in FIG. 38, the encrypting device 30 according to the embodiment mainly includes a receiving unit 1301, a revoked receiving device specifying unit 1303, a utilization key specifying unit 1305, a session key determining unit 1307, a bilinear mapping operation unit 1313, an encrypting unit 1315, a cipher text transmitting unit 1317, a storage unit 1319, and a transmitter authentication information generating unit 1321.

In this case, the receiving unit 1301, the revoked receiving device specifying unit 1303, the bilinear mapping operation unit 1313, the encrypting unit 1315, the cipher text transmitting unit 1317, and the storage unit 1319 according to the embodiment have almost the same configuration as the receiving unit 1301, the revoked receiving device specifying unit 1303, the bilinear mapping operation unit 1313, the encrypting unit 1315, the cipher text transmitting unit 1317, and the storage unit 1319 according to the third embodiment of the present invention and achieve the same effect as that of the third embodiment, and thus the detailed description thereof will not be repeated.

The utilization key specifying unit 1305 refers to the storage unit 1319 to determine whether a personal secret key is provided to the encrypting device 30. When it is determined that the personal secret key is recorded in the storage unit 1319, the utilization key specifying unit 1305 outputs a message indicating that the personal secret key exists to the session key determining unit 1307, which will be described below. Meanwhile, when it is determined that the personal secret key is not recorded in the storage unit 1319, the utilization key specifying unit 1305 outputs a message indicating that the personal secret key does not exist and only the pseudo secret key exists to the session key determining unit 1307. In addition, the utilization key specifying unit 1305 may record the determination result in the storage unit 1319, such that the following determination process may be omitted.

The session key determining unit 1307 determines a session key that is used to encrypt a plain text, such as distributed contents, on the basis of the public key, the personal secret key, and the public information, which are received by the receiving unit 1301 and recorded in the storage unit 1319, the set R that is determined by the revoked receiving device specifying unit 1303, and the determination result output from the utilization key specifying unit 1305. The session key determining unit 1307 further includes a session key calculating unit 1309 and a header calculating unit 1311.

The session key calculating unit 1309 calculates a session key that is used to encrypt a plain text, such as distributed contents, on the basis of the public key and public information obtained from the storage unit 1319, the set R of revoked receiving devices transmitted from the revoked receiving device specifying unit 1303, and the determination result output from the utilization key specifying unit 1305. The session key that is calculated by the session key calculating unit 1309 is transmitted to the encrypting unit 1315 and used when the plain text is encrypted. In addition, the session key calculating unit 1309 may record the calculated session key in the storage unit 1319.

The header calculating unit 1311 uses various types of data calculated when the session key calculating unit 1309 calculates the session key and the public key or the public information recorded in the storage unit 1319, thereby generating a header that is distributed to the receiving device 40 together with the cipher text. The generated header is transmitted to the cipher text transmitting unit 1317. In addition, the header calculating unit 1311 may record the generated header information in the storage unit 1319.

The transmitter authentication information generating unit 1321 uses the session key transmitted from the session key calculating unit 1309 and the parameter used for calculation, the header transmitted from the header calculating unit 1311, the cipher text, the public key, and the public information transmitted from the encrypting unit 1315, and the secret key and the unique value of the encrypting device, thereby generating transmitter authentication information. The transmitter authentication information is information that is used when the receiver determines whether the transmitted cipher text and header are tampered and verifies the validity of the transmitter, in the receiving device. When the transmitter authentication information is generated, the transmitter authentication information generating unit 1321 may use the bilinear mapping operation unit 1313. The generated transmitter authentication information is transmitted to the cipher text transmitting unit 1317, and broadcasted and distributed to each of the receiving devices together with the header and the cipher text. In addition, the transmitter authentication information generating unit 1321 may record the generated transmitter authentication information in the storage unit 1319.

<With Respect to a Receiving Device 40 According to this Embodiment>

Figure 39:
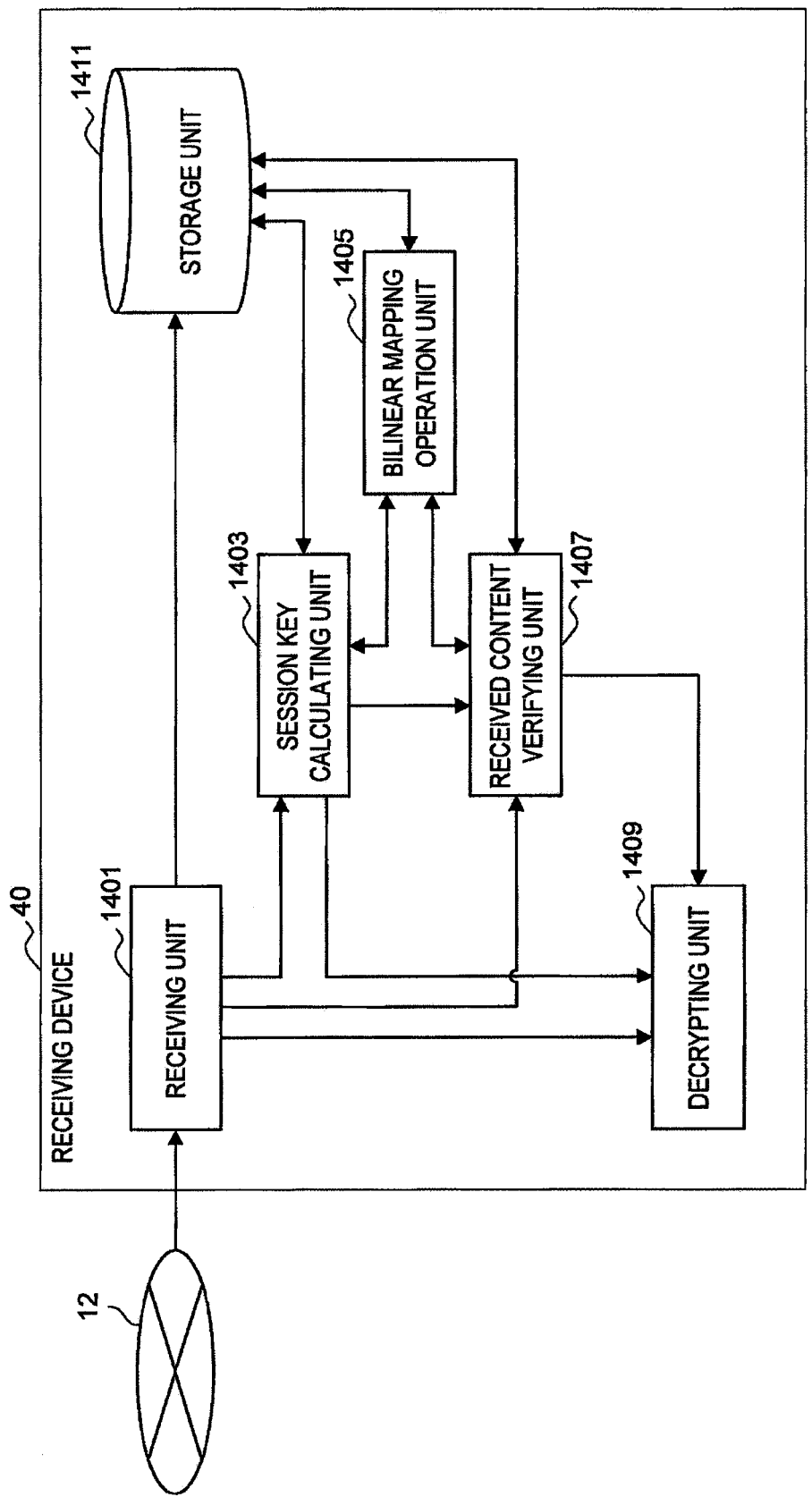
FIG. 39 is a block diagram illustrating the configuration of a receiving device according to the embodiment.

Next, the receiving device 40 according to the embodiment will be described in detail with reference to FIG. 39. FIG. 39 is a block diagram illustrating the configuration of the receiving device 40 according to this embodiment.

For example, as shown in FIG. 39, the receiving device 40 according to the embodiment mainly includes a receiving unit 1401, a session key calculating unit 1403, a bilinear mapping operation unit 1405, a received content verifying unit 1407, a decrypting unit 1409, and a storage unit 1411.

In this case, since the receiving unit 1401, the session key calculating unit 1403, the bilinear mapping operation unit 1405, the decrypting unit 1409, and the storage unit 1411 according to the embodiment have almost the same configuration as the receiving unit 1401, the session key calculating unit 1403, the bilinear mapping operation unit 1405, the decrypting unit 1409, and the storage unit 1411 according to the third embodiment of the present invention and achieve the same effect as that of the third embodiment, the detailed description thereof will not be repeated.

On the basis of the session key calculated by the session key calculating unit 1403 and the header, the cipher text, and the transmitter authentication information transmitted from the encrypting device 30, the received content verifying unit 1407 verifies validity of the transmitter and determines whether the received contents are tampered. When the verification process is executed, the received content verifying unit 1407 may use the bilinear mapping operation unit 1405. The received content verifying unit 1407 outputs the verification result to the decrypting unit 1409. In addition, the received content verifying unit 1407 may record the verification result in the storage unit 1411.

An example of a function of each of the key generating device 20, the encrypting device 30, and the receiving device 40 according to the embodiment has been described. Each of the constituent elements may be composed of a general-purpose member or a circuit or hardware that is specified to a function of each of the constituent elements. In addition, a function of each constituent element may be executed by the CPU. Accordingly, in accordance with a technology level when the embodiment is embodied, the configuration to be used may be appropriately changed.

<Operation of a Key Generating Device 20: a Setup' Process and a Join' Process>

Figure 40:
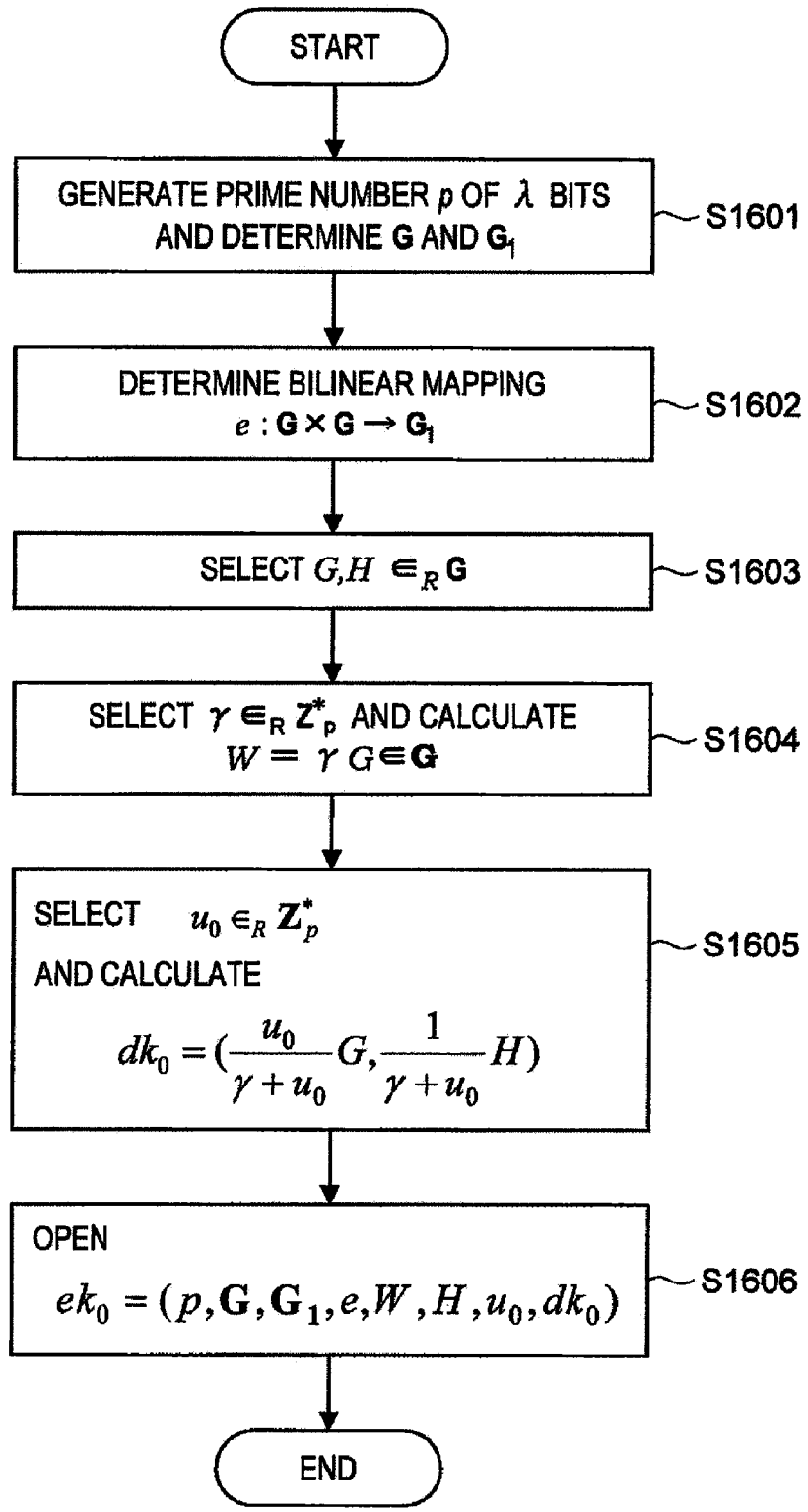
FIG. 40 is a flowchart illustrating a key generating process according to the embodiment.
Figure 41:
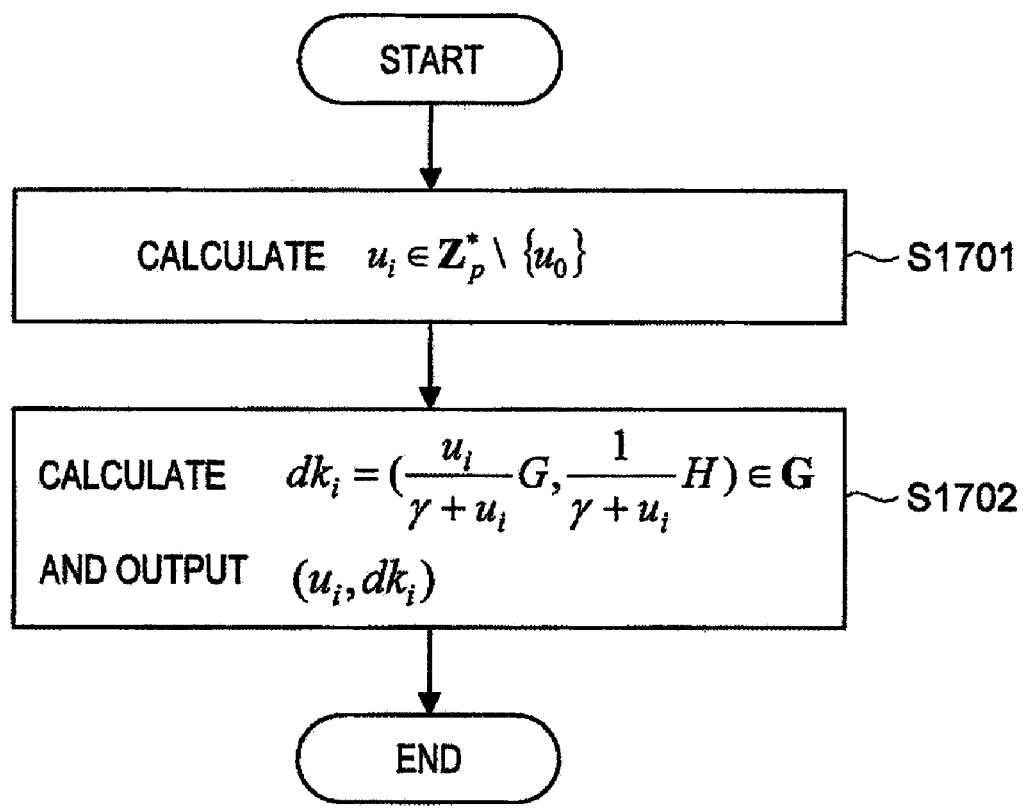
FIG. 41 is a flowchart illustrating a user registering process according to the embodiment.

The center operates the key generating device 20 that is possessed by the center, and generates the public key and the public information and a personal secret key corresponding to each user in accordance with the following sequence. Hereinafter, the operation (that is, the setup' process and the join' process) of the key generating device 20 according to the embodiment will be described in detail with reference to FIGS. 40 and 41. FIG. 40 is a flowchart illustrating a key generating process according to this embodiment, and FIG. 41 is a flowchart illustrating a user registering process according to this embodiment.

(Setup' Process in a Key Generating Device 20)

The setup' process is a key generating process that the center possessing the key generating device 20 according to the embodiment executes once when constructing the system. The center determines a security parameter λ, and the key generating device uses the input security parameter λ to execute the setup' process, which will be described below.

First, the parameter determining unit 1251 of the key generating device 20 generates a prime number p of λ bits. Next, the bilinear group selecting unit 1253 selects a bilinear mapping group G and a cyclic multiplicative group $G_1$ where p is used as an order (Step S1601).

Next, the bilinear group selecting unit 1253 of the key generating device 20 determines bilinear mapping e: G×G→$G_1$ (Step S1602).

Next, the parameter determining unit 1251 of the key generating device 20 selects G, H∈G (Step S1603).

Then, the parameter determining unit 1251 of the key generating device 20 selects $\gamma \in_R Z_P^*$ and calculates W=γG∈G (Step S1604). γ and G that are obtained by the above method are confidentially maintained as a master key mk=(γ, G) by only the center.

Next, the parameter determining unit 1251 of the key generating device 20 selects a value $u_0 \in_R Z_P^*$ that is not used as a user unique value and outputs the selected value to the pseudo secret key calculating unit 1259. The pseudo secret key calculating unit 1259 calculates $dk_0$ using the following Equation 401, on the basis of the transmitted $u_0$ (Step S1605).

$$dk_0 = (A_0, B_0) \in G \qquad \text{[Equation 401]}$$
$$= \left( \frac{u_0}{\gamma + u_0} G, \frac{1}{\gamma + u_0} H \right)$$

Next, the key calculating unit 1257 of the key generating device 20 uses the calculated data to configure an initial public key $ek_0$ as follows (Step S1606).

$$ek_0 = \{p, G, G_1, e, W, H, u_0, dk_0\} \qquad \text{[Equation 402]}$$

If the generation of the public key is completed, the distributing unit 1261 of the key generating device 20 opens the pseudo secret key $dk_0$ and the initial public key $ek_0$ obtained by executing the setup process as initial public keys of the entire system.

(Join' Process in a Key Generating Device 20)

The join' process is a user registering process that is executed by the center whenever the center receives a system joining request from the user. The join' process may be executed at any timing after the center completes a system setting process.

The center inputs the public key $ek_{i-1}$ (1≦i≦n), the master key mk, and i that is an index of an i-th joined user to the key generating device 20 and executes the join' process, which will be described below, thereby generating a secret key of a user who has transmitted the system joining request and executing a system joining process.

First, the key calculating unit 1257 of the key generating device 20 calculates $u_i \in Z_P^* \setminus \{u_0\}$ that is a unique value of a user i (Step S1701). Then, the key calculating unit 1257 executes the calculation that is shown in the following Equation 403 and calculates the secret key $dk_i$ of the user i who has transmitted the system joining request (Step S1702).

$$dk_i = (A_i, B_i) \in G \qquad \text{[Equation 403]}$$
$$= \left( \frac{u_i}{\gamma + u_i} G, \frac{1}{\gamma + u_i} H \right)$$

In this case, $B_i$ in Equation 403 is a portion of the secret key $dk_i$. However, $B_i$ is not secret information but public information, and the user i does not need to confidentially maintain $B_i$.

Next, the distributing unit 1261 of the key generating device 20 confidentially transmits the secret key $dk_i$ of the user i that is obtained by executing the join' process to the user i, through a secure communication path. The distributing unit 1261 adds public information ($u_i$, $B_i$) corresponding to the user i to the current public key $ek_{i-1}$, updates the current public key as a public key $ek_i$, and opens the public key. At this time, the new public key $ek_i$ forms the configuration shown by the following Equation 404.

$$ek_i = (p, G, G_1, e, W, H, u_0, dk_0, (u_1, B_1), \ldots (u_i, B_i)) \qquad \text{[Equation 404]}$$

The setup' process and the join' process that are executed by the key generating device 20 according to the embodiment have been described. Next, the encryption process (encryption" process) that is executed by the encrypting device 30 according to the embodiment will be described.

<Operation of an Encrypting Device 30: an Encryption" Process and a Sign Process>

Figure 42:
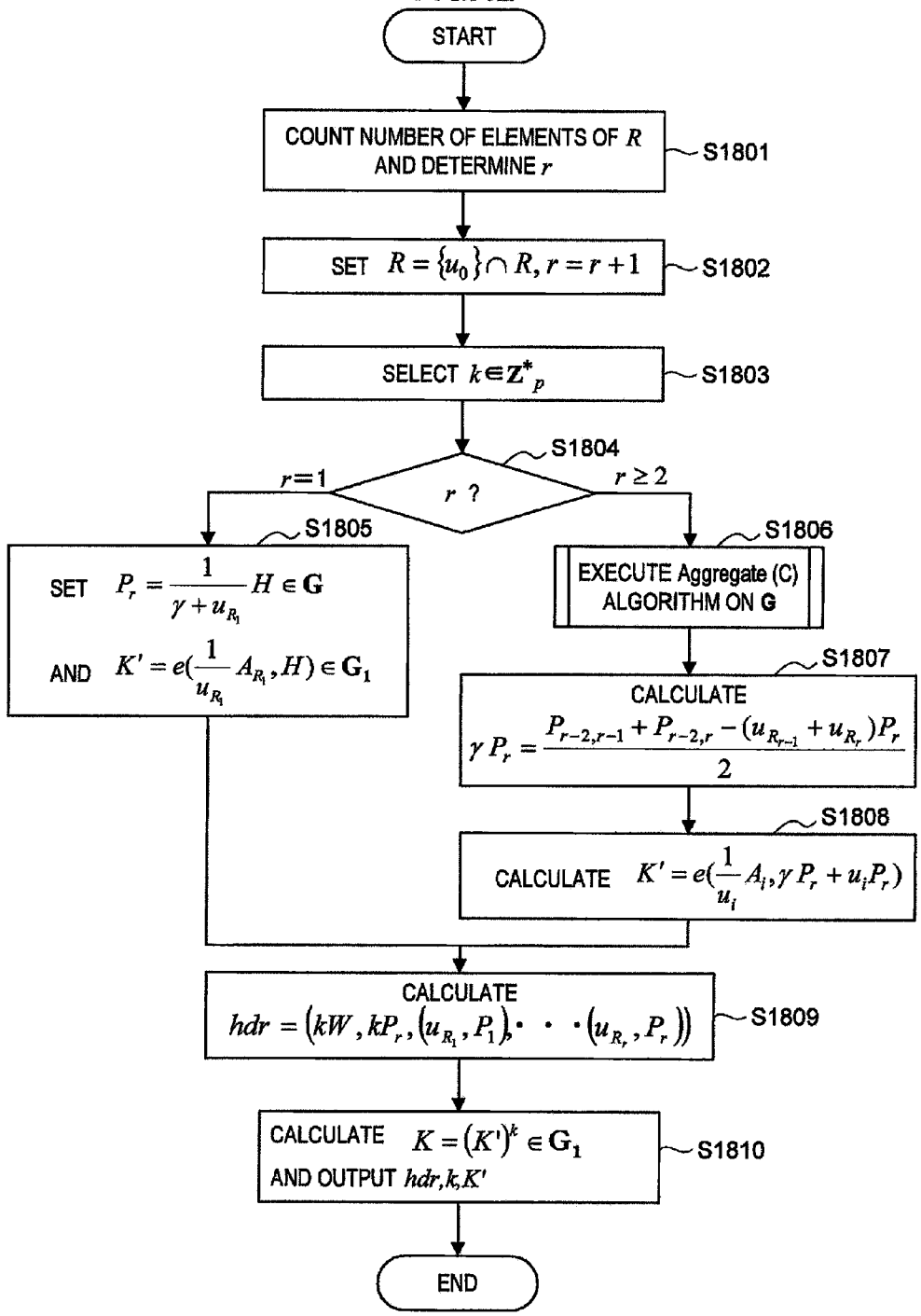
FIG. 42 is a flowchart illustrating an encryption process according to the embodiment.
Figure 43:
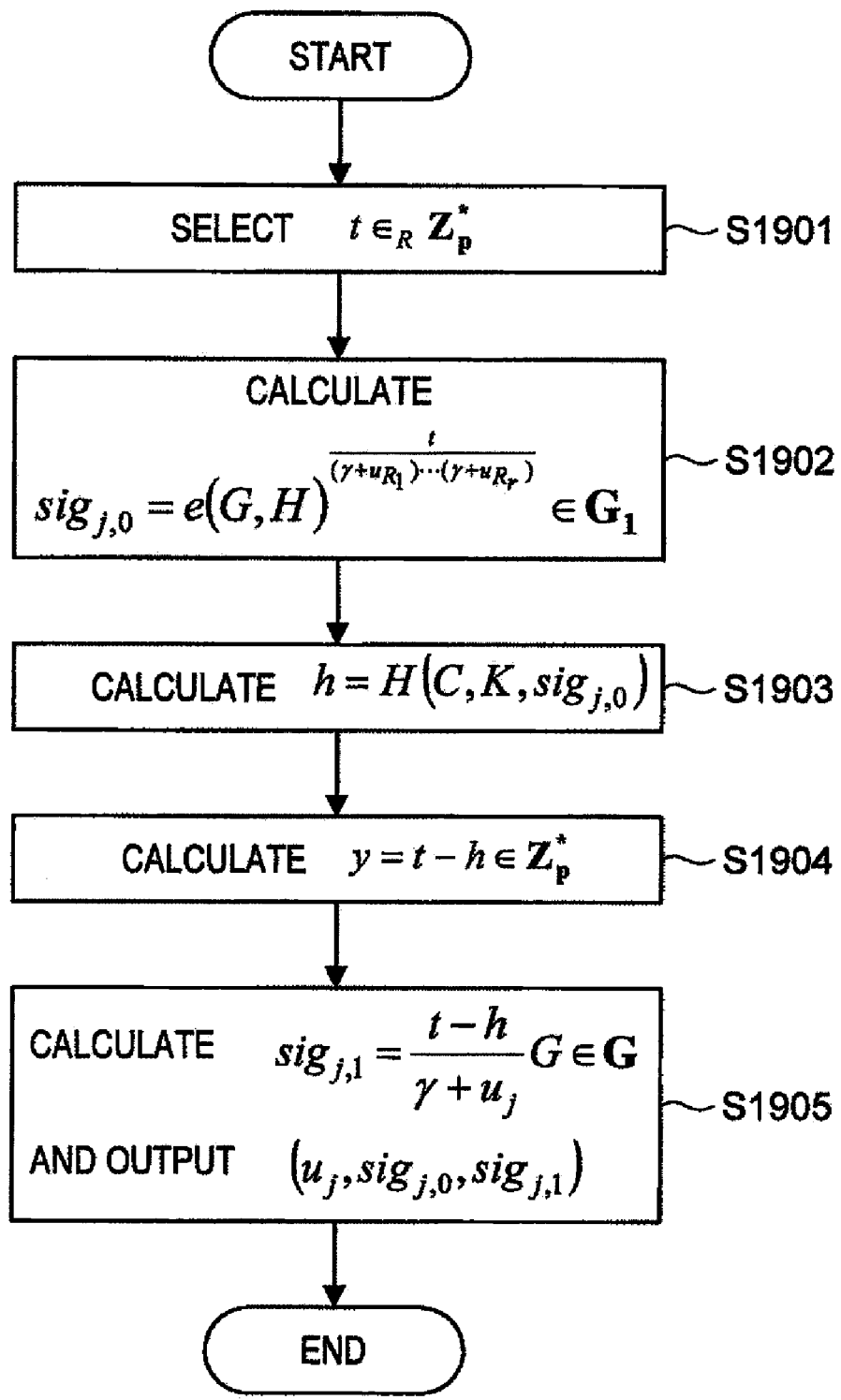
FIG. 43 is a flowchart illustrating a transmitter authentication information generating process according to the embodiment.

A distributor who distributes a plain text, such as contents, operates the encrypting device 30 that is possessed by the distributor, and generates a cipher text and a header in accordance with the following sequence. Hereinafter, an encryption" process of the encrypting device 30 according to the embodiment will be described in detail with reference to FIG. 42. FIG. 42 is a flowchart illustrating an encryption process that is executed by the encrypting device 30 according to this embodiment. In addition, the distributor operates the encrypting device 30 and generates transmitter authentication information, which is used when validity of the cipher text and the header generated in the receiving device 40 is verified and it is determined whether the cipher text and the header are tampered, in accordance with the following sequence. FIG. 43 is a flowchart illustrating a Sign' process that is executed when the encrypting device 30 according to the embodiment generates transmitter authentication information.

[Encryption" Process in an Encrypting Device 30]

The encryption" process is a process that is executed whenever an arbitrary transmitter who desires to distribute contents performs a distribution using the encrypting device 30.

The transmitter inputs the public key $ek_i$ and a set of revoked users R={$u_{R1} \ldots u_{Rr}$} to the encrypting device 30 according to the embodiment and executes the encryption" process, which will be described below, thereby executing an encryption process on a plain text, such as contents, that the transmitter desires to distribute. The set R that is input by the user is converted into digital data that can be used by the encrypting device 30 by means of the revoked receiving device specifying unit 1303 of the encrypting device 30 and used in the encryption" process.

In addition, the utilization key specifying unit 1305 of the encrypting device 30 determines whether the encrypting device 30 holds a personal secret key $dk_j$ and informs the session key determining unit 1307 of the determined result in advance. When receiving a message indicating that the personal secret key $dk_j$ exists from the utilization key specifying unit 1305, the session key determining unit 1307 uses $u_j$ as a unique value of the encrypting device 30 and a unique secret key $dk_j$ thereof during the process, which will be described below. Meanwhile, when receiving a message indicating that the personal secret key $dk_j$ does not exist from the utilization key specifying unit 1305, the session key determining unit 1307 uses $u_0$ as a unique value of a pseudo user and a pseudo secret key $dk_0$ thereof during the process, which will be described below.

In the description below, Equations are represented using $u_j$ and $dk_j$. However, when $u_0$ and $dk_0$ are used in the encryption process, $u_j$ becomes $u_0$ and $dk_j$ becomes $dk_0$ in Equations.

First, the revoked receiving device specifying unit 1303 of the encrypting device 30 counts the number of elements of R, and sets a count result as r (Step S1801). Next, the revoked receiving device specifying unit 1303 adds $u_0$ to the set R, and sets a value of r+1 as a new count result r (Step S1802). The revoked receiving device specifying unit 1303 outputs the count result r to the session key determining unit 1307.

Next, the session key calculating unit 1309 of the encrypting device 30 selects $k \in Z_P^*$ (Step S1803).

Next, the session key calculating unit 1309 of the encrypting device 30 executes a determination process on the number r of revoked users (Step S1804). In the case of r=1 (that is, in the case where only one revoked user exists), the session key calculating unit 1309 executes Step S1805, which will be described below. In addition, in the case of r≧2 (that is, in the case where two or more revoked users exist), the session key calculating unit 1309 executes Step S1806, which will be described below.

In addition, in the case where one revoked user exists, the session key calculating unit 1309 determines $P_r$ and K' on the basis of the following Equations 405 and 406 (Step S1805), and then executes Step S1809.

$$P_r = B_{R_1} = \frac{1}{\gamma + u_{R_1}} H \in G \quad \text{[Equation 405]}$$

$$K' = e\left(\frac{1}{u_{R_1}} A_{R_1}, H\right) \in G_1 \quad \text{[Equation 406]}$$

In addition, in the case where two or more revoked users exist, the session key calculating unit 1309 requests the bilinear mapping operation unit 1313 to execute an operation process (Aggregate (C) algorithm) of a bilinear group on G and calculate values shown in the following Equations 407 to 409. The bilinear mapping operation unit 1313 executes the Aggregate (C) algorithm and outputs values of Equations 407 to 409 to the session key calculating unit 1309 (Step S1806). In addition, since the Aggregate (C) algorithm that is an operation process algorithm of a bilinear group is the same as the Aggregate (C) algorithm described in the first modification of the third embodiment of the present invention, the detailed description thereof will not be repeated.

$$P_l(l=1, \ldots, r) = \frac{1}{(\gamma + u_{R_1}) \ldots (\gamma + u_{R_l})} H \in G \quad \text{[Equation 407]}$$

$$P_{r-2,r-1} = \frac{1}{(\gamma + u_{R_1}) \ldots (\gamma + u_{R_{r-2}})(\gamma + u_{R_{r-1}})} H \in G \quad \text{[Equation 408]}$$

$$P_{r-2,r} = \frac{1}{(\gamma + u_{R_1}) \ldots (\gamma + u_{R_{r-2}})(\gamma + u_{R_r})} H \in G \quad \text{[Equation 409]}$$

In this case, Equations 408 and 409 are values that are calculated as intermediate calculation values when Equation 407 ($P_r$) is derived. In the method according to the related art, the values of Equations 408 and 409 are not output as the calculation values. During the encryption process according to this embodiment, if the calculation values of Equations 408 and 409 are effectively used, a calculation amount that is needed at the time of encryption, that is, a calculation time or a cost of an apparatus required for calculation can be reduced.

For example, in the case of r=3, the bilinear mapping operation unit 1313 executes the above-described Aggregate (C) algorithm, and outputs three values of $P_{1,2}$, $P_{1,3}$, and $P_{2,3}$ as the operation result to the session key calculating unit 1309.

In the case of $j = 1$, $$P_{1,2} = \frac{1}{u_{R_2} - u_{R_1}}(P_{0,1} - P_{0,2})$$

$$= \frac{1}{u_{R_2} - u_{R_1}}\left(\frac{1}{\gamma + u_{R_1}} - \frac{1}{\gamma + u_{R_2}}\right)H$$

$$= \left(\frac{1}{(\gamma + u_{R_1})(\gamma + u_{R_2})}\right)H$$

$$P_{1,3} = \frac{1}{u_{R_3} - u_{R_1}}(P_{0,1} - P_{0,3})$$

$$= \frac{1}{u_{R_3} - u_{R_1}}\left(\frac{1}{\gamma + u_{R_1}} - \frac{1}{\gamma + u_{R_3}}\right)H$$

$$= \left(\frac{1}{(\gamma + u_{R_1})(\gamma + u_{R_3})}\right)H$$

In the case of $j = 2$, $$P_{2,3} = \frac{1}{u_{R_3} - u_{R_2}}(P_{1,2} - P_{1,3})$$

$$= \frac{1}{u_{R_3} - u_{R_2}}\left(\frac{1}{(\gamma + u_{R_1})(\gamma + u_{R_2})} - \frac{1}{(\gamma + u_{R_1})(\gamma + u_{R_3})}\right)H$$

$$= \left(\frac{1}{(\gamma + u_{R_1})(\gamma + u_{R_2})(\gamma + u_{R_3})}\right)H$$

Next, the session key calculating unit 1309 uses the operation result that is output from the bilinear mapping operation unit 1313 to calculate a value of the following Equation 410 (Step S1807).

$$\gamma P_r = \frac{1}{2}(P_{r-2,r-1} + P_{r-2,r} - (u_{R_{r-1}} + u_{R_r})P_r) \quad \text{[Equation 410]}$$

If Equation 410 is developed, it becomes the following Equation 411. If the session key calculating unit 1309 according to the embodiment calculates $\gamma P_r$, the Aggregate (C) algorithm on $G_1$ does not need to be executed, and the number of times of executing the Aggregate (C) algorithm can be reduced to one.

$$\gamma P_r = \frac{1}{2}(P_{r-2,r-1} + P_{r-2,r} - (u_{R_{r-1}} + u_{R_r})P_r) \quad \text{[Equation 411]}$$

$$= \frac{1}{2}\left(\frac{1}{(\gamma + u_{R_1}) \ldots (\gamma + u_{R_{r-2}})}\left(\frac{1}{\gamma + u_{R_{r-1}}} + \right.\right.$$

-continued $$\frac{1}{\gamma + u_{R_r}}\bigg)H - (u_{R_{r-1}} + u_{R_r})P_r\bigg)$$

$$= \frac{1}{2}\bigg(\frac{1}{(\gamma + u_{R_1}) \ldots (\gamma + u_{R_{r-2}})} \cdot$$

$$\frac{\gamma + u_{R_r} + \gamma + u_{R_{r-1}}}{(\gamma + u_{R_{r-1}})(\gamma + u_{R_r})}H - (u_{R_{r-1}} + u_{R_r})P_r\bigg)$$

$$= \frac{1}{2}\bigg(\frac{2\gamma + u_{R_r} + u_{R_{r-1}} - (u_{R_{r-1}} + u_{R_r})}{(\gamma + u_{R_1}) \ldots (\gamma + u_{R_r})}\bigg)H$$

$$= \frac{\gamma}{(\gamma + u_{R_1}) \ldots (\gamma + u_{R_r})}H$$

Next, the session key calculating unit 1309 uses the operation result of the bilinear mapping operation unit 1313, the value of Equation 411, and the secret key $dk_j$ or $dk_0$, thereby calculating a value shown in the following Equation 412 (Step S1808).

$$K' = e\bigg(\frac{1}{u_j}A_j, \gamma P_r + u_j P_r\bigg) \in G_1 \qquad \text{[Equation 412]}$$

$$= e\bigg(\frac{1}{\gamma + u_j}G, \frac{\gamma + u_j}{(\gamma + u_{R_1}) \ldots (\gamma + u_{R_r})}H\bigg)$$

$$= e(G, H)^{\frac{1}{(\gamma + u_{R_1}) \ldots (\gamma + u_{R_r})}}$$

With respect to each of the cases, if calculation of $P_r$ and K' is completed, the header calculating unit 1311 calculates the header hdr on the basis of the following Equation 413 (Step S1809).

$$hdr = (C_1, C_2, (u_{R_1}, P_1), \ldots (u_{R_r}, P_r)) \qquad \text{[Equation 413]}$$

$$= (kW, kP_r, (u_{R_1}, P_1), \ldots (u_{r_1}, P_r))$$

Next, the session key calculating unit 1309 calculates the session key K on the basis of the following Equation 414, and outputs the session key K together with the header hdr, K', and k (Step S1810).

$$K=(K')^k \in G_1 \qquad \text{[Equation 414]}$$

The encrypting unit 1315 of the encrypting device generates a cipher text $C=E_K(M)$ using a session key K of a plain text M, and transmits the cipher text to the transmitter authentication information generating unit 1321. In addition, the cipher text transmitting unit 1317 broadcasts and distributes the generated (hdr, C) and transmitter authentication information, which will be described below. If this process is executed, the transmitter can transmit the encrypted contents to a desired user.

In addition to the above process, the encryption of the plain text M or the encryption and broadcasting and distributing may be executed by the encryption" process. The transmitter may execute Steps S1801 and S1802 and input the executed result to the encrypting device 30 that executes the encryption" process.

In addition, during the encryption" process, $u_{R1}$ needs to be $u_0$.

[Transmitter Authentication Information Generating Process—a Sign' Process]

Next, a transmitter authentication information generating process (Sign' process) that is executed by the transmitter authentication information generating unit 1321 according to the embodiment will be described in detail with reference to FIG. 43.

The Sign' process is a process that is executed after a transmitter having the encrypting device 30 according to the embodiment generates a header hdr. In addition, the Sign' process is a process that can be executed by only a transmitter (encrypting device 30) who has a valid secret key.

The transmitter inputs a public key $ek_i$, a unique value $u_j$ of the transmitter, a secret key $dk_j$ that is held by the transmitter, and k, K', a session key K, and a cipher text C output from the session key calculating unit 1309 after executing the encryption" process to the encrypting device 30, and executes the Sign' process, which will be described below.

First, the transmitter authentication information generating unit 1321 randomly selects a parameter $t \in Z_P^*$ (Step S1901). Next, the transmitter authentication information generating unit 1321 calculates $sig_{j,0}$ that is one of elements of transmitter authentication information, on the basis of the following Equation 415 (Step S1902).

$$sig_{j,0} = (k')^t = e(G, H)^{\frac{t}{(\gamma + u_{R_1}) \ldots (\gamma + u_{R_r})}} \in G_1 \qquad \text{[Equation 415]}$$

Next, the transmitter authentication information generating unit 1321 uses the calculated $sig_{j,0}$, the cipher text C, and the session key K, and calculates a hash value h of these values using a hash function, on the basis of the following Equation 416 (Step S1903).

$$h=H(C,K,sig_{j,0}) \qquad \text{[Equation 416]}$$

Next, the transmitter authentication information generating unit 1321 uses the calculated hash value h and the selected parameter t to calculate secret information y of the transmitter on the basis of the following Equation 417 (Step S1904).

$$y=t-h \in Z_P^* \qquad \text{[Equation 417]}$$

Next, the transmitter authentication information generating unit 1321 uses the calculated secret information y and a unique secret key $dk_j$ of the encrypting device 30 to calculate $sig_{j,1}$ that is one of elements of transmitter authentication information on the basis of the following Equation 418, and outputs (uj, $sig_{j,0}$, and $sig_{j,1}$) as the transmitter authentication information to the cipher text transmitting unit 1317 (Step S1905).

$$sig_{j,1} = \frac{y}{u_j}A_j = \frac{t-h}{\gamma + u_j}G \in G \qquad \text{[Equation 418]}$$

As described above, the transmitter authentication information generating unit 1321 according to the embodiment uses a hash value that is related to the value calculated on the basis of the parameter arbitrarily selected by the transmitter, the cipher text C, and the session key K, thereby generating transmitter authentication information. Accordingly, when the malicious third party tampers contents of the cipher text or the session key and regenerates transmitter authentication information, the calculated hash value becomes a different value. For this reason, the receiving device 40 that has received the transmitter authentication information can use the transmitter authentication information to verify validity of the transmitter and determine whether the transmitted contents are tampered.

The encryption" process and the Sign' process that are executed by the encrypting device 30 according to the embodiment have been described. Next, the session key calculating process (decryption process) and the received content verifying process (verification' process) that are executed by the receiving device 40 according to the embodiment will be described.

<Operation of a Receiving Device 40: a Decryption Process and a Verification' Process>

Figure 44:
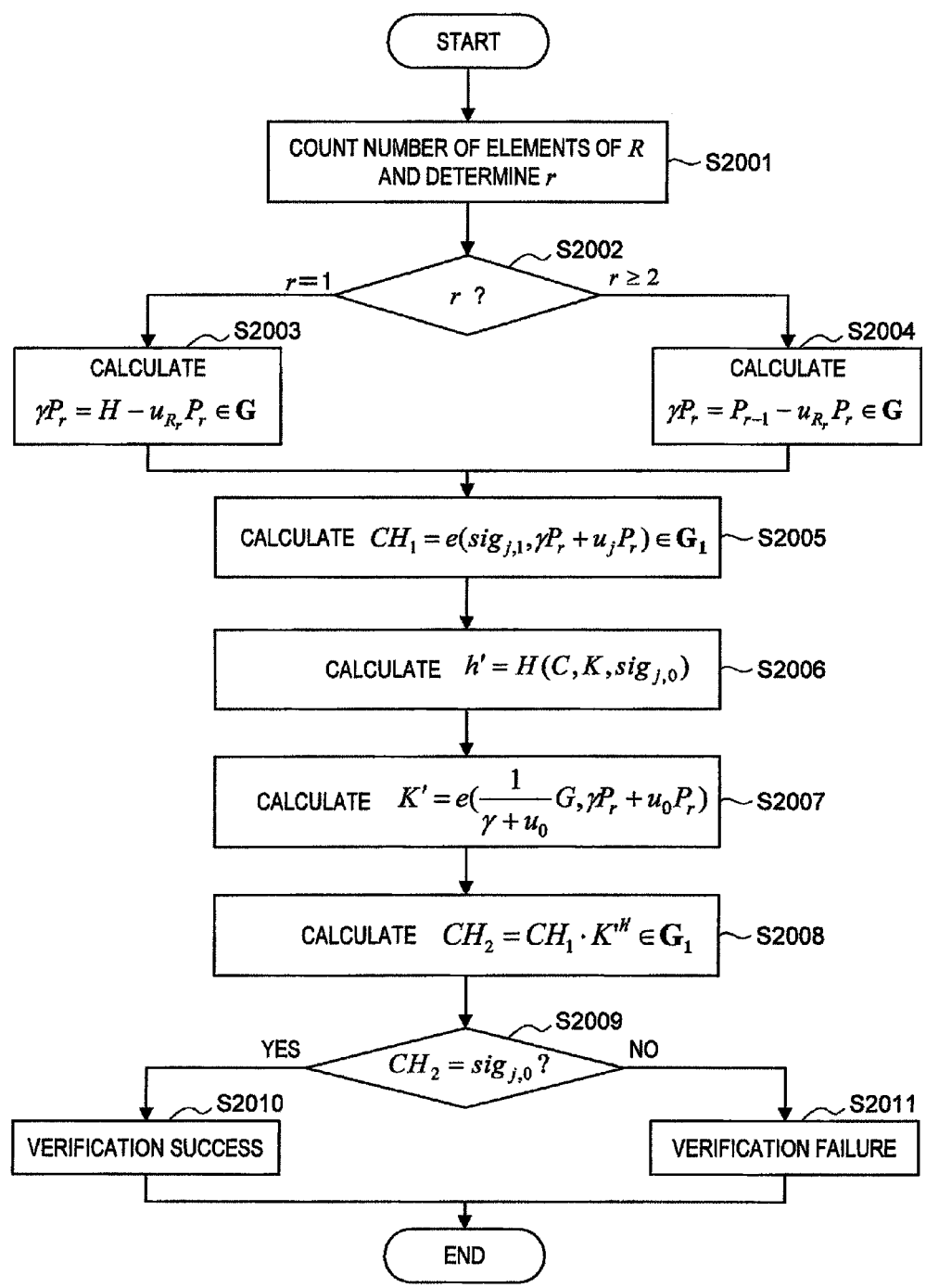
FIG. 44 is a flowchart illustrating a received content verifying process according to the embodiment.

A receiver who receives a cipher text transmitted from the encrypting device 30 operates the receiving device 40 possessed by the receiver, and executes the decryption process that is a session key calculating process in accordance with the following sequence. Since the decryption process that is executed by the receiving device 40 according to the embodiment is the same as the decryption process that is executed by the receiving device 40 according to the third embodiment of the present invention, the detailed description thereof will not be repeated. In addition, the receiver operates the receiving device 40, and executes the verification process of the received contents in accordance with the following sequence. FIG. 44 is a flowchart illustrating a verification' process that is executed when the receiving device 40 according to the embodiment verifies the received contents.

[Received Content Verifying Process—Verification' Process]

The verification' process is a process that is executed when it is confirmed whether a non-revoked user that uses the transmitted header hdr and transmitter authentication information ($u_j$, $sig_{j,0}$, $sig_{j,1}$) to generate the header hdr and the cipher text C is a user having a valid secret key, and the header hdr and the cipher text C are tampered or not.

A verifier inputs the received header hdr, and the session key K, the cipher text C, and the transmitter authentication information ($u_j$, $sig_{j,0}$, $sig_{j,1}$), which are obtained as a decryption result of the header hdr, to the receiving device 40, and the receiving device 40 executes the verification' process, which will be described below.

In addition, during the verification' process, only p, G, $G_1$, and e that are the system parameter portions of the public key $ek_i$ are used. However, since theses values are generally held by each user (or receiving device 40 that is held by the user) in advance, the public key does not need to be input in this case.

First, the received content verifying unit 1407 of the receiving device 40 counts the number of elements of a set R of revoked users and sets a count result as r (Step S2001), and executes a determination process on the count result (Step S2002). In the case where the count result r is 1, the received content verifying unit 1407 executes Step S2003, which will be described below. In addition, in the case where the count result r is 2 or more, the received content verifying unit 1407 executes Step S2004, which will be described below.

In the case where the count result r is 1, the received content verifying unit 1407 calculates $_\gamma P_r$ on the basis of the following Equation 419 (Step S2003), and executes Step S2005, which will be described below.

$$\gamma P_r = H - u_{R_r} P_r \in G \quad \text{[Equation 419]}$$

In addition, in the case where the count result r is 2 or more, the received content verifying unit 1407 calculates $_\gamma P_r$ on the basis of the following Equation 420 (Step S2004), and executes Step S2005, which will be described below.

$$\gamma P_r = P_{r-1} - u_{R_r} P_r \in G \quad \text{[Equation 420]}$$

Next, the received content verifying unit 1407 uses the calculated $_\gamma P_r$, the transmitter authentication information, and the public information to calculate a parameter $CH_1$ used for verification on the basis of the following Equation 421 (Step S2005).

$$CH_1 = e(sig_{j,1}, \gamma P_r + u_j P_r) \in G_1 \quad \text{[Equation 421]}$$

Next, the received content verifying unit 1407 uses the cipher text C and the transmitter authentication information transmitted from the encrypting device 30 and the session key K transmitted from the session key calculating unit 1403, thereby calculating a hash value h' on the basis of Equation 422 (Step S2006).

$$h' = H(C, K, sig_{j,0}) \quad \text{[Equation 422]}$$

Next, the received content verifying unit 1407 uses the calculated $_\gamma P_r$ and the public information to calculate K' on the basis of the following Equation 423 (Step S2007).

$$K' = e\left(\frac{1}{\gamma + u_0} G, \gamma P_r + u_0 P_r\right) \quad \text{[Equation 423]}$$

Next, the received content verifying unit 1407 uses the calculated verifying parameter $CH_1$ and hash value h' and the calculated K' to calculate a verifying value $CH_2$ on the basis of the following Equation 424 (Step S2008).

$$CH_2 = CH_1 \cdot K'^{h'} \in G_1 \quad \text{[Equation 424]}$$

Next, the received content verifying unit 1407 compares the calculated verifying value $CH_2$ and $sig_{j,0}$ included in the transmitter authentication information (Step S2009). If the condition $CH_2 = SIG_{j,0}$ is satisfied, the received content verifying unit 1407 determines that the cipher text C and the header hdr received from the encrypting device 30 are transmitted from the user j having a valid secret key and the cipher text C and the header hdr is not tampered (that is, verification is successfully made) (Step S2010). In addition, if the condition $CH_2 \neq sig_{j,0}$ is satisfied, the received content verifying unit 1407 determines that the cipher text C and the header hdr received from the encrypting device 30 are not transmitted from the user j having a valid secret key or the cipher text C and the header hdr are tampered (that is, verification is failed) (Step S2011).

If the verification result is fixed, the received content verifying unit 1407 transmits the verification result to the decrypting unit 1409.

In addition, the receiver may execute the above Step S2001 and input the execution result to the receiving device 40 that executes the verification' process.

<With Respect to Validity of Verification>

The operation of the receiving device 40 according to the embodiment has been described in detail. Next, the case is described, in which the encrypting device 30 adds the transmitter authentication information ($u_j$, $sig_{j,0}$, $sig_{j,1}$), and the receiver can recognize that the header hdr and the cipher text C are generated by the user j (or the user j authenticates the header hdr and the cipher text C that are generated by another person) and that the header hdr and the cipher text C are not tampered.

The user i who is a verifier allows the receiving device 40 to decrypt the header to acquire the session key K, and executes the verification' process using the receiving device 40. During the verification' process, in Steps S2003 and S2004, $_\gamma P_r$ is derived, and in Step S2005, a verifying parameter $CH_1$ is calculated.

In this case, since $sig_{j,1}$ has a value shown in Equation 418, the verifying parameter $CH_1$ becomes a value shown in the following Equation 425 if Equation 421 is developed.

$$CH_1 = e(sig_{j,1}, \gamma P_r + u_j P_r) \in G_1 \quad \text{[Equation 425]}$$

$$= e\left(\frac{t-h}{\gamma + u_j}G, \frac{\gamma + u_j}{(\gamma + u_{R_1})\ldots(\gamma + u_{R_r})}H\right)$$

$$= e(G, H)^{\frac{t-h}{(\gamma + u_{R_1})\ldots(\gamma + u_{R_r})}}$$

Meanwhile, in the case where the header hdr, the cipher text C, and the transmitter authentication information $sig_{j,0}$ are not tampered, the transmitter authentication information $sig_{j,0}$ is generated by the user j, and the valid session key K is derived by the header hdr, the condition h=h' is satisfied by Step S2006. Accordingly, in the above-described case, the verifying value $CH_2$ that is calculated in Step S2008 becomes a value shown in the following Equation 426.

$$CH_2 = CH_1 \cdot K'^{h'} \in G_1 \quad \text{[Equation 426]}$$

$$= e(G, H)^{\frac{t-h}{(\gamma + u_{R_1})\ldots(\gamma + u_{R_r})}} \cdot$$

$$\left\{e(G, H)^{\frac{1}{(\gamma + u_{R_1})\ldots(\gamma + u_{R_r})}}\right\}^h$$

$$= e(G, H)^{\frac{t}{(\gamma + u_{R_1})\ldots(\gamma + u_{R_r})}}$$

$$= sig_{j,0}$$

Accordingly, if $CH_2 = sig_{j,0}$ is satisfied, it can be understood that verification is realized.

<Difference with the Related Art>

In the method according to the related art, in order to derive $P_1, \ldots, P_r$, in the case where the condition $r \geq 2$ is satisfied, the Aggregate (A) algorithm with respect to an operation on G is executed by Step S36 of the Encryption algorithm. Then, in order to derive K', the Aggregate (A) algorithm with respect to an operation on $G_1$ is executed by Step S37.

Meanwhile, in the encrypting method according to this embodiment, similar to the method according to the related art, the Aggregate (C) algorithm with respect to an operation on G is executed by Step S1806 of the encryption" algorithm. However, when K' is derived, an operation on G in Step S1807 and an operation on $G_1$ in Step S1808 are used, instead of the Aggregate (C) algorithm. In this case, in the Aggregate (A) algorithm and the Aggregate (C) algorithm, only the output values in Steps S50 and S1510 are different from each other, and $P_{r-2,r-1}$ and $P_{r-2,r}$ that are additionally output in the Aggregate (C) algorithm are values that are used to derive $P_r$. Even though the values are additionally output, the calculation amount is the same as that of the Aggregate (A) algorithm.

That is, in regards to the calculation amount that is needed when a user j possessing a secret key $dk_j$ executes an encryption process, in the method according to the related art, the number of times of executing the Aggregate (A) algorithm needs to be two. Meanwhile, in the encrypting method according to this embodiment, the number of times of executing the Aggregate (C) algorithm is reduced to one, instead of a few times of operations on G and one time of bilinear mapping operation added. In addition, in regards to the calculation amount that is needed to derive K', in the method according to the related art, as r increases, the calculation amount increases in proportion to $r^2$. However, in the encrypting method according to this embodiment, the calculation amount becomes the constant calculation amount without depending on r.

In addition, the setup process and the join process are changed to the setup' process and the join' process, respectively, and a secret key of a pseudo user (pseudo secret key) $dk_0$ is generated and opened. During the encryption" process, $u_0$ that is a unique value of the pseudo user is typically added to R, and the encryption" process can be executed by a user that does not hold a secret key. As a result, even in the case of an arbitrary user, that is, a user who does not hold a secret key, the calculation amount that is needed to execute an encryption process can be reduced.

In this case, the encrypting method according to the embodiment is the same as the encrypting method according to the first modification of the third embodiment of the present invention. Therefore, in regards to the calculation amount during the encryption process, the arbitrary entity can obtain a calculation amount reduction effect that is described in the first modification of the third embodiment of the present invention. In addition, since the detailed description of the obtained calculation amount reduction effect is made in the first modification of the third embodiment, the detail description thereof will not be repeated herein.

In addition, in the method according to the related art, in addition to the execution of the Aggregate (A) algorithm on G at the time of an encryption process, the Aggregate (A) algorithm on $G_1$ needs to be executed. At this time, in the Aggregate (A) algorithm on $G_1$, since $V_i$ needs to be used, the center needs to open $V_i$ when the join process is executed. Accordingly, when the join process is executed with respect to n users, the public key is as shown in FIG. 45, and the number of elements excluding the system parameter becomes 3n+3.

Meanwhile, in the method according to this embodiment, since the secret key of the pseudo user (pseudo secret key) $dk_0$ is opened by executing the setup' process, an arbitrary entity can execute the Encryption" process, and the Aggregate (A) algorithm on $G_1$ does not need to be executed. For this reason, since the center does not need to open $V_i$, during the join' process, calculation and output of $V_i$, which needs to be executed during the join process, become unnecessary. As a result, when the join' process is executed with respect to n users, the public key is as shown in FIG. 45, and the number of elements excluding the system parameters becomes 2n+5.

As described above, when the condition $3n+3 \geq 2n+5$, that is, the condition $n \geq 2$ is satisfied, it can be seen that the size of the public key can be reduced as compared with the method according to the related art.

In regards to the number of elements in the public key, if the condition $n \geq 2$ is satisfied, it means that the method according to the embodiment is effective. However, since the individual elements in the public key are an original set in a different group, the bit sizes that are needed to secure safety are different from each other. Accordingly, in the description below, on the assumption of the specific bit size, the sizes of the public keys are compared with each other. Hereinafter, the case where 128-bit equivalent safety is satisfied is considered. At this time, the bit size of the prime number p becomes 256 bits and the original bit size of $G_1$ becomes 3072 bits.

In each of the elements of the public key in the method according to the related art, W, H, and $B_i$ (i=1, ..., and n) are points on an elliptic curve, that is, the origin of G, and $V_i$ (i= 1, ..., and n) becomes the origin of $G_1$. For simplicity of description, if the bit size of $u_i$ (i=1, ..., and n) that is a unique value of each user is set to 32 bits, the bit size of the public key in the method according to the related art becomes a value shown in the following Equation 427.

$$(32+256 \times 2+3072) \times n+2 \times (256 \times 2)+3072=(3616n+4096)\text{bit} \quad \text{[Equation 427]}$$

Meanwhile, in the method according to this embodiment, the bit size of the public key becomes a value shown in the following Equation 428.

$$(32+256\times2)\times(n+1)+3\times(256\times2)=(544n+2080)\text{bit} \quad \text{[Equation 428]}$$

Figure 46:
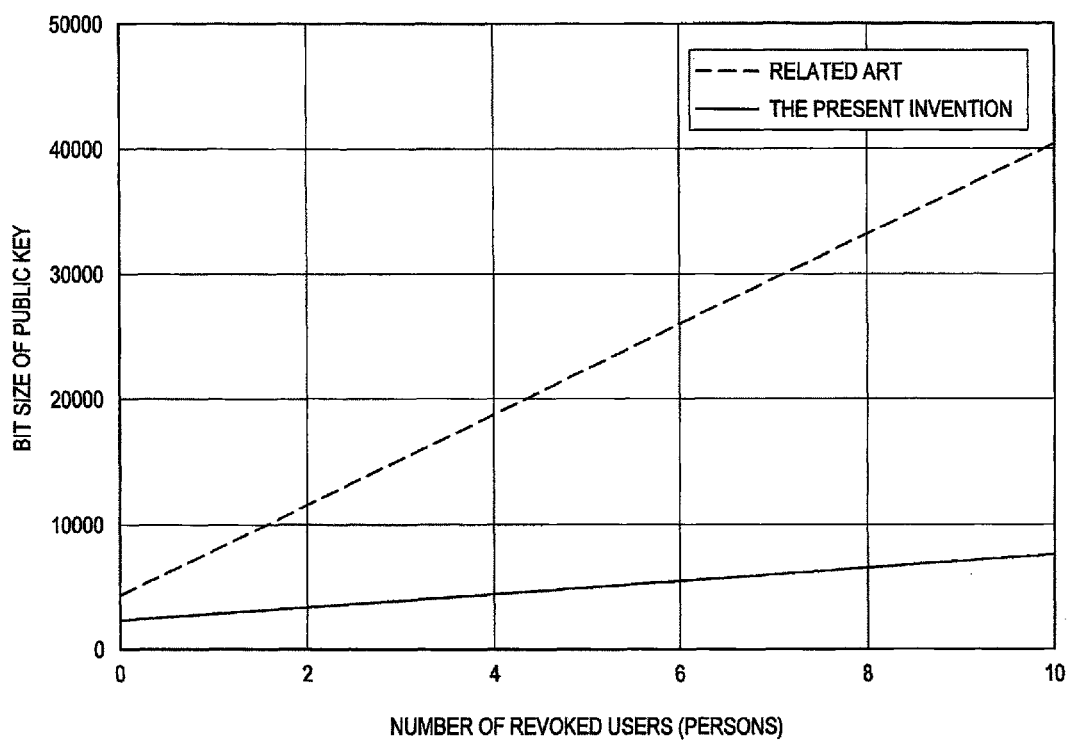
FIG. 46 is a graph illustrating a result that is obtained by comparing public key sizes in an encryption process.

The compared result of values obtained when n increases is shown in FIG. 46. As can be seen from FIG. 46, when the bit sizes are compared with each other, the bit size can be reduced with respect to the arbitrary n in the method according to this embodiment.

As described above, in the method according to this embodiment, multiplication, a power, and an inverse element operation on a cyclic group where a bit length is long, which are needed at the time of encryption in the method according to the related art, are removed, and a one-time bilinear mapping operation (pairing) and an operation of points on an elliptic curve are slightly added. When the user, that is, an entity (an operation subject, such as a person, a device, and a server) holding a secret key executes encryption, in particular, as r increases, the calculation amount that is needed at the time of encryption, that is, the calculation time or a cost of an apparatus that is needed at the time of calculation can be reduced.

In addition, if a pseudo secret key is opened as public information, since it is not necessary to open elements on a cyclic group where a bit length is long, which are needed at the time of encryption in the method according to the related art, the size of the public key can be reduced.

(Modification of an Encrypting Method According to this Embodiment)

During the setup' process according to this embodiment, in Step S1606, the following Equation 402 is opened as an initial public key $ek_0$.

$$ek_0=(p,G,G_1,e,W,H,u_o,dk_o=(A_0,B_0)) \quad \text{[Equation 402]}$$

Meanwhile, the following Equation 429 is calculated, and the initial public key $ek_0$ is set to the following Equation 430. When this initial public key is used, $H_0$ that is calculated in Equation 429 is hereinafter used, instead of H. If the initial public key is used, it may be possible to omit Step S1802 during the encryption" process.

$$H_0 = \frac{1}{\gamma+u_0}H \quad \text{[Equation 429]}$$

$$ek_0 = (p, G, G_1, e, W, H_0, u_0, A_0) \quad \text{[Equation 430]}$$

In addition, if the initial public key shown in Equation 430 is used, the calculation of Step S2003 in the verification' process of the receiving device 40 is changed as represented by the following Equation 431.

$$\gamma P_r = H - u_0 H_0 \in G \quad \text{[Equation 431]}$$

In addition, in the cipher key distribution system according to this embodiment, when the transmitter authentication information is generated and the received contents are verified, the Sign' process and the verification' process are used, respectively. However, the sign process and the verification process according to the third embodiment of the present invention may be used.

In addition, in the method according to this embodiment, during the verification' process, a receiver, that is, a verifier calculates $K' \in G_1$, but a transmitter may distribute K' and the header as the transmitter authentication information. The verifier uses K' that is included in the transmitter authentication information, thereby removing Step S2007 in the verification' process.

In addition, during the encryption" process according to this embodiment, it may be possible to generate transmitter authentication information using the pseudo secret key $dk_0$. However, since the pseudo secret key $dk_0$ is public information, an arbitrary entity can be obtained, and it may be impossible to specify a generator of the transmitter authentication information (signing) using the pseudo secret key $dk_0$. In order to resolve this issue, during the verification' process according to this embodiment, in the case of $u_j=u_0$, the receiving device 40 may determine that the transmitter authentication information is generated using the pseudo secret key $dk_0$, and complete the process in a state where the verification is not realized.

As described above, in the method according to this embodiment, multiplication, a power, and an inverse element operation on a cyclic group where a bit length is long, which are needed at the time of encryption in the method according to the related art, are removed, and a one-time bilinear mapping operation (pairing) and an operation of points on an elliptic curve are slightly added. When the user, that is, an entity (an operation subject, such as a person, a device, and a server) holding a secret key executes encryption, in particular, as r increases, the calculation amount that is needed at the time of encryption, that is, the calculation time or a cost of an apparatus that is needed at the time of calculation can be reduced.

In addition, if a pseudo secret key is opened as public information, since it is not necessary to open elements on a cyclic group where a bit length is long, which are needed at the time of encryption in the method according to the related art, the size of the public key can be reduced.

Further, in the method according to this embodiment, if the corresponding user is an authenticated user, the user can generate the header hdr and then execute the Sign' process, thereby adding transmitter authentication information. As a result, the user who has received the header hdr and transmitter authentication information ($u_j$, $sig_{j,0}$, $sig_{j,1}$) can detect whether the header hdr and the cipher text C are tampered and confirm the generator thereof.

In addition, the method according to the embodiment may be modified, such that each process is configured as described below, and thus only the user generates signing. In addition, in the description below, since the decryption process and the Aggregate (B) process are the same as those in the related art, the detailed description thereof will not be repeated.

<Operation of a Key Generating Device 20: a Setup''' Process and a Join''' Process>

Figure 47:
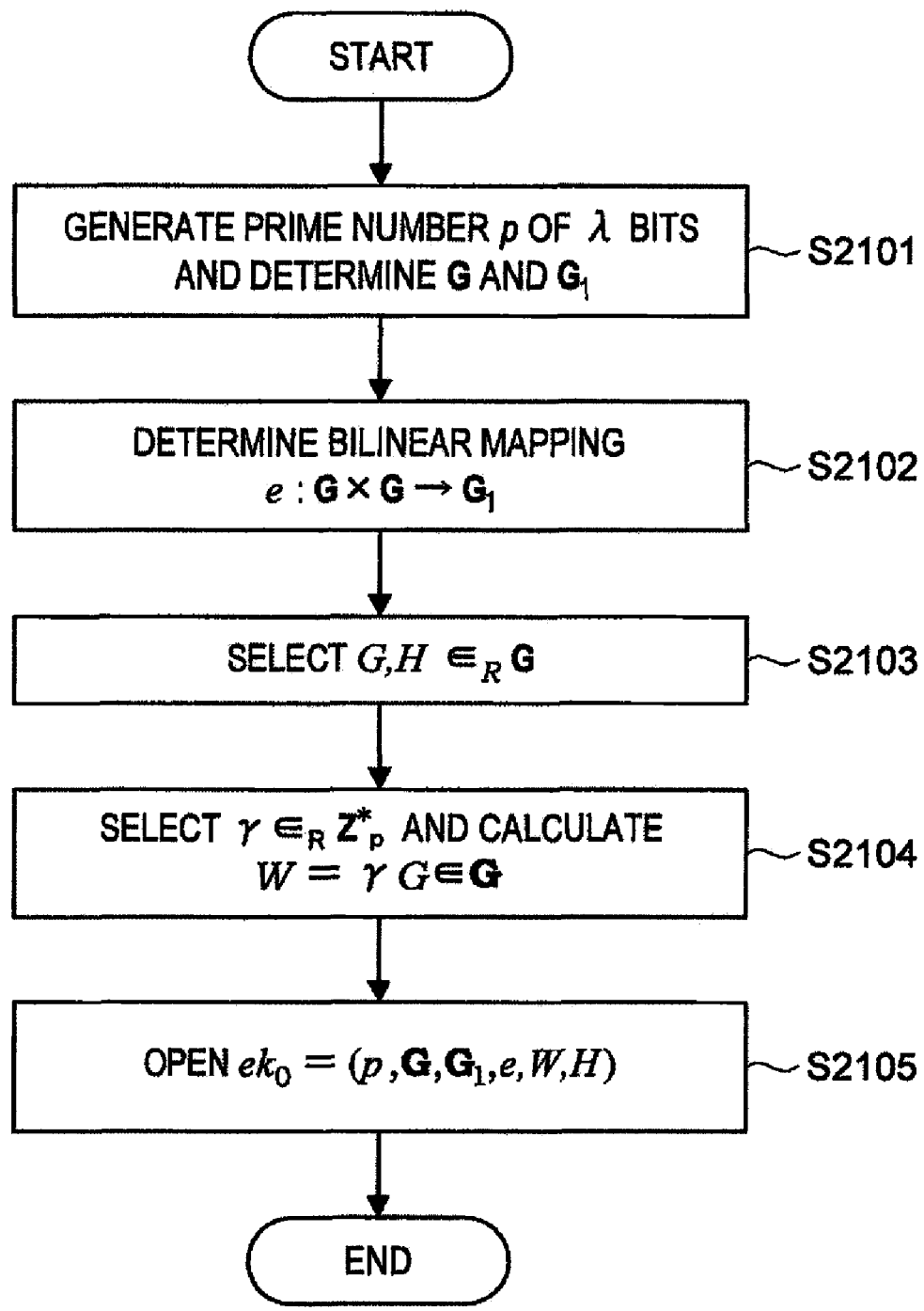
FIG. 47 is a flowchart illustrating a modification of a key generating process according to the embodiment.
Figure 48:
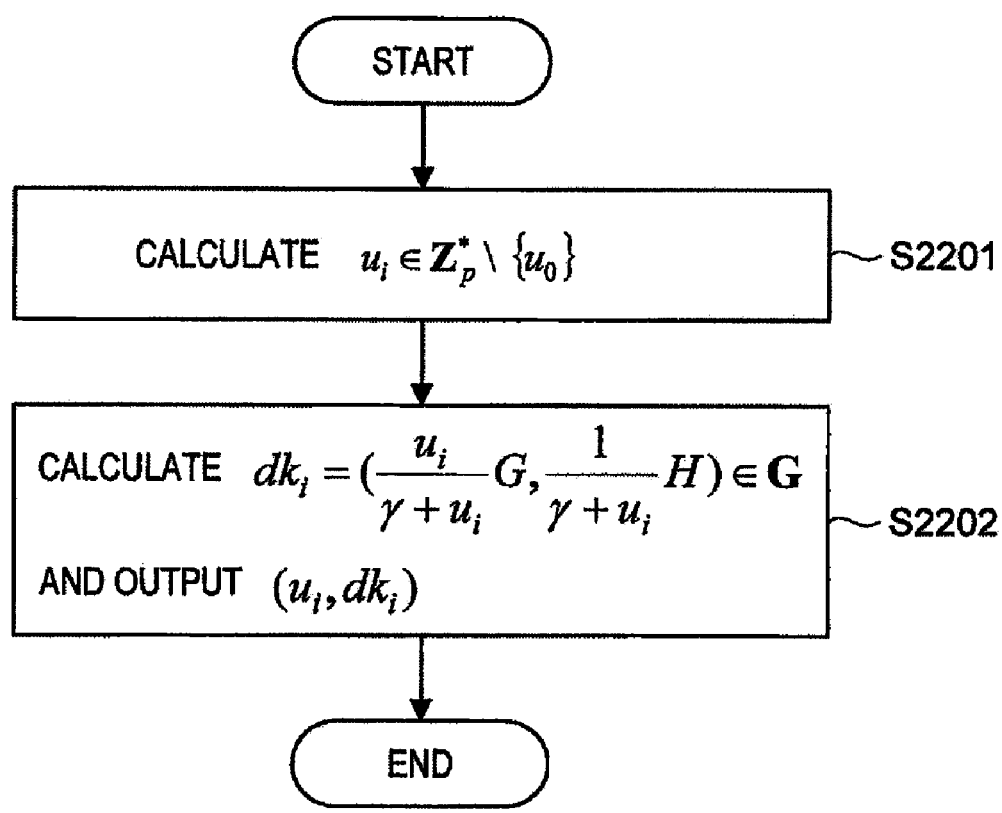
FIG. 48 is a flowchart illustrating a modification of a user registering process according to the embodiment.

A center operates the key generating device 20 that is possessed by the center, and generates the public key and the public information and a personal secret key corresponding to each user in accordance with the following sequence. Hereinafter, the operation of the key generating device 20 according to this modification (that is, the setup''' process and the join''' process) will be described in detail with reference to FIGS. 47 and 48. FIG. 47 is a flowchart illustrating a key generating process according to this modification. FIG. 48 is a flowchart illustrating a user registering process according to this modification.

(Setup''' Process in a Key Generating Device 20)

The setup''' process is a key generating process that the center possessing the key generating device 20 according to this modification executes once when constructing the system. The center determines a security parameter λ, and the key generating device uses the input security parameter λ to execute the setup''' process, which will be described below.

First, the parameter determining unit 1251 of the key generating device 20 generates a prime number p of λ bits. Next, the bilinear group selecting unit 1253 selects a bilinear mapping group G and a cyclic multiplicative group $G_1$ where p is used as an order (Step S2101).

Next, the bilinear group selecting unit 1253 of the key generating device 20 determines bilinear mapping e: $G \times G \to G_1$ (Step S2102).

Next, the parameter determining unit 1251 of the key generating device 20 selects G, H∈G (Step S2103).

Then, the parameter determining unit 1251 of the key generating device 20 selects $\gamma \in_R Z_P^*$ and calculates W=γG∈G (Step S2104). γ and G that are obtained by the above method are confidentially maintained as a master key mk=(γ, G) by only the center.

Next, the key calculating unit 1257 of the key generating device 20 uses the calculated data to configure an initial public key $ek_0$ as follows (Step S2105).

$$ek_0 = \{p, G, G_1, e, W, H\} \quad \text{[Equation 432]}$$

If the generation of the public key is completed, the distributing unit 1261 of the key generating device 20 opens the initial public key $ek_0$ obtained by executing the setup process as the initial public key of the entire system.

(Join''' Process in a Key Generating Device 20)

The join''' process is a user registering process that is executed by a center whenever the center receives a system joining request from the user. The join''' process may be executed at any timing after the center completes a system setting process.

The center input the public key $ek_{i-1}$ ($1 \leq i \leq n$), the master key mk, and i that is an index of an i-th joined user to the key generating device 20 and executes the join''' process, which will be described below, thereby generating a secret key of a user who has transmitted the system joining request and executing a system joining process.

First, the key calculating unit 1257 of the key generating device 20 calculates $u_i \in Z_P^* \setminus \{u_0\}$ that is a unique value of a user i (Step S2201). Then, the key calculating unit 1257 executes the calculation that is shown in the following Equation 433 and calculates the secret key $dk_i$ of the user i who has transmitted the system joining request (Step S2202).

$$dk_i = (A_i, B_i) \in G \quad \text{[Equation 433]}$$
$$= \left( \frac{u_i}{\gamma + u_i} G, \frac{1}{\gamma + u_i} H \right)$$

In this case, $B_i$ in Equation 433 is a portion of the secret key $dk_i$. However, $B_i$ is not secret information but public information, and the user i does not need to confidentially maintain $B_i$.

Next, the distributing unit 1261 of the key generating device 20 confidentially transmits the secret key $dk_i$ of the user i that is obtained by executing the join''' process to the user i, through a secure communication path. The distributing unit 1261 adds public information $(u_i, B_i)$ corresponding to the user i to the current public key $ek_{i-1}$, updates the current public key as a public key $ek_i$, and opens the public key. At this time, the new public key $ek_i$ forms the configuration shown by the following Equation 434.

$$ek_i = (p, G, G_1, e, W, H, (u_1, B_1), \ldots (u_i, B_i)) \quad \text{[Equation 434]}$$

The setup''' process and the join''' process that are executed by the key generating device 20 according to the embodiment have been described. Next, the encryption process (encryption''' process) that is executed by the encrypting device 30 according to this modification will be described.

<Operation of an Encrypting Device 30: an Encryption''' Process and a Sign''' Process>

Figure 49:
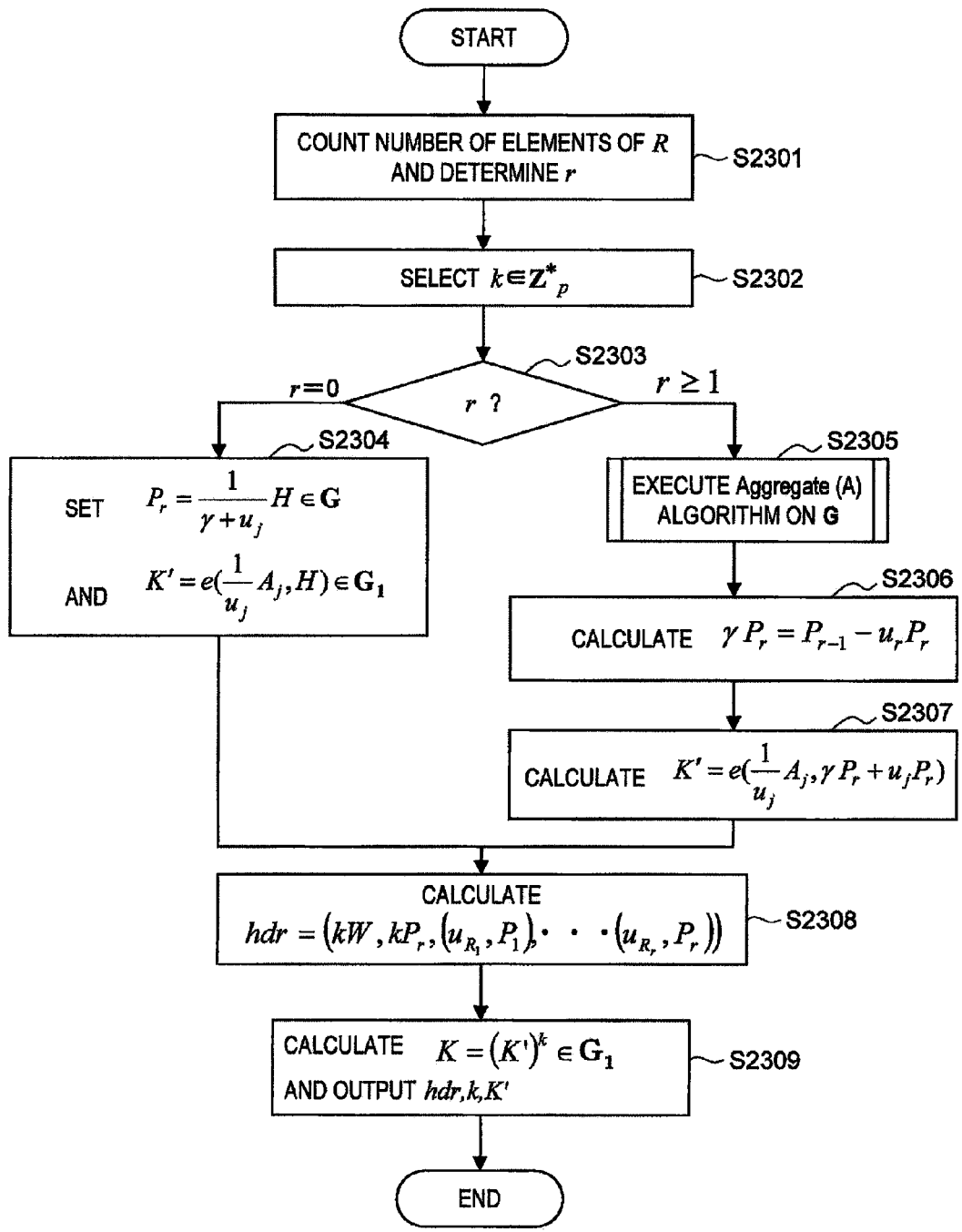
FIG. 49 is a flowchart illustrating a modification of an encryption process according to the embodiment.
Figure 50:
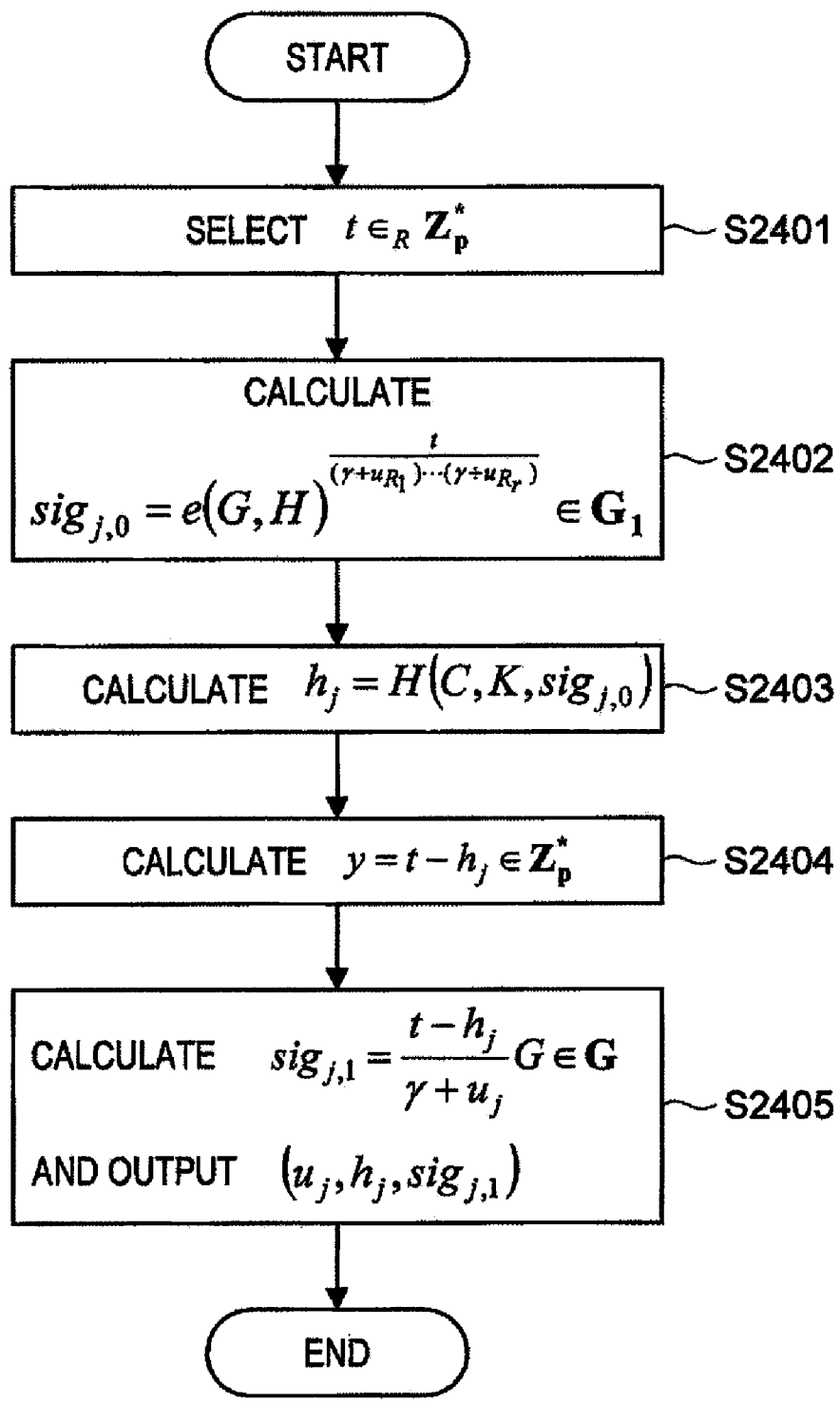
FIG. 50 is a flowchart illustrating a modification of a transmitter authentication information generating process according to the embodiment.

A distributor who distributes a plain text, such as contents, operates the encrypting device 30 that is possessed by the distributor, and generates a cipher text and a header in accordance with the following sequence. Hereinafter, the encryption''' process of the encrypting device 30 according to this modification will be described in detail with reference to FIG. 49. FIG. 49 is a flowchart illustrating an encryption process that is executed by the encrypting device 30 according to this modification. In addition, the distributor operates the encrypting device 30, and generates transmitter authentication information that is used when verifying validity of the cipher text and the header generated in the receiving device 40 and determining whether the cipher text and the header are tampered or not, in accordance with the following sequence. FIG. 50 is a flowchart illustrating a sign''' process that is executed when the encrypting device 30 according to this modification generates transmitter authentication information.

[Encryption''' Process in an Encrypting Device 30]

The encryption''' process is a process that is executed whenever an arbitrary transmitter who desires to distribute contents performs a distribution using the encrypting device 30.

The transmitter inputs a public key $ek_i$ and a set of revoked users $R = \{u_{R1} \ldots u_{Rr}\}$ to the encrypting device 30 according to this modification and executes the encryption''' process, which will be described below, thereby executing the encryption process on a plain text, such as contents, which the transmitter desires to distribute. The set R that is input by the user is converted into digital data that can be used by the encrypting device 30 by means of the revoked receiving device specifying unit 1303 of the encrypting device 30 and used in the encryption''' process.

First, the revoked receiving device specifying unit 1303 of the encrypting device 30 counts the number of elements of R, and sets a count result as r (Step S2301). The revoked receiving device specifying unit 1303 outputs the count result r to the session key determining unit 1307.

Next, the session key calculating unit 1309 of the encrypting device 30 selects $k \in Z_P^*$ (Step S2302).

Next, the session key calculating unit 1309 of the encrypting device 30 executes a determination process on the number r of revoked users (Step S2303). In the case of r=0 (that is, in the case where there is no revoked user), the session key calculating unit 1309 executes Step S2304, which will be described below. In addition, in the case of r≥1 (that is, in the case where at least one revoked user exists), the session key calculating unit 1309 executes Step S2305, which will be described below.

In the case where there is no revoked user, the encrypting device 30 sets the encrypting device 30 as a revoked user. That is, in addition to $R_1 = j$, the session key calculating unit 1309 determines $P_r$ and K' on the basis of the following Equations 435 and 436 (Step S2304), and then executes Step S2308.

$$P_r = B_j = \frac{1}{\gamma + u_j} H \in G \quad \text{[Equation 435]}$$

$$K' = e\left(\frac{1}{u_j} A_j, H\right) \in G_1 \quad \text{[Equation 436]}$$
$$= e(G, H)^{\frac{1}{\gamma + u_j}}$$

In addition, in the case where at least one revoked user exists, the session key calculating unit 1309 requests the bilinear mapping operation unit 1313 to execute an operation process (Aggregate (C) algorithm) of a bilinear group on G and calculate a value shown in the following Equation 437. The bilinear mapping operation unit 1313 executes the Aggregate (A) algorithm and outputs the value of Equation 437 to the session key calculating unit 1309 (Step S2305). In addition, since the Aggregate (A) algorithm that is an operation process algorithm of a bilinear group is the same as the Aggregate (A) algorithm according to the related art, the detailed description thereof will not be repeated.

$$P_l(l=1,\ldots,r) = \frac{1}{(\gamma+u_{R_1})\ldots(\gamma+u_{R_l})} H \in G \quad \text{[Equation 437]}$$

Next, the session key calculating unit 1309 uses the operation result that is output from the bilinear mapping operation unit 1313 to calculate a value of the following Equation 438 (Step S2306).

$$\gamma P_r = P_{r-1} - u_r P_r \in G \quad \text{[Equation 438]}$$

If the session key calculating unit 1309 according to the embodiment calculates $_\gamma P_r$, the Aggregate (A) algorithm on $G_1$ does not need to be executed, and the number of times of executing the Aggregate (A) algorithm can be reduced to one.

Next, the session key calculating unit 1309 uses the operation result of the bilinear mapping operation unit 1313, the value of Equation 438, and the secret key $dk_j$ to calculate a value shown in the following Equation 439 (Step S2307).

$$K' = e\left(\frac{1}{u_j} A_j, \gamma P_r + u_j P_r\right) \in G_1 \quad \text{[Equation 439]}$$
$$= e\left(\frac{1}{\gamma+u_j} G, \frac{\gamma+u_j}{(\gamma+u_{R_1})\ldots(\gamma+u_{R_r})} H\right)$$
$$= e(G, H)^{\frac{1}{(\gamma+u_{R_1})\ldots(\gamma+u_{R_r})}}$$

With respect to each of the cases, if calculation of $P_r$ and $K'$ is completed, the header calculating unit 1311 calculates the header hdr on the basis of the following Equation 440 (Step S2308).

$$hdr = (C_1, C_2, (u_{R_1}, P_1), \ldots (u_{R_r}, P_r)) \quad \text{[Equation 440]}$$
$$= (kW, kP_r, (u_{R_1}, P_1), \ldots (u_{R_r}, P_r))$$

Next, the session key calculating unit 1309 calculates the session key K on the basis of the following Equation 441, and outputs the session key K together with the header hdr, K', k (Step S2309).

$$K = (K')^k \in G_1 \quad \text{[Equation 441]}$$

The encrypting unit 1315 of the encrypting device generates a cipher text $C=E_K(M)$ using a session key K of a plain text M and transmits the cipher text to the transmitter authentication information generating unit 1321. In addition, the cipher text transmitting unit 1317 broadcasts and distributes the generated (hdr, C) and the transmitter authentication information, which will be described below. If this process is executed, the transmitter can transmit the encrypted contents to a desired user.

In addition to the above process, the encryption of the plain text M or the encryption and broadcasting and distributing may be executed by the encryption''' process. The transmitter may execute Step S2301 and input the executed result to the encrypting device 30 that executes the encryption''' process.

[Transmitter Authentication Information Generating Process—Sign''' Process]

Next, a transmitter authentication information generating process (Sign''' process) that a transmitter authentication information generating unit 1321 according to this modification executes will be described in detail with reference to FIG. 50.

The Sign''' process is a process that is executed after a transmitter having the encrypting device 30 according to this modification generates a header hdr. In addition, the Sign''' process is a process that can be executed by only a transmitter (encrypting device 30) who has a valid secret key.

The transmitter inputs a public key $ek_i$, a unique value $u_j$ of the transmitter, a secret key $dk_j$ that is held by the transmitter, and k, K', a session key K, and a cipher text C output from the session key calculating unit 1309 after executing the encryption''' process to the encrypting device 30, and executes the Sign''' process, which will be described below.

First, the transmitter authentication information generating unit 1321 randomly selects a parameter $t \in Z_P^*$ (Step S2401). Next, the transmitter authentication information generating unit 1321 calculates $sig_{j,0}$ that is one of elements of transmitter authentication information, on the basis of the following Equation 442 (Step S2402).

$$sig_{j,0} = (K')^t = e(G, H)^{\frac{t}{(\gamma+u_{R_1})\ldots(\gamma+u_{R_r})}} \in G_1 \quad \text{[Equation 442]}$$

Next, the transmitter authentication information generating unit 1321 uses the calculated $sig_{j,0}$, the cipher text C, and the session key K, and calculates a hash value $h_j$ of these values using a hash function, on the basis of the following Equation 443 (Step S2403).

$$h_j = H(C, K, sig_{j,0}) \quad \text{[Equation 443]}$$

Next, the transmitter authentication information generating unit 1321 uses the calculated hash value $h_j$ and the selected parameter t to calculate secret information y of the transmitter on the basis of the following Equation 444 (Step S2404).

$$y = t - h_j \in Z_P^* \quad \text{[Equation 444]}$$

Next, the transmitter authentication information generating unit 1321 uses the calculated secret information y and a unique secret key $dk_j$ of the encrypting device 30 to calculate $sig_{j,1}$ that is one of elements of the transmitter authentication information on the basis of the following Equation 445. The transmitter authentication information generating unit 1321 outputs $(u_j, h_j, sig_{j,1})$ as the transmitter authentication information to the cipher text transmitting unit 1317 (Step S2405).

$$sig_{j,1} = \frac{y}{u_j} A_j = \frac{t-h_j}{\gamma+u_j} G \in G \quad \text{[Equation 445]}$$

As described above, the transmitter authentication information generating unit 1321 according to this modification uses a hash value that is related to the value calculated on the basis of the parameter arbitrarily selected by the transmitter, the cipher text C, and the session key K, thereby generating transmitter authentication information. Accordingly, when the malicious third party tampers contents of the cipher text or the session key and regenerates transmitter authentication information, the calculated hash value becomes a different value. For this reason, the receiving device 40 that has received the transmitter authentication information can use the transmitter authentication information to verify validity of the transmitter and determine whether the transmitted contents are tampered.

The encryption''' process and the Sign''' process that are executed by the encrypting device 30 according to this modification have been described. Next, the received content verifying process (Verification''' process) that is executed by the receiving device 40 according to this modification will be described.

<Operation of a Receiving Device 40: a Verification''' Process>

Figure 51:
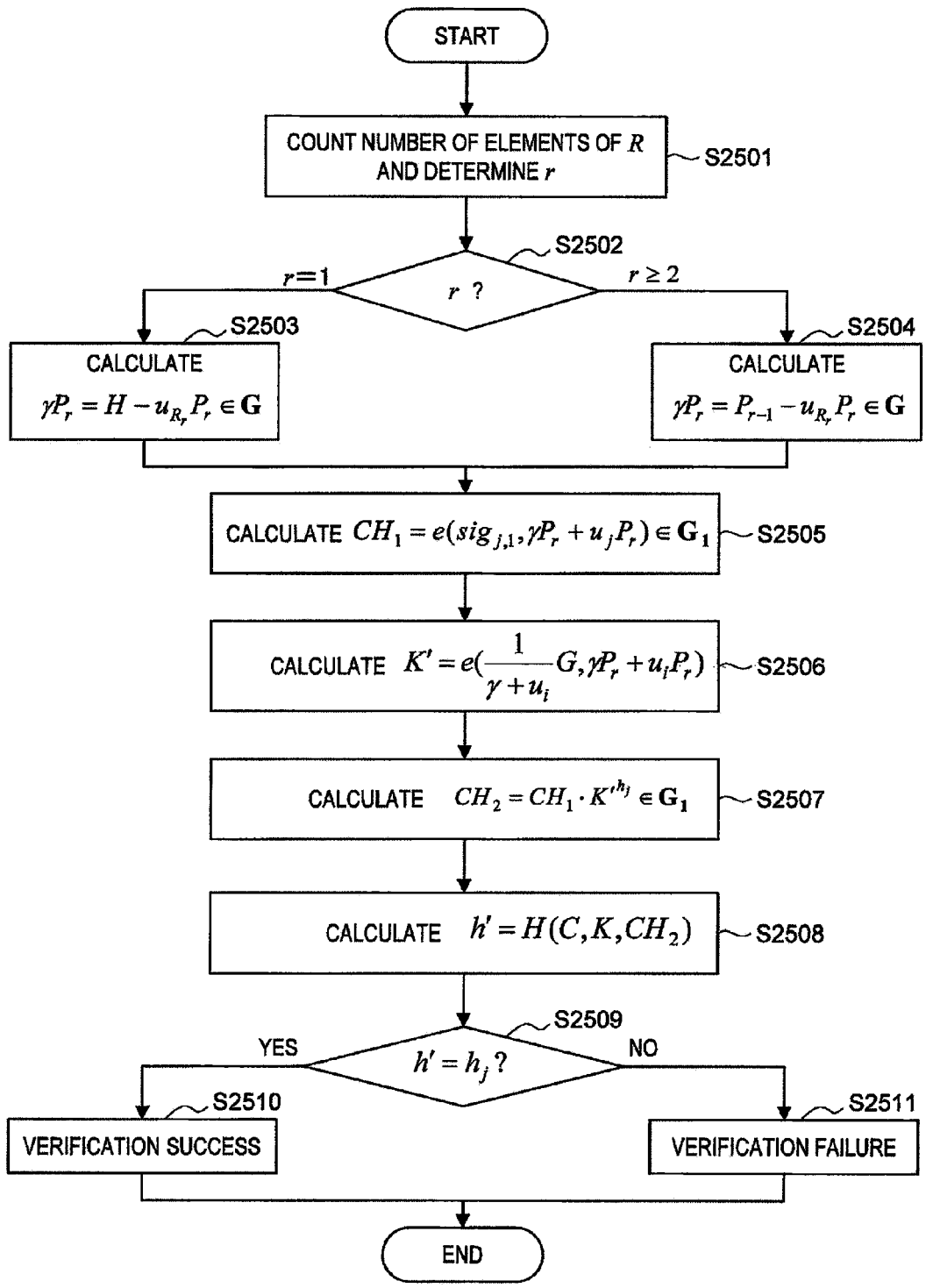
FIG. 51 is a flowchart illustrating a modification of a received content verifying process according to the embodiment.

A receiver who receives a cipher text transmitted from the encrypting device 30 operates the receiving device 40 possessed by the receiver, and executes a verification process on the received contents in accordance with the following sequence. FIG. 51 is a flowchart illustrating a Verification''' process that is executed when the receiving device 40 according to this modification verifies received contents.

The verification''' process is a process that is executed when it is confirmed whether a non-revoked user that uses the transmitted header hdr and transmitter authentication information ($u_j$, $h_j$, $sig_{j,1}$) to generate the header hdr and the cipher text C is a user having a valid secret key, and the header hdr and the cipher text C are tampered or not.

A verifier inputs the received header hdr, and the session key K, the cipher text C, and the transmitter authentication information ($u_j$, $sig_{j,0}$, $sig_{j,1}$), which are obtained as a decryption result of the header hdr, to the receiving device 40, and the receiving device 40 executes the Verification''' process, which will be described below.

In addition, during the Verification''' process, only p, G, $G_1$, and e that are the system parameter portions of the public key $ek_i$ are used. However, since theses values are generally held by each user (or the receiving device 40 that is held by the user) in advance, the public key does not need to be input in this case.

First, the received content verifying unit 1407 of the receiving device 40 counts the number of elements of a set R of revoked users and sets a count result as r (Step S2501), and then executes a determination process on the count result (Step S2502). In the case where the count result r is 1, the received content verifying unit 1407 executes Step S2503, which will be described below. In addition, in the case where the count result r is 2 or more, the received content verifying unit 1407 executes Step S2504, which will be described below.

In the case where the count result r is 1, the received content verifying unit 1407 calculates $_\gamma P_r$ on the basis of the following Equation 446 (Step S2503), and executes Step S2505, which will be described below.

$$\gamma P_r = H - u_{R_r} P_r \in G \qquad \text{[Equation 446]}$$

In addition, in the case where the count result r is 2 or more, the received content verifying unit 1407 calculates $_\gamma P_r$ on the basis of the following Equation 447 (Step S2504), and executes Step S2505, which will be described below.

$$\gamma P_r = P_{r-1} - u_{R_r} P_r \in G \qquad \text{[Equation 447]}$$

Next, the received content verifying unit 1407 uses the calculated $_\gamma P_r$, the transmitter authentication information, and the public information to calculate a verifying parameter $CH_1$ on the basis of the following Equation 448 (Step S2505).

$$CH_1 = e(sig_{j,1}, \gamma P_r + u_j P_r) \in G_1 \qquad \text{[Equation 448]}$$

Next, the received content verifying unit 1407 uses the calculated $_\gamma P_r$ and the secret key $u_i$ that is held by the received content verifying unit 1407 to calculate K' on the basis of the following Equation 449 (Step S2506).

$$K' = e\left(\frac{1}{\gamma + u_i} G, \gamma P_r + u_i P_r\right) \qquad \text{[Equation 449]}$$

Next, the received content verifying unit 1407 uses the calculated verifying parameter $CH_1$, the hash value $h_j$, and the calculated K' to calculate a verifying value $CH_2$ on the basis of the following Equation 450 (Step S2507).

$$CH_2 = CH_1 \cdot K'^{h_j} \in G_1 \qquad \text{[Equation 450]}$$

Next, the received content verifying unit 1407 uses the cipher text C transmitted from the encrypting device 30, the session key K transmitted from the session key calculating unit 1403, and the calculated $CH_2$ to calculate a hash value h' on the basis of the following Equation 451 (Step S2508).

$$h' = H(C, K, CH_2) \qquad \text{[Equation 451]}$$

Next, the received content verifying unit 1407 compares the calculated hash value h' and $h_j$ included in the transmitter authentication information (Step S2509). If the condition h'=$h_j$ is satisfied, the received content verifying unit 1407 determines that the cipher text C and the header hdr received from the encrypting device 30 are transmitted from the user j having a valid secret key and the cipher text C and the header hdr is not tampered (that is, verification is successfully made) (Step S2510). In addition, if the condition h'≠$h_j$ is satisfied, the received content verifying unit 1407 determines that the cipher text C and the header hdr received from the encrypting device 30 are not transmitted from the user j having a valid secret key or the cipher text C and the header hdr are tampered (that is, verification is failed) (Step S2511).

If the verification result is fixed, the received content verifying unit 1407 transmits the verification result to the decrypting unit 1409.

In addition, the receiver may execute the above Step S2501 and input the execution result to the receiving device 40 that executes the Verification''' process.

As described above, according to this modification, only an authenticated user can generate signing.

In addition, in the encrypting device 30 according to the above-described first to fourth embodiments, the Aggregate (C) algorithm is used to calculate $_\gamma P_r$ on the basis of the following Equation 501.

$$\gamma P_r = \frac{1}{2}(P_{r-2,r-1} + P_{r-2,r} - (u_{R_{r-1}} + u_{R_r})P_r) \qquad \text{[Equation 501]}$$

However, if the following Equation 502 is used instead of Equation 501, $_\gamma P_r$ can be calculated using the Aggregate (A) algorithm, not the Aggregate (C) algorithm.

$$\gamma P_r = P_{r-1} - u_{R_r} P_r \qquad \text{[Equation 502]}$$

It should be understood by those skilled in the art that various modifications, combinations, sub-combinations and alterations may occur depending on design requirements and other factors insofar as they are within the scope of the appended claims or the equivalents thereof.

For example, each step in each flowchart in the present specification does not need to be processed in time series in accordance with a sequence described as a flowchart, and may include processes (for example, parallel processes or processes by an object) that are executed in parallel or individually.

What is claimed is:

1. A hardware key generating device that generates a unique secret key of each of a plurality of receiving devices and a public key and public information opened to the plurality of receiving devices and an encrypting device, the key generating device comprising:
 a parameter determining unit that randomly determines a plurality of parameters that are needed when generating the secret key and the public key;
 a bilinear group selecting unit that selects a plurality of bilinear groups and bilinear mapping on the basis of the plurality of parameters; and
 a key generating unit that generates the secret key and the public key on the basis of the parameters and the plurality of bilinear groups,
 wherein an operation result from the bilinear mapping operation is used by the encrypting device to generate transmitter authentication information, which is used when it is detected whether a cipher text is tampered and validity of the cipher text is verified by a receiving device.

2. The hardware key generating device according to claim 1,
 wherein the parameter determining unit determines a prime number p of a predetermined digit as a parameter, and
 the bilinear group selecting unit selects a bilinear mapping group G and a cyclic multiplicative group $G_1$ where the prime number p is used as an order.

3. The hardware key generating device according to claim 2,
 wherein the parameter determining unit determines $\gamma \in Z_P^*$ and G, H∈G as parameters, and
 the key generating unit selects a unique value $u_i \in Z_P^*$ of the receiving device, and calculates the secret key $dk_i$ on the basis of the following Equation 1.

$$dk_i = (A_i, B_i) \in G \qquad \text{[Equation 1]}$$
$$= \left( \frac{u_i}{\gamma + u_i} G, \frac{1}{\gamma + u_i} H \right).$$

4. The hardware key generating device according to claim 3,
 wherein the key generating unit further includes a pseudo secret key calculating unit that calculates a pseudo secret key, which is not used as the secret key but opened as the public information, and
 the pseudo secret key calculating unit selects $u_0 \in Z_P^*$ opened as the public information, and calculates the pseudo secret key $dk_0$ on the basis of the following Equation 2.

$$dk_0 = (A_0, B_0) \in G \qquad \text{[Equation 2]}$$
$$= \left( \frac{u_0}{\gamma + u_0} G, \frac{1}{\gamma + u_0} H \right).$$

5. The hardware key generating device according to claim 3,
 wherein the key generating unit calculates V=e (G, H)∈$G_1$ and W=γG∈G, calculates unique public information $V_1$ of the receiving device on the basis of the following Equation 3, and calculates a public key $ek_i$ on the basis of the following Equation 4.

$$V_i = e(G, H)^{\frac{1}{\gamma + u_i}} \in G_1 \qquad \text{[Equation 3]}$$

$$ek_i = \left( \begin{array}{c} p, G, G_1, e, W, H, V, \\ (u_1, B_1, V_1), \ldots (u_i, B_i, V_i) \end{array} \right). \qquad \text{[Equation 4]}$$

6. The hardware key generating device according to claim 4,
 wherein the key generating unit calculates W=γG∈G, and calculates a public key $ek_i$ on the basis of the following Equation 5.

$$ek_i = (p, G, G_1, e, W, H, u_0, dk_0, (u_1, B_1), \ldots (u_i, B_i)) \qquad \text{[Equation 5]}$$

7. A hardware key generating device that generates a unique secret key of each of a plurality of receiving devices and a public key and public information opened to the plurality of receiving devices and an encrypting device, the key generating device comprising:
 a parameter determining unit that randomly determines a plurality of parameters that are needed when generating the secret key and the public key;
 a bilinear group selecting unit that selects a plurality of bilinear groups and bilinear mapping on the basis of the plurality of parameters; and
 a key generating unit that generates the secret key and the public key on the basis of the parameters and the plurality of bilinear groups,
 wherein an operation result from the bilinear mapping operation is used by the encrypting device to generate transmitter authentication information, which is used when it is detected whether a cipher text is tampered and validity of the cipher text is verified by a receiving device;
 wherein the parameter determining unit determines prime number p of a predetermined digit, $\gamma \in Z_P^*$, and G, H∈G as parameters,
 the bilinear group selecting unit selects a bilinear mapping group G and a cyclic multiplicative group $G_1$ where the prime number p is used as an order, and bilinear mapping e, and
 the key generating unit calculates V=e (G, H)∈$G_1$, W=γG∈G, and X=γH∈G, selects a unique value $u_i \in Z_P^*$ of the receiving device, calculates the secret key $dk_i$ on the basis of the following Equation 1, calculates unique public information $V_i$ of the receiving device on the basis of the following Equation 6, and calculates a public key $ek_i$ on the basis of the following Equation 7.

$$dk_i = (A_i, B_i) \in G \qquad \text{[Equation 1]}$$
$$= \left( \frac{u_i}{\gamma + u_i} G, \frac{1}{\gamma + u_i} H \right)$$

$$V_i = e(G, H)^{\frac{1}{\gamma + u_i}} \in G_1 \qquad \text{[Equation 6]}$$

$$ek_i = \left( \begin{array}{c} p, G, G_1, e, W, H, V, X, \\ (u_1, B_1, V_1), \ldots (u_i, B_i, V_i) \end{array} \right). \qquad \text{[Equation 7]}$$

8. A hardware encrypting device that encrypts a plain text on the basis of a public key and public information and generates a cipher text, the encrypting device comprising:

a revoked receiving device specifying unit that specifies revoked receiving devices that is not allowed to decrypt the cipher text among a plurality of receiving devices and determines a set of the revoked receiving devices;

a session key determining unit that determines a session key needed to encrypt the cipher text, on the basis of a pseudo secret key that is not used as the secret key but opened as the public information or a unique secret key of the encrypting device, the public key, and the public information and the set of revoked receiving devices;

a bilinear mapping operation unit that executes a bilinear mapping operation that is needed when calculating the session key;

a transmitter authentication information generating unit that uses an operation result from the bilinear mapping operation unit to generate transmitter authentication information, which is used when it is detected whether the cipher text is tampered and validity of the cipher text is verified by the receiving device; and an encrypting unit that encrypts the plain text using the session key, wherein the bilinear mapping operation unit outputs at least a value $P_r$ defined by the following Equation 8 as an operation result to the session key determining unit, and the session key determining unit calculates a value that is equivalent to $_\gamma P_r$ on the basis of the public information and the operation result output from the bilinear mapping operation unit, and calculates a session key on the basis of the calculated $_\gamma P_r$, the public information, and the pseudo secret key opened as the public information or the unique secret key of the encrypting device.

$$P_l(l=1, \ldots, r) = \frac{1}{(\gamma + u_{R_1}) \ldots (\gamma + u_{R_l})} H \in G.$$ [Equation 8]

9. The hardware encrypting device according to claim 8, wherein, when the number r of elements of the set of revoked receiving devices is 2 or more, the bilinear mapping operation unit outputs values defined by the following Equations 9 and 10 in addition to Equation 8 as an operation result to the session key determining unit.

$$P_{r-2,r-1} = \frac{1}{(\gamma + u_{R_1}) \ldots (\gamma + u_{R_{r-2}})(\gamma + u_{R_{r-1}})} H \in G$$ [Equation 9]

$$P_{r-2,r} = \frac{1}{(\gamma + u_{R_1}) \ldots (\gamma + u_{R_{r-2}})(\gamma + u_{R_r})} H \in G.$$ [Equation 10]

10. The hardware encrypting device according to claim 9, wherein the session key determining unit calculates a value $_\gamma P_r$ defined by the following Equation 11, on the basis of the public information and the operation result output from the bilinear mapping operation unit, and the session key determining unit calculates a session key, on the basis of the value $_\gamma P_r$, the public information, and the pseudo secret key opened as the public information or the unique secret key of the encrypting device.

$$\gamma P_r = \frac{1}{2}(P_{r-2,r-1} + P_{r-2,r} - (u_{R_{r-1}} + u_{R_r})P_r).$$ [Equation 11]

11. The hardware encrypting device according to claim 8, wherein the session key determining unit calculates the value $_\gamma P_r$ defined by the following Equation 12, on the basis of the public information and the operation result output from the bilinear mapping operation unit, and the session key determining unit calculates a session key, on the basis of the value $_\gamma P_r$, the public information, and the pseudo secret key opened as the public information or the unique secret key of the encrypting device.

$$\gamma P_r = P_{r-1} - u_{R_r} P_r$$ [Equation 12]

12. The hardware encrypting device according to claim 10 or 11, wherein the session key determining unit selects $k \in Z_p^*$, calculates a value K' defined by the following Equation 13 on the basis of the value $_\gamma P_r$, the public information, and the pseudo secret key opened as the public information or the unique secret key of the encrypting device, and calculates a session key $K=(K')^k \in G_1$.

$$K' = e\left(\frac{1}{u_j} A_j, \gamma P_r + u_j P_r\right) \in G_1.$$ [Equation 13]

13. The hardware encrypting device according to claim 12, wherein the session key determining unit calculates a header hdr transmitted together with the cipher text, on the basis of the following Equation 14.

$$hdr=(kW, kP_r, (u_{R_1}, P_1), \ldots (u_{R_r}, P_r))$$ [Equation 14]

14. The hardware encrypting device according to claim 9 or 11, further comprising:

a utilization key specifying unit that determines whether the encrypting device holds a unique secret key thereof and specifies a secret key used when a session key is calculated, wherein, when it is determined that the encrypting device holds the unique secret key thereof, the session key determining unit uses the unique secret key of the encrypting device to calculate the session key K, and when it is determined that the encrypting device does not hold the unique secret key thereof, the session key determining unit uses a pseudo secret key included in the public information to calculate the session key K.

15. The hardware encrypting device according to claim 8, further comprising:

a session key calculating method selecting unit that holds a second session key calculating method that is used to calculate the session key K, and selects a session key calculating method to calculate the session key K, wherein the session key calculating method selecting unit selects the session key calculating method used by the session key determining unit in accordance with the number r of elements of the set of revoked receiving devices.

16. The hardware encrypting device according to claim 8, wherein the transmitter authentication information generating unit uses the public key, the public information, the unique secret key of the encrypting device, the parameters and the session key used when the session key is calculated, and the cipher text, thereby generating the transmitter authentication information.

17. The hardware encrypting device according to claim 16, wherein the transmitter authentication information generating unit selects an arbitrary parameter $t \in Z_p^*$, and uses the public information and the parameter t to calculate an element $sig_{j,0}$ of the transmitter authentication information on the basis of the following Equation 15, and the transmitter authentication information generating unit uses the cipher text C, the session key K, the calculated element $sig_{j,0}$, and a hash function H to calculate a hash value h on the basis of the following Equation 16.

$$sig_{j,0} = e(G, H)^{\overline{(\gamma+u_{R_1})\cdots(\gamma+u_{R_r})}} \in G \qquad \text{[Equation 15]}$$

$$h = H(C, K, sig_{j,0}). \qquad \text{[Equation 16]}$$

18. The hardware encrypting device according to claim 17, wherein the transmitter authentication information generating unit calculates secret information y of the encrypting device on the basis of the following Equation 17, and uses the secret information y and the unique secret key of the encrypting device to calculate an element $sig_{j,1}$ of the transmitter authentication information on the basis of the following Equation 18, and the transmitter authentication information generating unit uses the unique value $u_i$ of the encrypting device, the element $sig_{j,0}$, and the element $sig_{j,1}$ to set ($u_i$, $sig_{j,0}$, $sig_{j,1}$) as the transmitter authentication information.

$$y = t - hk \in Z_p^* \qquad \text{[Equation 17]}$$

$$sig_{j,1} = \frac{y}{u_j} A_j = \frac{t-hk}{\gamma+u_j} G \in G. \qquad \text{[Equation 18]}$$

19. The hardware encrypting device according to claim 17, wherein the transmitter authentication information generating unit calculates secret information y of the encrypting device on the basis of the following Equation 19, and uses the secret information y and the unique secret key of the encrypting device to calculate an element $sig_{j,1}$ of the transmitter authentication information on the basis of the following Equation 20, and the transmitter authentication information generating unit uses the unique value $u_i$ of the encrypting device, the element $sig_{j,0}$, and the element $sig_{j,1}$ to set ($u_i$, $sig_{j,0}$, $sig_{j,1}$) as the transmitter authentication information.

$$y = t - h \in Z_p^* \qquad \text{[Equation 19]}$$

$$sig_{j,1} = \frac{y}{u_j} A_j = \frac{t-h}{\gamma+u_j} G \in G. \qquad \text{[Equation 20]}$$

20. The hardware encrypting device according to claim 17, wherein the transmitter authentication information generating unit calculates secret information y of the encrypting device on the basis of the following Equation 19, and uses the secret information y and the unique secret key of the encrypting device to calculate an element $sig_{j,1}$ of the transmitter authentication information on the basis of the following Equation 20, and the transmitter authentication information generating unit uses the unique value $u_i$ of the encrypting device and the calculated hash value h and element $sig_{j,1}$ to set ($u_i$, h, $sig_{j,1}$) as the transmitter authentication information.

$$y = t - h \in Z_p^* \qquad \text{[Equation 19]}$$

$$sig_{j,1} = \frac{y}{u_j} A_j = \frac{t-h}{\gamma+u_j} G \in G. \qquad \text{[Equation 20]}$$

21. A hardware receiving device that communicates with a key generating device and an encrypting device, the receiving device comprising:

a session key calculating unit that calculates a session key used to decrypt a cipher text transmitted from the encrypting device, on the basis of a unique secret key of the receiving device, a public key, and public information generated by the key generating device, and a header transmitted from the encrypting device;

a received content verifying unit that uses the header, the cipher text, transmitter authentication information transmitted from the encrypting device, and the calculated session key to verify received information; and a bilinear mapping operation unit that executes a bilinear mapping operation needed when the session key is calculated, wherein the bilinear mapping operation unit operates a value $B_{i,r}$ defined by the following Equation 21 on the basis of the public key and the public information, the received content verifying unit uses the calculated session key, the cipher text, and the transmitter authentication information to calculate a predetermined value, and verifies the predetermined value on the basis of whether the predetermined value is equal to a portion of elements constituting the transmitter authentication information, and the session key calculating unit calculates the session key on the basis of the following Equation 22.

$$B_{i,R} = \frac{1}{\prod_{j=1}^{r}(\gamma+u_{R_j})} B_i \qquad \text{[Equation 21]}$$

$$K = e(kW, B_{i,R}) \cdot e(A_i, kP_r). \qquad \text{[Equation 22]}$$

22. A hardware receiving device that communicates with a key generating device and an encrypting device, the receiving device comprising:

a session key calculating unit that calculates a session key used to decrypt a cipher text transmitted from the encrypting device, on the basis of a unique secret key of the receiving device, a public key, and public information generated by the key generating device, and a header transmitted from the encrypting device;

a received content verifying unit that uses the header, the cipher text, transmitter authentication information transmitted from the encrypting device, and the calculated session key to verify received information; and a bilinear mapping operation unit that executes a bilinear mapping operation needed when the session key is calculated and the received information is verified, wherein the received content verifying unit uses the calculated session key, the cipher text, and the transmitter authentication information to calculate a predetermined value, and verifies the predetermined value on the basis of whether the predetermined value is equal to a portion of elements constituting the transmitter authentication information.

23. The hardware receiving device according to claim 22, wherein the received content verifying unit uses a value $_\gamma P_r$ calculated in accordance with r as the number of revoked receiving devices, the transmitter authentication information ($u_i$, $sig_{j,0}$, $sig_{j,1}$), and the header to calculate a parameter $CH_1$ on the basis of the following Equation 23, the received content verifying unit uses the cipher text, the calculated session key K, and an element $sig_{j,0}$ of the transmitter authentication information to calculate a hash value h' on the basis of the following Equation 24, and the received content verifying unit uses the parameter $CH_1$, the session key K, and the hash value h' to calculate a verifying parameter $CH_2$ on the basis of the following Equation 25.

$$CH_1 = e(sig_{j,1}, \gamma P_r + u_j P_r) \in G_1 \quad \text{[Equation 23]}$$

$$h' = H(C, K, sig_{j,0}) \quad \text{[Equation 24]}$$

$$CH_2 = CH_1 \cdot K^{h'} \in G_1 \quad \text{[Equation 25]}$$

24. The hardware receiving device according to claim 22, wherein the received content verifying unit
uses a value $_\gamma P_r$ calculated in accordance with r as the number of revoked receiving devices, the transmitter authentication information ($u_i$, $sig_{j,0}$, $sig_{j,1}$), and the header to calculate a parameter $CH_1$ on the basis of the following Equation 23,
uses the cipher text, the calculated session key K, and an element $sig_{j,0}$ of the transmitter authentication information to calculate a hash value h' on the basis of the following Equation 24,
uses the public key, the public information, and the calculated value $_\gamma P_r$ to calculate a parameter K' on the basis of the following Equation 26, and
uses the parameter $CH_1$, the parameter K', and the hash value h' to calculate a verifying parameter $CH_2$ on the basis of the following Equation 27.

$$CH_1 = e(sig_{j,1}, \gamma P_r + u_j P_r) \in G_1 \quad \text{[Equation 23]}$$

$$h' = H(C, K, sig_{j,0}) \quad \text{[Equation 24]}$$

$$K' = e\left(\frac{1}{\gamma + u_0}G, \gamma P_r + u_0 P_r\right) \quad \text{[Equation 26]}$$

$$CH_2 = CH_1 \cdot K'^{h'} \in G_1. \quad \text{[Equation 27]}$$

25. The hardware receiving device according to claim 23, wherein the received content verifying unit
uses a value $_\gamma P_r$ calculated in accordance with r as the number of revoked receiving devices, the transmitter authentication information ($u_i$, h, $sig_{j,1}$), and the header to calculate a parameter $CH_1$ on the basis of the following Equation 23,
uses the public key, the public information, the calculated value $_\gamma P_r$, and the unique secret key of the receiving device to calculate a parameter K' on the basis of the following Equation 28,
uses the parameter $CH_1$, the parameter K', and an element h of the transmitter authentication information to calculate a verifying parameter $CH_2$ on the basis of the following Equation 29, and
uses the cipher text, the calculated session key K, and the calculated verifying parameter $CH_2$ to calculate a hash value h' on the basis of the following Equation 30.

[Formula 18]

$$CH_1 = e(sig_{j,1}, \gamma P_r + u_j P_r) \in G_1 \quad \text{[Equation 23]}$$

$$K' = e\left(\frac{1}{\gamma + u_i}G, \gamma P_r + u_i P_r\right) \quad \text{[Equation 28]}$$

$$CH_2 = CH_1 \cdot K'^h \in G_1 \quad \text{[Equation 29]}$$

$$h' = H(C, K, CH_2). \quad \text{[Equation 30]}$$

26. The hardware receiving device according to claim 23 or 24,
wherein the received content verifying unit
determines that verification is successfully made, when the verifying parameter $CH_2$ is equal to an element $sig_{j,0}$ of the transmitter authentication information, and
determines that the verification is failed, when the verifying parameter $CH_2$ is not equal to the element $sig_{j,0}$ of the transmitter authentication information.

27. The hardware receiving device according to claim 25, wherein the received content verifying unit determines that verification is successfully made, when the hash value h' is equal to an element h of the transmitter authentication information, and
determines that the verification is failed, when the hash value h' is not equal to the element h of the transmitter authentication information.

28. The hardware receiving device according to claim 26, further comprising:
a decrypting unit that decrypts the cipher text using the calculated session key,
wherein the decrypting unit executes a decryption process on the cipher text in accordance with a verification result of the received content verifying unit.

29. The hardware receiving device according to claim 27, further comprising:
a decrypting unit that decrypts the cipher text using the calculated session key,
wherein the decrypting unit executes a decryption process on the cipher text in accordance with a verification result of the received content verifying unit.

30. The hardware receiving device according to claim 22, wherein the decrypting unit does not execute a decryption process on the cipher text, when the transmitter authentication information is generated using a pseudo secret key that is not used as the secret key but opened as the public information.

31. A key generating method, implemented by a computer, that generates a unique secret key of each of a plurality of receiving devices and a public key and public information opened to the plurality of receiving devices and an encrypting device, the key generating method comprising the steps of:
randomly determining, by the computer, a plurality of parameters that are needed when generating the secret key and the public key;
selecting a plurality of bilinear groups and bilinear mapping on the basis of the plurality of parameters; and
generating, by the computer, the secret key and the public key on the basis of the parameters and the plurality of bilinear groups,
wherein an operation result from the bilinear mapping operation is used by the encrypting device to generate transmitter authentication information, which is used when it is detected whether a cipher text is tampered and validity of the cipher text is verified by a receiving device.

32. A key generating method, implemented by a computer, that generates a unique secret key of each of a plurality of receiving devices and a public key and public information opened to the plurality of receiving devices and an encrypting device, the key generating method comprising the steps of:

randomly determining, by the computer, a plurality of parameters that are needed when generating the secret key and the public key and selecting a plurality of bilinear groups and bilinear mapping on the basis of the plurality of parameters; and generating, by the computer, the secret key and the public key on the basis of the parameters and the plurality of bilinear groups, wherein an operation result from the bilinear mapping operation is used by the encrypting device to generate transmitter authentication information, which is used when it is detected whether a cipher text is tampered and validity of the cipher text is verified by a receiving device;

wherein, in the step of determining the parameters and selecting the plurality of bilinear groups and bilinear mapping, a prime number p of a predetermined digit, $\gamma \in Z_P^*$, and G, H$\in$G are determined as parameters, and a bilinear mapping group G and a cyclic multiplicative group $G_1$ where the prime number p is used as an order and bilinear mapping e are selected, and in the key generating step, V=e (G, H)$\in G_1$, W=$\gamma$G$\in$G, and X=$\gamma$H$\in$G are calculated, a unique value $u_i \in Z_P^*$ of the receiving device is selected, the secret key $dk_i$ is calculated on the basis of the following Equation 1, unique public information $V_1$ of the receiving device is calculated on the basis of the following Equation 6, and a public key $ek_i$ is calculated on the basis of the following Equation 7.

$$dk_i = (A_i, B_i) \in G \qquad \text{[Equation 1]}$$
$$= \left( \frac{u_i}{\gamma + u_i} G, \frac{1}{\gamma + u_i} H \right)$$

$$V_i = e(G, H) \in G_1 \qquad \text{[Equation 6]}$$

$$ek_i = \begin{matrix} (p, G, G_1, e, W, H, V, X, \\ (u_1, B_1, V_1), \ldots (u_i, B_i, V_i)). \end{matrix} \qquad \text{[Equation 7]}$$

33. An encrypting method, implemented by a computer, that encrypts a plain text on the basis of a public key and public information and generates a cipher text, the encrypting method comprising the steps of:

specifying revoked receiving devices that are not allowed to decrypt the cipher text among a plurality of receiving devices and determining a set of the revoked receiving devices;

executing, by the computer, a bilinear mapping operation that is needed when calculating a session key used to encrypt the plain text, and outputting at least a value $P_r$ defined as the following Equation 8 as an operation result;

determining, by the computer, the session key used to encrypt the cipher text, on the basis of a pseudo secret key that is not used as the secret key but opened as the public information or a unique secret key of the encrypting device, the public key, the public information, the set of revoked receiving devices, and the operation result;

generating transmitter authentication information using an operation result obtained by executing the bilinear mapping operation step to generate transmitter authentication information, which is used when it is detected whether the cipher text is tampered and validity of the cipher text is verified by the receiving device; and encrypting, by the computer, the plain text using the session key.

$$P_l(l=1, \ldots, r) = \frac{1}{(\gamma + u_{R_1}) \ldots (\gamma + u_{R_l})} H \in G. \qquad \text{[Equation 8]}$$

34. The encrypting method according to claim 33, wherein, in the bilinear mapping operation step, when the number r of elements of the set of revoked receiving devices is 2 or more, values defined by Equations 9 and 10 in addition to Equation 8 are output as an operation result.

$$P_{r-2,r-1} = \frac{1}{(\gamma + u_{R_1}) \ldots (\gamma + u_{R_{r-2}})(\gamma + u_{R_{r-1}})} H \in G \qquad \text{[Equation 9]}$$

$$P_{r-2,r} = \frac{1}{(\gamma + u_{R_1}) \ldots (\gamma + u_{R_{r-2}})(\gamma + u_{R_r})} H \in G. \qquad \text{[Equation 10]}$$

35. A key processing method, implemented by a computer, that is executed by a receiving device that communicates with a key generating device and an encrypting device, the key processing method comprising the steps of:

executing, by the computer, a bilinear mapping operation that is needed when calculating a session key used to decrypt a cipher text transmitted from the encrypting device, and outputting a value $B_{i,r}$ defined by the following Equation 21;

calculating, by the computer, the session key using the following Equation 22, on the basis of a unique secret key of the receiving device, a public key, and public information generated by the key generating device, and a header transmitted from the encrypting device; and verifying received content using the header, the cipher text, transmitter authentication information transmitted from the encrypting device, and the calculated session key, wherein the step of verifying uses the calculated session key, the cipher text, and the transmitter authentication information to calculate a predetermined value, and verifies the predetermined value on the basis of whether the predetermined value is equal to a portion of elements constituting the transmitter authentication information.

$$B_{i,R} = \frac{1}{\prod_{j=1}^{r}(\gamma + u_{R_j})} B_i \qquad \text{[Equation 21]}$$

$$K = e(kW, B_{i,R}) \cdot e(A_i, kP_r). \qquad \text{[Equation 22]}$$

36. A key processing method, implemented by a computer, that is executed by a receiving device that communicates with a key generating device and an encrypting device, the key processing method comprising the steps of:

executing, by the computer, a bilinear mapping operation that is needed when calculating a session key used to decrypt a cipher text transmitted from the encrypting device;

calculating, by the computer, the session key used to decrypt the cipher text transmitted from the encrypting device, on the basis of a unique secret key of the receiving device, a public key, and public information generated by the key generating device, and a header transmitted from the encrypting device; and verifying received content using the header, the cipher text, transmitter authentication information transmitted from the encrypting device, and the calculated session key, wherein the step of verifying uses the calculated session key, the cipher text, and the transmitter authentication information to calculate a predetermined value, and verifies the predetermined value on the basis of whether the predetermined value is equal to a portion of elements constituting the transmitter authentication information.

37. A non-transitory computer readable medium encoded with a program that allows a computer to function as a key generating device that generates a unique secret key of each of a plurality of receiving devices and a public key and public information opened to the plurality of receiving devices and an encrypting device, the program allowing the computer to execute:

a parameter determining function of randomly determining a plurality of parameters that are needed when generating the secret key and the public key;

a bilinear group selecting function of selecting a plurality of bilinear groups and bilinear mapping on the basis of the plurality of parameters; and a key generating function of generating the secret key and the public key on the basis of the parameters and the plurality of bilinear groups, wherein an operation result from the bilinear mapping operation is used by the encrypting device to generate transmitter authentication information, which is used when it is detected whether a cipher text is tampered and validity of the cipher text is verified by a receiving device.

38. A non-transitory computer readable medium encoded with a program that allows a computer to function as a key generating device that generates a unique secret key of each of a plurality of receiving devices and a public key and public information opened to the plurality of receiving devices and an encrypting device, the program allowing the computer to execute:

a parameter determining function of determining a prime number p of a predetermined digit, $\gamma \in Z_P^*$, and G, H$\in$G as parameters, which are needed when generating the secret key and the public key;

a bilinear group selecting function of selecting a bilinear mapping group G and a cyclic multiplicative group $G_1$ where the prime number p is used as an order and bilinear mapping e, on the basis of the prime number p of the predetermined digit; and a key generating function of calculating V=e (G, H)$\in G_1$, W=$\gamma$G$\in$G, and X=$\gamma$H$\in$G, selecting a unique value $u_i \in Z_P^*$ of the receiving device, outputting a value defined by the following Equation 1 as an operation result and setting the value as the secret key $dk_i$, outputting a value defined by the following Equation 6 as an operation result and setting the value as unique public information $V_i$ of the receiving device, and outputting a value defined by the following Equation 7 as an operation result and setting the value as a public key $ek_i$, on the basis of the parameters and the plurality of bilinear groups, wherein an operation result from the bilinear mapping operation is used by the encrypting device to generate transmitter authentication information, which is used when it is detected whether a cipher text is tampered and validity of the cipher text is verified by a receiving device.

$$dk_i = (A_i, B_i) \in G \qquad \text{[Equation 1]}$$
$$= \left( \frac{u_i}{\gamma + u_i} G, \frac{1}{\gamma + u_i} H \right)$$

$$V_i = e(G, H)^{\frac{1}{\gamma + u_i}} \in G_1 \qquad \text{[Equation 6]}$$

$$ek_i = \begin{array}{l} (p, G, G_1, e, W, H, V, X, \\ (u_1, B_1, V_1), \ldots (u_i, B_i, V_i)). \end{array} \qquad \text{[Equation 7]}$$

39. A non-transitory computer readable medium encoded with a program that allows a computer to function as an encrypting device that encrypts a plain text on the basis of a public key and public information and generates a cipher text, the program allowing the computer to execute:

a revoked receiving device specifying function of specifying revoked receiving devices where the cipher text is not transmitted among a plurality of receiving devices and determining a set of the revoked receiving devices;

a session key determining function of determining a session key used to encrypt the plain text, on the basis of a pseudo secret key that is not used as the secret key but opened as the public information or a unique secret key of the encrypting device, the public key, the public information, and the set of revoked receiving devices;

a bilinear mapping operation function of executing a bilinear mapping operation needed when the session key is calculated on the basis of the pseudo secret key that is not used as the secret key but opened as the public information or the unique secret key of the encrypting device, the public key, the public information, and the set of revoked receiving devices, and outputting at least a value $P_r$ defined by the following Equation 8 as an operation result;

a transmitter authentication information generating function of using an operation result from the bilinear mapping operation unit to generate transmitter authentication information, which is used when it is detected whether the cipher text is tampered and validity of the cipher text is verified by the receiving device; and an encrypting function of encrypting the plain text using the session key.

$$P_l(l=1, \ldots, r) = \frac{1}{(\gamma + u_{R_1}) \ldots (\gamma + u_{R_l})} H \in G. \qquad \text{[Equation 8]}$$

40. A non-transitory computer readable medium encoded with a program that allows a computer to function as a receiving device that communicates with a key generating device and an encrypting device, the program allowing the computer to execute:

a bilinear mapping operation function of executing a bilinear mapping operation needed when calculating a session key used to decrypt a cipher text transmitted from the encrypting device, and outputting a value $B_{i,r}$ defined by the following Equation 21;

a received content verifying function of using the header, the cipher text, transmitter authentication information transmitted from the encrypting device, and the calculated session key to verify the received information; and a session key calculating function of calculating the session key using the following Equation 22, on the basis of a unique secret key of the receiving device, a public key, and public information generated by the key generating device, and a header transmitted from the encrypting device, wherein the received content verifying function uses the calculated session key, the cipher text, and the transmitter authentication information to calculate a predetermined value, and verifies the predetermined value on the basis of whether the predetermined value is equal to a portion of elements constituting the transmitter authentication information.

$$B_{i,R} = \frac{1}{\prod_{j=1}^{r}(\gamma + u_{R_j})} B_i \qquad \text{[Equation 21]}$$

$$K = e(kW, B_{i,R}) \cdot e(A_i, kP_r). \qquad \text{[Equation 22]}$$

41. A non-transitory computer readable medium encoded with a program that allows a computer to function as a receiving device that communicates with a key generating device and an encrypting device, the program allowing the computer to execute:

a session key calculating function of calculating a session key used to decrypt a cipher text transmitted from the encrypting device, on the basis of a unique secret key of the receiving device, a public key, and public information generated by the key generating device, and a header transmitted from the encrypting device;

a received content verifying function of using the header, the cipher text, transmitter authentication information transmitted from the encrypting device, and the calculated session key to verify the received information; and a bilinear mapping operation function of executing a bilinear mapping operation needed when the session key is calculated and the received information is verified, wherein the received content verifying function uses the calculated session key, the cipher text, and the transmitter authentication information to calculate a predetermined value, and verifies the predetermined value on the basis of whether the predetermined value is equal to a portion of elements constituting the transmitter authentication information.

* * * * *